(12) United States Patent
Reese et al.

(10) Patent No.: US 9,907,436 B2
(45) Date of Patent: Mar. 6, 2018

(54) HOLDING OVEN

(71) Applicant: Duke Manufacturing Co., St. Louis, MO (US)

(72) Inventors: Robert J. Reese, Edwardsville, IL (US); John Edward Wright, St. Louis, MO (US); Philip Tiberio, St. Charles, MO (US); Steven M. Shei, Fort Wayne, IN (US); Ralph Lee Macy, St. Peters, MO (US); Christopher Seay Green, Affton, MO (US); Gregory Glen Stettes, Pacific, MO (US); Jeffrey Steven Markwardt, Maryland Heights, MO (US)

(73) Assignee: Duke Manufacturing Co., St. Louis, MO (US)

( * ) Notice: Subject to any disclaimer, the term of this patent is extended or adjusted under 35 U.S.C. 154(b) by 1206 days.

(21) Appl. No.: 13/968,104

(22) Filed: Aug. 15, 2013

(65) Prior Publication Data

US 2014/0083309 A1 Mar. 27, 2014

Related U.S. Application Data

(63) Continuation of application No. PCT/US2012/025284, filed on Feb. 15, 2012.

(Continued)

(51) Int. Cl.
*A23B 4/03* (2006.01)
*A47J 39/00* (2006.01)
(Continued)

(52) U.S. Cl.
CPC .............. *A47J 39/003* (2013.01); *A21B 3/04* (2013.01); *A47J 39/006* (2013.01); *B23P 19/04* (2013.01);
(Continued)

(58) Field of Classification Search
CPC ......... A21B 3/04; A47J 39/003; A47J 39/006; B23P 19/04; F24C 15/003; F24C 15/327;
(Continued)

(56) References Cited

U.S. PATENT DOCUMENTS 1,552,490 A 9/1925 McClafferty
3,345,047 A * 10/1967 Gooden ................ A61M 16/16
128/200.17

(Continued)

FOREIGN PATENT DOCUMENTS

CN 87208485 U 3/1988
CN 2774646 Y 4/2006
(Continued)

OTHER PUBLICATIONS

Henny Penny Humidified Holding Cabinets, Model HHC-990/992/993/996/997/998, 60 pages.

(Continued)

*Primary Examiner* — Dana Ross
*Assistant Examiner* — Joseph Iskra
(74) *Attorney, Agent, or Firm* — Senniger Powers LLP

(57) ABSTRACT

Methods, ovens, and associated apparatus. Ovens and methods are adapted for maintaining the quality of a pre-cooked food product. Rapid temperature and/or relative humidity restoration may be used. Ovens may include a partition movable to vary sizes of oven cavities. Ovens may include removable interior panels. Humidification mechanisms are adapted for generating water vapor which may be used to maintain the quality of a pre-cooked food product.

18 Claims, 95 Drawing Sheets

Related U.S. Application Data

(60) Provisional application No. 61/443,097, filed on Feb. 15, 2011, provisional application No. 61/472,967, filed on Apr. 7, 2011, provisional application No. 61/564,152, filed on Nov. 28, 2011.

(51) Int. Cl.
| | |
|---|---|
| *F24C 15/32* | (2006.01) |
| *B23P 19/04* | (2006.01) |
| *A21B 3/04* | (2006.01) |
| *F24C 15/00* | (2006.01) |
| *H05B 3/28* | (2006.01) |
| *H05B 3/42* | (2006.01) |

(52) U.S. Cl.
CPC .......... *F24C 15/003* (2013.01); *F24C 15/327* (2013.01); *H05B 3/28* (2013.01); *H05B 3/42* (2013.01); *H05B 2203/003* (2013.01); *Y10T 29/49815* (2015.01)

(58) Field of Classification Search
CPC ...... H05B 2203/003; H05B 3/28; H05B 3/42; Y10T 29/49815; A21D 17/008; A23L 5/13
USPC ............. 126/1 R, 19 R, 21 R, 21 A, 38, 273, 126/273 R, 344, 369; 99/324, 325, 447, 99/467, 468; 219/200, 385, 391; 426/510–511, 523
See application file for complete search history.

(56) References Cited

U.S. PATENT DOCUMENTS

| | | | |
|---|---|---|---|
| 3,476,673 A * | 11/1969 | Stiles ...................... | C23F 14/00 |
| | | | 204/196.05 |
| 3,952,609 A | 4/1976 | Klemm | |
| 3,955,007 A | 5/1976 | Roderick | |
| 4,013,434 A | 3/1977 | Kronenberger et al. | |
| 4,062,983 A | 12/1977 | Roderick | |
| 4,276,754 A | 7/1981 | Ty | |
| 4,426,923 A | 1/1984 | Ohata | |
| 4,437,396 A | 3/1984 | Plattner et al. | |
| 4,557,118 A | 12/1985 | Pink et al. | |
| 4,623,780 A | 11/1986 | Shelton | |
| 4,700,685 A * | 10/1987 | Miller ...................... | A21B 1/24 |
| | | | 126/20 |
| 4,722,268 A | 2/1988 | Rightley | |
| 4,730,100 A | 3/1988 | Pingelton | |
| 4,780,254 A | 10/1988 | Ando | |
| 4,835,368 A | 5/1989 | Fortmann et al. | |
| 4,850,206 A | 7/1989 | Larsen | |
| 4,870,836 A | 10/1989 | Pink | |
| 4,891,498 A | 1/1990 | Fortmann et al. | |
| 4,924,072 A | 5/1990 | Oslin | |
| 5,025,132 A | 6/1991 | Fortmann et al. | |
| 5,083,505 A | 1/1992 | Kohlstrung et al. | |
| 5,365,039 A | 11/1994 | Chaudoir | |
| 5,377,498 A | 1/1995 | Cur et al. | |
| 5,451,744 A | 9/1995 | Koopman et al. | |
| 5,460,009 A | 10/1995 | Wills et al. | |
| 5,463,940 A | 11/1995 | Cataldo | |
| 5,474,789 A | 12/1995 | Hayami et al. | |
| 5,519,188 A | 5/1996 | Yuichi et al. | |
| 5,530,223 A * | 6/1996 | Culzoni ................... | A21B 3/04 |
| | | | 126/20 |
| 5,532,456 A | 7/1996 | Smith et al. | |
| 5,540,492 A | 7/1996 | Dasher et al. | |
| 5,558,010 A | 9/1996 | Shelton | |
| 5,619,983 A * | 4/1997 | Smith ...................... | A47J 27/16 |
| | | | 126/20 |
| 5,642,628 A | 7/1997 | Whipple, III et al. | |
| 5,653,905 A | 8/1997 | McKinney | |
| 5,660,103 A | 8/1997 | Koopman | |
| 5,715,745 A | 2/1998 | Blanton, Jr. et al. | |
| 5,771,789 A | 6/1998 | Davis | |
| 5,786,568 A | 7/1998 | McKinney | |
| 5,918,480 A | 7/1999 | Nagata et al. | |
| 6,121,583 A | 9/2000 | Hansen | |
| D435,096 S | 12/2000 | Meeks | |
| 6,188,045 B1 * | 2/2001 | Hansen .................... | F22B 27/16 |
| | | | 126/20 |
| 6,250,215 B1 | 6/2001 | Brenn | |
| 6,342,262 B1 * | 1/2002 | Wuest ..................... | F24C 15/327 |
| | | | 126/20 |
| D453,822 S | 2/2002 | Meeks et al. | |
| 6,427,461 B1 | 8/2002 | Whinery et al. | |
| 6,453,802 B1 | 9/2002 | Manganiello et al. | |
| 6,454,176 B1 | 9/2002 | Burkett et al. | |
| 6,497,907 B2 | 12/2002 | Hofer | |
| 6,570,138 B2 | 5/2003 | Hansen et al. | |
| 6,658,995 B1 | 12/2003 | DeYoung et al. | |
| 6,670,585 B2 | 12/2003 | Burkett et al. | |
| 6,832,732 B2 | 12/2004 | Burkett et al. | |
| 6,904,761 B2 | 6/2005 | Rafalovich et al. | |
| 6,987,246 B2 * | 1/2006 | Hansen ................... | F24C 15/327 |
| | | | 126/20 |
| 7,089,850 B2 | 8/2006 | Lee et al. | |
| 7,220,946 B2 | 5/2007 | Majchrzak et al. | |
| 7,235,762 B2 | 6/2007 | Gagas et al. | |
| 7,279,659 B2 | 10/2007 | Gagas et al. | |
| 7,297,905 B2 | 11/2007 | Kim et al. | |
| 7,363,773 B2 | 4/2008 | Lee et al. | |
| 7,451,691 B2 | 11/2008 | Robertson | |
| 7,677,165 B2 | 3/2010 | Adams | |
| 8,378,265 B2 * | 2/2013 | Greenwood ............. | F24C 7/082 |
| | | | 126/21 A |
| 2002/0178930 A1 | 12/2002 | Lee et al. | |
| 2006/0113294 A1 | 6/2006 | LoMaglio et al. | |
| 2007/0108179 A1 | 5/2007 | Hines, Jr. | |
| 2008/0078371 A1 | 4/2008 | Bosciano | |
| 2008/0134712 A1 | 6/2008 | Civanelli | |
| 2008/0202350 A1 | 8/2008 | Maki | |
| 2009/0007798 A1 | 1/2009 | Yamaguchi et al. | |
| 2009/0032521 A1 | 2/2009 | Kim et al. | |
| 2009/0064874 A1 | 3/2009 | Chew | |
| 2009/0173101 A1 | 7/2009 | Hynes | |
| 2009/0249963 A1 | 10/2009 | Linskens et al. | |
| 2009/0274802 A1 | 11/2009 | Kling et al. | |
| 2010/0255165 A1 | 10/2010 | Rees | |
| 2010/0301034 A1 | 12/2010 | Greenwood et al. | |
| 2011/0139014 A1 | 6/2011 | Nishiura et al. | |

FOREIGN PATENT DOCUMENTS

| | | |
|---|---|---|
| CN | 200996701 Y | 12/2007 |
| CN | 201173546 Y | 12/2008 |
| JP | H1061977 A | 3/1998 |
| JP | 2000199633 * | 7/2000 |
| JP | 2000199633 A | 7/2000 |
| JP | 2008267699 A | 11/2008 |
| WO | 2001022857 | 5/2001 |
| WO | 2009097340 A2 | 8/2009 |
| WO | 2010024272 A1 | 3/2010 |

OTHER PUBLICATIONS

Henny Penny SmartHold Holding Cabinet, Henny Penny Corporation, Eaton, OH 45320 USA, Revised Feb. 10, 2009, 2 pages.
FWE Clymate IQ Brochure, Precision Heated and Humidified Holding Cabinet, www.FWE.com, 12 pages.
Chinese Office Action, Application No. 201280011830.3, dated Jan. 6, 2015, 13 pages.
European Search Report, Application No. 14162951.9-1656, dated Jan. 9, 2014, 5 pages.
Search Report, PCT/US2012/025284, dated Dec. 27, 2012, 4 pages.
Written Opinion, PCT/US2012/025284, dated Dec. 27, 2012, 9 pages.
Abstract of JP2000199633; Jul. 18, 2000.
Second Office Action dated Aug. 25, 2015 in Chinese Application 201280011830.3, 5 pages.

(56) References Cited

OTHER PUBLICATIONS

Search Report dated Jun. 16, 2016 in European Application 12747408.8, 13 pages.
Second Examination Report dated Oct. 6, 2016 in Australian Application 2012217730, 5 pages.
First Examination Report dated May 31, 2016 in Australian Application 2012217730, 2 pages.

* cited by examiner

HOLDING OVEN

CROSS-REFERENCE TO RELATED APPLICATIONS

This application is a continuation application claiming priority to PCT Patent Application No. PCT/US2012/025284, filed Feb. 15, 2012, which claims priority to U.S. Provisional Patent Application Nos. 61/443,097, filed Feb. 15, 2011, 61/472,967, filed Apr. 7, 2011, and 61/564,152, filed Nov. 28, 2011, each of which is hereby incorporated by reference in their entirety.

FIELD OF THE INVENTION

The present invention generally relates to food service equipment and, more particularly, to ovens for holding cooked foods at conditions suitable for serving.

BACKGROUND OF THE INVENTION

Food holding ovens are used in the fast food service industry, for example, to hold pre-cooked food at a desired temperature for a period of holding time during which the quality of the food remains suitable for serving. If the food is not consumed within this time, it is generally discarded. Some such ovens have food holding compartments with open fronts and backs (i.e., no doors) to facilitate access to the compartments. Other ovens have holding compartments with doors, which allows the temperature and humidity conditions in the holding compartments to be more closely controlled to achieve longer periods of holding time. However, opening the door of a holding compartment to place food in a compartment and/or remove food from the compartment will disrupt the desired temperature and humidity conditions in the compartment, and prior art ovens are slow to regenerate the desired holding environment after the door is closed. As a result, the duration of effective holding time for the food is reduced.

SUMMARY

One aspect of the present invention is directed to a method of maintaining the quality of a pre-cooked food product. The method includes placing a first quantity of pre-cooked food product in a first cavity of a batch oven, circulating air through the first cavity, and maintaining the temperature of the circulating air of the first cavity, as measured by a first temperature sensor, at a target temperature of 170-200 degrees F. The method also includes maintaining the relative humidity (RH) of the circulating air of the first cavity, as measured by a first RH sensor, at a target RH of 20-40%. Rapid temperature restoration is initiated when the measured temperature of the circulating air of the first cavity rises above or falls below the target temperature, as following a door opening/closing event during which a door of the batch oven is opened, food is loaded into the first cavity or unloaded from the first cavity, and the door is closed. The rapid temperature restoration includes adding heat to the circulating air of the first cavity when the measured temperature of the air in the first cavity is below the target temperature. The rapid temperature restoration is completed to restore the temperature of air in the first cavity to the target temperature in no more than about three minutes regardless of the magnitude of the difference between the target temperature and the measured temperature of the circulating air at initiation of the rapid temperature restoration. Rapid RH restoration is initiated when the measured RH of the circulating air of the first cavity rises above or falls below the target RH, as following the door opening/closing event. The rapid RH restoration includes intermittently introducing water vapor into the circulating air of the first cavity when the measured RH of the air in the first cavity is below the target RH and removing water vapor from the circulating air when the measured RH of the air in the first cavity is above the target RH. The rapid RH restoration is completed to restore the RH of air in the first cavity to the target RH in no more than about three minutes, regardless of the magnitude of the difference between the target RH and the measured RH of the circulating air at initiation of the rapid RH restoration.

In another aspect, the present invention is directed to a method of maintaining the quality of pre-cooked grilled chicken. The method includes placing a quantity of pre-cooked grilled chicken in a first cavity of a batch oven, circulating air through the first cavity to flow over the pre-cooked grilled chicken at an average maximum speed of no more than about 14 feet per minute, and maintaining the circulated air of the first cavity at a target temperature of 170-200 degrees F. The method also includes maintaining the circulated air of the first cavity at a target relative humidity (RH) of 30-40% by intermittently introducing water vapor into the circulating air.

In another aspect, the present invention is directed to a method of maintaining the quality of pre-cooked fried chicken. The method includes placing a quantity of pre-cooked fried chicken in a first cavity of a batch oven, circulating air through the first cavity to flow over the pre-cooked fried chicken at an average maximum speed of no more than about 14 feet per minute, and maintaining the circulated air of the first cavity at a target temperature of 170-200 degrees F. The method also includes maintaining the circulated air of the first cavity at a target relative humidity (RH) of about 20% by intermittently introducing water vapor into the circulating air.

In another aspect, the present invention is directed to a batch holding oven for maintaining the quality of a pre-cooked food product. The oven includes a first cavity for holding a first quantity of pre-cooked food product, a first door providing access to the first cavity, a first blower for circulating air through the first cavity, a first heater for heating the circulating air of the first cavity, a first humidifying mechanism for intermittently introducing water vapor into the circulating air of the first cavity, a first de-humidifying mechanism for removing water vapor from the circulating air of the first cavity, a first relative humidity (RH) sensor for measuring the relative humidity of the circulating air of the first cavity, and a first temperature sensor for measuring the temperature of the circulating air of the first cavity. The oven also includes a first controller programmed to initiate a first rapid temperature restoration when the measured temperature in the first cavity rises above or falls below a first target temperature, as following a door opening/closing event during which the first door of the first cavity is opened, food is loaded into the first cavity or unloaded from the first cavity, and the door is closed. The rapid temperature restoration includes adding heat to the circulating air of the first cavity when the measured temperature of the air in the first cavity is below the target temperature. The first rapid temperature restoration is completed to restore the temperature of the circulating air of the first cavity to the first target temperature in no more than about three minutes, regardless of the magnitude of the difference between the first target temperature and the measured temperature of the circulating air of the first cavity at initiation of the first rapid temperature restoration. The first controller is also programmed to initiate a first rapid RH restoration when the measured RH in the first cavity rises above or falls below a first target RH, as following the door opening/closing event. The first rapid RH restoration includes operating the first humidifying mechanism to introduce water vapor intermittently into the circulating air of the first cavity when the measured RH of the circulating air in the first cavity is below the first target RH and operating the first de-humidifying mechanism to remove water vapor from the circulating air of the first cavity when the measured RH of the circulating air in the first cavity is above the first target RH. The first rapid RH restoration is completed to restore the RH of the circulating air of the first cavity to the first target RH in no more than about three minutes, regardless of the magnitude of the difference between the first target RH and the measured RH of the circulating air of the first cavity at initiation of the first rapid RH restoration.

In another aspect, the present invention is directed to a batch holding oven for maintaining the quality of a pre-cooked food product. The oven includes a cavity for holding a quantity of pre-cooked food product, a door providing access to the cavity, a blower for circulating air through the cavity, a heater for heating the circulating air of the cavity, and a humidifying mechanism for intermittently introducing water vapor into the circulating air of the cavity. The humidifying mechanism includes a water line adapted for connection to a source of water. The humidifying mechanism also includes a rotor including a flexible upper surface. The water line has an outlet positioned for introducing water to the flexible upper surface of the rotor. A controller is programmed for operating the humidifying mechanism to intermittently introduce water to the flexible upper surface of the rotor to maintain pre-selected RH conditions in the circulating air of the cavity.

In another aspect, the present invention is directed to a humidifying mechanism. The mechanism includes a water line adapted for connection to a source of water and a rotor including a flexible upper surface. The water line has an outlet positioned for introducing water to the flexible upper surface of the rotor.

In another aspect, the present invention is directed to a method of introducing water vapor into air which circulates through an oven cavity. The method includes introducing water to a flexible upper surface of a rotor, rotating the rotor to cause the water to move radially outward toward a peripheral edge of the rotor, heating the water adjacent to the peripheral edge of the rotor to cause the water to change to water vapor which is then circulated through the oven cavity.

In another aspect, the present invention is direct to a method of controlling the temperature and relative humidity in a food holding compartment of an oven having a door providing access to the compartment. The method includes heating air in the compartment to a target temperature, humidifying air in the compartment to a target relative humidity by intermittently introducing water into heated air circulating through the compartment, and initiating introduction of water into the heated air in response to closure of the door after it has been opened.

In another aspect, the present invention is directed to apparatus for holding food at desired temperature and relative humidity conditions. The apparatus includes a cabinet defining a food holding compartment, a door movable between a closed position closing the food holding compartment and an open position allowing access to the compartment, a door sensor for sensing closure of the door and generating a closure signal in response to thereto, a temperature sensor for sensing temperature of the air in the food holding compartment, a humidity sensor for sensing the humidity of the air in the food holding compartment, a heating mechanism for heating the food holding compartment, a water-delivery mechanism, and an air-circulation device for circulating air containing water from the water-delivery mechanism throughout the food holding compartment to humidify the compartment. The apparatus also includes a control system including a controller for controlling the operation of the heater and the operation of the water-delivery mechanism to maintain air in the food holding compartment at target temperature and humidity conditions. The controller is programmed to activate the water-delivery mechanism in response to the closure signal.

In another aspect, the present invention is directed to a method of rapidly generating desired heat and humidity conditions in a food holding compartment after a door of the compartment has been opened and closed. The method includes heating air in the compartment after the door is closed and initiating a humidity restoration cycle in response to closure of the door after it has been opened. The cycle includes intermittently delivering water at timed intervals and circulating air containing the water through the compartment.

In another aspect, the present invention is directed to a batch holding oven for maintaining the quality of a pre-cooked food product. The oven includes a cabinet having a cavity for holding a pre-cooked food product, at least one door selectively closing a door opening in the cabinet which provides access to the cavity, and left and right side air ducts. The left side air duct is positioned to the left side of the cavity, and the right side air duct is positioned to the right side of the cavity. The oven also includes a blower for circulating air through the left and right side air ducts and the cavity, a heater for heating the circulating air, left and right side air outlets formed in the left and right side air ducts oriented for directing air flowing out of the left and right side air ducts toward respective left and right side portions of the door, and left and right side deflectors. The left side deflector is positioned between the left side air outlet and the left side portion of the door for deflecting air flowing out of the left side air outlet from contacting the left side portion of the door. The right side deflector is positioned between the right side air outlet and the right side portion of the door for deflecting air flowing out of the left side air outlet from contacting the right side portion of the door.

In another aspect, the present invention is directed to a batch holding oven for maintaining the quality of a pre-cooked food product. The oven includes a cabinet having a cavity for holding a pre-cooked food product, at least one door selectively closing a door opening in the cabinet which provides access to the cavity, and at least one of a left and a right side air duct, the left side air duct being positioned to the left side of the cavity, and the right side air duct being positioned to the right side of the cavity. The air ducts include internal surfaces forming a flow path through the ducts. The oven also includes a blower for circulating air through the at least one left and right side air duct and the cavity. a heater for heating the circulating air, and a removable panel associated with the one of left and right side air duct. The removable panel has an inner surface facing the cavity which forms a boundary of the cavity. The panel has an opposite outer surface facing away from the cavity which forms a boundary of the one of left and right side air duct. The removable panel is removable from the cavity to provide access from the cavity to internal surfaces of the one of left and right side air duct.

In another aspect, the present invention is directed to a method of exposing ductwork of an oven. The method includes disconnecting by hand, without tools, a removable side panel connected to a cabinet of the oven and forming a side boundary of a cavity adapted for holding a pre-cooked food product. The method also includes removing the removable side panel from the cavity through a door opening in the cabinet, thereby exposing interior surfaces of the ductwork in the side of the cabinet which were previously concealed by the side panel when the removable side panel was connected to the cabinet.

In another aspect, the present invention is directed to a batch holding oven for maintaining the quality of a pre-cooked food product. The oven includes an upper cavity for holding a pre-cooked food product, a lower cavity below the upper cavity for holding a pre-cooked food product, at least one door providing access to the upper and lower cavities, left and right upper side air ducts at left and right sides of the upper cavity, respectively, and left and right lower side air ducts at left and right sides of the lower cavity, respectively. The oven also includes a first blower for circulating air through the left and right upper side air ducts and the upper cavity, a second blower for circulating air through the left and right lower side air ducts and the lower cavity, a first heater for heating the circulating air of the upper cavity, a second heater for heating the circulating air of the lower cavity, a first humidifying mechanism for intermittently introducing water vapor into the circulating air of the upper cavity, a second humidifying mechanism for intermittently introducing water vapor into the circulating air of the lower cavity, a de-humidifying mechanism for removing water vapor from the circulating air of one of the cavities, a first relative humidity (RH) sensor for measuring the relative humidity of the circulating air of the upper cavity, a second relative humidity (RH) sensor for measuring the relative humidity of the circulating air of the lower cavity, a first temperature sensor for measuring the temperature of the circulating air of the upper cavity, and a second temperature sensor for measuring the temperature of the circulating air of the lower cavity. The oven also includes a partition separating the upper and lower cavities, upper partition supports for supporting the partition at an upper elevation, and lower partition supports for supporting the partition at a lower elevation. The partition is movable between the upper and lower elevations for varying sizes of the cavities. The oven also includes a sealing system for sealing peripheral portions of the movable partition to inhibit flow of air between the first and second cavities.

In yet another aspect, the present invention is directed to a batch holding oven for maintaining the quality of a pre-cooked food product. The oven includes an upper cavity for holding a pre-cooked food product, a lower cavity below the upper cavity for holding a pre-cooked food product, at least one door providing access to the upper and lower cavities, left and right upper side air ducts at left and right sides of the upper cavity, respectively, and left and right lower side air ducts at left and right sides of the lower cavity, respectively. The oven also includes a blower system for circulating air through the upper and lower side air ducts and the upper and lower cavities, a heater system for heating the circulating air of the upper and lower cavities, a partition separating the upper and lower cavities, upper partition supports for supporting the partition at an upper elevation, and lower partition supports for supporting the partition at a lower elevation. The partition is movable between the upper and lower elevations for varying sizes of the cavities. The oven also includes a sealing system engageable with the movable partition to inhibit flow of air between the first and second cavities. The sealing system includes left and right sealing devices extending generally horizontally along respective left and right sides of the oven cavity. The sealing devices are movable between up-positions when the partition is in its lower elevation for sealing opposite sides of the partition and down-positions when the partition is in its upper elevation for sealing opposite sides of the partition. The sealing system further includes one or more gaskets on the at least one door. The one or more gaskets are positioned for sealing engagement by a front of the partition when the at least one door is closed.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
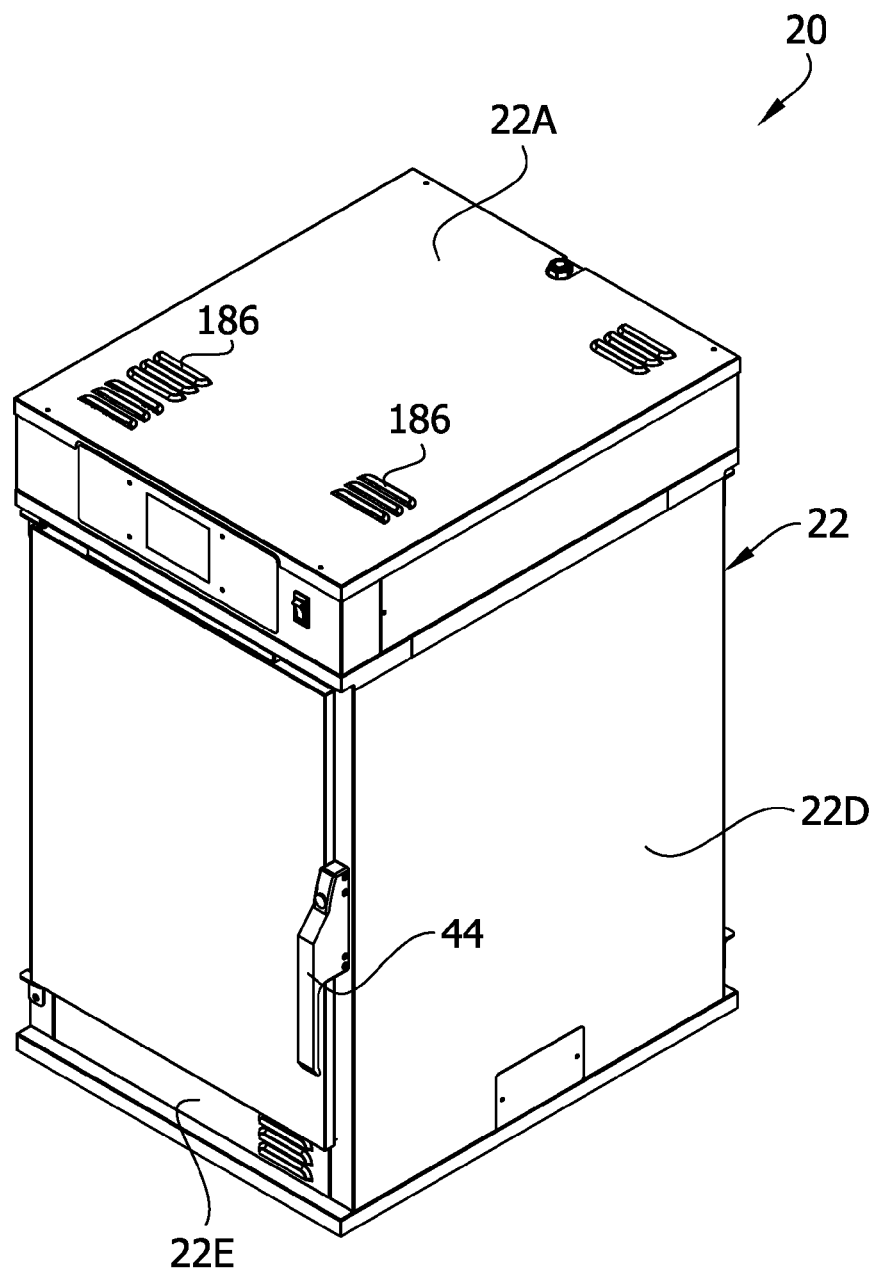
FIG. 1 is a perspective of a first embodiment of an oven of the present invention.
Figure 2:
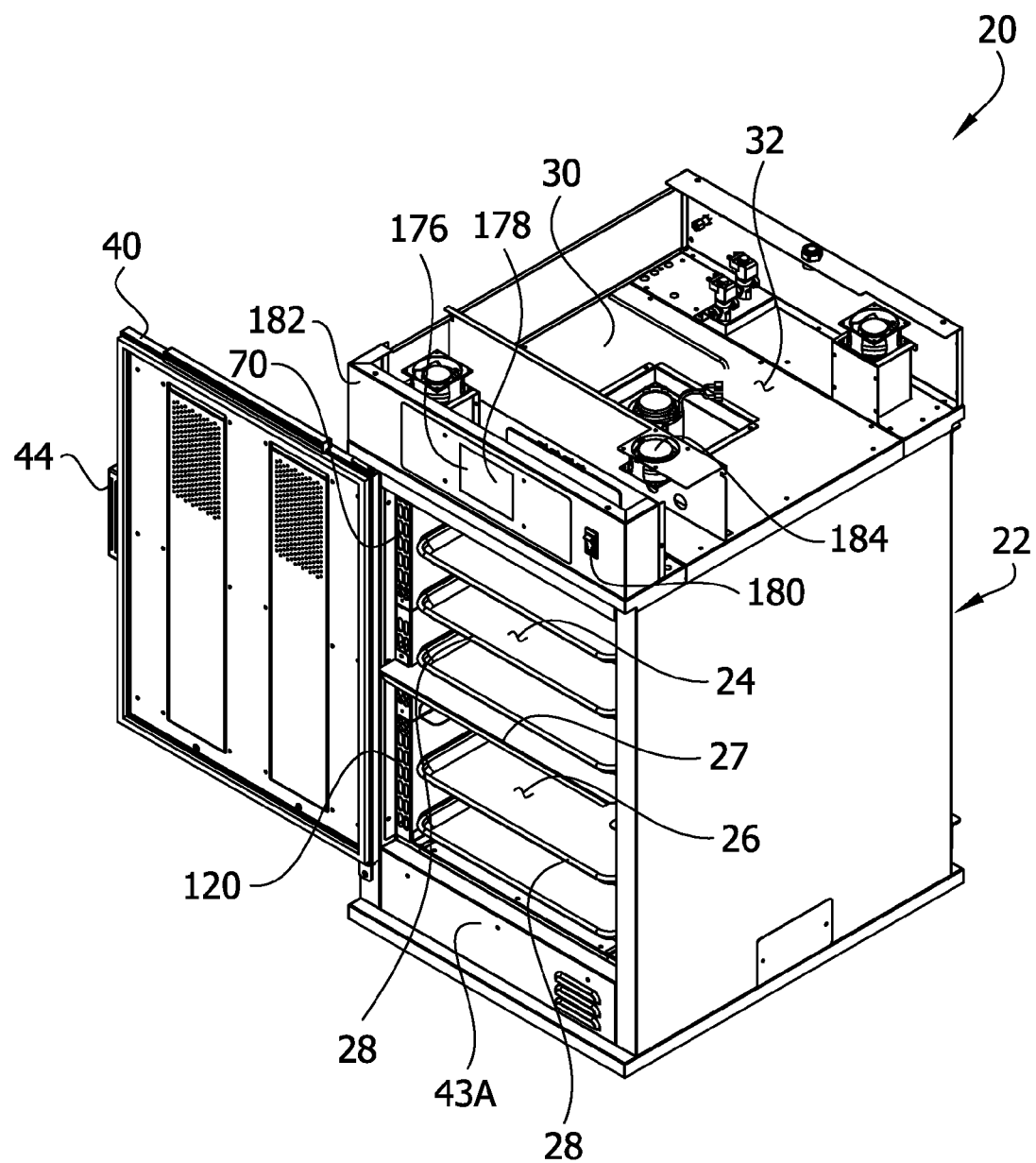
FIG. 2 is a view similar to the perspective of FIG. 1, a top wall of the oven being removed and a front door of the oven being open.

Referring to the drawings, FIG. 1 illustrates one embodiment of an oven of this invention, generally designated 20. As shown in FIG. 2, the oven 20 comprises a housing or cabinet 22 having upper (first) and lower (second) holding cavities 24, 26 for holding pre-cooked food at desired temperature and humidity conditions prior to serving the food. The upper and lower cavities 24, 26 are separated by a generally horizontal partition 27. The number of cavities in each oven may vary (i.e., one or more). If there are multiple cavities, the cavities may be arranged in horizontal rows and/or vertical columns. Each cavity 24, 26 is configured to hold one or more containers 28 (e.g., food pans or trays) of food on supports 29 (FIG. 5) spaced at different elevations in the cavity.

The cabinet 22 of the oven comprises a top wall 22A, a bottom wall 22B (FIG. 4), opposite side walls 22C, 22D, a front wall 22E, and a back wall 22F. The walls include suitable thermal insulation. The top wall 22A comprises a removable cover (also indicated by the reference number 22A). An upper internal horizontal panel 30 is spaced below the cover 22A to create an upper compartment 32 inside the cabinet 22 for housing various components of the oven, as will be described. Similarly, a lower internal horizontal panel 34 (FIG. 4) is spaced above the bottom wall 22B of the cabinet to create a lower compartment 36 inside the cabinet for housing various components of the oven, as will be described.

Figure 3:
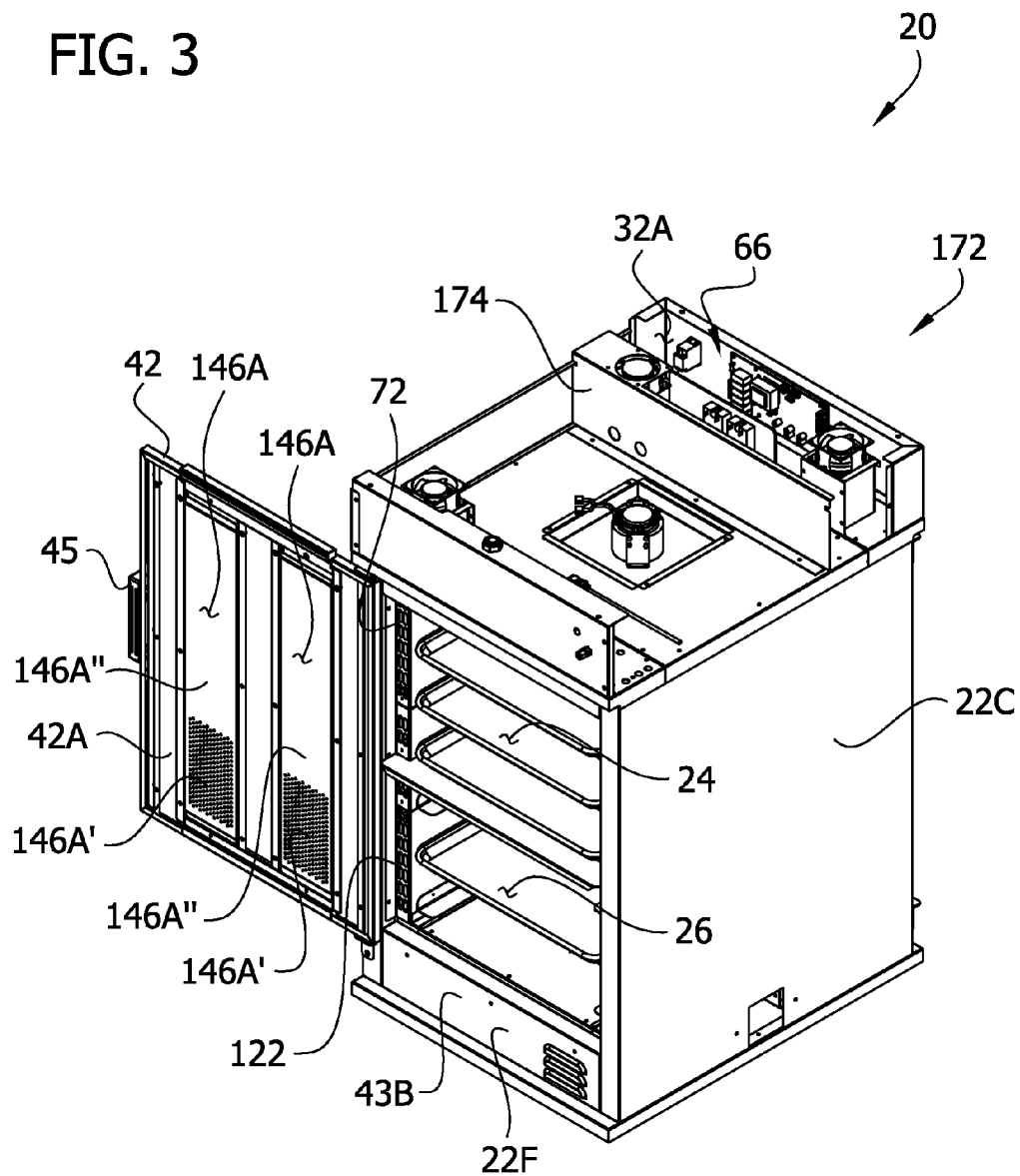
FIG. 3 is a rear perspective of the oven having a rear door open.

Referring to FIGS. 2 and 3, access to the cavities 24, 26 is provided by front and rear doors 40, 42 at the front and rear of the cabinet 22. FIG. 2 is a front perspective of the cabinet 22 having the front door 40 open. FIG. 3 is a rear perspective of the cabinet 22 having the rear door 42 open. This "pass through" arrangement allows food to be loaded and/or unloaded from both the front and the rear of the cabinet 22. In other embodiments, only one door is provided for front-only loading/unloading. In still other embodiments, separate doors may be provided for the upper and lower cavities 24, 26, in either a "pass through" arrangement or a front-only loading/unloading arrangement. In any case, each door(s) may be hinged along its upper, lower, or side edges. As shown in FIGS. 2 and 3, door sensors 43A and 43B (e.g., push-button switches) are provided for the doors 40, 42, respectively. The door sensors 43A, 43B generate closure signals in response to closure of the doors 40, 42. The relevance of these sensors 43A, 43B will become apparent later in this description. Handles 44, 45 with suitable door-latching mechanisms are provided on the doors.

Figure 4:
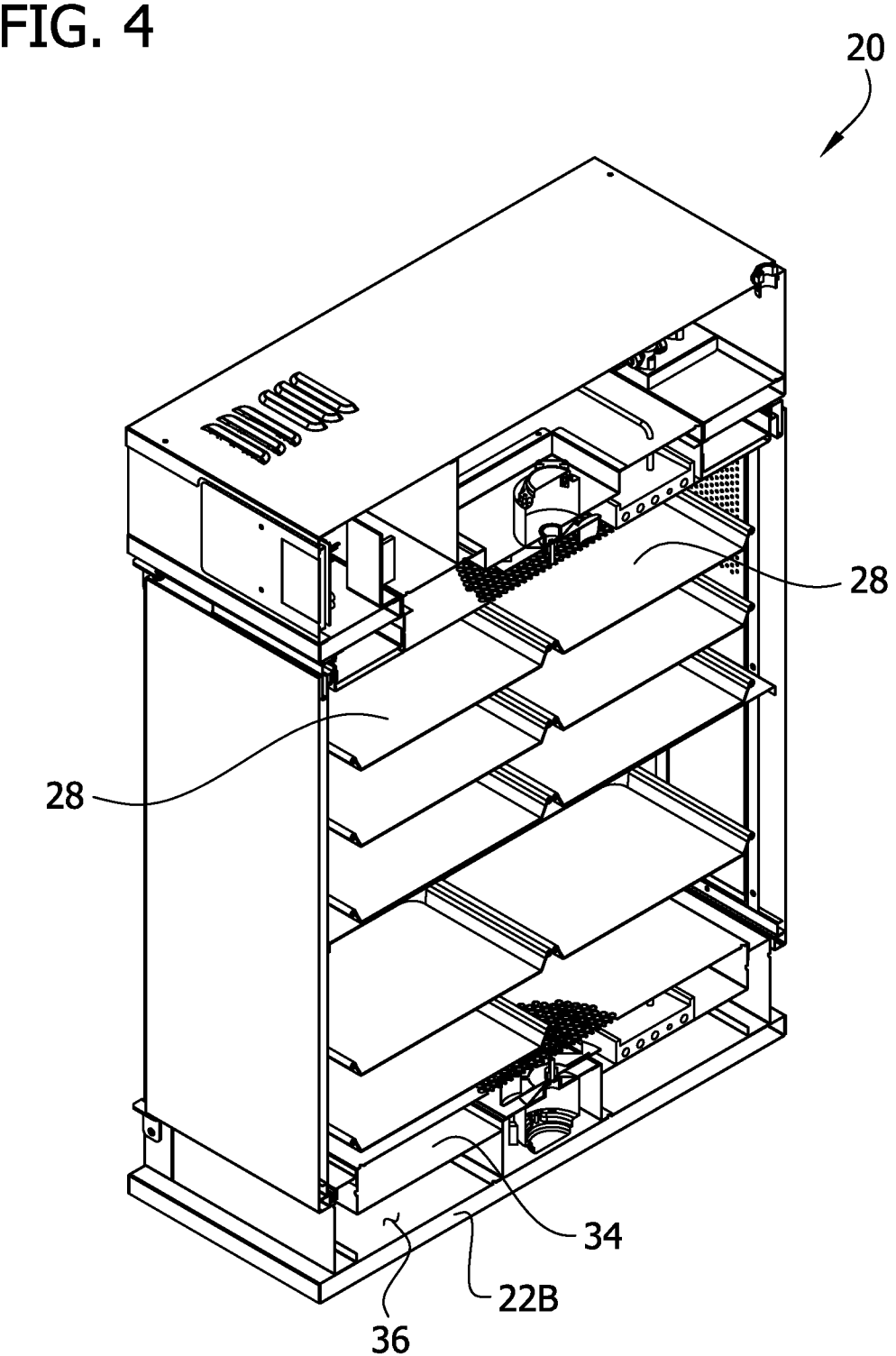
FIG. 4 is a perspective of a vertical section of the oven taken along the depth of the oven.
Figure 5:
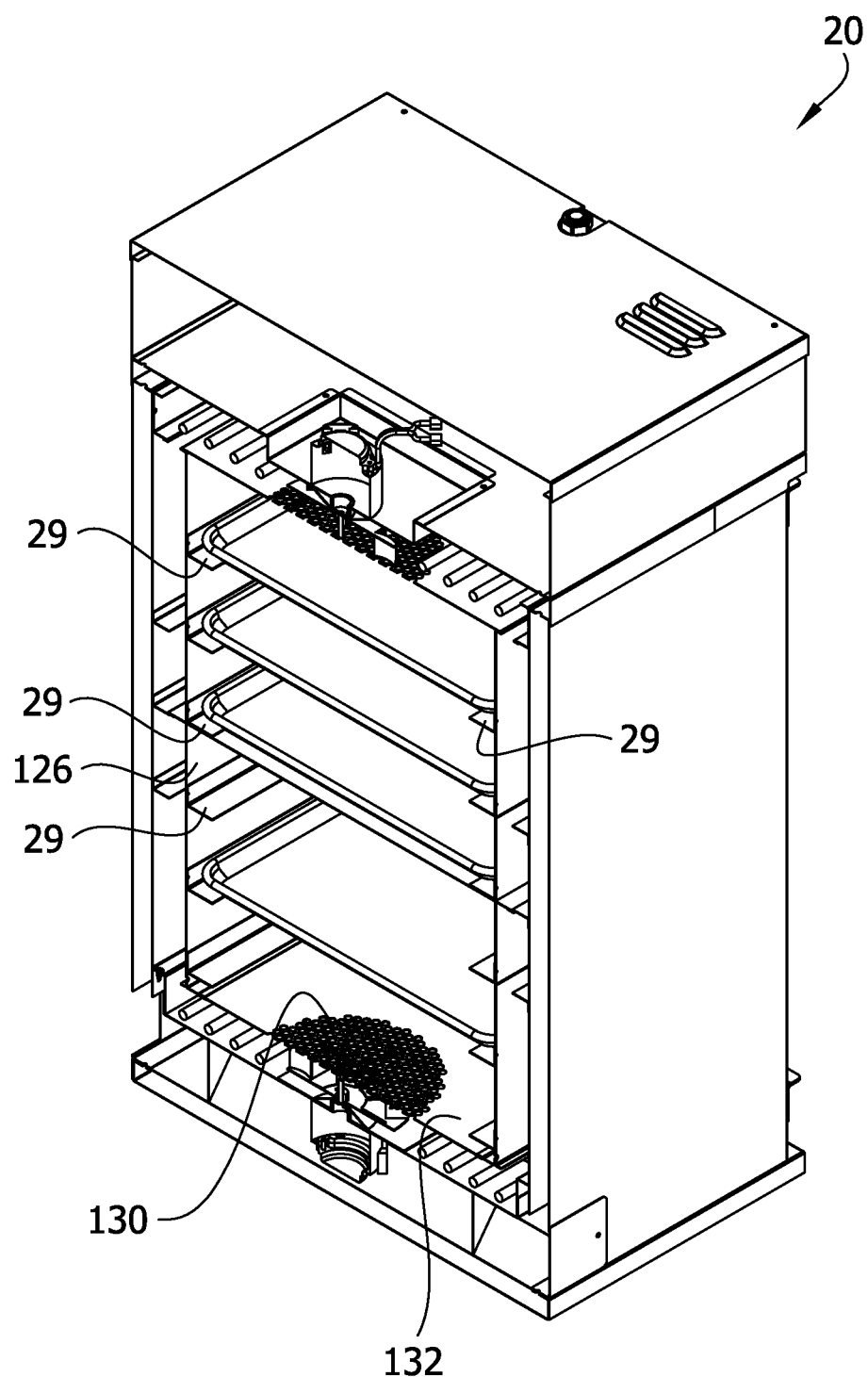
FIG. 5 is a perspective of a vertical section of the oven taken along the width of the oven.
Figure 6:
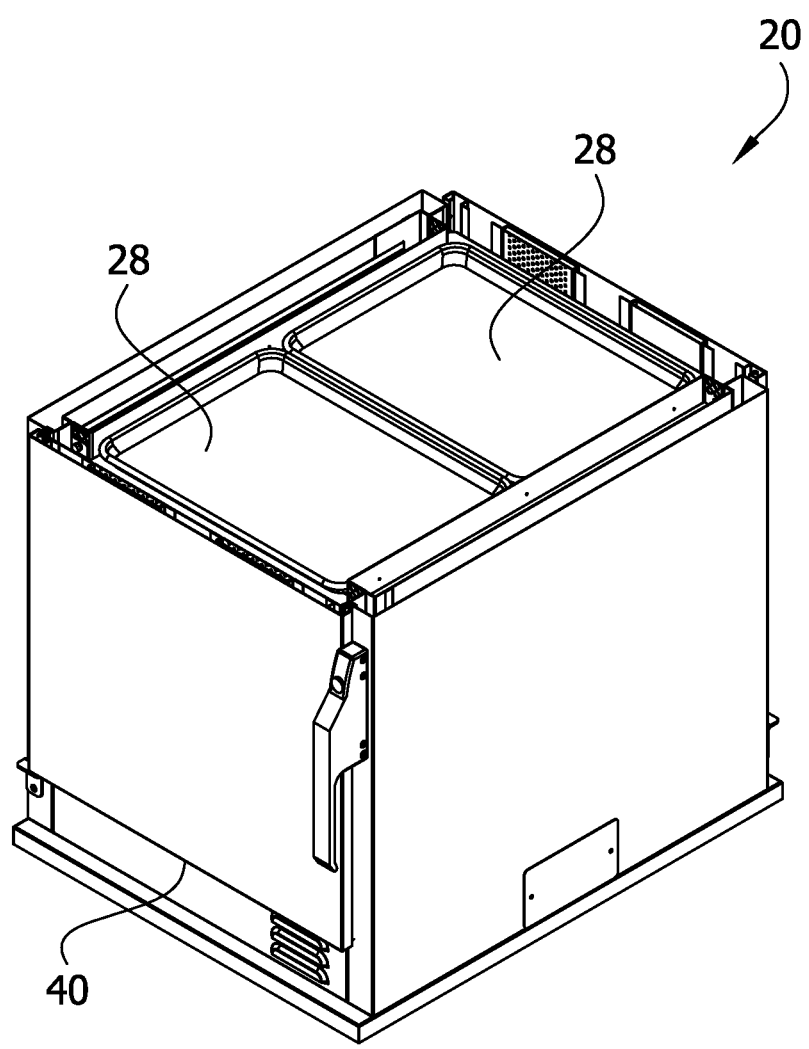
FIG. 6 is a perspective of a horizontal section of the oven.

FIGS. 4 through 6 illustrate various sections of the oven 20. In particular, FIGS. 4 and 5 illustrate vertical sections of the oven 20 taken along the depth and width of the oven, respectively. FIG. 6 illustrates a horizontal section of the oven 20.

Figure 7:
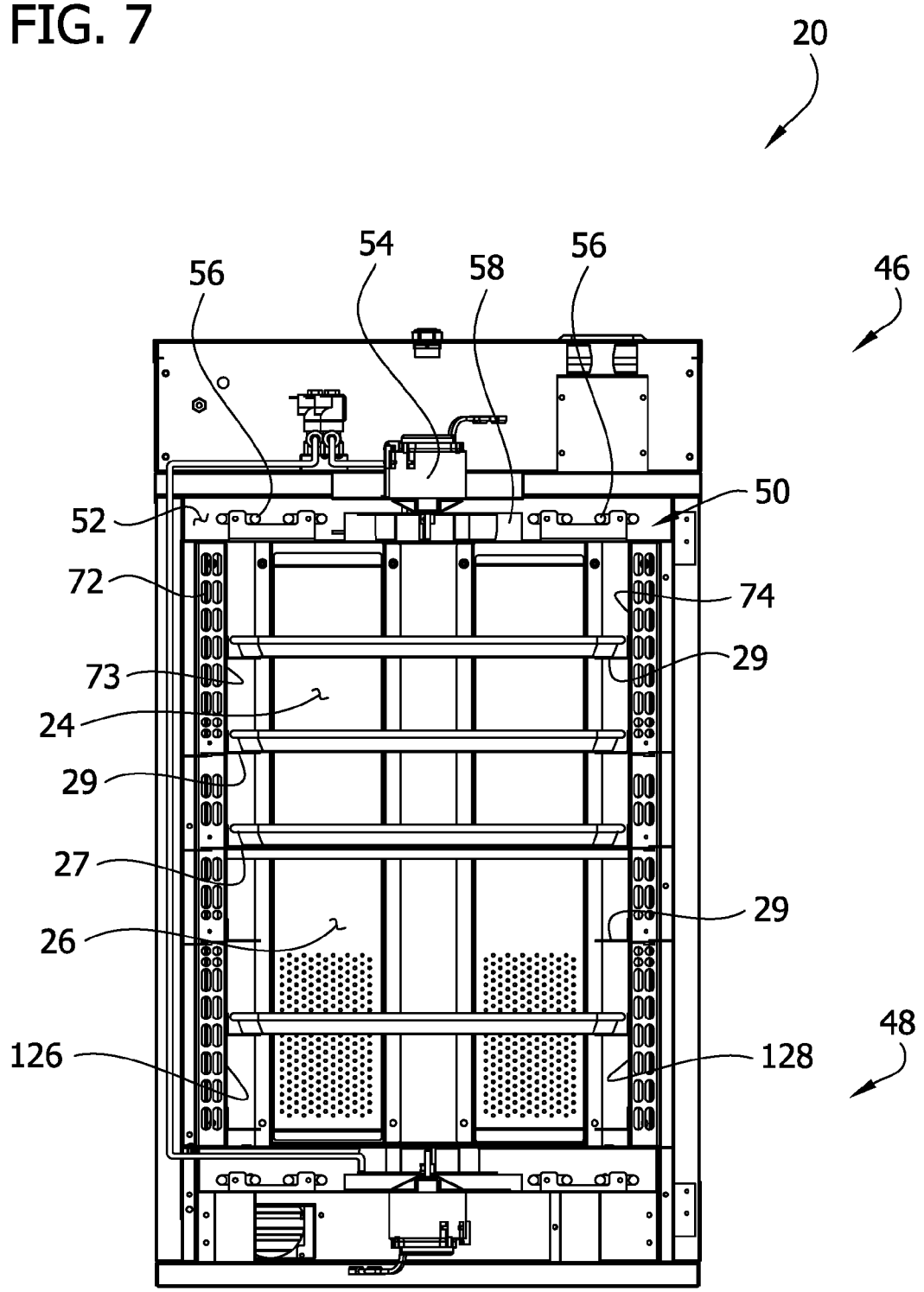
FIG. 7 is a vertical section of the oven taken along the width of the oven.

Referring to FIG. 7, the oven 20 has separate cavity systems 46, 48 for controlling the temperature, relative humidity (RH), and air flow conditions in the upper and lower cavities 24, 26, so that the conditions in each cavity can be varied independent of conditions in the other cavity. Desirably, this allows the oven 20 to be used to hold, simultaneously, different types and/or amounts of food product under conditions suitable for the different loads to maximize holding time for the food while maintaining the quality of the food. By way of example, conditions in the upper cavity 24 may be set for holding grilled chicken, and conditions in the lower cavity 26 may be set for holding fried chicken. The conditions in the upper and lower cavities 24, 26 may also be set for holding the same type of food product (e.g., grilled chicken).

Figure 18:
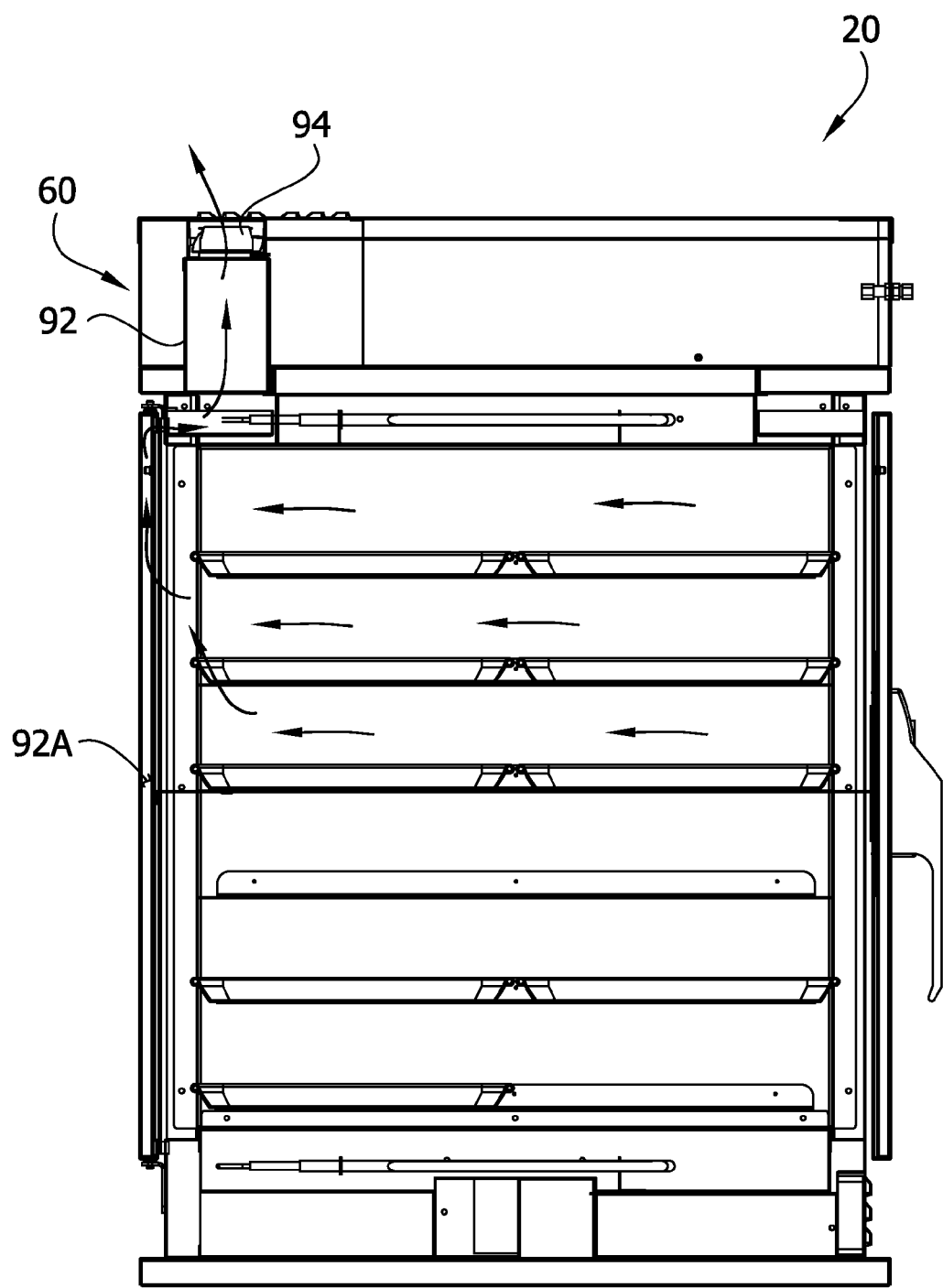
FIG. 18 is a vertical section of the oven taken along the depth of the oven.
Figure 19:
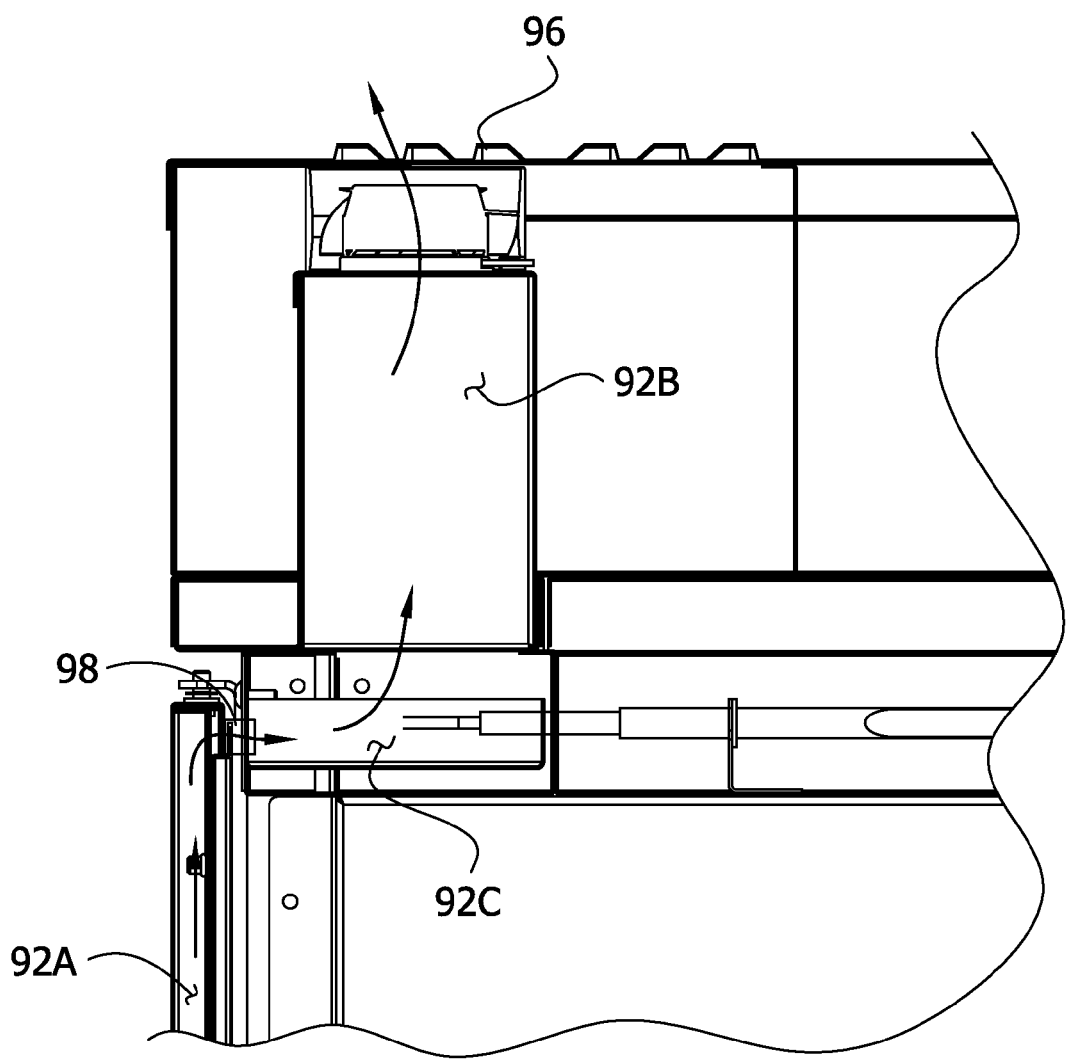
FIG. 19 is an enlarged portion of the section of FIG. 18.

In particular, the upper cavity system of the oven 46 comprises an upper duct system (broadly, upper ductwork) 50 defining an upper air flow path 52, an upper blower 54 (air-circulation device) for circulating air through the upper duct system and upper cavity, a heater 56 for heating the circulating air of the upper cavity 24, a humidifying mechanism 58 for intermittently introducing water vapor into the circulating air of the upper cavity, and a de-humidifying mechanism 60 (FIG. 18) for removing water vapor from the circulating air of the upper cavity 24. A relative humidity (RH) sensor 62 (FIG. 12) is provided for sensing the relative humidity of the circulating air of the upper cavity 24, and a temperature sensor 64 (FIG. 12) is provided for measuring the temperature of the circulating air.

As will be described in detail later, the oven has a controller 66 which may be programmed to initiate rapid temperature restoration when the measured temperature of the circulating air of the first cavity 24 rises above or falls below a target temperature, such as immediately following a door opening/closing event during which a door 40, 42 of the batch oven 20 is opened, food is loaded into the first cavity 24 or unloaded from the first cavity, and the door is closed. Similarly, the controller 66 may be programmed to initiate rapid RH restoration when the RH in the upper cavity 24 as measured by the RH sensor 62 rises above or falls below a target RH, as immediately following the aforementioned door opening/closing event. Alternatively, the controller 66 may be programmed to execute time-based methods to maintain and rapidly restore target temperature and RH conditions in the cavity 24. In this way, the temperature and RH in the first cavity 24 are maintained at optimal values selected to maximize holding times for particular foods, as will be discussed.

Figure 8:
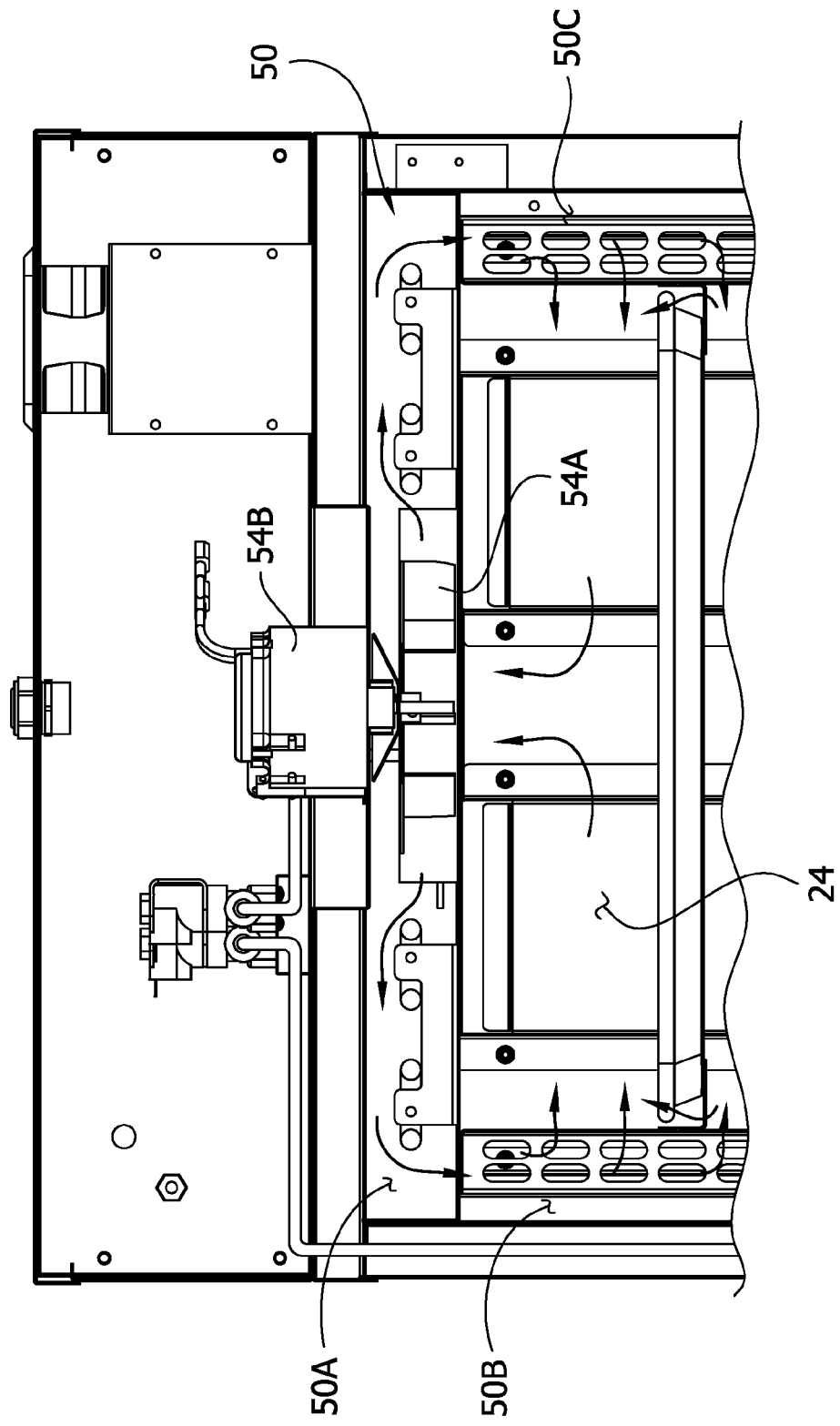
FIG. 8 is a enlarged upper portion of the section of FIG. 7.

Referring now to FIG. 8, the upper duct system 50 comprises an upper duct 50A extending horizontally above the upper cavity, and left and right side ducts 50B, 50C at the left and right sides of the upper cavity 24. The upper duct 50A extends substantially the entire width of the upper cavity 24 (FIG. 5) and most of the depth (front-to-back dimension) of the cavity (FIG. 4). Each side duct 50B, 50C communicates at its upper end with the upper duct 50A along substantially the entire depth (front-to-back dimension) of the upper cavity 24.

Figure 10:
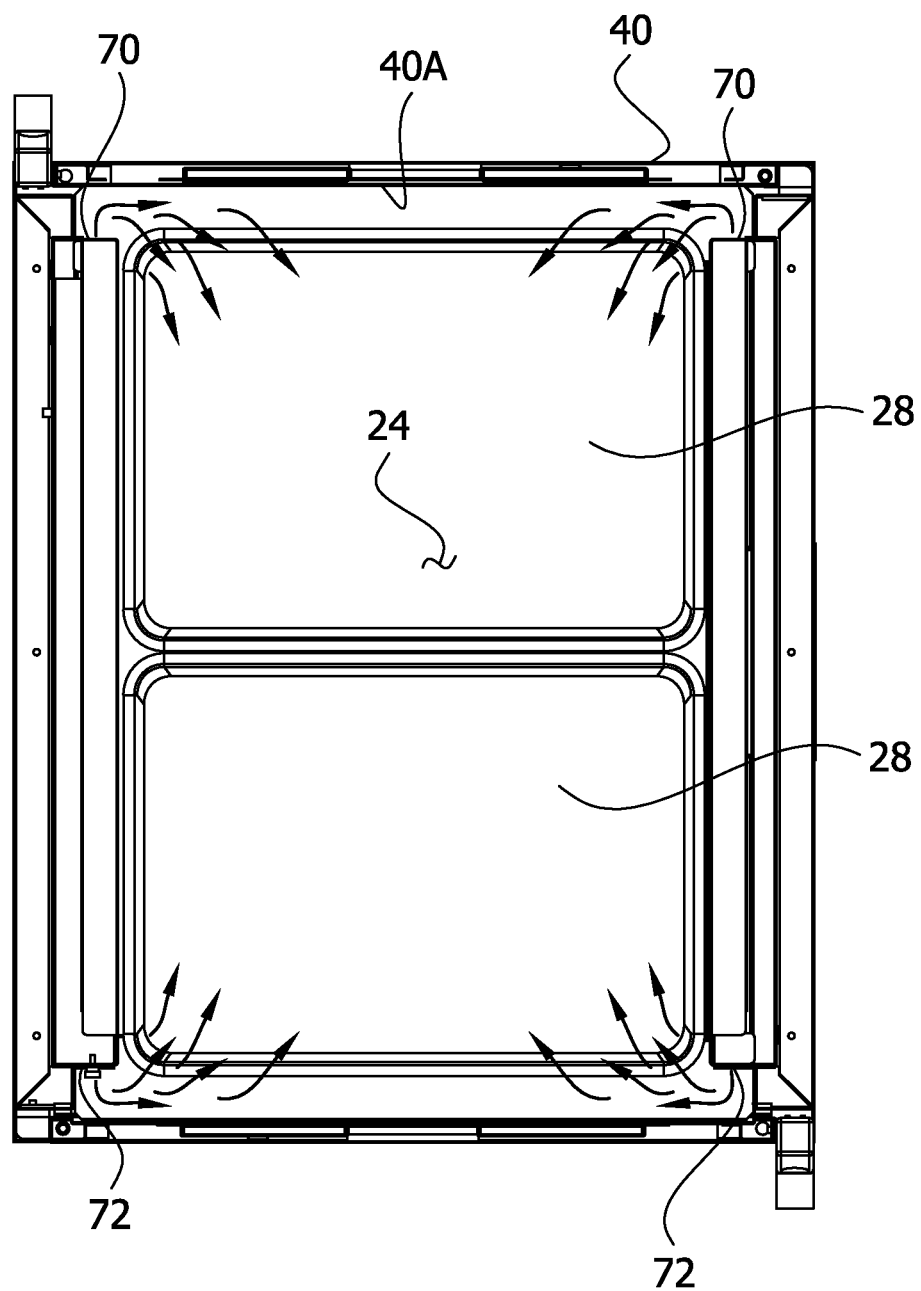
FIG. 10 is a top view of a horizontal section of the oven.

As shown in FIGS. 2, 3, 7, and 10, each side duct 50B, 50C has a series of front outlet openings 70 spaced from the rear (inner) surface of the front door 40A when the door 40 is closed, and a series of rear outlet openings 72 spaced from the front (inner) surface of the rear door when the door is closed. The front and rear openings 70, 72 are arranged in a vertical array extending from adjacent the top of the upper cavity 24 to adjacent the bottom of the cavity 26. The openings 70, 72 are arranged and sized for directing flow of circulating air into the upper cavity 24 primarily along a perimeter of the cavity rather than toward a center of the cavity to reduce direct air flow over pre-cooked food product in a center area of the cavity. Desirably, the ductwork 50B, 50C directs circulating air into the upper cavity 24 primarily toward the four corners of the cavity 24, as shown in FIG. 10. A few small apertures (not shown) may be provided in the side ducts 50B, 50C to allow small amounts of ducted air to "bleed" out among the pan support locations for better temperature and humidity distribution and/or reduction of stratification in the cavity 24. For example, lines or arrays of small apertures may be positioned in the side ducts 50B, 50C immediately above opposite sides of pans 28 supported on one or more of the supports 29. However, the flow of air over the food product should be primarily "indirect", i.e., most of the air flowing over the product has been previously deflected by a surface at a perimeter of the oven cavity 24. Indirect air flow assists in preventing excessive surface drying of the food.

Referring to FIG. 10, air exiting the outlet openings 70, 72 impacts against the inner surfaces of the front and rear doors 40A, 42A and is deflected for uniform distribution into the upper cavity 24 where it flows gently over the pre-cooked food product held in the trays 28. In one embodiment the air exiting the outlet openings 70, 72 has an average speed of about 310 feet per minute. Desirably, the speed of the air flowing over the food is relatively low, e.g., at an average maximum speed of no more than about 6, 8, 10, 12, 14, or 16 ft/min. The outlet openings 70, 72 are arranged and sized for uniform flow of air into the upper cavity 24 along substantially the entire vertical dimension of the cavity.

Figure 11:
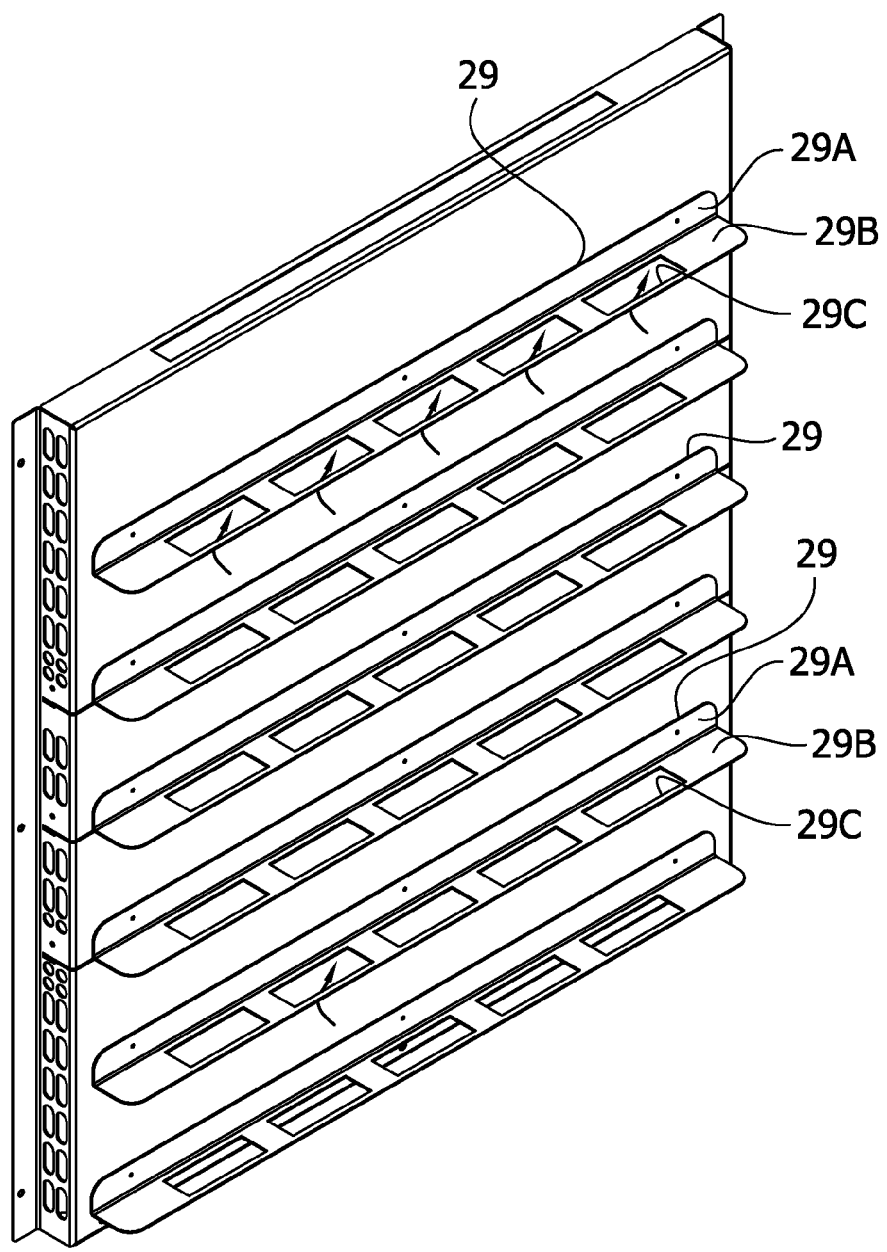
FIG. 11 is a perspective of a portion of a side duct of the oven.

Circulation of air in the upper cavity 24 is facilitated not only by the spacing of the side duct outlets 70, 72 from the front and rear doors 40, 42, but also by the design of the tray supports 29. In this regard, as shown in FIGS. 5 and 7, the supports 29 comprise a plurality of generally horizontal bars (also indicated by the reference number 29) attached to surfaces 73, 74 of the side ducts 50B, 50C facing the cavity 24. In the illustrated embodiment, the bars 29 are L-shaped angle bars having vertical legs 29A attached to respective side ducts 50B, 50C and horizontal legs 29B extending into the cavity 24. FIG. 11 is a perspective of a portion of the side duct 50B showing openings 29C in the horizontal legs 29B of the bars. The openings 29C facilitate air flow vertically at the sides of the cavity 24 around the peripheries of the trays 28, as illustrated in FIG. 8. Other configurations may be used to facilitate air flow. For example, spacers (not shown) such as bumps, ridges, or other protrusions may be provided on the horizontal legs 29B to support the trays 28 above the horizontal legs to provide gaps between the trays and horizontal legs to facilitate air flow around the peripheries of the trays. Moreover, the trays 28 may be supported on wire racks (having spaces between wires forming the racks) (not shown) which are supported on the supports 29 to provide gaps between the trays and the horizontal legs 29B that facilitate air flow through the wire racks and around the peripheries of the trays. The supports 29 may have other shapes. By way of example, the supports may be U-shaped for receiving respective side edges of the trays.

Air exits the upper cavity 24 through an air outlet 76 (FIG. 9) comprising a plurality of openings in a lower wall 78 of the upper duct 50A at a location generally over the center of the upper cavity 24.

The blower 54 for the upper cavity 24 is mounted on a pan-shaped support 80 secured to the upper internal panel 30 above the upper air duct 50A. The blower 54 includes a blower wheel 54A rotatable by a motor 54B. The motor 54B may be a one-speed motor or a variable-speed motor having electrical lead wires for connection to a source of power. As illustrated best in FIG. 9, the blower 54 is mounted such that the blower wheel 54A is positioned in the upper duct 50A desirably directly above the air outlet 76 of the upper cavity 24. The blower wheel 54A rotates about a generally vertical axis and has blades spaced around the axis of the wheel. The size and flow capabilities of the blower 54 will vary depending on the size of the upper cavity 24.

Figure 9:
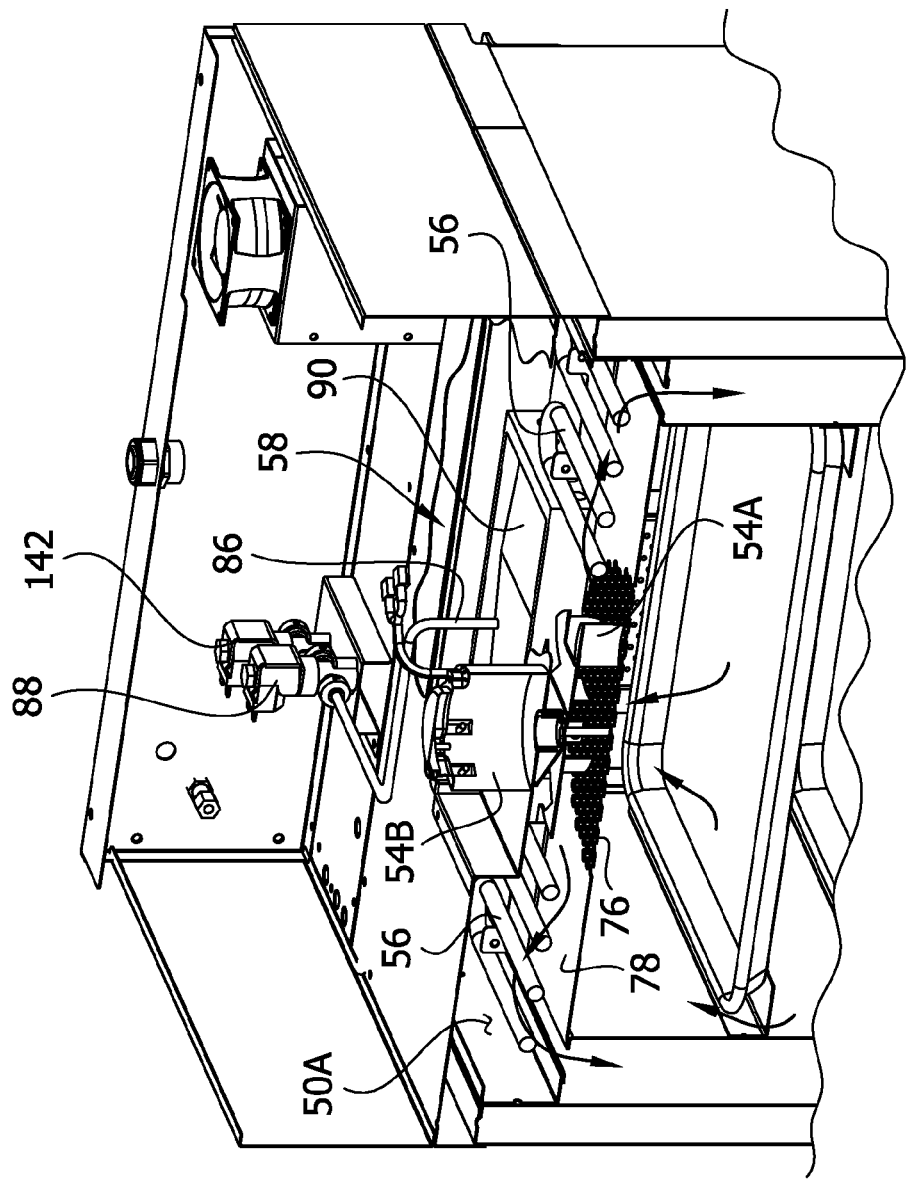
FIG. 9 is a perspective of an upper portion of a vertical section of the oven taken along the width of the oven.

Referring to FIG. 9, the heater 56 comprises electric resistance heating elements (also indicated by the reference number 56) in the upper duct 50A on opposite sides of the blower wheel 54A for heating air flowing through the duct system 50. The heating elements 56 have connections for receiving power from an electric power source.

Figure 12:
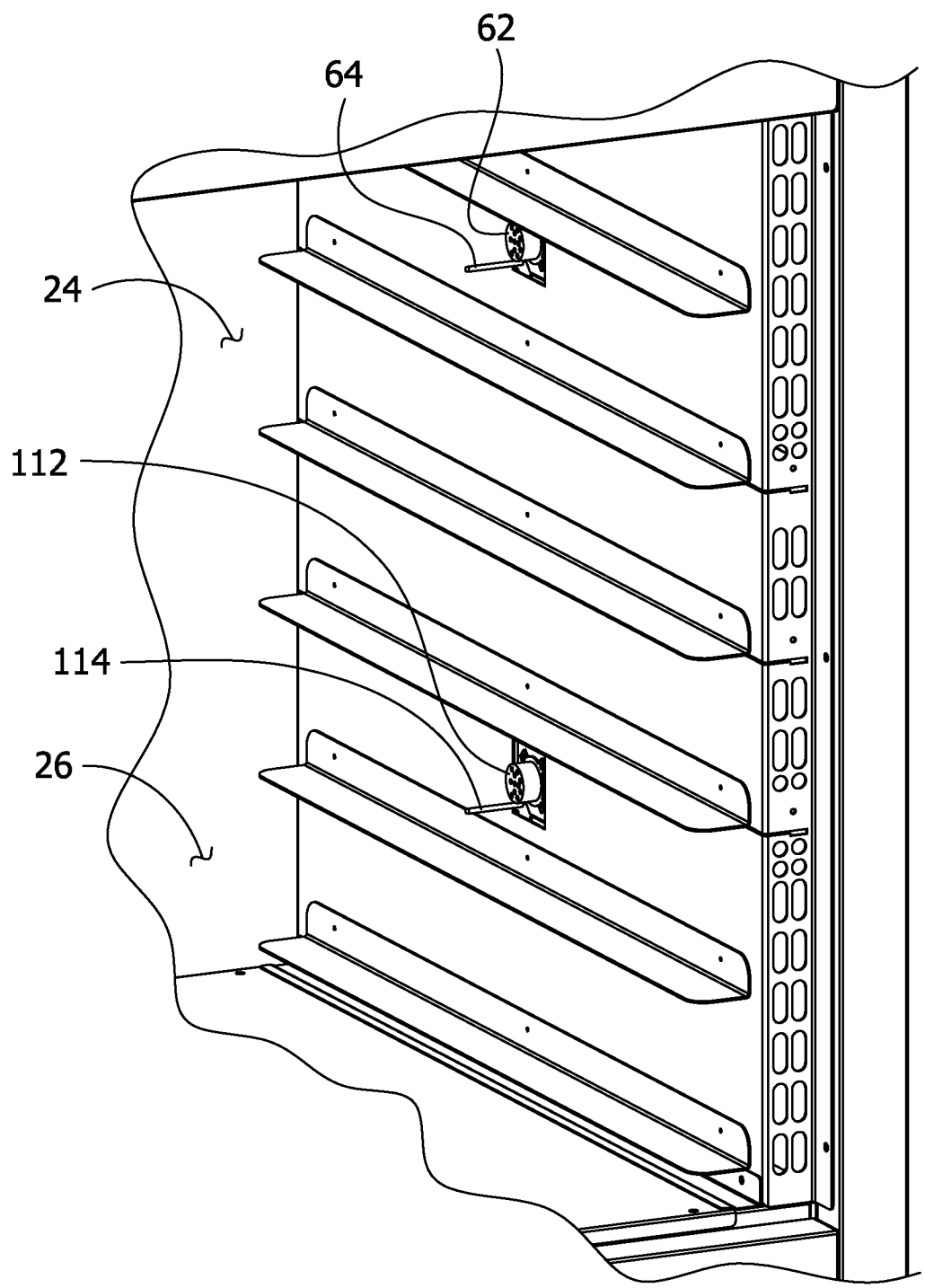
FIG. 12 is a partial front perspective of the oven showing locations of sensors in the oven.
Figure 13:
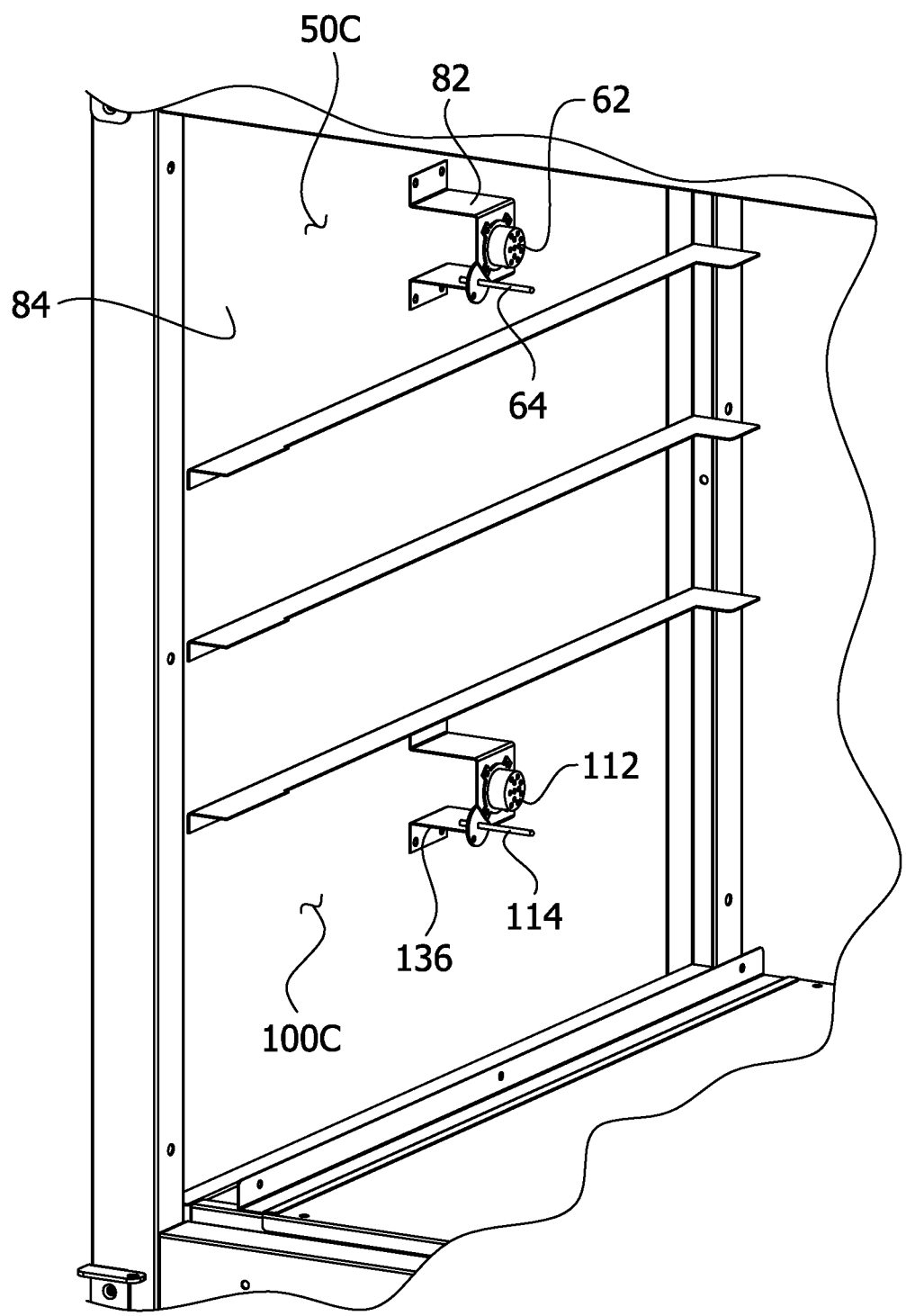
FIG. 13 is a partial rear perspective of the oven showing locations of the sensors in the oven.

FIG. 12 is a front perspective showing the temperature sensor 64 positioned in the upper cavity 24. FIG. 13 is a rear perspective of the cabinet 22 having a portion of the side duct 50C removed to expose a bracket 82 on which the temperature sensor 64 is mounted. The bracket 82 is secured to a wall of the cabinet 84 inside the side air duct 50C. However, it will be understood that it can be mounted in other ways and other locations, so long as it measures the temperature of the air in the oven cavity 24 circulating over the food in the cavity.

Referring to FIG. 9, the humidifying mechanism 58 comprises a water line 86 adapted for connection to a water source, a valve 88 in the line movable between open and closed positions, and a heating device 90 for receiving and vaporizing water from the water line. The valve 88 (e.g., a solenoid-operated valve) is mounted on the upper internal panel 30 above the upper air duct 50A. The heating device is disposed in the upper air duct 50A, and water delivered from the water line 86 falls onto the heated surface 90 where it is vaporized and introduced into the circulating air for increasing the RH of the air in the upper cavity. The water line 86 and/or the valve 88 may be referred to broadly as a water-delivery mechanism.

Figure 14:
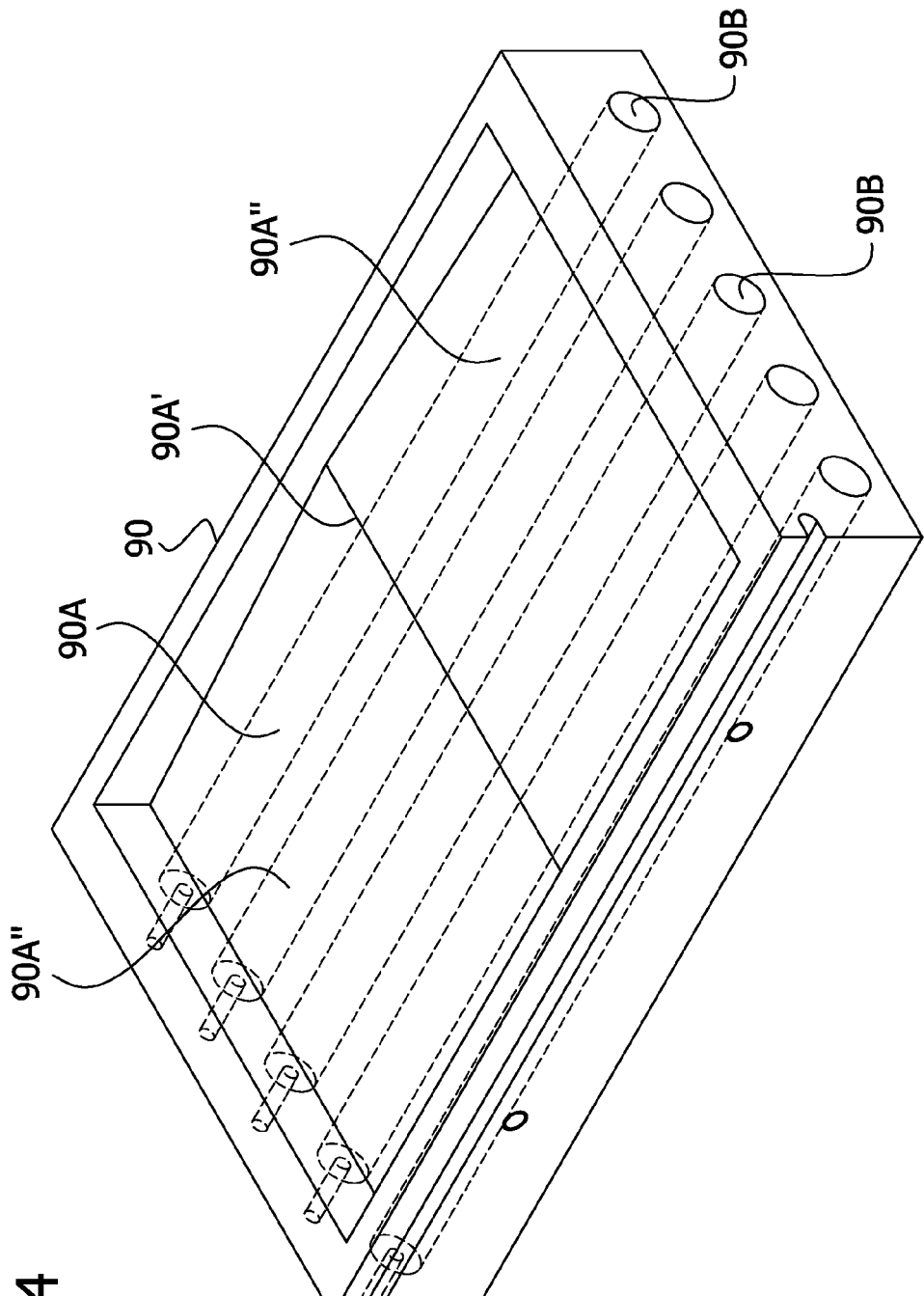
FIG. 14 is a perspective of a heating device of a humidifying mechanism of the oven, heating elements being shown in phantom.
Figure 15:
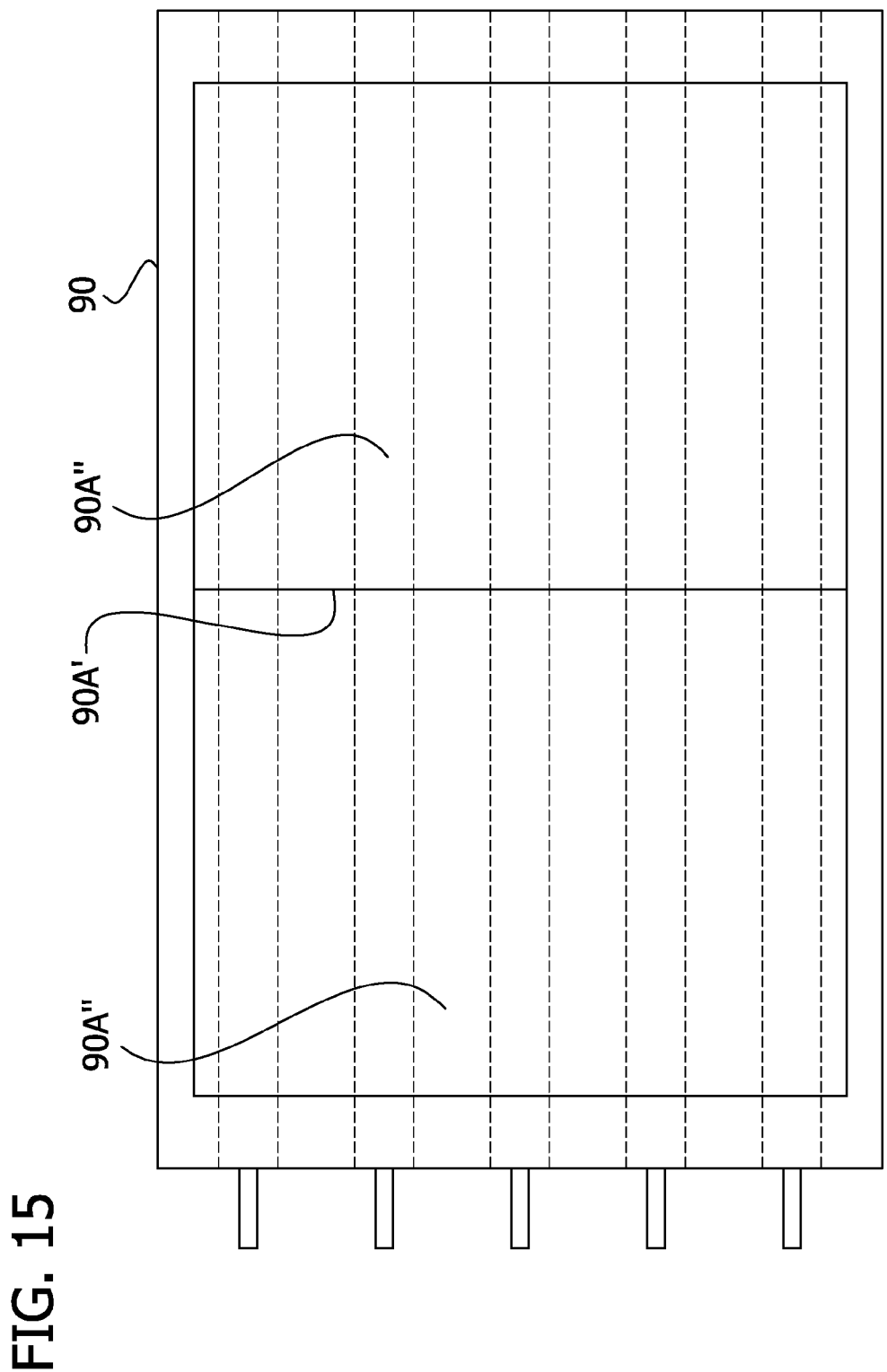
FIG. 15 is a plan view of the heating device, the heating elements being shown in phantom.
Figure 16:
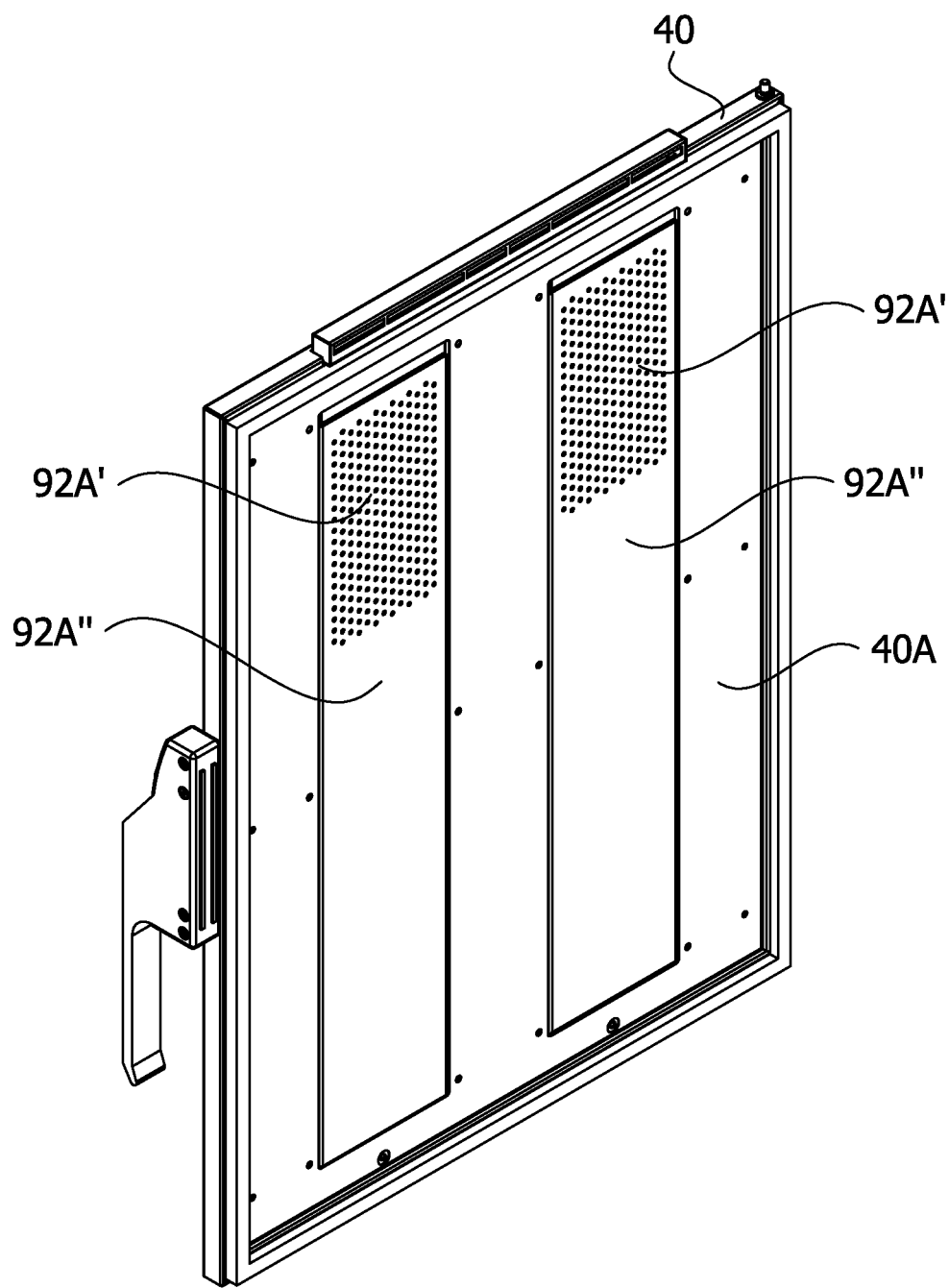
FIG. 16 is a rear perspective of the front door of the oven.
Figure 17:
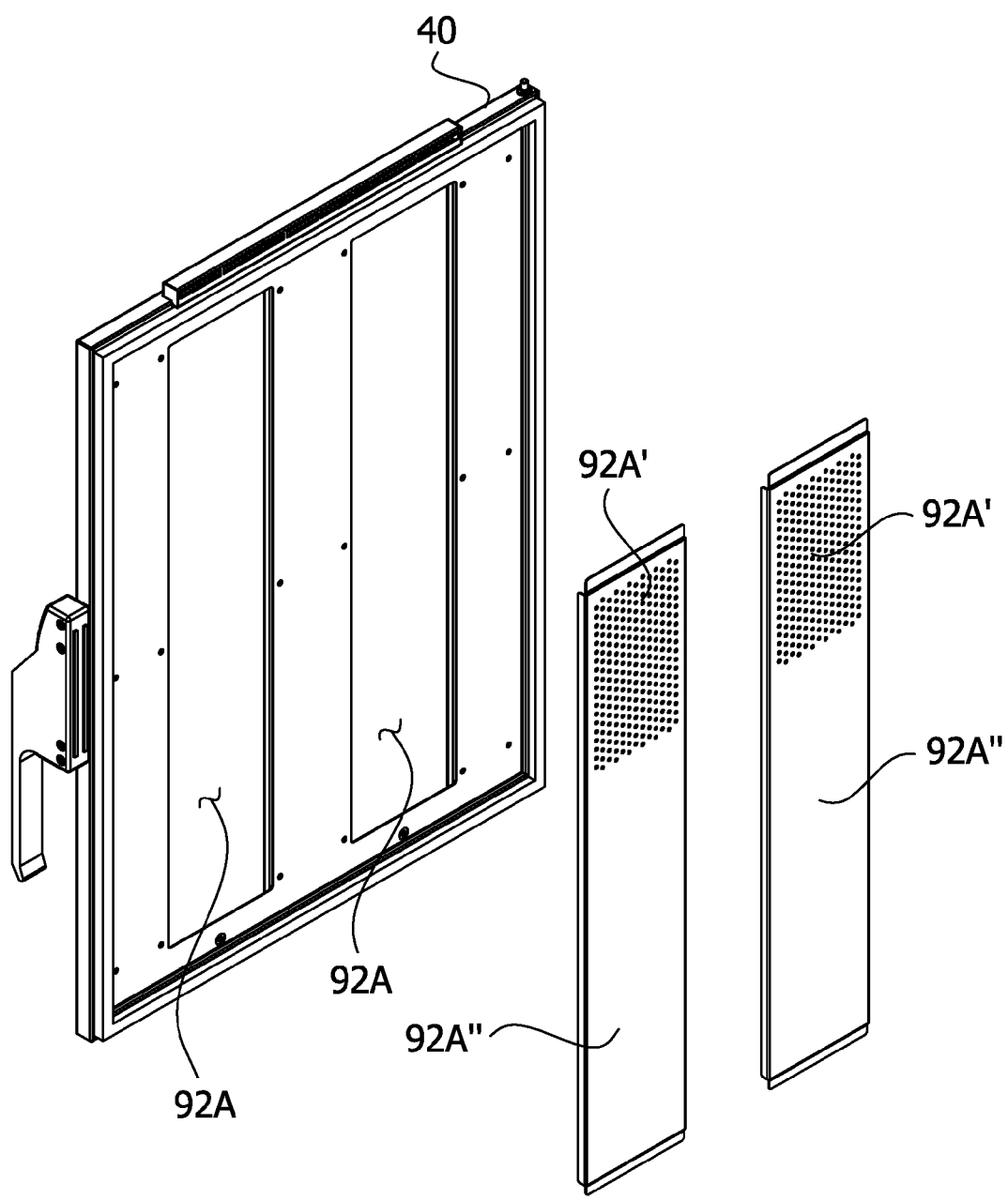
FIG. 17 is a rear perspective of the front door, duct walls being removed from the door to expose ducts in the door.

In the embodiment of FIGS. 14 and 15, the heating device 90 comprises a receptacle (also indicated by the reference number 90) having an upward-facing heated surface 90A, and a heater 90B for heating the surface. The heated surface 90A has a peak area 90A' and side areas 90K sloping down from the peak area. By way of example but not limitation, the receptacle 90 may be a block of metal (e.g., aluminum), and the heater 90B may comprise one or more electric resistance heating elements embedded in the block for heating the heated surface 90A to a temperature suitable for quickly vaporizing the water. By way of example, the receptacle 90 may be a machined aluminum block having elements that are 400 W 230V cartridge heaters 90B for maintaining the temperature of the heated surface 90A above the boiling temperature of water (212 degrees F.), preferably between 250-400 degrees F., and more preferably between 280-350 degrees F. The arrangement is such that water from the water line 86 falls on the peak area 90A' of the heated surface 90A and then spreads downward as a thin layer or film of water on the sloping side areas 90K. This arrangement spreads the water out over a relatively large surface area for rapid and more efficient vaporization. In the illustrated embodiment, the heating device 90 is located adjacent the blower wheel 54A so that vapor from the device is dispersed into the air stream by the rotating blades of the wheel. The receptacle has drains for draining excess water from the receptacle for suitable disposition.

Other mechanisms may be used for humidifying air circulating through the duct system 50 and upper cavity 24. For example, water may be sprayed or otherwise delivered onto the rotating blower wheel 54A where it is atomized and introduced into the circulating air. This type of system is exemplified in co-assigned U.S. patent application Ser. No. 12/841,393, published Dec. 2, 2010, as Pub. No. 2010/0301034, which is incorporated herein by reference for all purposes not inconsistent with this disclosure.

Referring again to FIG. 12, the RH sensor 62 is positioned in the upper cavity 24. As shown in FIG. 13, it is mounted by means of the bracket 82 secured to the wall of the cabinet 84 inside the side air duct 50C. However, it will be understood that it can be mounted in other ways and other locations, so long as it measures the RH of the air in the oven cavity 24 circulating over the food in the cavity.

Referring to FIGS. 16-19, the de-humidifying mechanism 60 for the upper cavity 24 comprises an upper-cavity vent 92 and fan 94 for venting (exhausting) high-humidity air from the upper cavity 24 to atmosphere. The upper-cavity vent 92 comprises two front vent door ducts 92A in the front door 40, a front vent stack 92B extending up through the upper internal wall 30 into the upper compartment 32, and a front vent connecting duct 92C connecting the front vent door ducts 92A and the front vent stack 92B. The front vent fan 94 is located in the front vent stack 92B for creating a flow of air to exhaust air from the upper cavity 24 through the front vent door ducts 92A, the front vent connecting duct 92C, and the front vent stack 92B. Air from the vent stack 92B passes into the upper compartment 32 and escapes into atmosphere through louvers 96 in the top cover of the cabinet 22A. The front vent door ducts 92A have inlets 92A' comprising arrays of perforations in surfaces of the ducts 92K forming a portion of the inner surface of the front door 40A. Alternatively, the perforated surfaces 92K may be omitted, providing each duct 92A with a relatively large rectangular inlet (not shown). A seal or gasket 98 is provided around the front end of the front vent connecting duct 92C for sealing against the front door 40 when it closes, so there is no escape of air from the vent as it moves from the door duct 92A to the connecting duct 92C.

Figure 33:
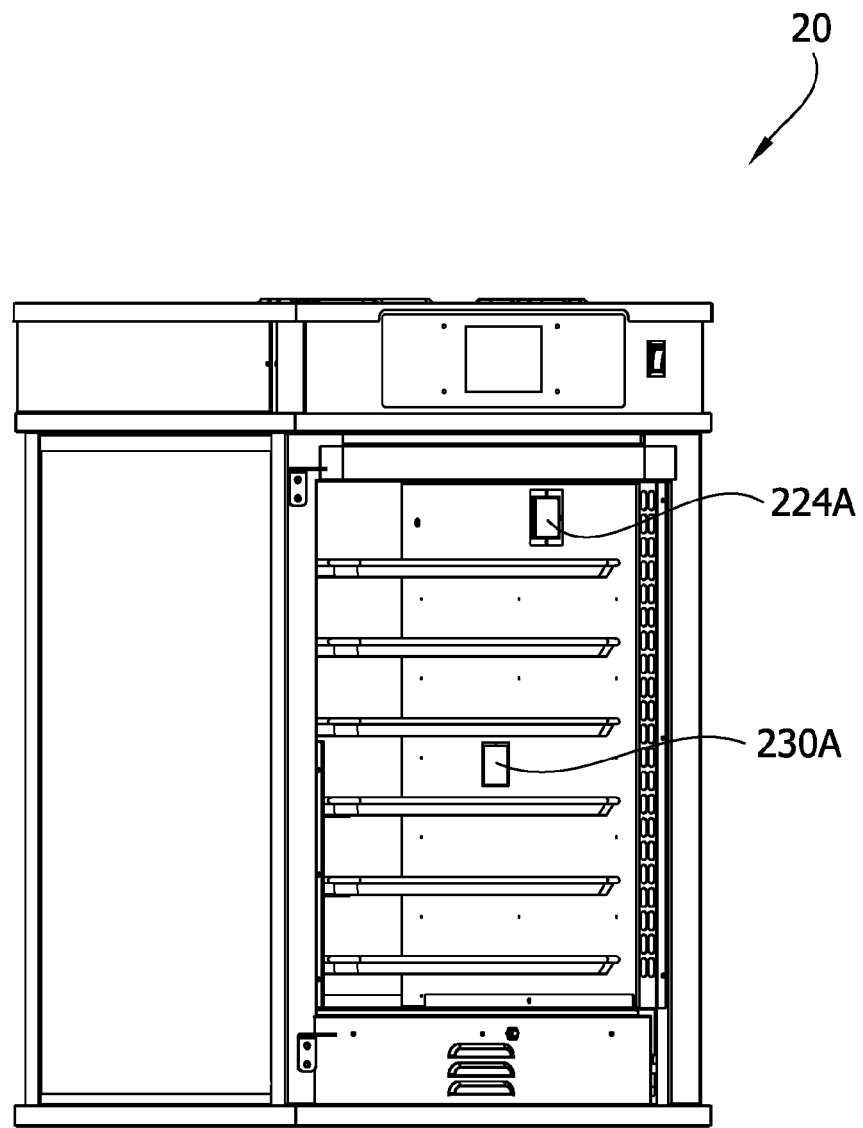
FIG. 33 is a perspective of another embodiment of an oven of the present invention, a front door of the oven being removed to show exhaust openings inside the oven.
Figure 34:
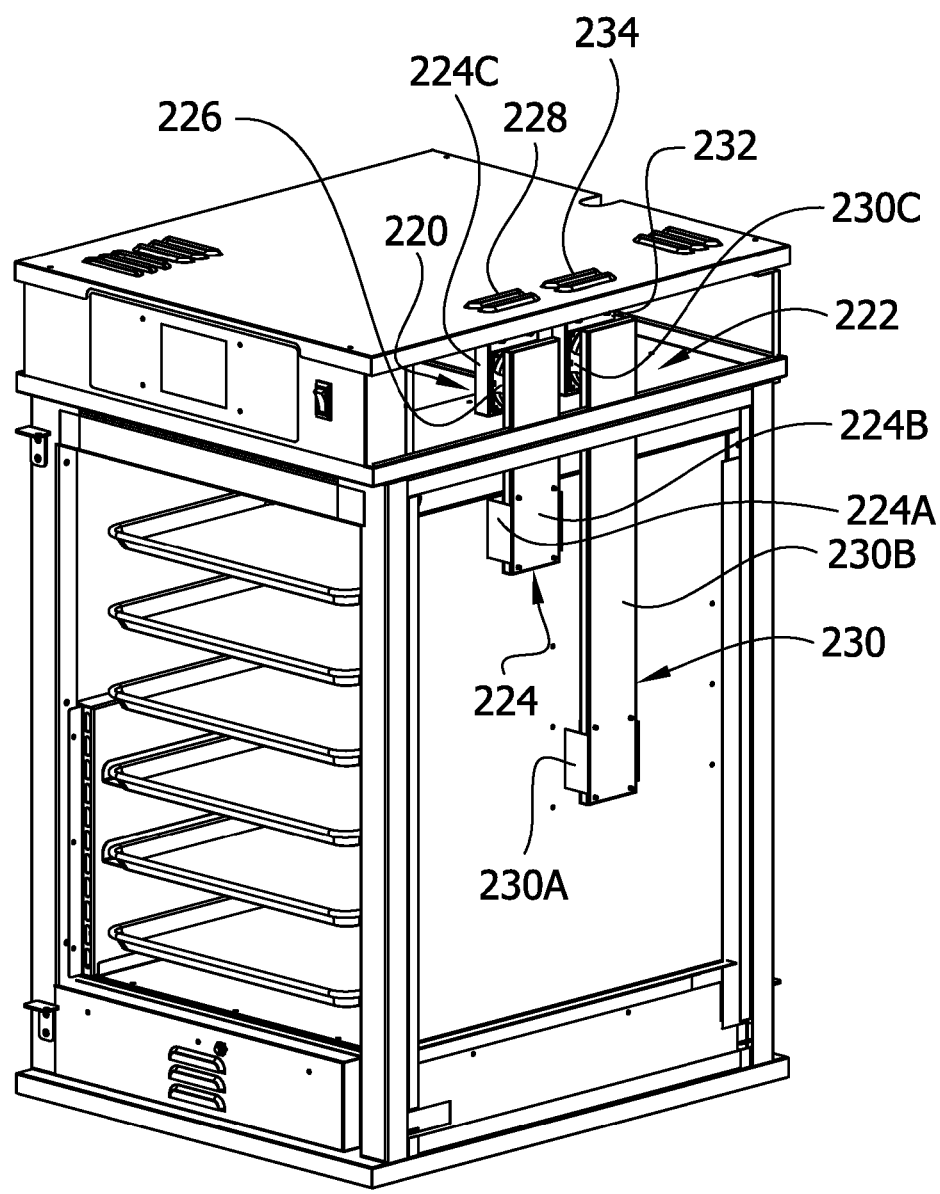
FIG. 34 is a perspective of the oven of FIG. 33, a side wall of the oven being removed to expose exhaust ducts.

Other vent configurations may be used for exhausting high-humidity air from the upper cavity 24. For example, an alternative embodiment having vent ducts in the sides of the cabinet 22 is shown in FIGS. 33 and 34 and described in further detail below. Moreover, a system may be arranged to force ambient air into the cavity to create positive pressure in the cavity (e.g., about 0.1 to 0.25 inches of water column) to cause high-humidity air to vent from the cavity. Such a system would reduce condensation on the blower motor, which may increase a lifespan of the blower. Systems other than vent systems can be used to de-humidify the air in the upper oven cavity. For example, one or more dehumidifiers can be used to perform this function.

The lower cavity system of the oven 48 is similar to the upper cavity system 46 described above and has similar components, described below.

Figure 20:
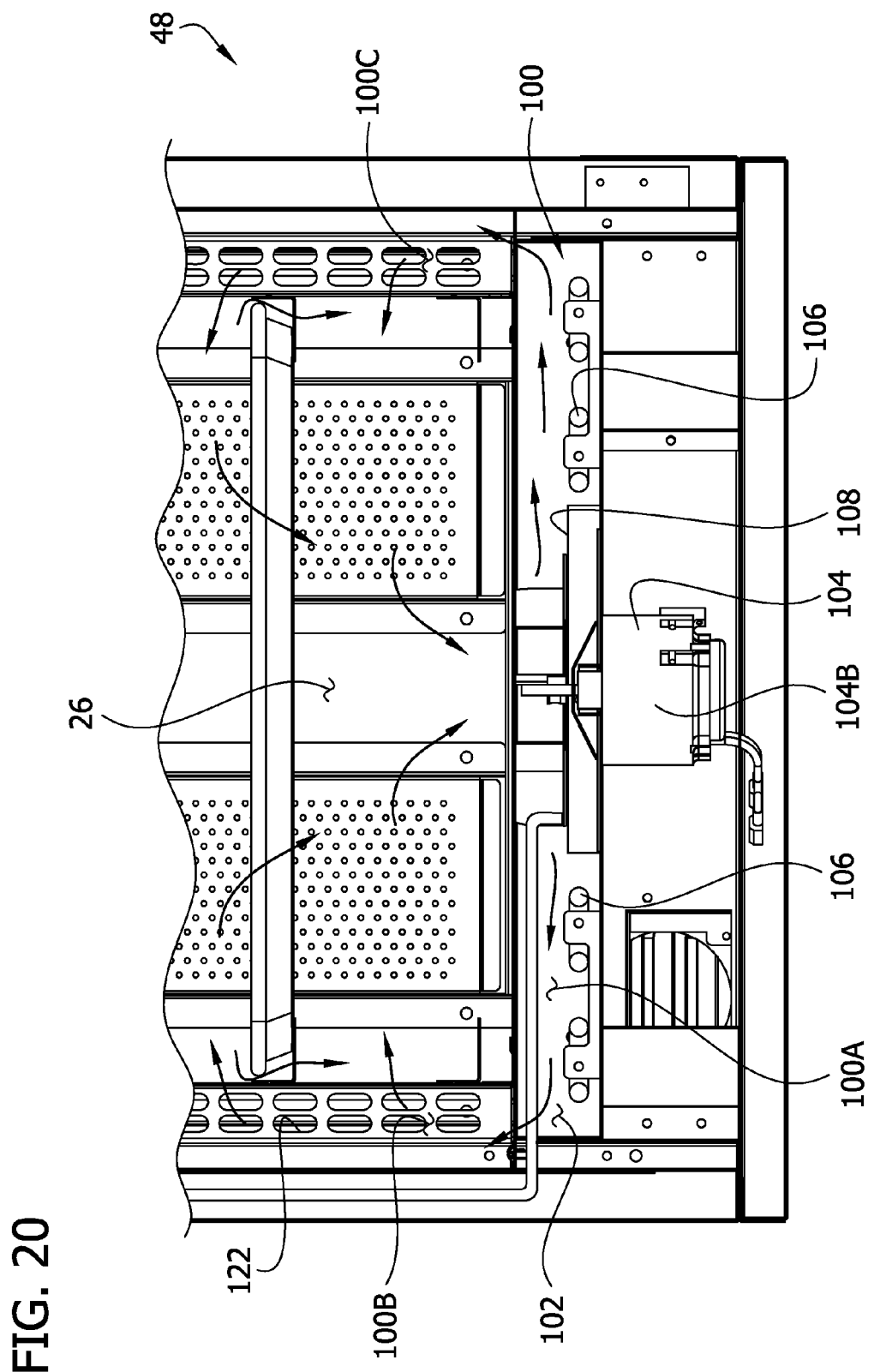
FIG. 20 is an enlarged portion of a vertical section of the oven taken along the width of the oven.

As shown in FIG. 20, the lower cavity system 48 comprises a lower duct system (broadly, lower ductwork) 100 defining a lower air flow path 102, a lower blower 104 (air-circulation device) for circulating air through the lower duct system and lower cavity 26, a heater 106 for heating the circulating air of the lower cavity, a humidifying mechanism 108 for intermittently introducing water vapor into the circulating air of the lower cavity, and a de-humidifying mechanism 110 (FIG. 23) for removing water vapor from the circulating air of the lower cavity. A relative humidity (RH) sensor 112 (FIG. 12) is provided for measuring the relative humidity of the circulating air of the lower cavity 26, and a temperature sensor 114 (FIG. 12) is provided for measuring the temperature of the circulating air.

As will be described in detail later, the controller 66 of the oven 20 may be programmed to initiate rapid temperature restoration when the measured temperature of the circulating air of the second cavity 26 rises above or falls below a target temperature, such as immediately following a door opening/closing event during which a door of the batch oven 40, 42 is opened, food is loaded into the second cavity 26 or unloaded from the second cavity, and the door is closed. Similarly, the controller 66 may be programmed to initiate rapid RH restoration when the RH in the upper cavity 26 as measured by the RH sensor 112 rises above or falls below a target RH, as immediately following the aforementioned door opening/closing event. Alternatively, the controller 66 may be programmed to execute time-based methods to maintain and rapidly restore target temperature and RH conditions in the cavity 26. In this way, the temperature and RH in the lower cavity 26 are maintained at optimal values selected to maximize holding times for particular foods, as will be discussed.

Referring now to FIG. 20, the lower duct system 100 comprises a lower duct 100A extending horizontally below the lower cavity 26, and left and right side ducts 100B, 100C at the left and right sides of the lower cavity. The lower duct 100A extends substantially the entire width of the lower cavity 26 (FIG. 5) and most of the depth (front-to-back dimension) of the cavity (FIG. 4). Each side duct 100B, 100C communicates at its upper end with the lower duct 100A along substantially the entire depth (front-to-back dimension) of the lower cavity 26.

Figure 21:
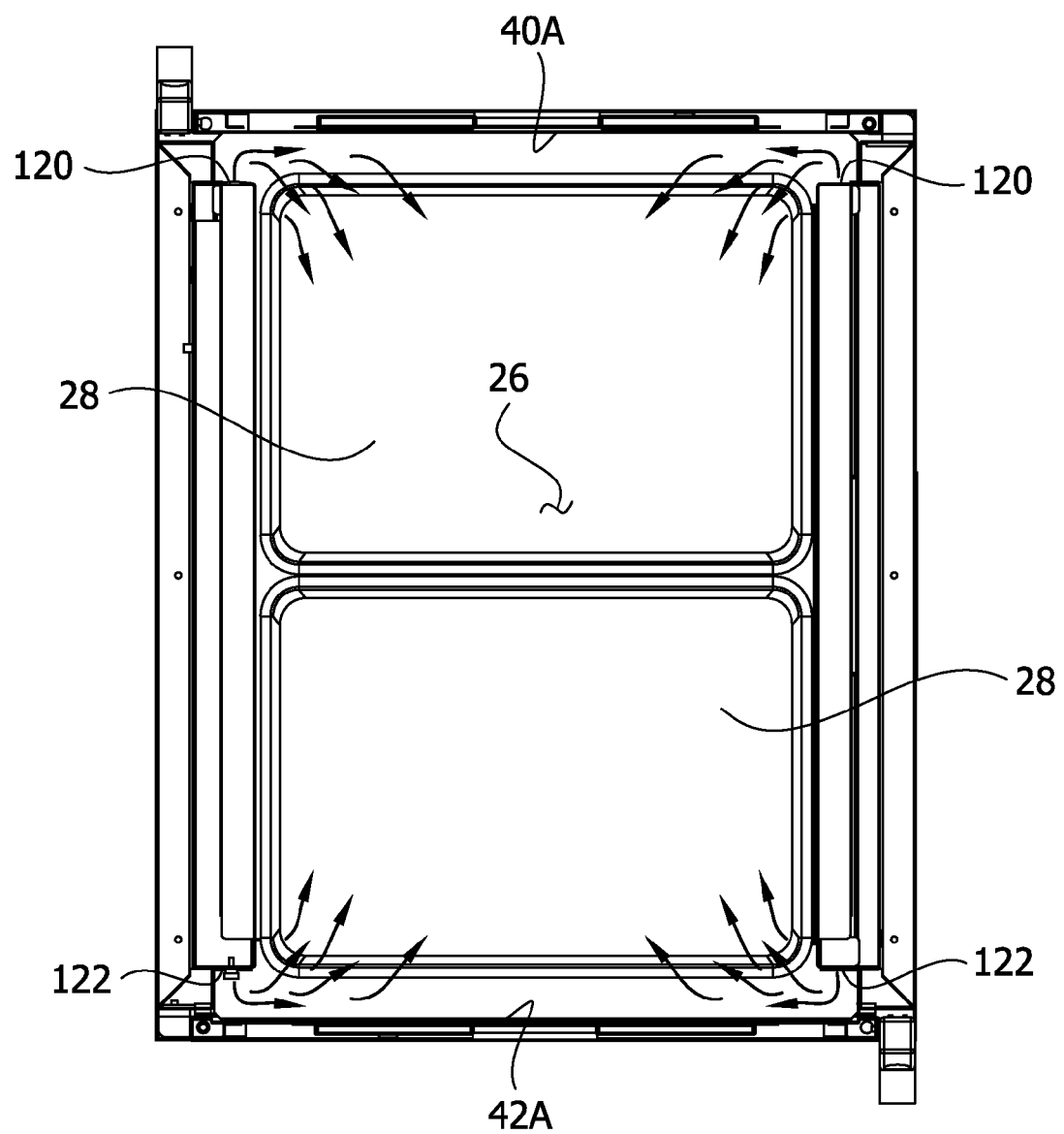
FIG. 21 is a top view of a horizontal section of the oven.

As shown in FIGS. 2, 3, 20, and 21, each side duct of the lower cavity 100B, 100C has a series of front outlet openings 120 spaced from the rear (inner) surface of the front door 40A when the door 40 is closed, and a series of rear outlet openings 122 spaced from the front (inner) surface of the rear door 42A when the door 42 is closed. The front and rear openings 120, 122 are arranged in a vertical array extending from adjacent the top of the lower cavity 26 to adjacent the bottom of the cavity. The openings 120, 122 are arranged and sized for directing flow of circulating air into the lower cavity 26 primarily along a perimeter of the cavity rather than toward a center of the cavity to reduce direct air flow over pre-cooked food product in a center area of the cavity. Desirably, the ductwork 100B, 100C directs circulating air into the lower cavity 26 primarily toward the four corners of the cavity, as shown in FIG. 21.

Air exiting the outlet openings 120, 122 impacts against the inner surfaces of the front and rear doors 40A, 42A and is deflected for uniform distribution into the lower cavity 26 where it flows gently over the pre-cooked food product held in the trays 28. In one embodiment the air exiting the outlet openings 120, 122 has an average speed of about 310 feet per minute. Desirably, the speed of the air flowing over the food is relatively low, e.g., at an average maximum speed of no more than about 6, 8, 10, 12, 14, or 16 ft/min. The outlet openings 120, 122 are arranged and sized for uniform flow of air into the lower cavity 26 along substantially the entire vertical dimension of the cavity.

Circulation of air in the lower cavity 26 is facilitated not only by the spacing of the side duct outlets 120, 122 from the front and rear doors 40, 42, but also by the design of the tray supports 29. In this regard, as shown in FIGS. 5 and 7, the supports 29 comprise a plurality of generally horizontal bars (also indicated by the reference number 29) attached to surfaces 126, 128 of the side ducts 100B, 100C facing the cavity 26. In the illustrated embodiment, the bars 29 are L-shaped angle bars having vertical legs 29A attached to respective side ducts 100B, 100C and horizontal legs 29B extending into the cavity 26. FIG. 11 is a perspective of a portion of the side duct 100B showing openings 29C in the horizontal legs of the bars 29B. The openings 29C facilitate air flow vertically at the sides of the cavity 26 around the peripheries of the trays 28, as illustrated in FIG. 20. Other configurations may be used to facilitate air flow. For example, spacers (not shown) such as bumps, ridges, or other protrusions may be provided on the horizontal legs 29B to support the trays 28 above the horizontal legs to provide gaps between the trays and horizontal legs to facilitate air flow around the peripheries of the trays. Moreover, the trays 28 may be supported on wire racks (having spaces between wires forming the racks) (not shown) which are supported on the supports 29 to provide gaps between the trays and the horizontal legs 29B that facilitate flow of air through the wire racks and around the peripheries of the trays. The supports 29 may have other shapes. By way of example, the supports may be U-shaped for receiving respective side edges of the trays.

Air exits the lower cavity through an air outlet 130 (FIG. 5) comprising a plurality of openings in an upper wall 132 of the lower duct 100C at a location generally below the center of the lower cavity 26.

The blower 104 for the lower cavity 26 is mounted on a pan-shaped support 134 secured to the bottom of the cabinet below the lower duct 100A. The blower 104 includes a blower wheel 104A rotatable by a motor 104B. The motor 104B may be a one-speed motor or a variable-speed motor having electrical lead wires for connection to a source of power. As illustrated best in FIG. 5, the blower 104 is mounted such that the blower wheel 104A is positioned in the lower duct 100A generally below the air outlet of the lower cavity 130. The blower wheel 104A is rotatable about a generally vertical axis and has blades spaced around the axis of the wheel. The size and flow capabilities of the blower 104 will vary depending on the size of the lower cavity 26.

Figure 22:
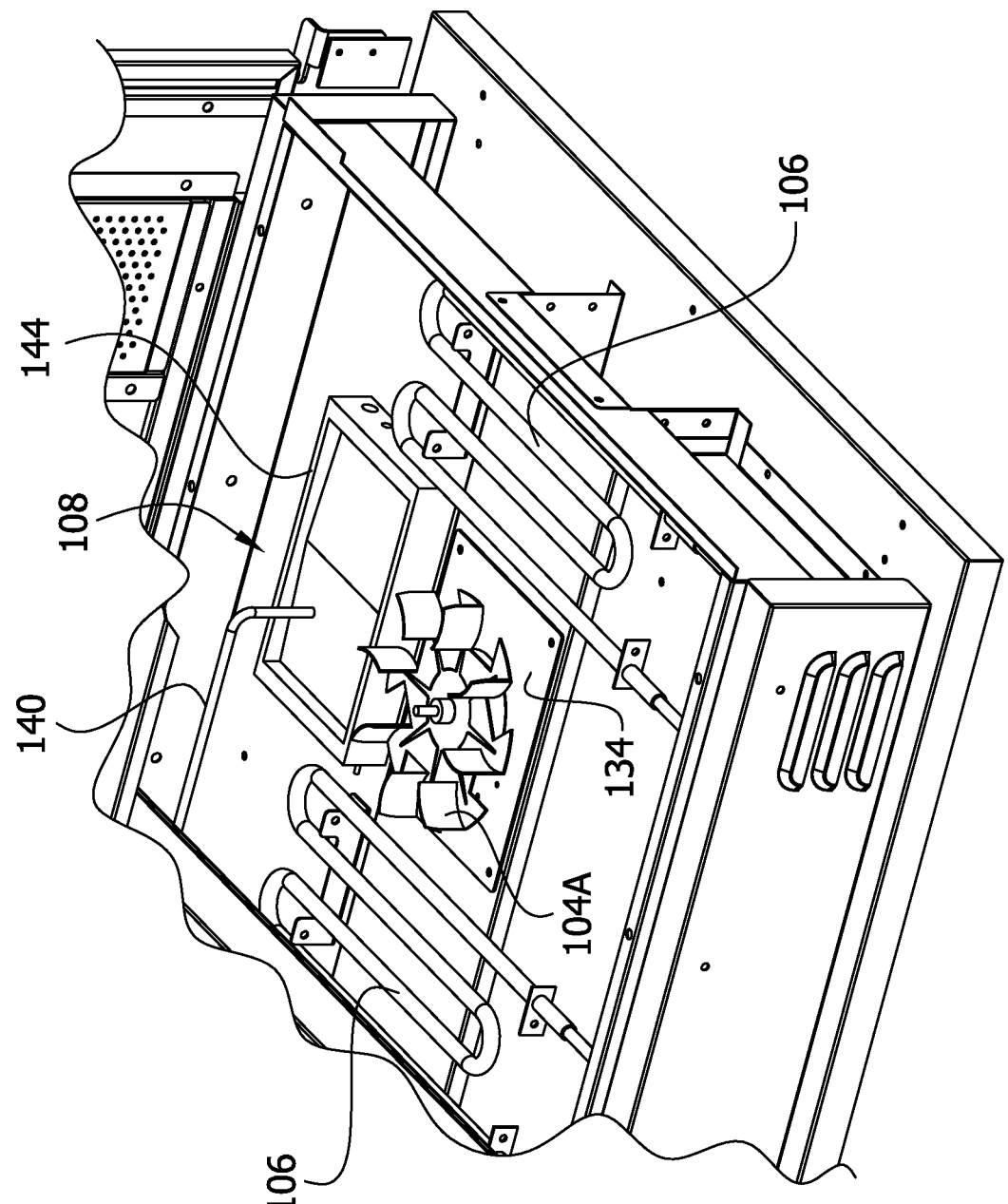
FIG. 22 is a partial front perspective of a lower portion of the oven, portions of the oven being removed.

Referring to FIG. 22, the heater 106 for the lower cavity comprises electric resistance heating elements (also indicated by the reference number 106) in the lower duct 100A on opposite sides of the blower wheel 104A for heating air flowing through the duct system 100. The heating elements 106 have connections for receiving power from an electric power source.

FIG. 12 is a front perspective showing the temperature sensor 114 positioned in the lower cavity 26. FIG. 13 is a rear perspective of the cabinet 22 having a portion of the side duct 100C removed to expose a bracket 136 on which the temperature sensor 114 is mounted. The bracket 136 is secured to the wall of the cabinet 84 inside the side air duct 100C. However, it will be understood that it can be mounted in other ways and at other locations, so long as it measures the temperature of the air in the oven cavity 26 circulating over the food in the cavity.

Referring to FIG. 22, the humidifying mechanism for the lower cavity 108 comprises a water line 140 adapted for connection to a water source, a valve 142 (FIG. 9) in the line movable between open and closed positions, and a heating device 144 for receiving and vaporizing water from the water line. The valve 142 (e.g., a solenoid-operated valve) is mounted on the lower internal wall 34 below the lower air duct 100A. The heating device 144 is disposed in the lower air duct 100A, and water delivered from the water line 140 falls onto the heated surface 144 where it is vaporized and introduced into the circulating air for increasing the RH of the air in the lower cavity 26. The water line 140 and/or the valve 142 may be referred to broadly as a water-delivery mechanism.

The heating device for the lower cavity 144 may have a similar or identical construction as the heating device for the upper cavity 90. For an example construction of the heating device for the lower cavity 144, refer to FIGS. 14 and 15 and the above description of the heating device for the upper cavity 90. The heating device 144 is located adjacent the lower blower wheel 104A so that vapor from the device is dispersed into the air stream of the lower cavity 26 by the rotating blades of the wheel. The receptacle 144 has drains for draining excess water from the receptacle for suitable disposition.

Other mechanisms may be used for humidifying air circulating through the duct system 100 and lower cavity 26. For example, water may be sprayed or otherwise delivered onto the rotating blower wheel 104A where it is atomized and introduced into the circulating air. This type of system is exemplified in the aforementioned co-assigned U.S. patent application Ser. No. 12/841,393, published Dec. 2, 2010, as Pub. No. 2010/0301034.

Referring again to FIG. 12, the RH sensor 112 is positioned in the lower cavity 26. As shown in FIG. 13, it is mounted by means of the bracket 136 secured to the wall 84 of the cabinet 22 inside the side air duct 100C. However, it will be understood that it can be mounted in other ways and other locations, so long as it measures the RH of the air in the oven cavity circulating over the food in the cavity 26.

Figure 23:
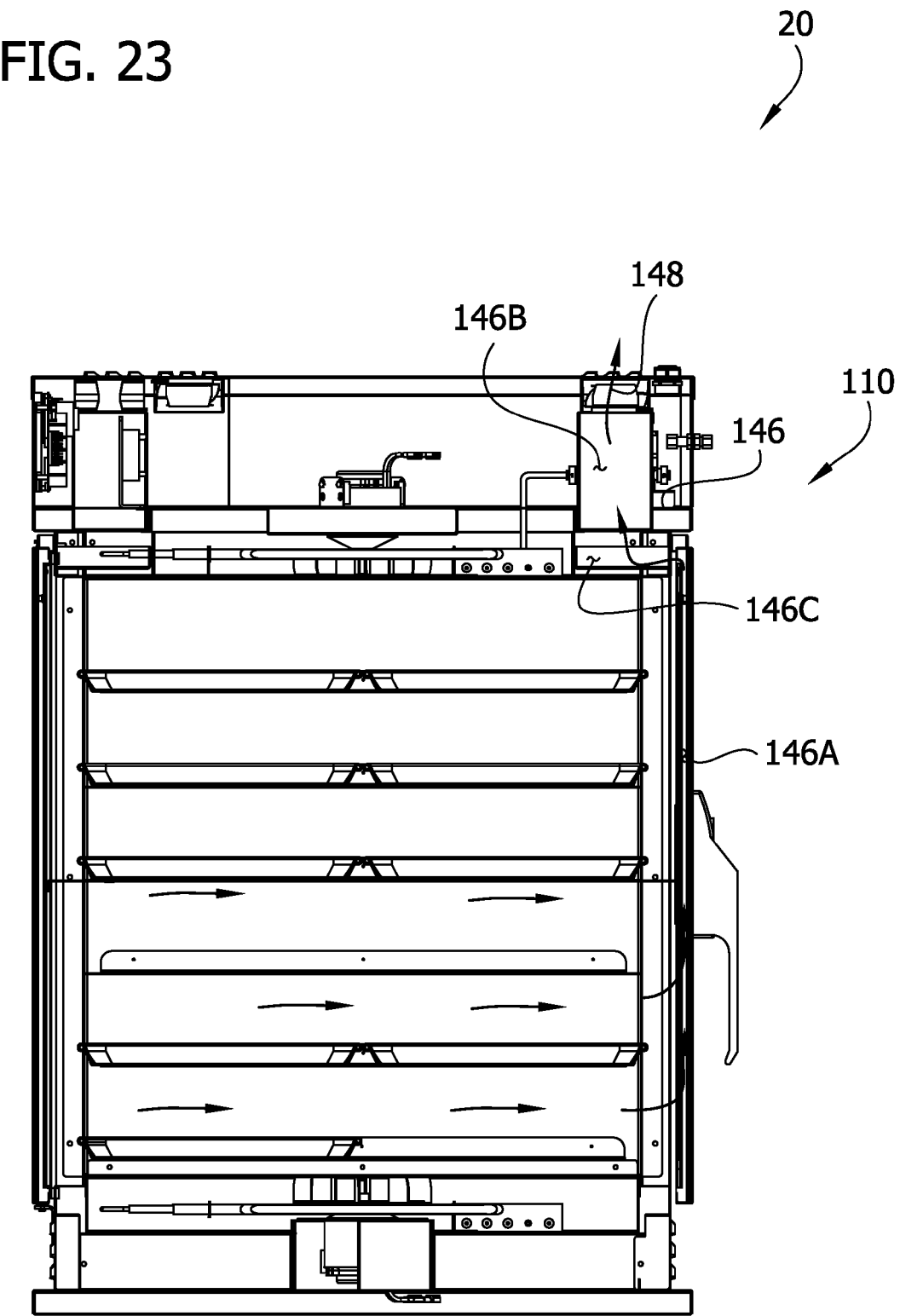
FIG. 23 is a vertical section of the oven taken along the depth of the oven.

The de-humidifying mechanism for the lower cavity 110 is similar to the de-humidifying mechanism for the upper cavity 60. Referring to FIG. 23, the de-humidifying mechanism for the lower cavity 110 comprises a lower-cavity vent 146 and fan 148 for venting (exhausting) high-humidity air from the lower cavity 26 to atmosphere. The lower-cavity vent 146 comprises two rear vent door ducts 146A in the rear door 42, a rear vent stack 146B extending up through the upper internal wall 30 into the upper compartment 32, and a rear vent connecting duct 146C connecting the rear vent door ducts and the rear vent stack. The rear vent fan 148 is located in the rear vent stack 146B for exhausting air from the lower cavity 26 through the rear vent door ducts 146A, the rear vent connecting duct 146C, and the rear vent stack 146B. The rear vent door ducts 146A have inlets 146A' (FIG. 3) comprising arrays of perforations in surfaces of the ducts 146" forming a portion of the inner surface of the rear door 42A. Alternatively, the perforated surfaces 146" may be omitted, providing each duct with a relatively large rectangular inlet (not shown). A seal or gasket 150 is provided around the rear end of the rear vent connecting duct 146C for sealing against the rear door 42 when it closes, so there is no escape of air from the vent as it moves from the door duct 146A to the connecting duct 146C.

Other vent configurations may be used for exhausting high-humidity air from the lower cavity 26. For example, an alternative embodiment having vent ducts in the sides of the cabinet 22 is shown in FIGS. 33 and 34 and described in further detail below. Moreover, a system may be arranged to force ambient air into the cavity to create positive pressure in the cavity (e.g., about 0.1 to 0.25 inches of water column) to cause high-humidity air to vent from the cavity. Such a system would reduce condensation on the blower motor, which may increase a lifespan of the blower. Systems other than vent systems can be used to de-humidify the air in the lower oven cavity. For example, one or more dehumidifiers can be used to perform this function.

Figure 24A:
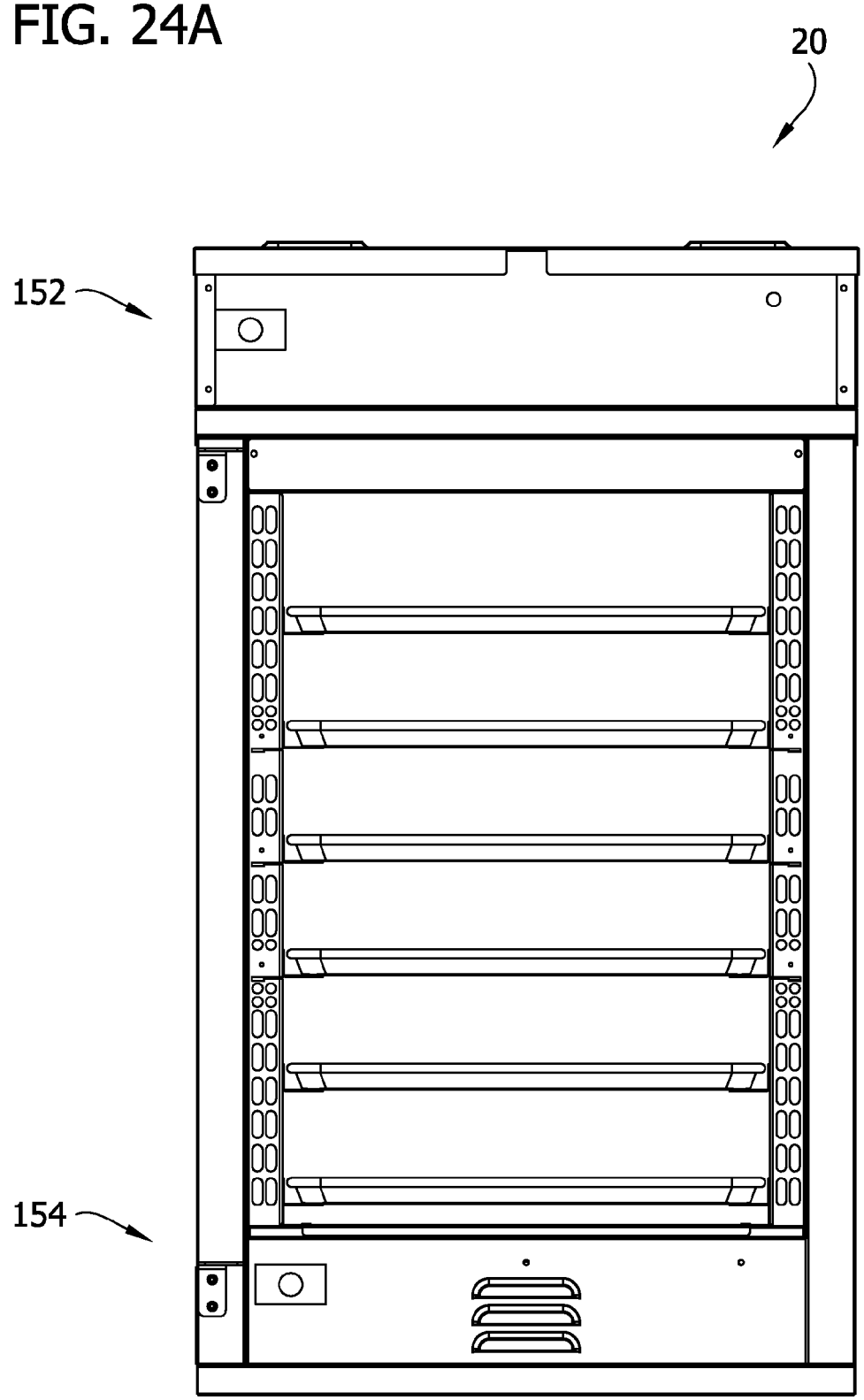
FIG. 24A is a schematic front elevation of the oven having the front door removed and illustrating upper and lower makeup air inlets of the oven.
Figure 24B:
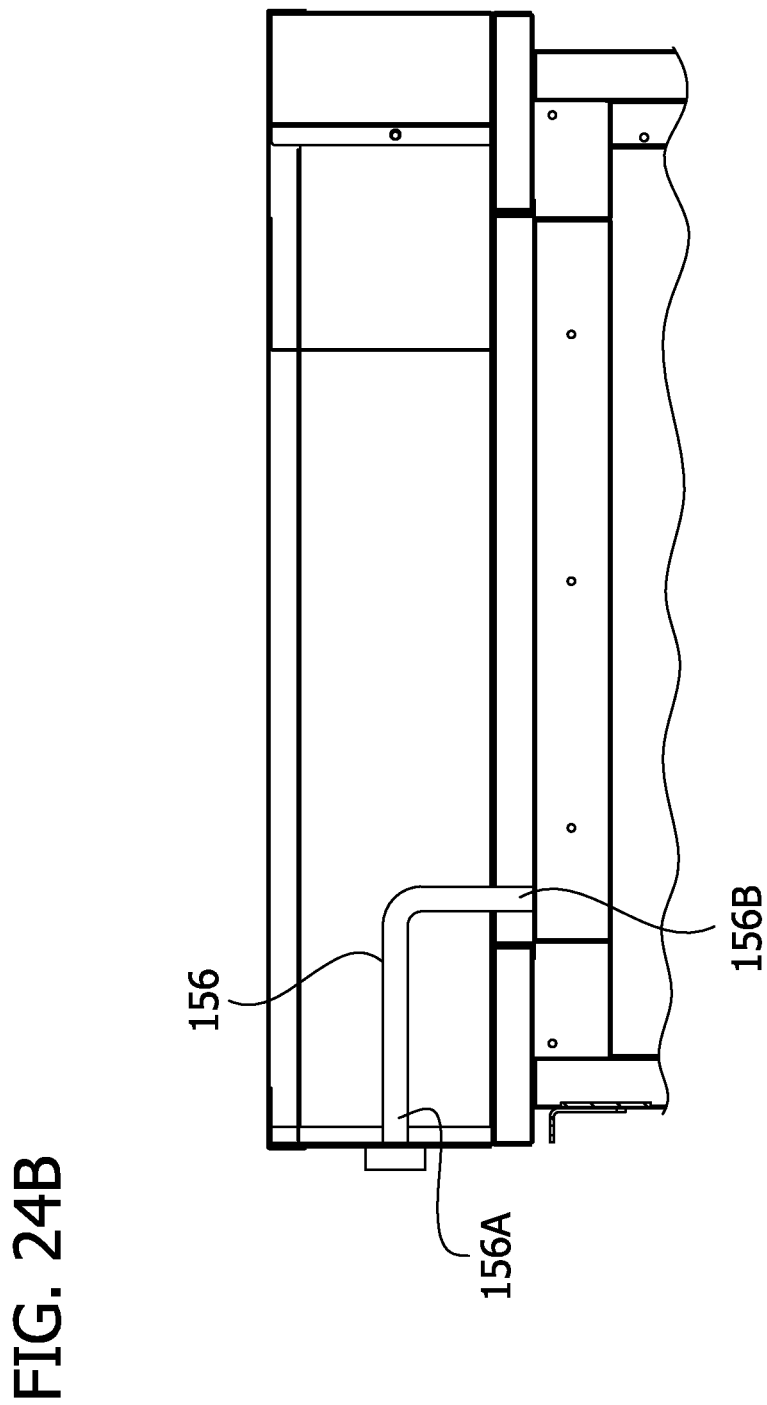
FIG. 24B is an enlarged upper portion of a vertical section of the oven taken along the depth of the oven illustrating the upper makeup air inlet in further detail.
Figure 24C:
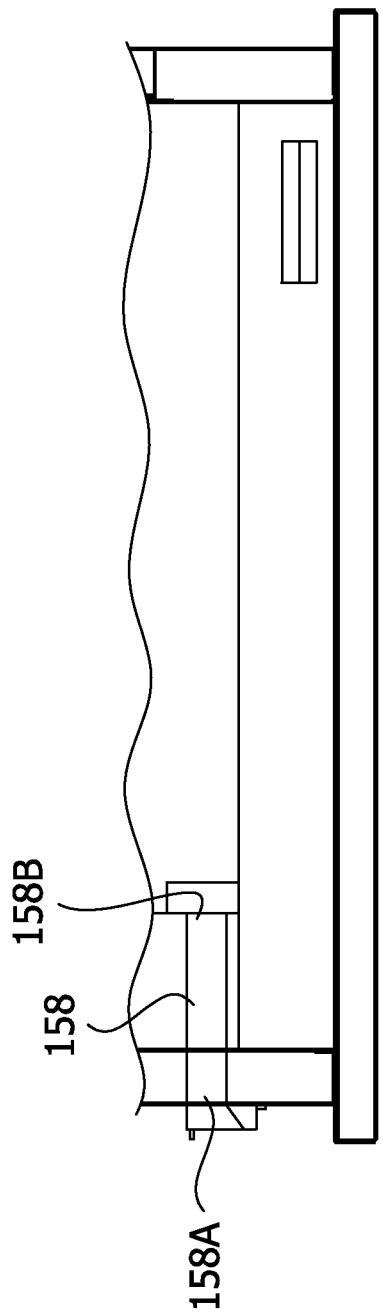
FIG. 24C is an enlarged lower portion of a vertical section of the oven taken along the depth of the oven illustrating the lower makeup air inlet in further detail.

As shown in FIGS. 24A-24C, upper and lower make-up air systems 152, 154 are provided for replacing air vented from respective upper and lower cavities 24, 26 to remove water vapor from the upper and lower cavities, respectively.

In particular, referring to FIG. 24B, the upper make-up air system 152 comprises a conduit 156 in the upper compartment 32 having an inlet port 156A at a side wall of the cabinet communicating with atmosphere and an outlet port 156B communicating with the inside of the upper air duct 50A generally adjacent the heating elements 56 in the upper duct 50A. When high-humidity air is exhausted from the upper cavity 24, make-up air enters the inlet port of the conduit 156A and exits the outlet port of the conduit 156B, where it is heated by the heating elements 56 in the upper duct 50A prior to entering the upper cavity 24.

Referring to FIG. 24C, the lower make-up air system 154 comprises a conduit 158 having an inlet end port 158A at a side wall of the cabinet communicating with atmosphere and an outlet port 158B communicating with the inside of the lower air duct 100A generally adjacent the heating elements 106 in the lower duct. When high-humidity air is exhausted from the lower cavity 26, make-up air enters the inlet port of the conduit 158A and exits the outlet port of the conduit 158B, where it is heated by the heating elements 106 in the lower duct 100A prior to entering the lower cavity 26.

The upper-cavity vent 92 and fan 94 and the lower-cavity vent 146 and fan 148 are sized and configured for rapid venting of the upper and lower cavities 24, 26, respectively, so that temperature and humidity conditions can be restored quickly following a door opening/closing event. By way of example, each of the upper and lower cavities 24, 26 has a volume of about 4.6 cubic feet, and each of the upper and lower vent fans 94, 148 generate an air flow of 15-20 cfm. The vent fans 94, 148 may be one-speed fans, or variable speed fans, the speed of which can be varied depending on the magnitude of the difference between the target RH and the measured RH of the air circulating through a respective oven cavity 24, 26 (e.g., the fan speed is proportional to the magnitude of the difference.)

Figure 26:
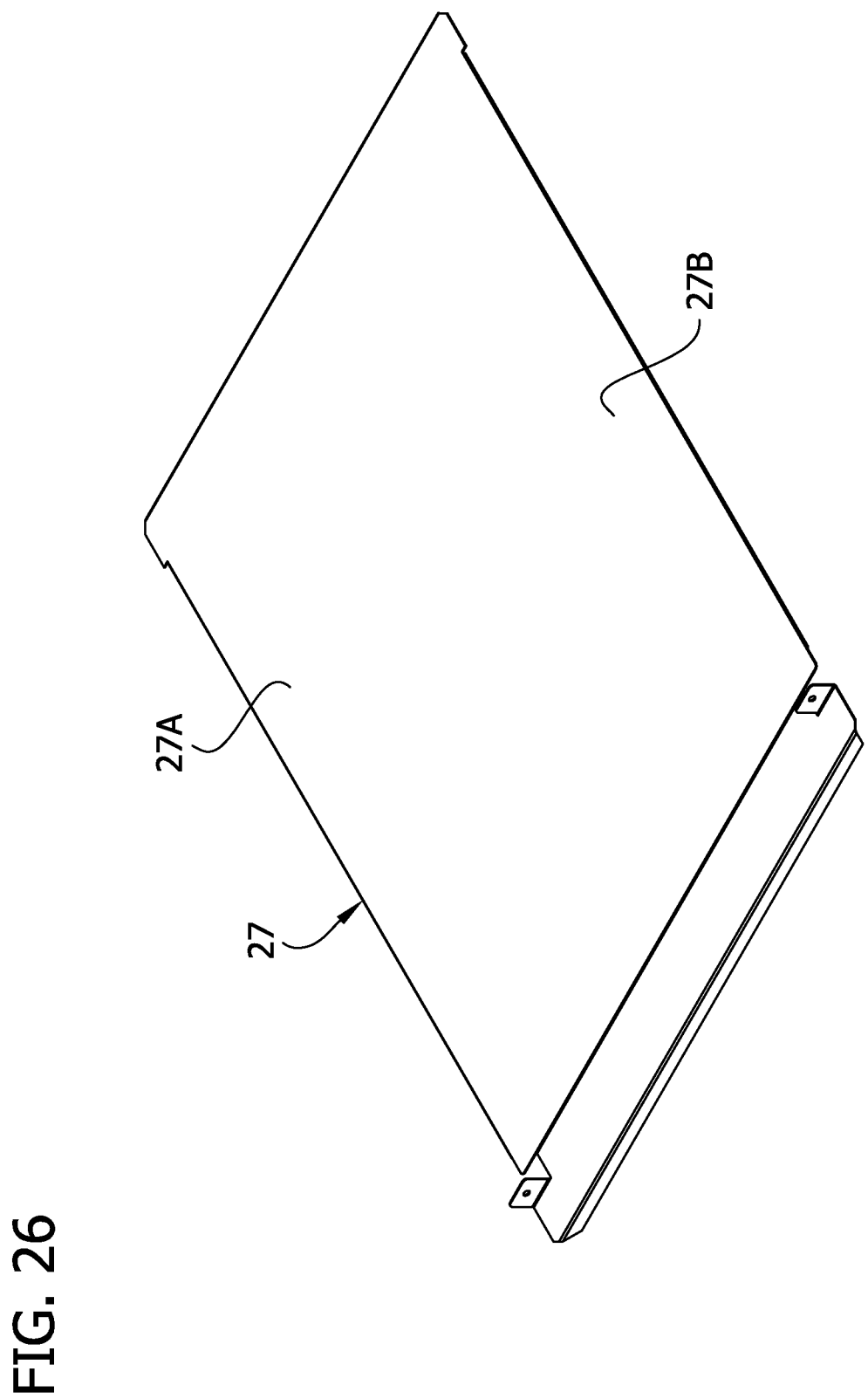
FIG. 26 is a perspective of a partition of the oven.
Figure 27:
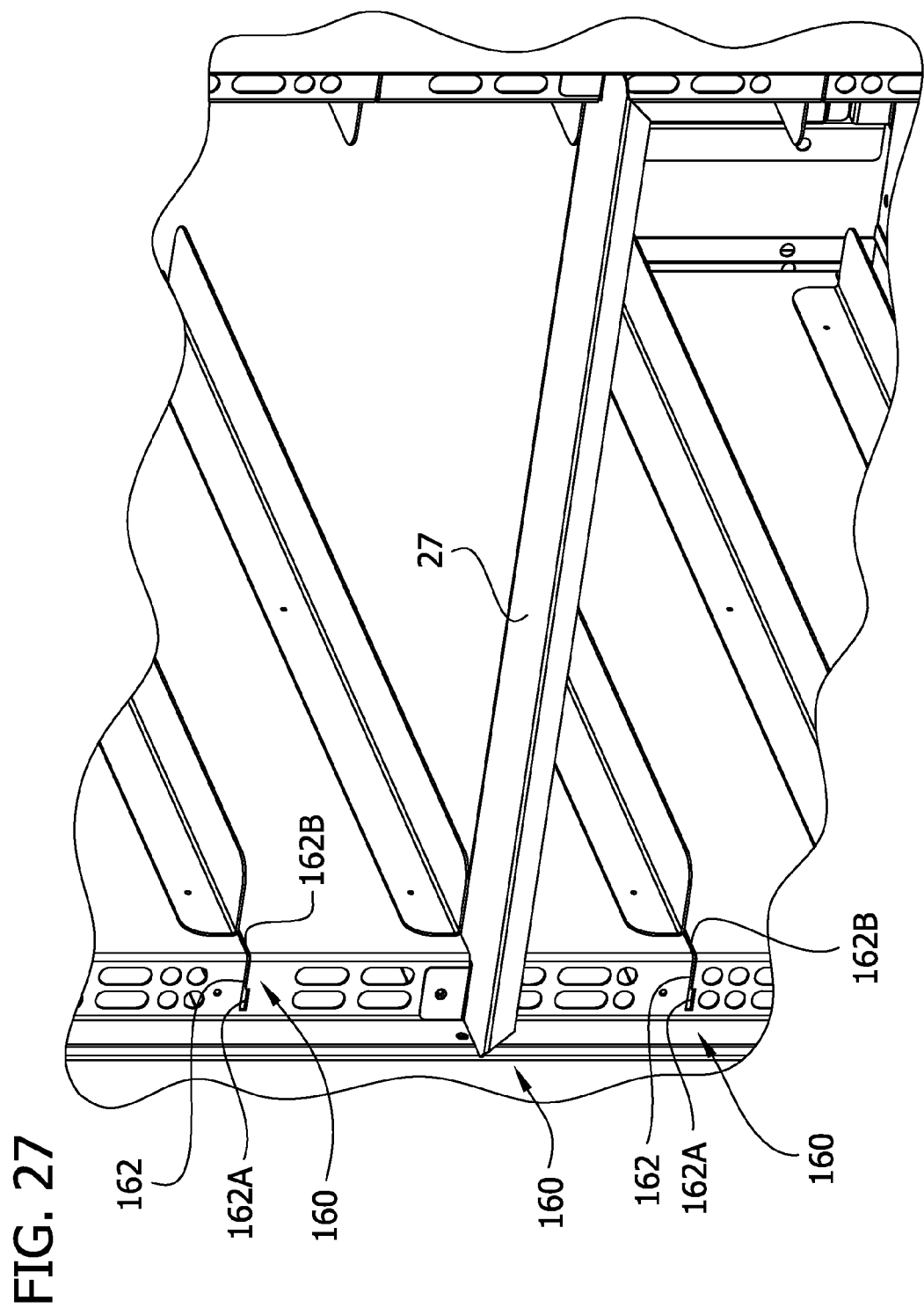
FIG. 27 is a partial front perspective of the oven having the front door open to show sets of partition supports at different heights in the oven, the partition being positioned on an intermediate set of the partition supports.

As noted above, the partition 27 separating the upper and lower cavities 24, 26 is a movable partition that can be supported at different elevations in the cabinet 22 to vary the sizes of the upper and lower cavities. FIG. 26 is a perspective of the partition 27. As shown in FIG. 27, three sets of partition supports 160 are provided for supporting the partition 27 at three different elevations, but this number may vary from a single elevation to two, three, or more elevations.

Figure 28:
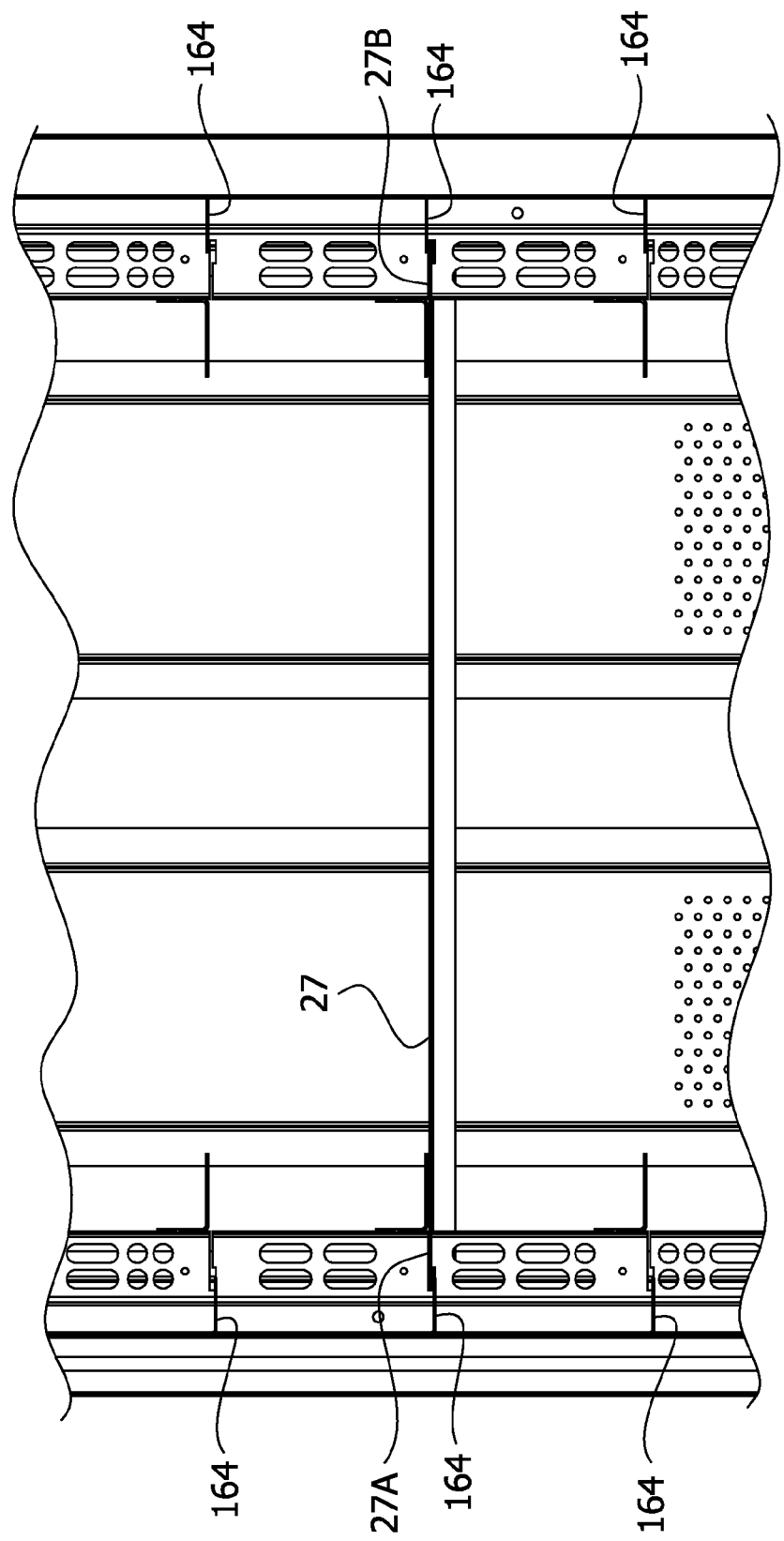
FIG. 28 is a partial front elevation corresponding to the view of FIG. 27.
Figure 29:
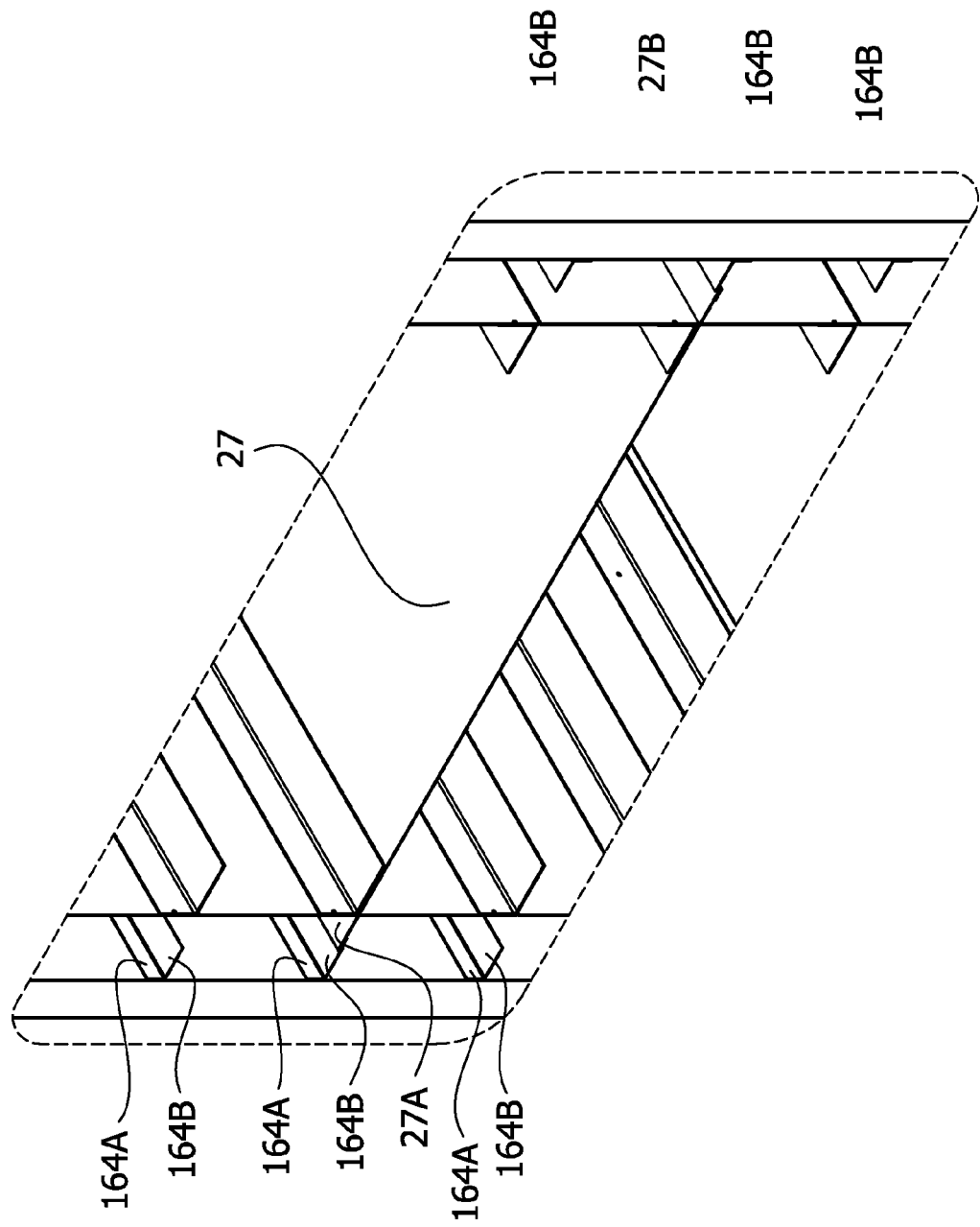
FIG. 29 is a perspective of a partial section of the oven taken along the width of the oven, the partition being positioned on the intermediate set of the partition supports.
Figure 30:
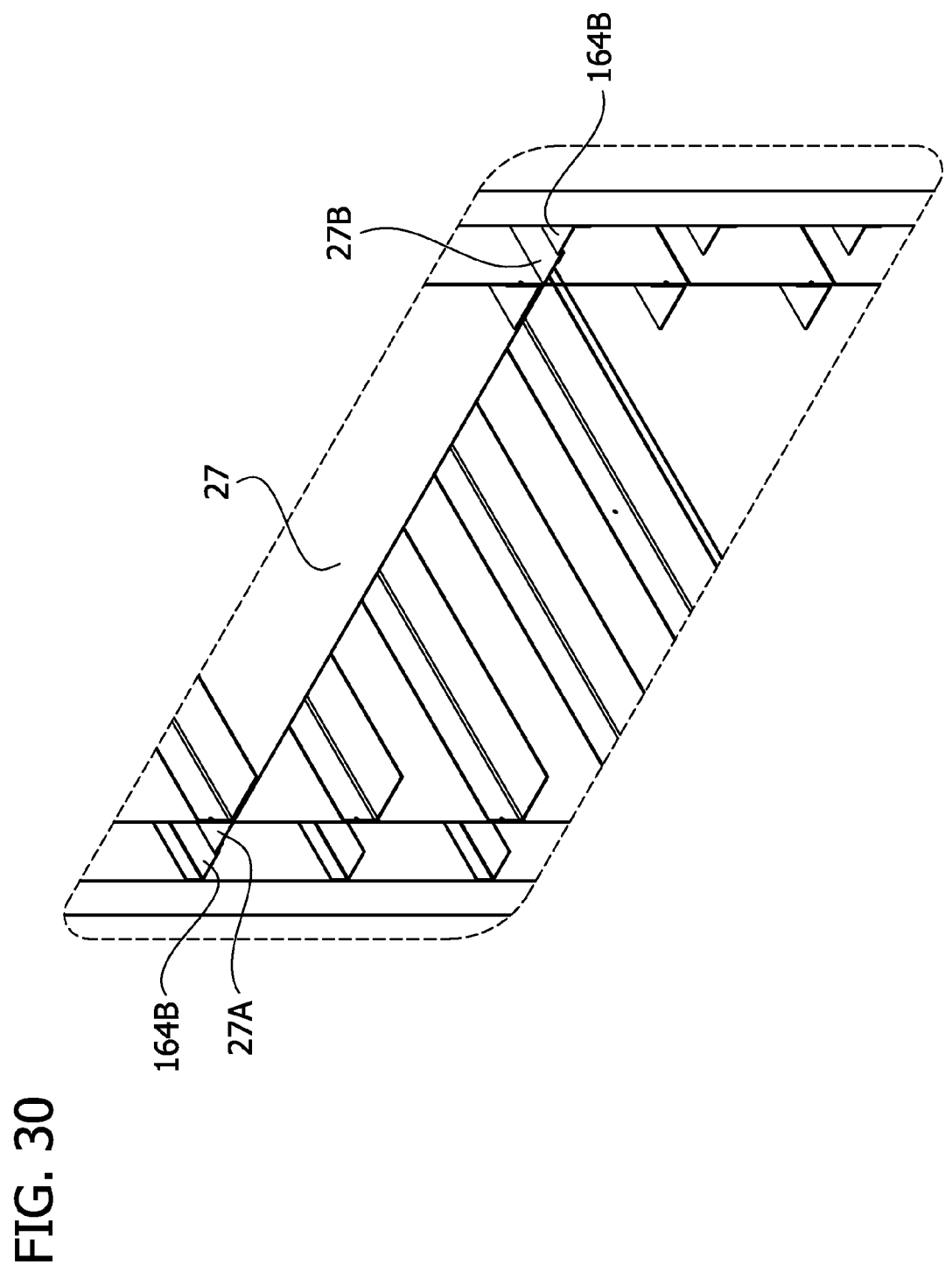
FIG. 30 is a perspective of a partial section of the oven taken along the width of the oven, the partition being positioned on an upper set of the partition supports.

Each set of partition supports 160 comprises openings 162 in the side ducts 50B, 50C, or 100B, 100C for receiving opposite side margins of the partition 27A, 27B. As shown in FIG. 27, each opening includes a first portion 162A in the front surface of a respective side duct 50B, 50C, 100B or 100C and a second portion 162B extending substantially the entire depth of the cavities 24, 26 between the inside surfaces of the front and rear doors 40A, 42A. As shown in FIGS. 28-30, each set of partition supports 160 also comprises two support members 164 at opposite sides of the cabinet 22 positioned inside the side ducts 50B, 50C, 100B, 100C. The support members 164 extend substantially the entire depth of the cavities 24, 26 between the inside surfaces of the front and rear doors 40A, 42A for supporting substantially the entire lengths of the opposite side margins of the partition 27A, 27B. Each support member 164 comprises generally horizontal bars (also indicated by the reference number 164) attached to inner side surfaces of the ducts 50B, 50C, 100B, 100C facing the cavities 24, 26. In the illustrated embodiment, the bars 164 are L-shaped angle bars having vertical legs 164A attached to respective side surfaces of the ducts 50B, 50C, 100B, 100C and horizontal legs 164B extending toward the cavities 24, 26. The partition 27 is positioned on a particular set of partition supports 164 by inserting rear portions of the opposite side margins of the partition 27A, 27B into the opening portions 162A and sliding the partition fully into the cabinet 22 along the opening portions 162B and bars 164. The arrangement is such that the side margins of the partition 27A, 27B overlap the horizontal legs 164B of the support bars 164B to divide the side ducts 50B, 50C, 100B, 100C to separate the air circulating above and below the partition 27 in the ducts. FIGS. 27-29 illustrate the partition 27 in a middle position, and FIG. 30 illustrates the partition 27 moved to an upper position. Desirably, the interaction of the side margins of the partition 27A, 27B with the horizontal legs 164B forms a suitable seal. Other types of partition supports may be used without departing from the scope of the present invention. For example, the bars 164 may be U-shaped for receiving the side margins of the partition 27A, 27B between legs of the "U".

Figure 31:
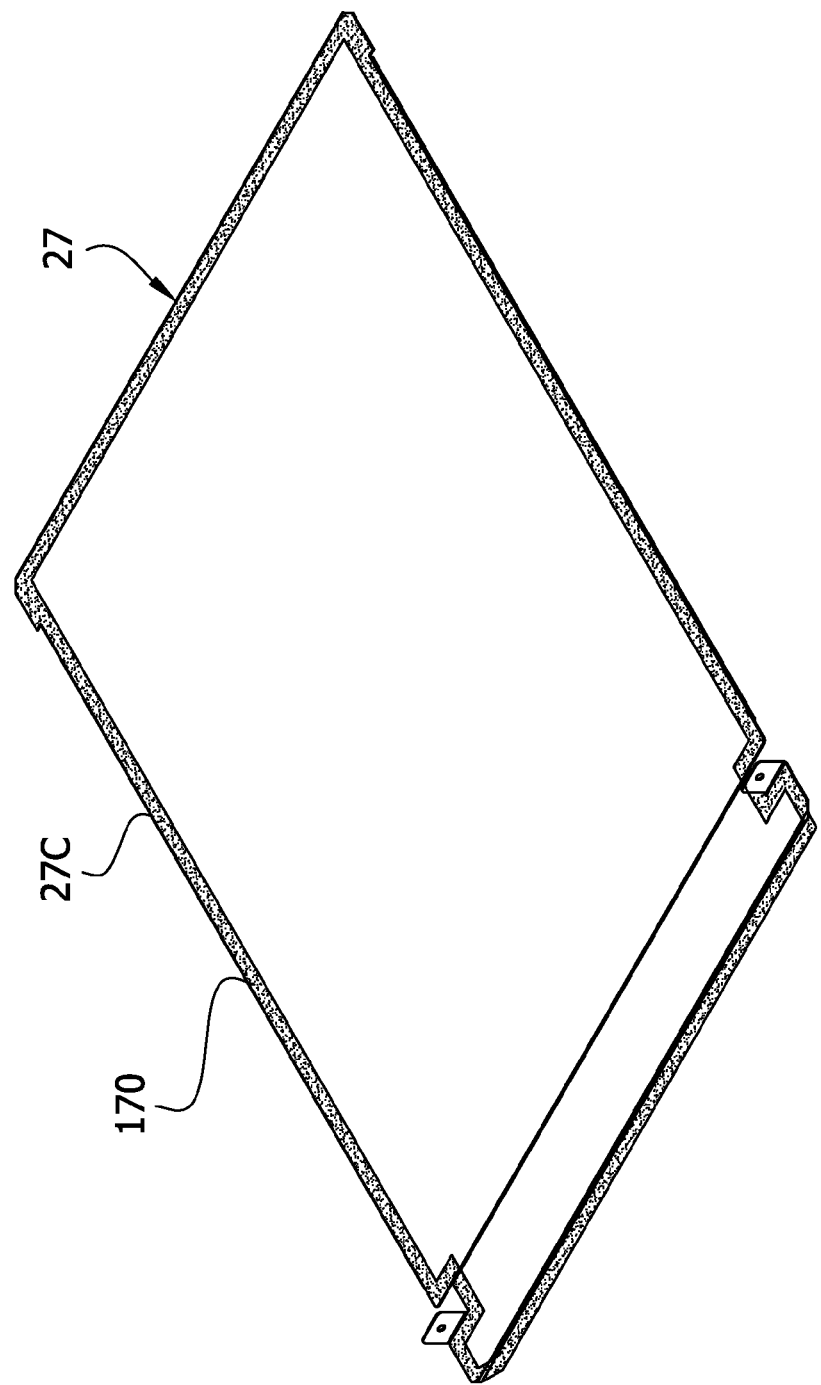
FIG. 31 is a perspective the partition including a sealing mechanism.

A sealing mechanism 170 may be provided for sealing around all or part of a periphery 27C of the partition 27 to assist in inhibiting flow of air between the upper (first) and lower (second) cavities 24, 26 and/or above and below the side margins of the partition 27A, 27B in the side ducts 50B, 50C, 100B, 100C. For example, as shown in FIG. 31, the sealing mechanism 170 may be a seal or gasket of elastomeric material extending around the periphery of the partition 27C. The elastomeric material assists in forming a seal between the side margins of the partition 27A, 27B and the horizontal legs of the support bars 164B and in forming a seal between the front and rear of the partition with the inner surface of the front door 40A and the inner surface of the rear door 42A. Sealing mechanisms having other configurations (e.g., including elastomeric material or flexible metallic material) may be used without departing from the scope of the present invention.

Referring to FIGS. 2 and 3, the oven 20 includes an electronic control system 172 housed in a separate control section of the upper compartment 32A toward the front of the cabinet 22. The control section 32A is defined in part by a dividing wall 174 spaced back from the front wall of the cabinet 22E. The control system 172 includes the controller 66 comprising a microprocessor, memory, and associated components. The system 172 also includes an operator input 176 (e.g., touch screen), display 178, and power button 180 on a control panel 182 at the front of the cabinet 22. A cooling fan 184 in the control section of the upper compartment creates a cooling air flow over the various electronic components for cooling them. Louvers 186 in the top cover 22A facilitate this air flow.

In general, the oven operates to create and maintain temperature, relative humidity (RH), and air flow conditions which are closely regulated and tailored to the food product being held in the cavities 24, 26. Moreover, the oven operates to rapidly regenerate temperature and RH conditions to desired values. By doing so, it has been found, unexpectedly, that the holding times for certain food products (e.g., chicken) can be extended far beyond those obtained using conventional equipment.

In operation, the partition 27 is moved to a selected position determined by the desired sizes of the upper and lower cavities 24, 26. Food product is loaded into one or both of the oven cavities 24, 26, and the temperature and humidity target settings for each oven cavity in use are selected using the operator input 176. For purposes of this description, it will be assumed that only the upper cavity system 46 is to be used. However, either or both of the upper and lower cavity systems 46, 48 may be used. For simplicity, operation of only the upper cavity system 46 is described below. The operation of the lower cavity system 48 may be essentially identical.

The blower 54, vent fan 94, heating elements 56, humidifying mechanism 58, and de-humidifying mechanism 60 of the upper cavity system 46 may be operated during normal operation in a maintenance or idle mode. For various reasons, such as to load and/or unload food, the doors 40, 42 may be opened and closed. The blower 54, vent fan 94, heating elements 56, humidifying mechanism 58, and de-humidifying mechanism 60 are turned off when a door 40, 42 is opened. When the doors 40, 42 are closed, as signaled by door sensors 43A and 43B, the blower 54 for the upper cavity system 46 is energized to circulate air through the upper cavity 24, and the temperature and RH sensors 64, 62 measure the temperature and RH conditions inside the cavity. In a door open/closure event (e.g., including food loading/unloading), the temperature and RH conditions in the cavity 24 usually change dramatically. For example, the RH may drop 20% or more, and the temperature may drop 10, 20, 30, or more degrees F. It has been discovered that it is important to rapidly restore the target conditions in the cavity 24 after closure of the door(s). Desirably, this rapid restoration process should occur in no more than three minutes, preferably in no more than two minutes, more preferably in no more than ninety seconds, more preferably in no more than sixty seconds, and most preferably in no more than forty-five or even thirty seconds after the door is closed. Each of the cavity systems 46, 48 of the oven is capable of achieving this result by methods described below.

The controller 66 may be programmed in various ways to carry out rapid restoration and maintenance of temperature and RH conditions in the cavity 24. Two example methods by which these operations may be regulated (and according to which the controller 66 may be programmed) are described below. In the first example, humidification, de-humidification, and temperature are controlled according to closed-loop methods. In the second example, humidification is controlled according to an open-loop (time-based) method, and de-humidification and temperature may be controlled according to closed-loop methods. Other methods and/or combinations of the described methods may be used without departing from the scope of the present invention.

Figure 32:
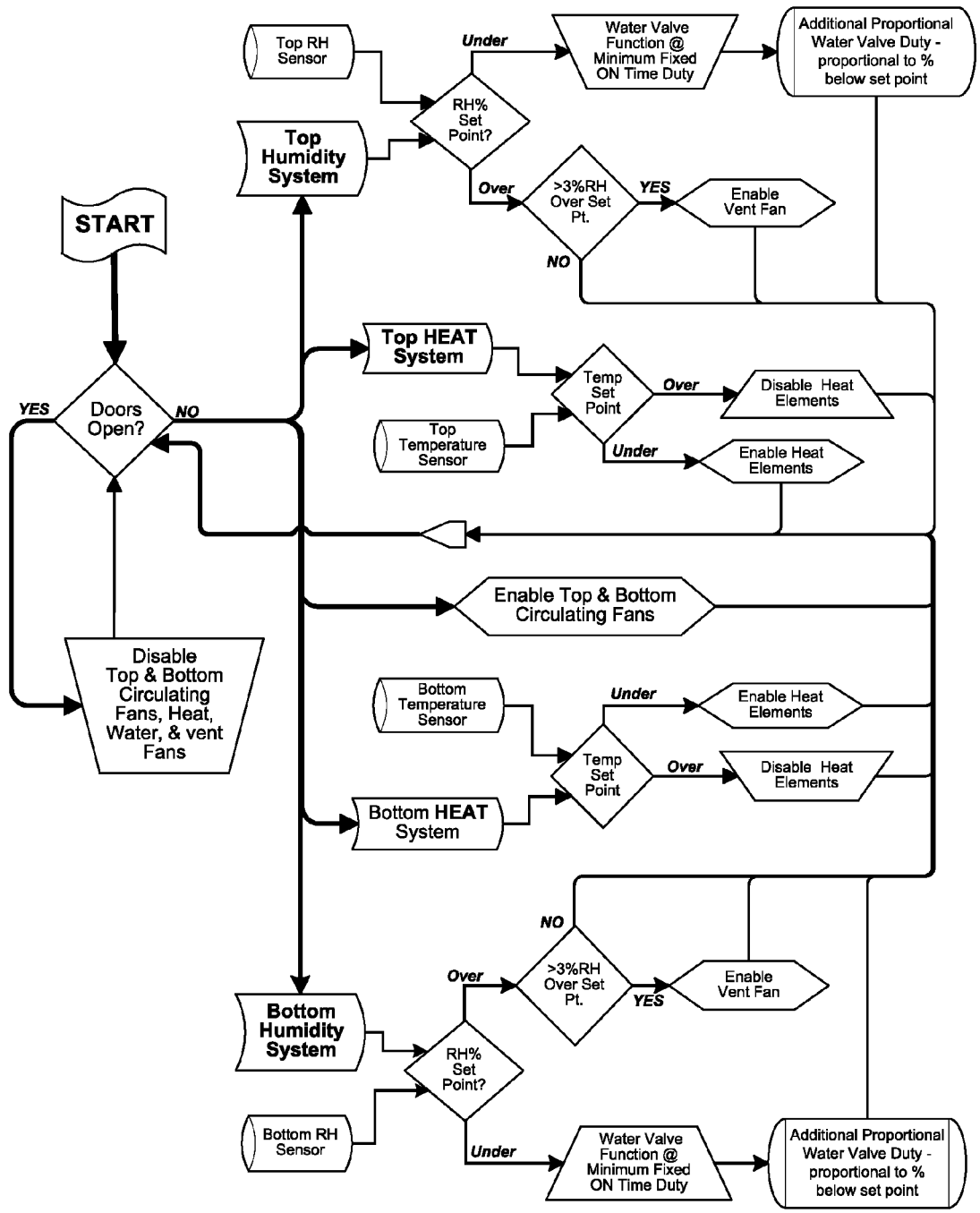
FIG. 32 is a flow chart illustrating methods according to the present invention.

The methods according to the first example are illustrated schematically in the flow chart of FIG. 32. Food product is loaded into the oven cavity 24, and the temperature and humidity target settings ("set points" in FIG. 32) for the cavity are selected using the operator input 176. The controller 66 then operates according to the closed-loop methods to create, maintain, and, when necessary, rapidly regenerate temperature and RH conditions corresponding to the target settings.

If the measured temperature is below the target setting (e.g., 180 degrees F.), the controller 66 energizes ("enables") the heating elements 56 in the upper air duct 50A until the measured temperature is at or somewhat above (e.g., 1.0 degree F. above) the target setting, at which time the heating elements 56 are de-energized ("disabled"). The heating elements 56 stay de-energized until the measured temperature falls below or somewhat below the target temperature, at which time the heating elements 56 are again energized and the process repeats. In this manner, the temperature in the oven cavity 24 can be regulated within a tight range (e.g., ±5.0 degrees F.) close to the target setting.

Desirably, the amount of heat supplied by the heating elements 56 is proportional to the magnitude of the difference between the measured temperature and the target temperature (i.e., the target temperature setting). That is, if the magnitude is large, a large amount of heat will be supplied; if the magnitude is small, a smaller amount of heat will be supplied. This can be accomplished by varying the duty cycle of the heating elements 56, as will be understood by those skilled in the art. Alternatively, instead of using a proportional control, the heating elements 56 may be energized continuously until the temperature sensor 64 indicates the temperature is at or above the desired set point, at which point the controller 66 de-energizes the heating elements.

Similarly, if the measured RH of the circulating air of the upper cavity is below the target setting (e.g., 30%), the controller 66 energizes the humidifying mechanism 58 to add water vapor to the circulating air. This is accomplished by operating ("enabling" in FIG. 32) the solenoid valve 88 to deliver water to the heated surface 90A of the heating device 90 where it is immediately vaporized and introduced into the circulating air of the upper cavity 24. Desirably, water is introduced into the heated air no more than about 16, 10, 5, or more desirably 3 seconds after closure of the door. The delivery of water to the heated surface 90A may be intermittent. This is accomplished by alternately opening and closing the solenoid valve 88 such that water is delivered to the heating device 90 during timed "on" intervals of relatively short duration (e.g., 2 milliseconds to 2 seconds) and not delivered to the heating device 90 during timed "off" intervals of longer duration (e.g., 30-120 seconds). The "off" intervals provide a period of time during which the RH sensor 62 can measure the increase in the RH of the air in the upper cavity 24 as a result of the water vapor added during the "on" interval. The process of intermittently adding water vapor to the air stream continues until the measured RH in the upper cavity 24 rises to or somewhat above (e.g., 3% above) the target RH (i.e., the target RH setting), at which time the controller 66 operates ("disables") the solenoid valve 88 to close the water line 86 and stop further delivery to the heating mechanism 90.

Desirably, the amount of water supplied by the humidification mechanism 58 is proportional to the magnitude of the difference between the measured RH and the target RH (i.e., the target RH setting). That is, if the magnitude is large, a large amount of water will be supplied; if the magnitude is small, a smaller amount of water will be supplied. This can be accomplished by increasing the duration of each "on" interval and/or by decreasing the duration of each "off" interval.

The cavity 24 may have a volume of about 4.6 cubic feet, and about 0.01 ounces of water is used to rapidly regenerate 20% RH in the cavity in 1.5 minutes. About 0.015 ounces of water may be used to rapidly regenerate 40% RH in the cavity 24 in 1.5 minutes. The amount of water used varies depending upon several variables, including the volume of the cavity 24.

In an idle/maintenance mode, the RH of the cavity 24 may be maintained by using minimum fixed timed "on" intervals of about 10 milliseconds and minimum fixed timed "off" intervals of about 35 seconds. Water use may be about 1.0 ounce per hour for a 20% RH environment and about 1.6 ounces per hour for a 40% RH environment. If the RH sensor 62 indicates the minimum fixed time intervals are inadequate to maintain desired RH conditions, the "on" and/or "off" intervals are adjusted by the controller 66 to make the amount of water supplied by the humidification mechanism 58 proportional to the magnitude of the difference between the measured RH and the target RH (i.e., the target RH setting), as described above.

If the measured RH is above the target RH setting, the upper vent fan 94 is operated to exhaust the high-humidity air in the oven cavity 24, which is replaced by drier make-up air. The vent fan 94 remains on until the measured RH in the oven cavity falls to the target RH or a RH slightly above (e.g., 1%) the target RH, at which time the fan is de-energized ("disabled").

In the second example, humidification is controlled according to an open-loop method. Food product is loaded into the oven cavity 24. Using the operator input 176, the temperature and humidity target settings for the cavity 24 are selected, the particular type of food product loaded in the cavity 24 is selected, and/or a quantity of the food product (e.g., full or partial load) is selected. The controller 66 is programmed with time-based methods corresponding to particular humidity settings, particular types of food product, and/or particular quantities of the food product. The controller 66 operates according to the time-based methods to create, maintain, and rapidly regenerate RH conditions. A primary difference in this second example is that the time-based methods initiate rapid restoration of the RH conditions in response to closure of the doors, as sensed by the door sensors 43A, 43B, rather than according to sensed difference between the target conditions and actual conditions in the cavity 24. When using time-based methods, RH sensors such as sensors 62 and 112 may not be necessary and thus may be omitted.

For example, an operator may program the oven 20 to hold grilled chicken in the cavity 24 by indicating accordingly on the operator input 176. For grilled chicken, the controller 66 is programmed to maintain the cavity 24 at target temperature and RH conditions of, for example, 180 degrees F. and 40% RH. The controller 66 may or may not execute a pre-holding sequence to bring the temperature and RH in the cavity 24 to these values. The operator opens a door 40, 42, inserts the grilled chicken, and closes the door. Immediately upon door closure, or following a pre-determined time (e.g., about 0-16 seconds or more desirably about 0-3 seconds) after closure of the door 40, 42, the controller 66 energizes the humidifying mechanism 58 and operates the solenoid valve 88 according to fixed timed "on" intervals during which water is delivered to the heated surface 90A of the heating device 90, and fixed timed "off" intervals during which water is not delivered to the heating device 90. The fixed timed "on" and "off" intervals are selected to rapidly restore the target RH conditions. For example, the controller 66 may operate the solenoid valve 88 according to an initial fixed sixteen-second "on" interval, followed by a fixed forty-second "off" interval, followed by alternating five-second "on" and forty-second "off" intervals, until the door sensors 43A, 43B indicate opening of one of the doors 40, 42. The fixed "on" and "off" intervals are repeated after the sensors 43A, 43B once again indicate closure of the doors 40, 42. The controller 66 may be programmed to operate according to fixed timed "on" and "off" intervals other than described above without departing from the scope of the present invention. For example, the initial fixed "on" interval may range from 10-30 seconds, and the subsequent fixed "on" and "off" intervals may range from 2-8 and 20-60 seconds, respectively.

As another example, an operator may program the oven 20 to hold fried chicken in the cavity 24 by indicating accordingly on the operator input 176. For fried chicken, the controller 66 is programmed to maintain the cavity 24 at target temperature and RH conditions of, for example, 180 degrees F. and 20% RH. The controller 66 may or may not execute a pre-holding sequence to bring the temperature and RH in the cavity 24 to these values. The operator opens the door 40, 42, inserts the fried chicken, and closes the door. Immediately upon door closure, or following a pre-determined time (e.g., about 0-16 seconds or more desirably about 0-3 seconds) after closure of the door 40, 42, the controller 66 energizes the humidifying mechanism 58 and operates the solenoid valve 88 according to fixed timed "on" intervals during which water is delivered to the heated surface 90A of the heating device 90, and fixed timed "off" intervals during which water is not delivered to the heating device 90. The fixed timed "on" and "off" intervals are selected to rapidly restore the target RH conditions. For example, the controller 66 may operate the solenoid valve 88 according to alternating one-second "on" and thirty-second "off" intervals. No initial extended "on" interval is used because moisture from the fried chicken humidifies the cavity 24 sufficiently such that an initial extended "on" interval is not necessary. The alternating fixed "on" and "off" intervals continue until the door sensors 43A, 43B indicate opening of one of the doors 40, 42. The fixed "on" and "off" intervals are repeated after the sensors 43A, 43B once again indicate closure of the doors 40, 42. The controller 66 may be programmed to operate according to fixed timed "on" and "off" intervals other than described above without departing from the scope of the present invention. For example, the fixed "on" and "off" intervals may range from 1-5 and 15-60 seconds, respectively.

In this second example, the controller 66 may be programmed to regulate temperature by operating the heating elements 56 according to time-based methods like the methods described immediately above with respect to RH (e.g., energizing the heating elements 56 for a first "on" interval and then for alternating "off" intervals and "on" intervals shorter than the first "on" interval), or according to a closed-loop method as described above with respect to the first example. Moreover, the controller 66 may be programmed to regulate removal of high-humidity air by operating the vent fan 94 according to time-based methods, or according to closed-loop methods as described above with respect to the first example.

The methods described above are efficacious in maintaining pre-cooked food product at a quality not only suitable for human consumption but also appetizing to the pallet for extended holding times relative to conventional holding ovens. For example, "low mass" pre-cooked food product such as grilled chicken or fish can be maintained at such quality for holding periods of up to 60, 70, 80, or even 90 minutes. "High mass" pre-cooked food product such as bone-in fried or breaded chicken can be maintained at such quality for holding periods of up to 80, 90, 100, 110, 120, 130, 140, or even 150 minutes.

Figure 25A:
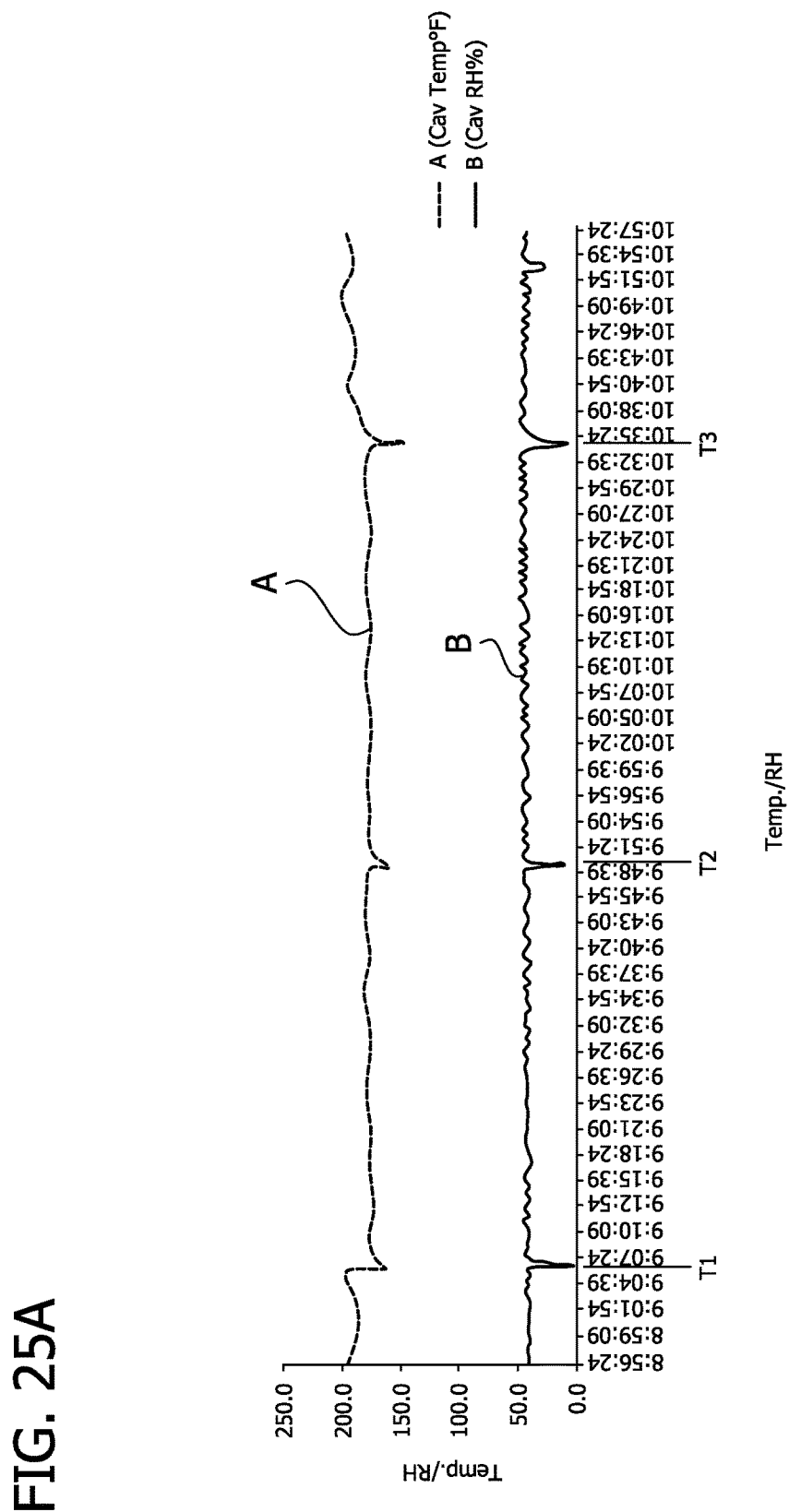
FIG. 25A is a graph showing results from an example test conducted with an oven constructed and programmed to operate according to the present invention.

FIG. 25A is a graph showing results from an example test conducted with an oven constructed and programmed to operate according to the present invention. This particular test was conducted using an open-loop type RH restoration method as described above. Tests conducted using closed-loop type RH restoration methods showed similar results.

The oven was set to target temperature and RH values of 180 degrees F. and 40% RH. A first curve indicated by A is a plot of temperature as a function of time. A second curve indicated by B is a plot of RH as a function of time. At time T1, a door of the oven was opened, two pans of grilled chicken were inserted in the oven, and the door was closed. At time T2, the door was opened, two additional pans of grilled chicken were inserted in the oven, and the door was closed. At time T3, all pans of grilled chicken were removed from the oven. As indicated by the consistently horizontal segments of curves A and B between times T1 and T2 and between times T2 and T3, the oven operated successfully in consistently maintaining the target temperature and RH values for substantially the entire holding duration.

Figure 25B:
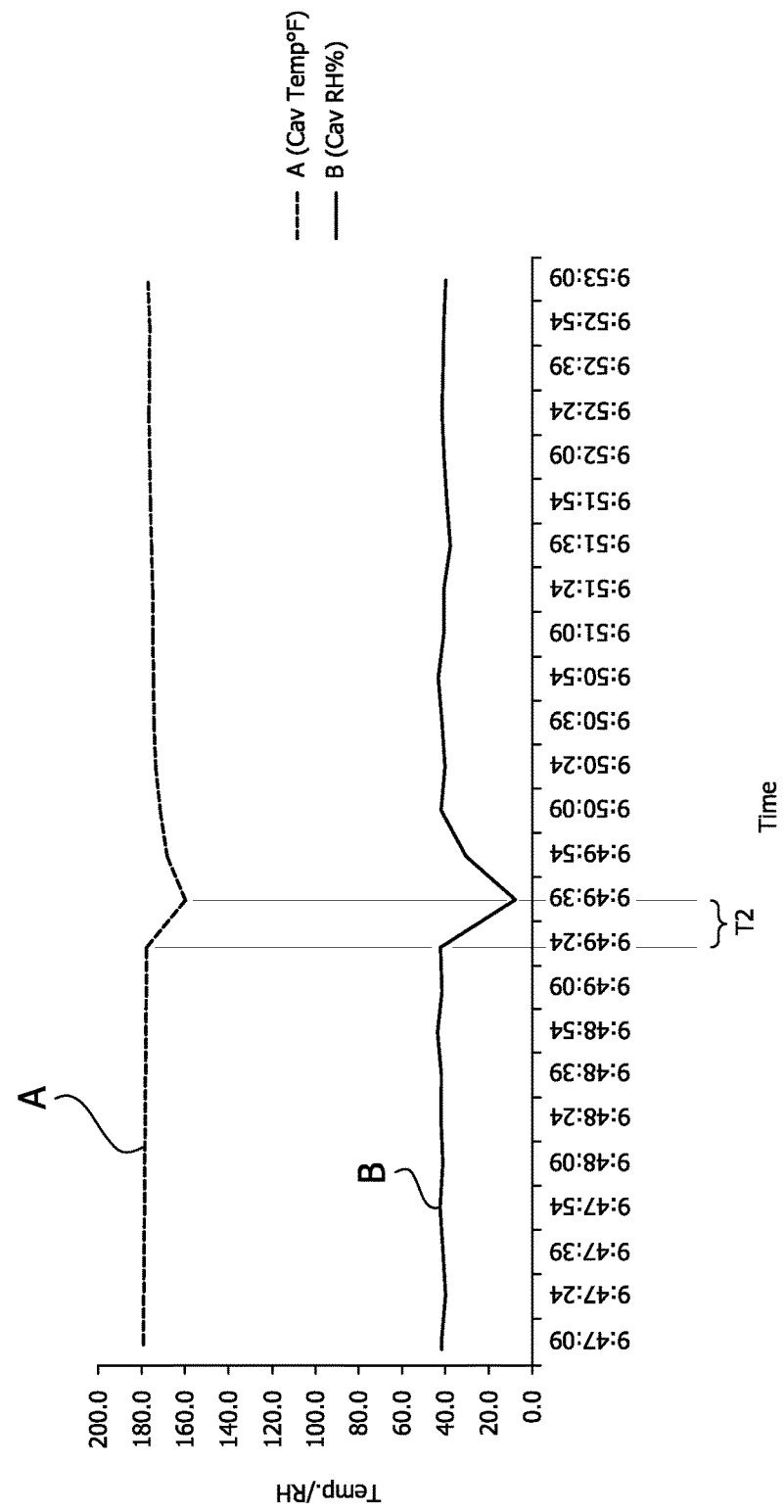
FIG. 25B illustrates a portion of the graph of FIG. 25A.

FIG. 25B illustrates a portion of the graph of 25A. In particular, the graph of FIG. 25B is limited to the time frame immediately before and after door open/closure at T2. As indicated by the negative slope of the curves A and B during time T2, the temperature and RH in the oven rapidly decreased during the time the door was open. However, as indicated by the subsequent positive slopes and plateaus of the curves A and B, the oven was successful in rapidly restoring the target temperature and RH values. In particular, the temperature was restored to within about 3 degrees of 180 degrees F. in less than about 1.5 minutes, and the RH was restored to within about 3 percentage points of 40% RH in less than about 45 seconds.

Figure 25C:
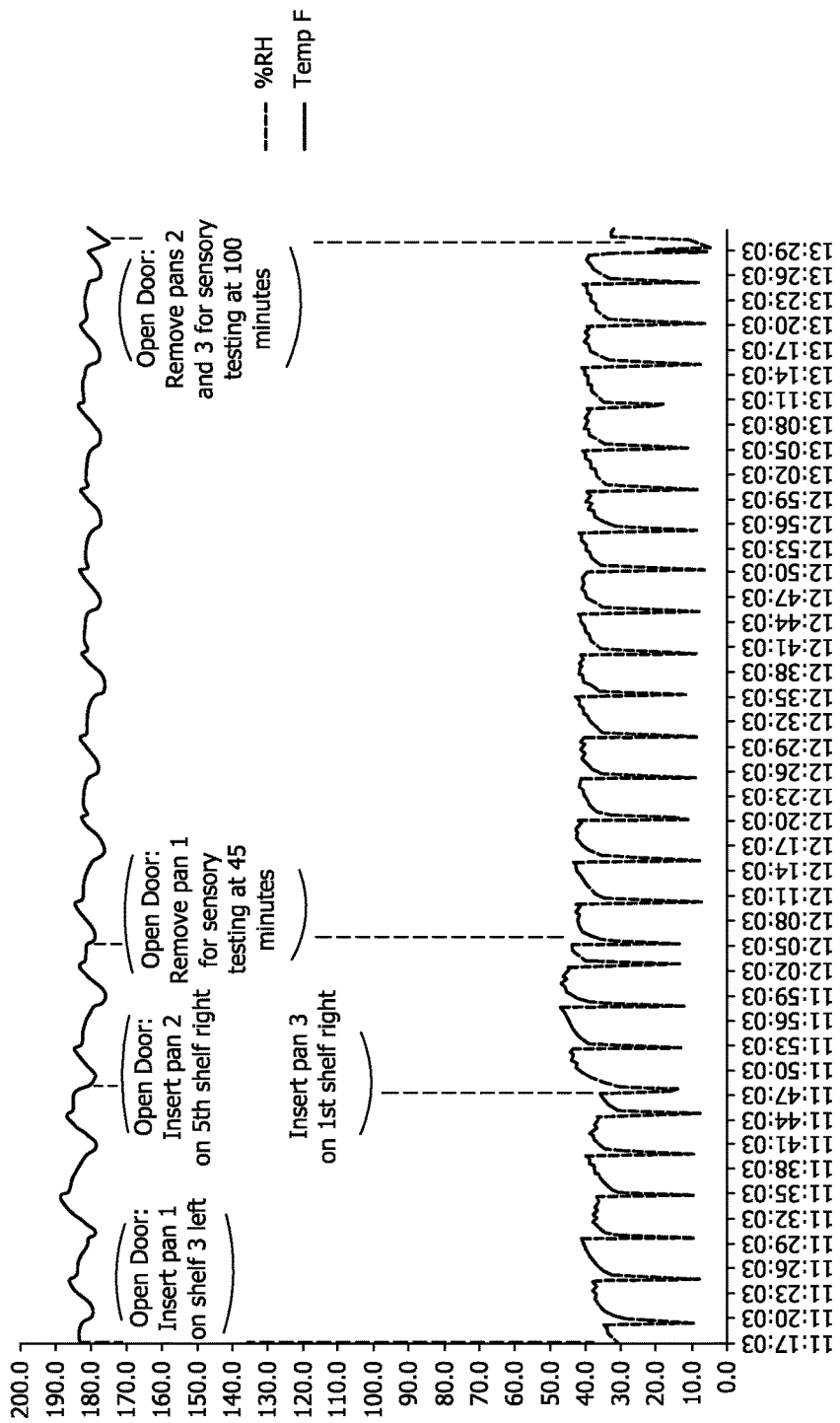
FIG. 25C is a graph showing results from another example test conducted with an oven constructed and programmed to operate according to the present invention.

A similar test was conducted and provided the results shown in the graph of FIG. 25C. The test was conducted to demonstrate rapid restoration of temperature and humidity with different loading/unloading events (including door open/closure) and with a door of the oven being opened and closed every 5 minutes. Target set points were 180 degrees F. and 40% RH. As shown, RH dropped drastically every time the door was opened and closed but was restored to within about 3 percentage points of 40% RH in less than 1.5 to 1.75 minutes on average. In similar tests, RH dropped drastically every time the door was opened and closed but was restored to within about 3 percentage points of 40% RH in less than about 30 to 45 seconds on average.

FIGS. 33 and 34 illustrate the oven 20 having de-humidifying mechanisms 220, 222, which may be used in place of the de-humidifying mechanisms 60, 110 described above. In particular, the de-humidifying mechanism 220 for the upper cavity 24 comprises an upper-cavity vent 224 and fan 226 for venting (exhausting) high-humidity air from the upper cavity to atmosphere. The upper-cavity vent 224 comprises an inlet 224A through the side duct 50C of the upper cavity 24, a vent duct 224B in the side of the cabinet 22 extending up through the upper internal wall 30 into the upper compartment 32, and a vent stack 224C extending upward toward louvers 228 in the top cover of the cabinet 22A. The fan 226 is positioned between the vent duct 224B and the vent stack 224C. The fan 226 creates negative pressure in the vent duct 224B, which causes high-humidity air from the upper cavity 24 to enter the vent duct 224B through the inlet 224A. The high humidity air moves upward through the vent stack 224C, and escapes into atmosphere through the louvers 228.

The de-humidifying mechanism 222 for the lower cavity 26 is similar to the de-humidifying mechanism 220 for the upper cavity 24. In particular, the de-humidifying mechanism 222 comprises a lower-cavity vent 230 and fan 232 for venting (exhausting) high-humidity air from the lower cavity 26 to atmosphere. The lower-cavity vent 230 comprises an inlet 230A through the side duct 100C of the lower cavity 26, a vent duct 230B in the side of the cabinet 22 extending up through the upper internal wall 30 into the upper compartment 32, and a vent stack 230C extending upward toward louvers 234 in the top cover of the cabinet 22A. The fan 232 is positioned between the vent duct 230B and the vent stack 230C. The fan 232 creates negative pressure in the vent duct 230B, which causes high-humidity air from the lower cavity 26 to enter the vent duct 230B through the inlet 230A. The high humidity air moves upward through the vent stack 230C, and escapes into atmosphere through the louvers 234.

Figure 35:
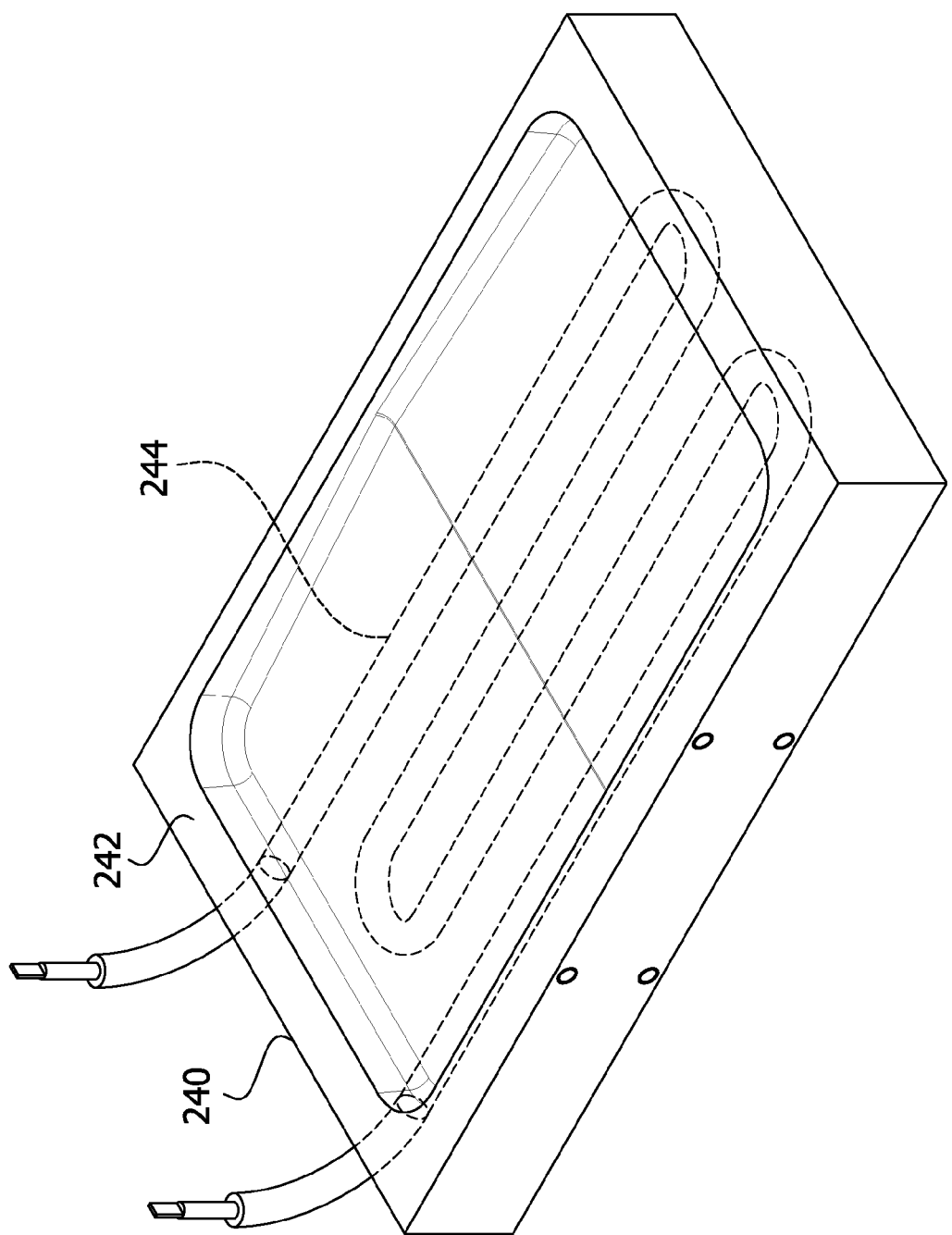
FIG. 35 is a perspective of another embodiment of a heating device for use in a humidifying mechanism of the present invention.

FIG. 35 illustrates another embodiment of a heating device 240, which may be used in place of the heating devices 90, 144 (upper and lower) described above. In this embodiment, the heating device 240 is an aluminum block 242 having a resistance heating element 244 having a serpentine shape cast in the block. The heating device 240 may be otherwise substantially similar or identical to the heating devices 90, 144.

Figure 36:
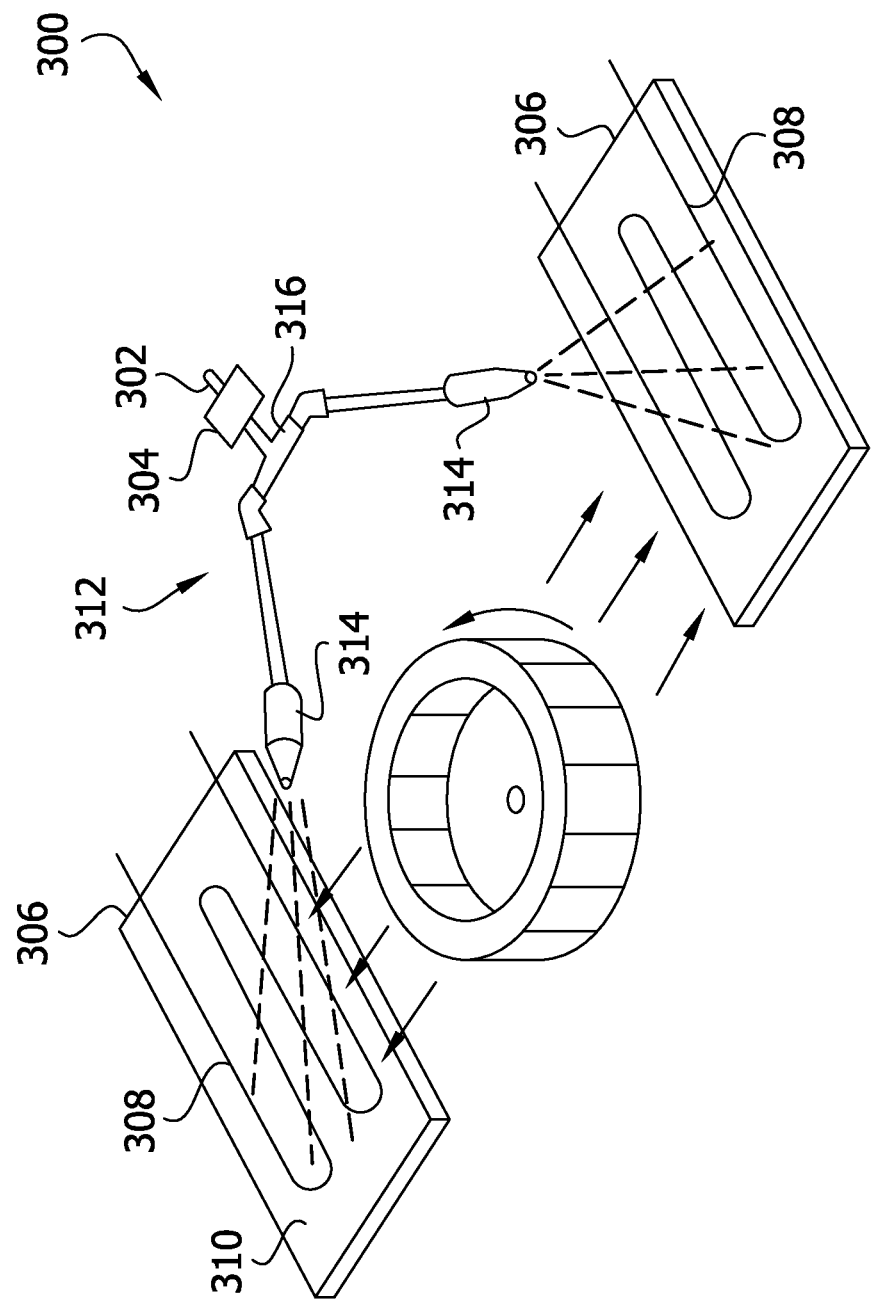
FIG. 36 is a perspective of another embodiment of a humidifying mechanism of the present invention.
Figure 37:
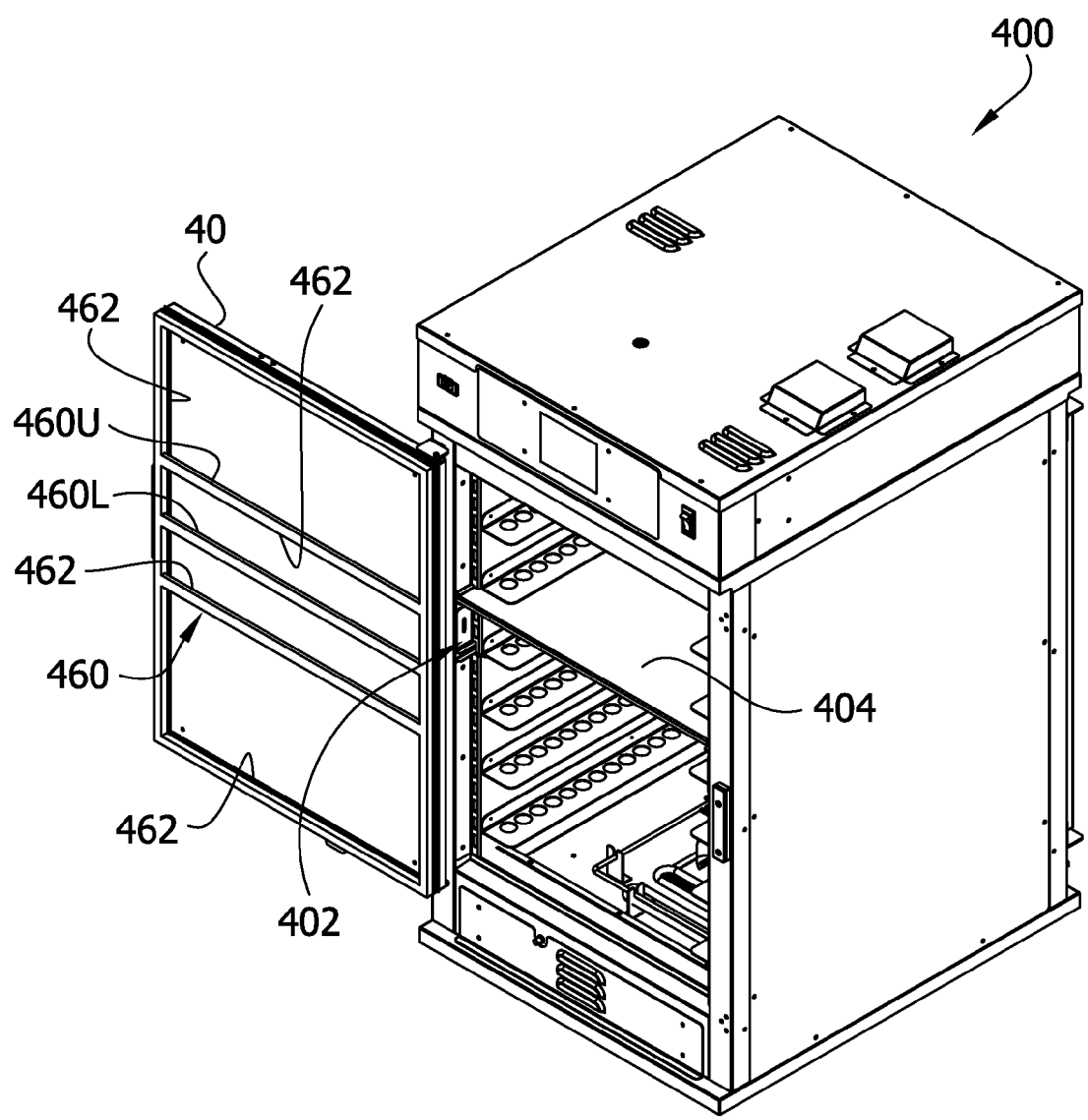
FIG. 37 is a perspective of another embodiment of an oven of the present invention, the oven having a sealing system for sealing peripheral portions of a movable partition separating upper and lower oven cavities of the oven, a front door of the oven being open and a partition of the oven being in an upper position.

FIG. 36 illustrates another embodiment of a humidifying mechanism 300, which may be used in place of or in addition to other humidifying mechanisms (e.g., mechanisms 58, 108) for the upper or lower cavities 24, 26. The humidifying mechanism 300 comprises a water line 302 adapted for connection to a water source, a valve 304 in the line movable between open and closed positions, and heating devices 306 for receiving and vaporizing water from the water line. The heating devices 306 comprise heating elements 308 (e.g., electric resistance elements) in heat transfer contact with (e.g., resting on top of) heated members 310, which are illustrated as flat plates. Two such heating devices 306 are shown, but one or more of such devices may be used without departing from the scope of the present invention. A water delivery assembly 312 including a plurality of spray nozzles 314 connected to a manifold 316 is connected to the water supply line 302. Two such nozzles 314 are shown in FIG. 36, but this number may vary. The nozzles 314 are positioned for spraying water directly onto surfaces of respective heating devices 306, resulting in vaporization of the water. The water line 302, the valve 304, and/or the water delivery assembly may be referred to broadly as a water-delivery mechanism. In some embodiments, separate heaters such as resistance elements 56 described above are not necessary because the heating devices 306 serve as the primary or sole heaters for heating the circulating air. Alternatively, one or more heating devices 306 may be provided in addition to heaters such as the resistance elements 56.

EXAMPLES

The following non-limiting examples are provided to further illustrate the present invention.

To extend the holding time for grilled chicken, it has been found that the internal temperature must be maintained within a closely controlled range prior to removal from the oven. An excessive internal temperature causes the product to dry out too quickly and become tough. White meat attains a stringy texture. Dark meat assumes a bland steamed taste and becomes overly soft. Also, conditions in the holding oven should be such that the grilled chicken retains its fresh-cooked appearance. A darker skin color is not acceptable because the product has an appearance of being aged (not fresh cooked), and a dry skin is not appetizing to the pallet (tough to chew). Too much moisture will cause the grill marks to disappear (wash out). Still further, conditions should be such that the skin appearance of the grilled chicken is appealing (fresh cooked and crispy). The skin also needs to be intact to the meat and not saturated with moisture. Too much moisture causes the skin to lift off the product and to be soft and chewy when consumed. When moisture is allowed to accumulate between the skin and the meat, high holding temperatures will start to steam the meat, and the meat will have a steamed versus grilled taste to it. Not enough humidity will cause the skin to dry out and become hard.

Taking the above into account, a specific "recipe" of conditions using an oven of this invention has been found to provide extended holding times for pre-cooked grilled chicken. These times exceed by 50-150% the holding times achieved by conventional ovens. More specifically, grilled foods (e.g., chicken on bone) are extended from 45 minutes to 90 minutes on average. The specific "recipe" of conditions is as follows: circulating air through the oven cavity to flow over the pre-cooked grilled chicken at a maximum speed of no more than about 12 feet per minute; maintaining the circulated air of the oven cavity at a target temperature of 170-200 degrees F.; and maintaining the circulated air of the oven cavity at a target relative humidity (RH) of about 20% by intermittently introducing water vapor into the circulating air of the cavity. The gentle (low-speed) air flow over the food product creates an environment of relatively uniform heat and humidity throughout the chamber, whether partially or fully loaded. The rapid temperature and RH restoration procedure described above may also be utilized. Under these conditions, it has been found that the quality of the grilled chicken remains high for the entire duration of the holding period. That is, the meat remains tender and moist; the skin color retains the appearance of freshly grilled chicken; and the skin remains fresh, crispy, and intact with the meat. In other words, the recipe is efficacious in maintaining the pre-cooked grilled chicken at a level of quality that is not only suitable for human consumption but also appetizing to the pallet for the entire duration of the holding period.

Similarly, to extend the holding time for fried or breaded chicken, it has been found that the internal temperature must be maintained within a closely controlled range prior to removal from the oven. An excessive internal temperature causes the product to dry out too quickly and become tough. White meat attains a stringy texture. Dark meat assumes a bland steamed taste and becomes overly soft. An excessive internal temperature also drives moisture out of the product and into the breading, which creates a very wet surface instead of the desired crispy surface. Also, conditions in the holding oven should be such that the breading remains dry and crispy while the meat remains moist. Too much moisture on the breading will cause the product to feel wet and the breading to fall off the meat during consumption. When product is served the moisture will also transfer to the serving surface which is undesirable. Product appearance needs to be appealing (fresh cooked) and crispy. The breading also needs to be intact to the meat and not saturated with moisture. Not enough humidity will drive the moisture out of the meat.

Taking the above into account, a specific "recipe" of conditions using an oven of this invention has been found to provide extended holding times for pre-cooked fried or breaded chicken. These times exceed by 50-150% the holding times achieved by conventional ovens. More specifically, fried foods (e.g., chicken on bone) hold times are extended from 60 minutes to 150 minutes on average. The following specific "recipe" of conditions has been found to provide extended holding times for pre-cooked fried chicken: circulating air through the oven cavity to flow over the pre-cooked grilled chicken at a maximum speed of no more than about 12 feet per minute, maintaining the circulated air of the oven cavity at a target temperature of 170-200 degrees F., and maintaining the circulated air of the oven cavity at a target relative humidity (RH) of about 20% by intermittently introducing water vapor into the circulating air. The gentle (low-speed) air flow over the food product creates an environment of relatively uniform heat and humidity throughout the chamber, whether partially or fully loaded. The rapid temperature and RH restoration procedure described above may also be utilized. Under these conditions, it has been found that the quality of the fried chicken remains high for the entire duration of the holding period. That is, the meat remains tender and moist, and the breading remains dry, crispy, and intact with the meat. In other words, the recipe is efficacious in maintaining the pre-cooked grilled chicken at a level of quality that is not only suitable for human consumption but also appetizing to the pallet for the entire duration of the holding period.

In an oven having two cavities, like the oven described above, grilled chicken can be held in one cavity under a selected set of target conditions, and fried chicken can be held in the other cavity under a different selected set of target conditions. Of course, other food products can be held in the cavities under target conditions optimal for such products. By way of example but not limitation, other food products may include other grilled meat products, other fried or breaded meat products, grilled and fried fish products, vegetables, etc. Moreover, the same type of food products may be held in both cavities.

FIGS. 37-55 illustrate an oven, generally designated 400, having a sealing system 402 for sealing peripheral portions of a movable partition 404 separating upper and lower oven cavities 406, 408. The oven may be similar in construction to the oven 20 described above and, for convenience, corresponding parts are designated by corresponding reference numbers. However, it will be understood that sealing system 402 can be used in other types of ovens having upper and lower cavities separated by a movable partition.

Figure 41:
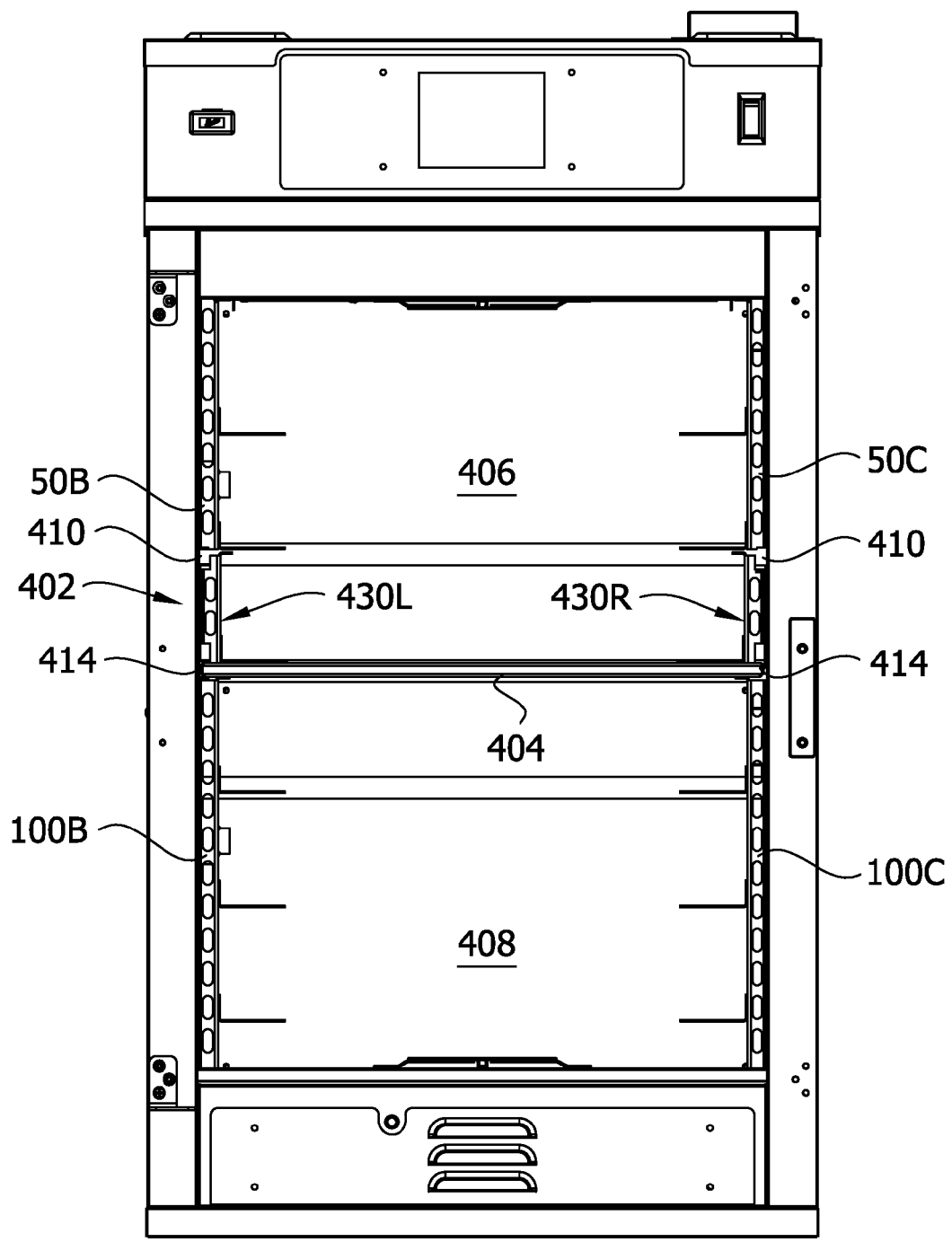
FIG. 41 is a front elevation of the oven, the front door being removed and the partition being in the lower position.
Figure 42:
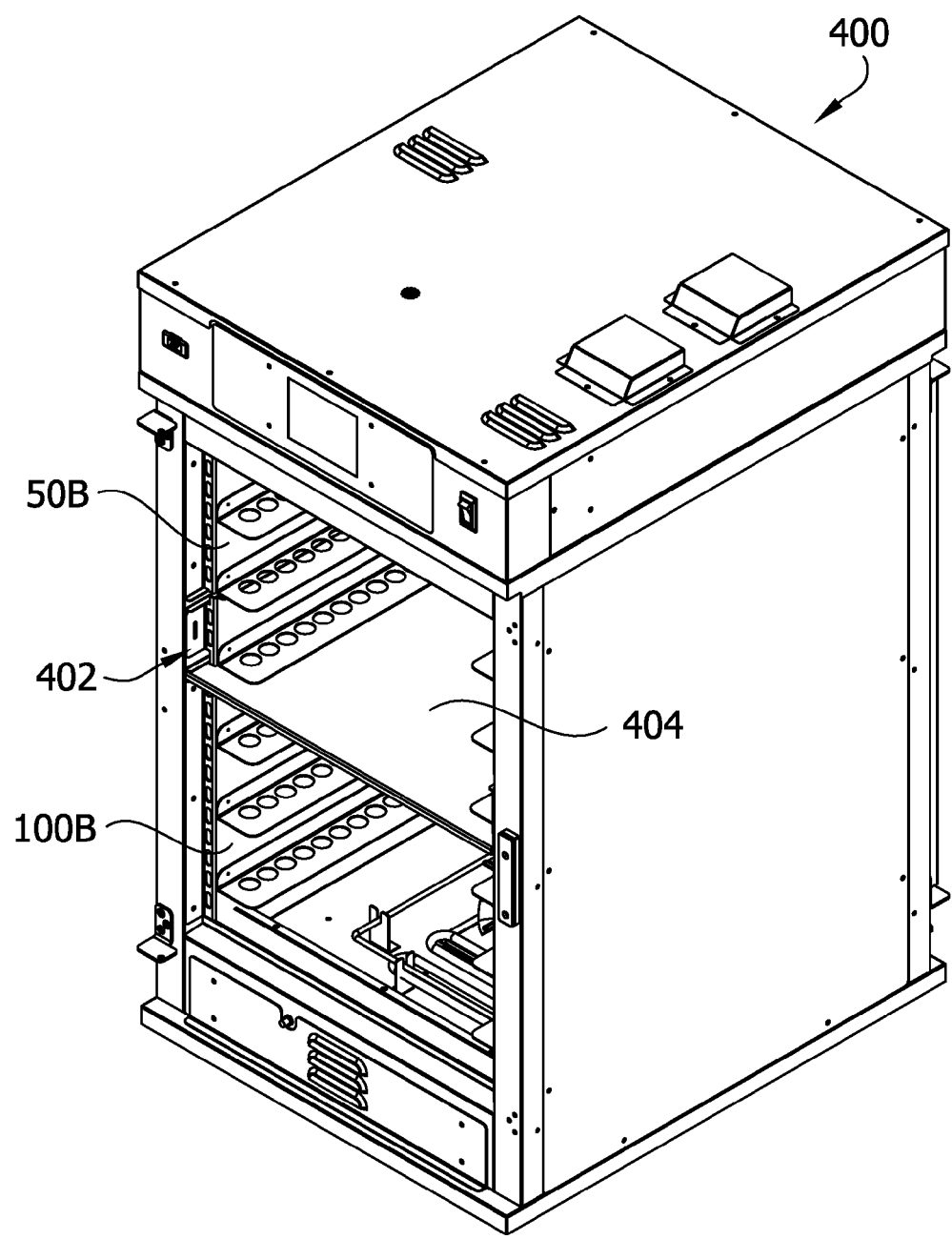
FIG. 42 is a perspective of the oven corresponding to the view shown in FIG. 41.
Figure 43:
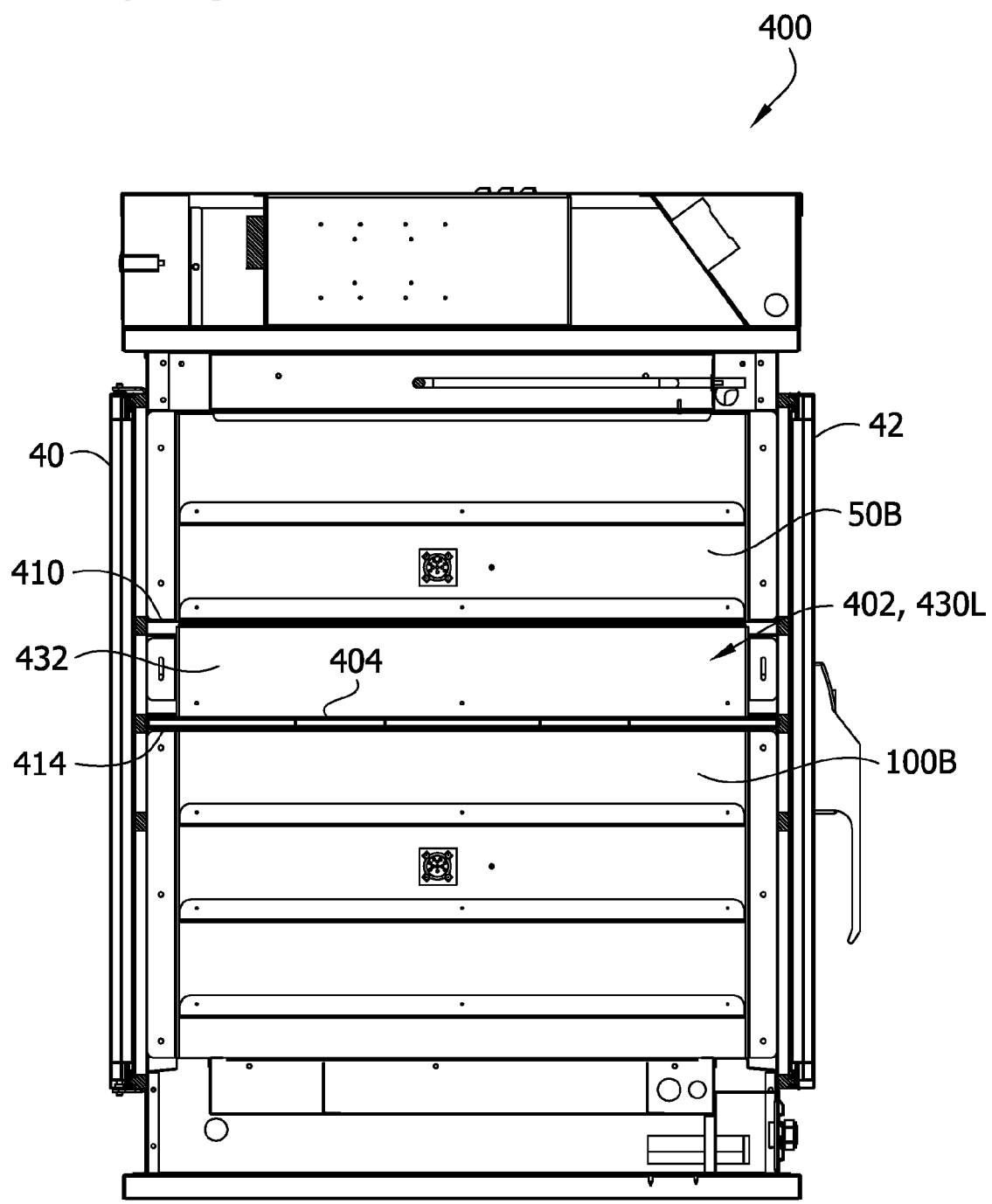
FIG. 43 is a section of the oven taken along the depth of the oven, the partition being in the lower position.
Figure 46:
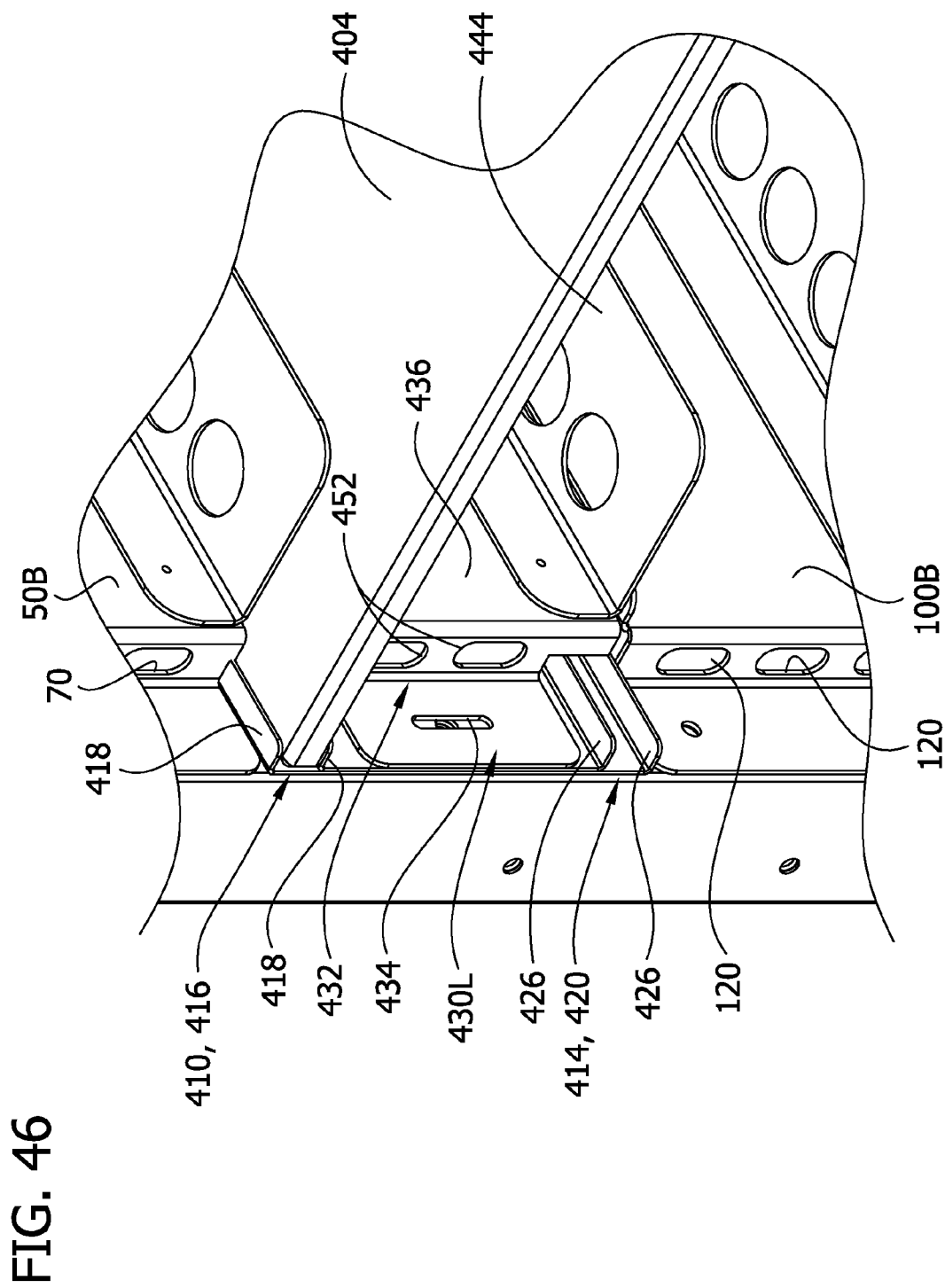
FIG. 46 is an enlarged segment of the perspective portion of FIG. 45.

The oven 400 has upper partition supports 410 for supporting the partition 404 at an upper elevation (FIG. 38), and lower partition supports 414 for supporting the partition at a lower elevation (FIG. 41). The upper partition supports 410 comprise a pair of horizontal upper channels 416 extending along opposite sides of the upper oven cavity (FIG. 46). Each such channel 416 comprises upper and lower in-turned flanges 418. Similarly, the lower partition supports 414 comprise a pair of horizontal lower channels 420 extending along opposite sides of the lower oven cavity. Each such channel comprises upper and lower in-turned flanges 426. The partition 404 is movable between the sets of upper and lower channels 416, 420. The partition is slidable in and out of the upper and lower channels 416, 420 to move the partition between its upper and lower elevations. The side edge margins of the partition 404 have a relatively close (tight) fit in respective channels 416, 420. Other partition supports may be used.

Figure 38:
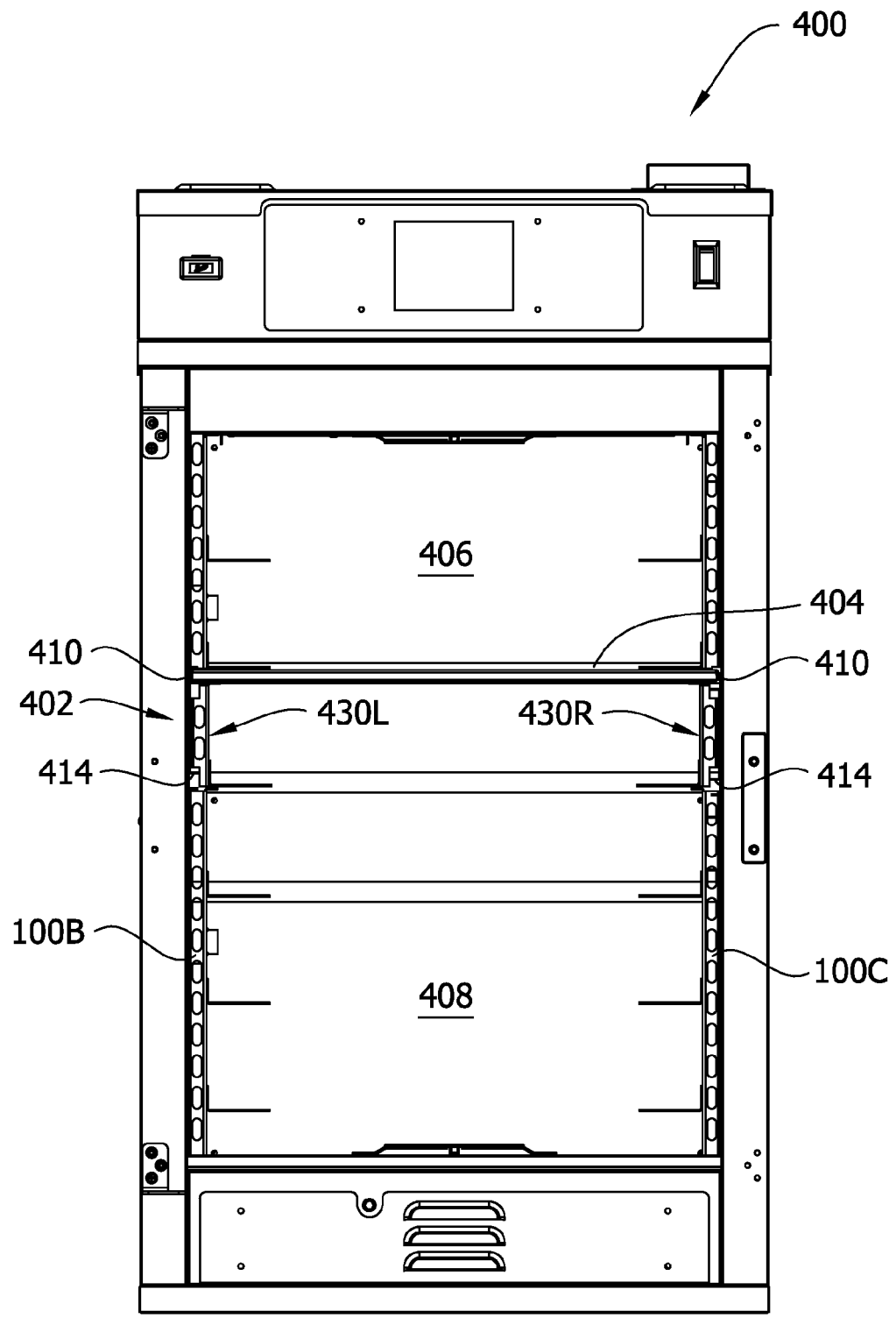
FIG. 38 is a front elevation of the oven of FIG. 37, the front door being removed and the partition being in the upper position.
Figure 39:
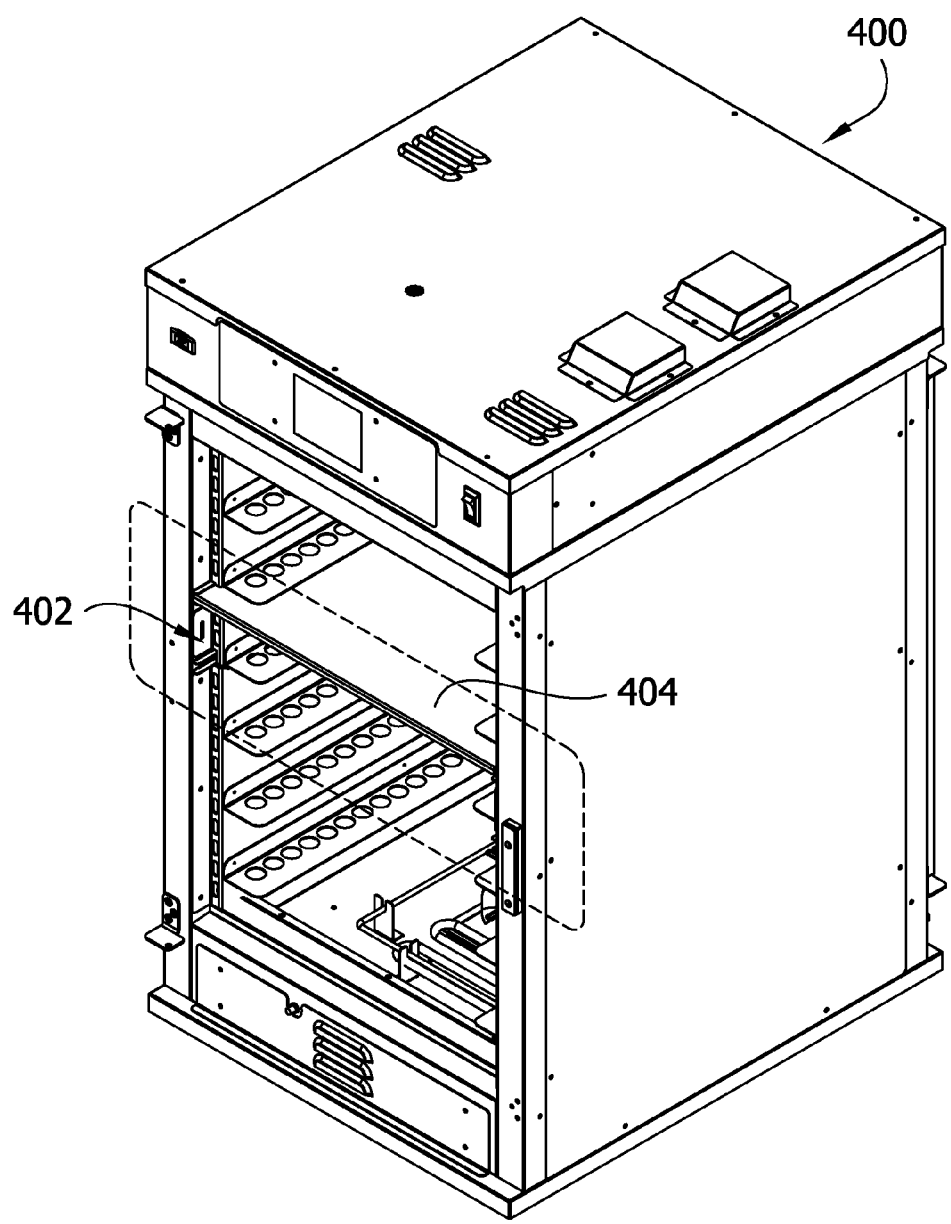
FIG. 39 is a perspective of the oven having the front door removed, the partition being in the upper position.
Figure 40:
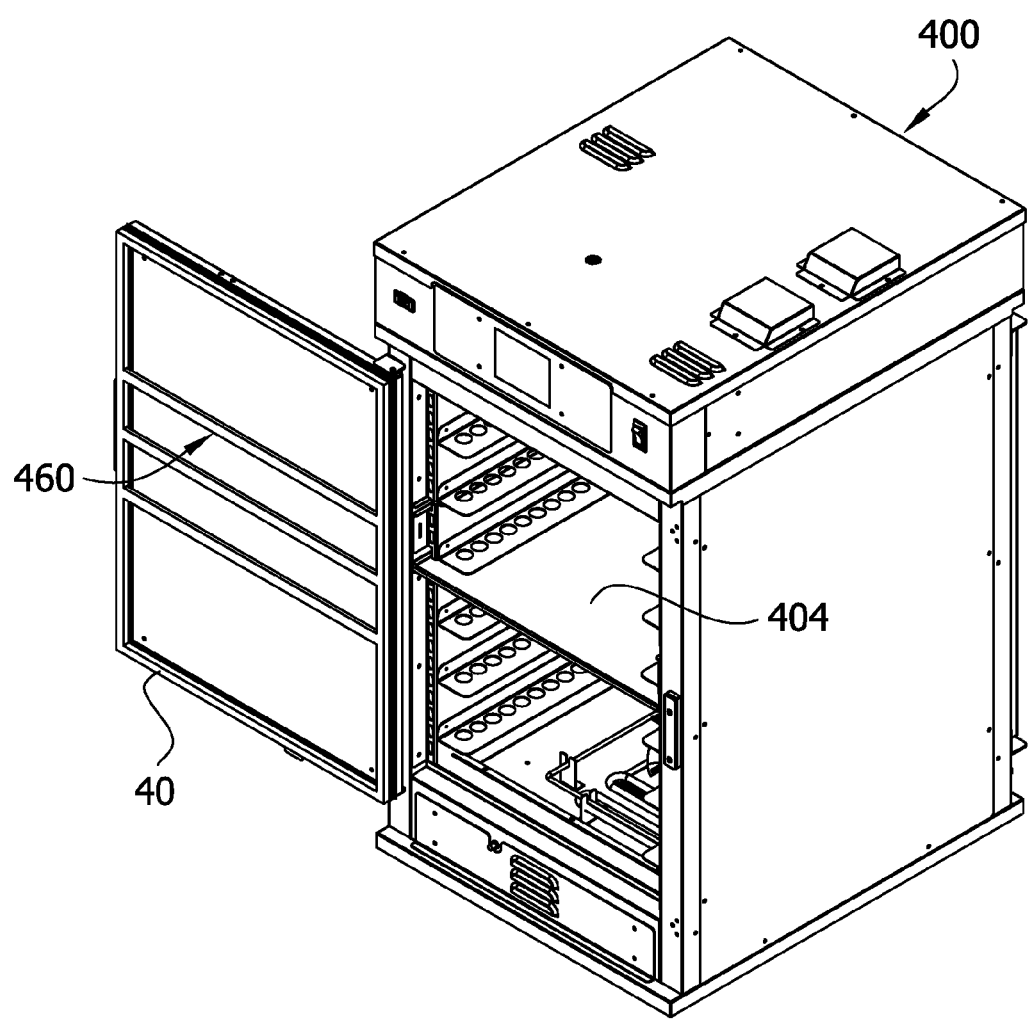
FIG. 40 is a perspective of the oven having the partition in a lower position.
Figure 44:
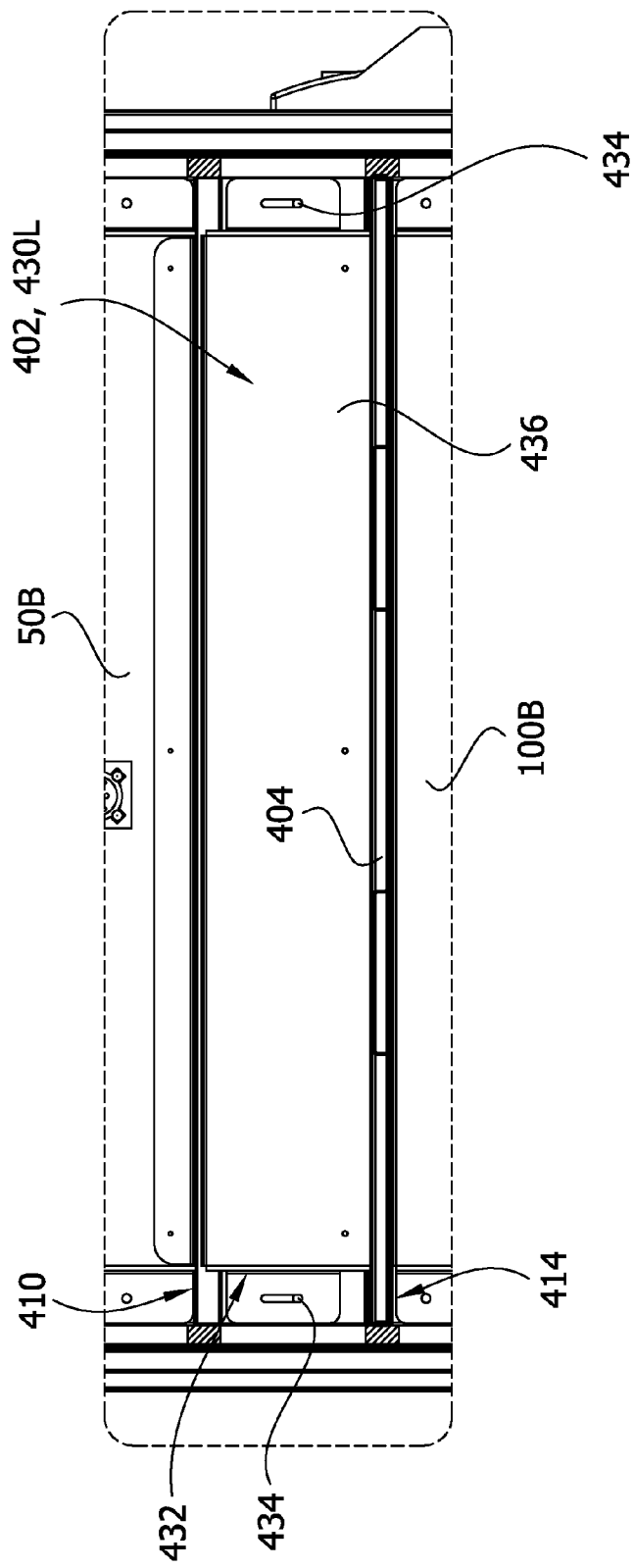
FIG. 44 is an enlarged portion of the section of FIG. 43.
Figure 45:
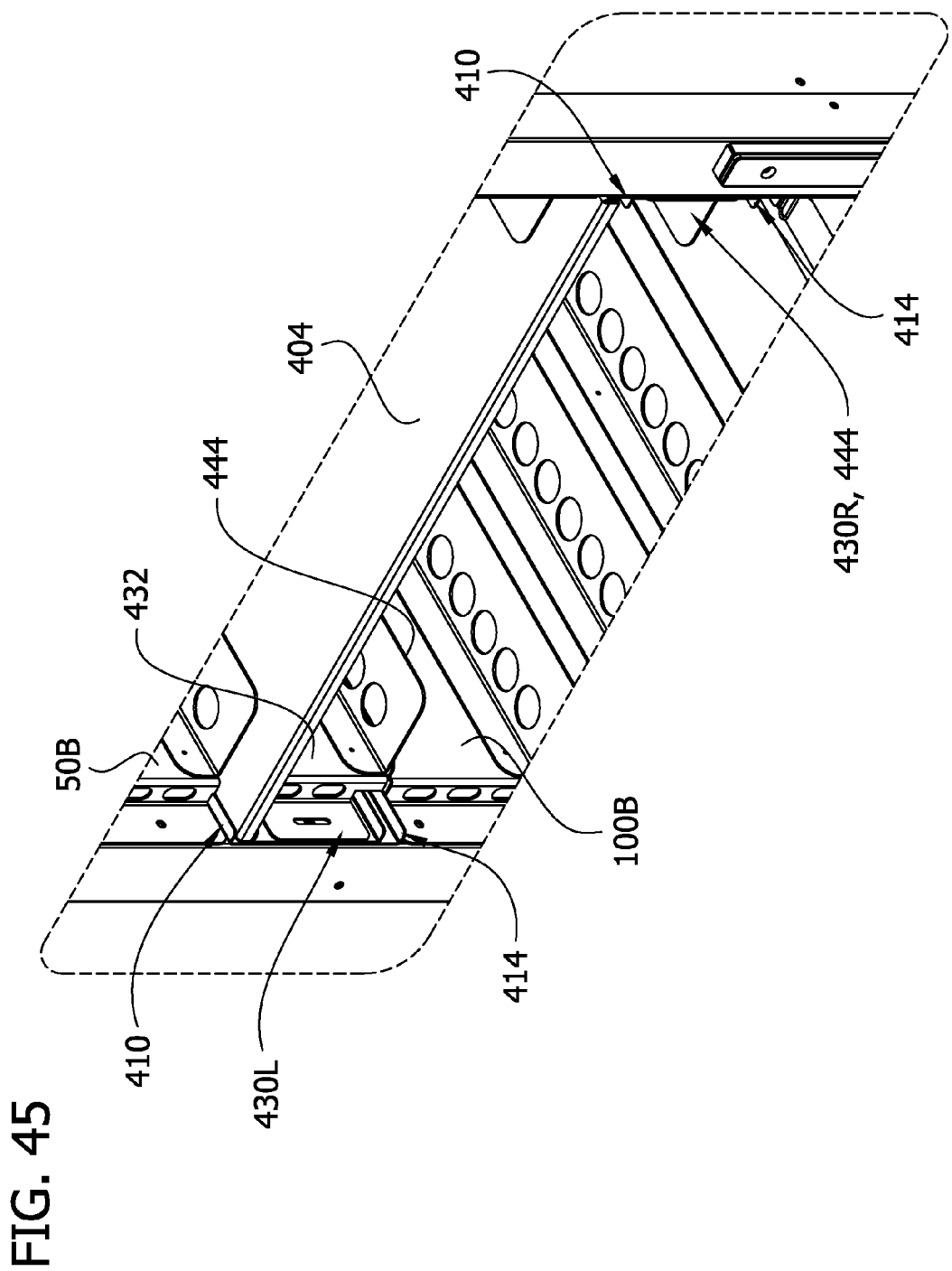
FIG. 45 is an enlarged portion of the perspective of FIG. 39.

Referring to FIGS. 38 and 44, the sealing system 402 comprises left and right sealing devices 430L, 430R extending generally horizontally along respective left and right sides of the oven cavity. (Most of the figures show only the left sealing device 430L. The construction of the right sealing device is functionally identical.) Each sealing device 430L, 430R comprises an elongate member 432 having pin-and-slot connections 434 with side wall components of the oven. The connections 434 allow the sealing device 430L, 430R to slide between up and down positions. In their up-positions (FIGS. 41, 47, 51, 53, 55), the left and right sealing devices 430L, 430R form lower-end extensions of respective left and right upper air ducts 50B, 50C and seal opposite sides (side edge margins) of the partition 404 when the partition 404 is at its lower elevation. In their down-positions (FIGS. 38, 46, 50, 52, 54), the left and right sealing devices 430L, 430R form upper end extensions of respective left and right lower air ducts 100B, 100C and seal opposite sides (side edge margins) of the partition 404 when the partition is at its upper elevation. The sealing devices 430L, 430R are biased by gravity toward their down-positions. In the illustrated embodiment, gravity provides the only biasing force. Other embodiments may include a spring force.

Figure 47:
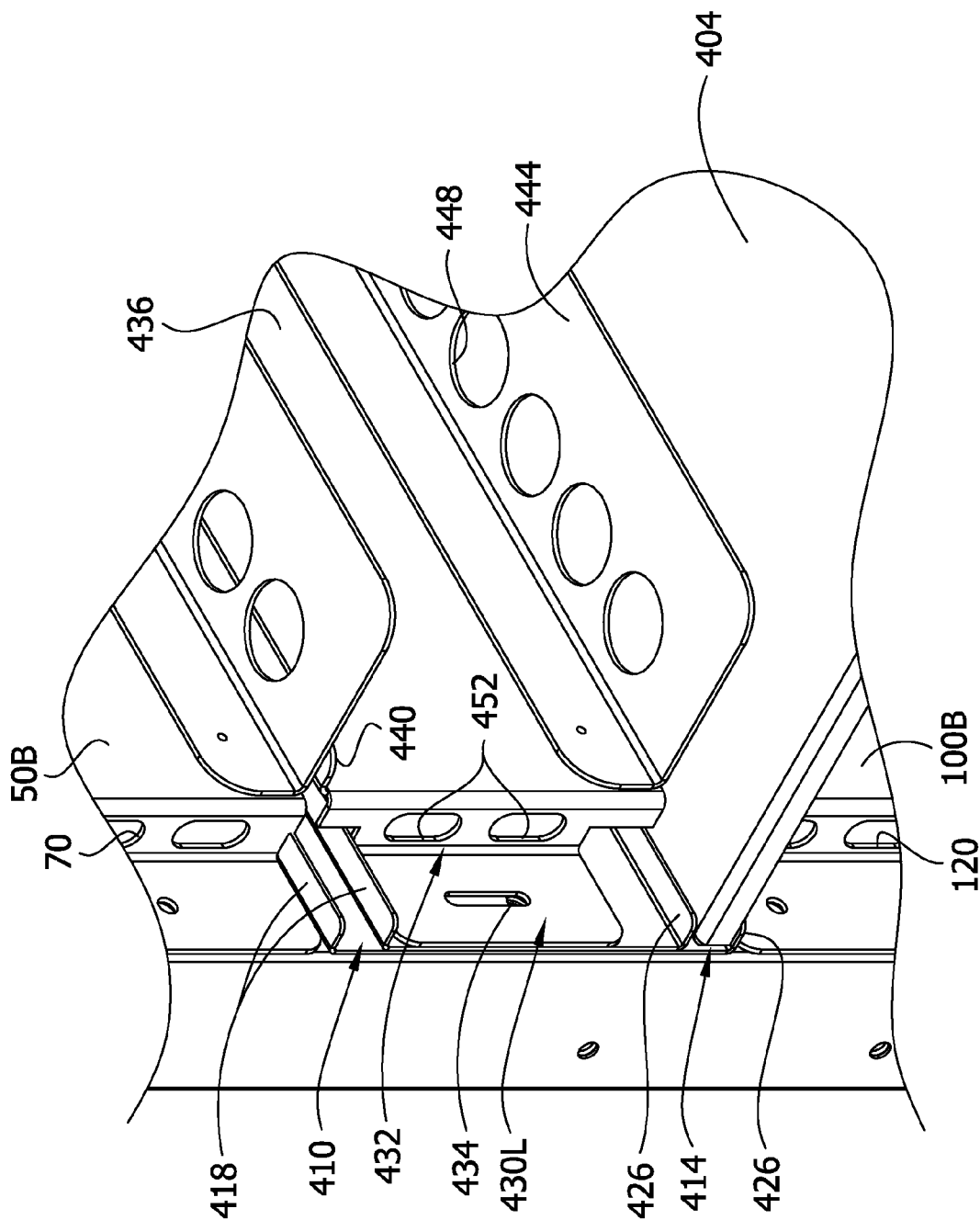
FIG. 47 is a view similar to FIG. 46 but showing the partition in the lower position.
Figure 48:
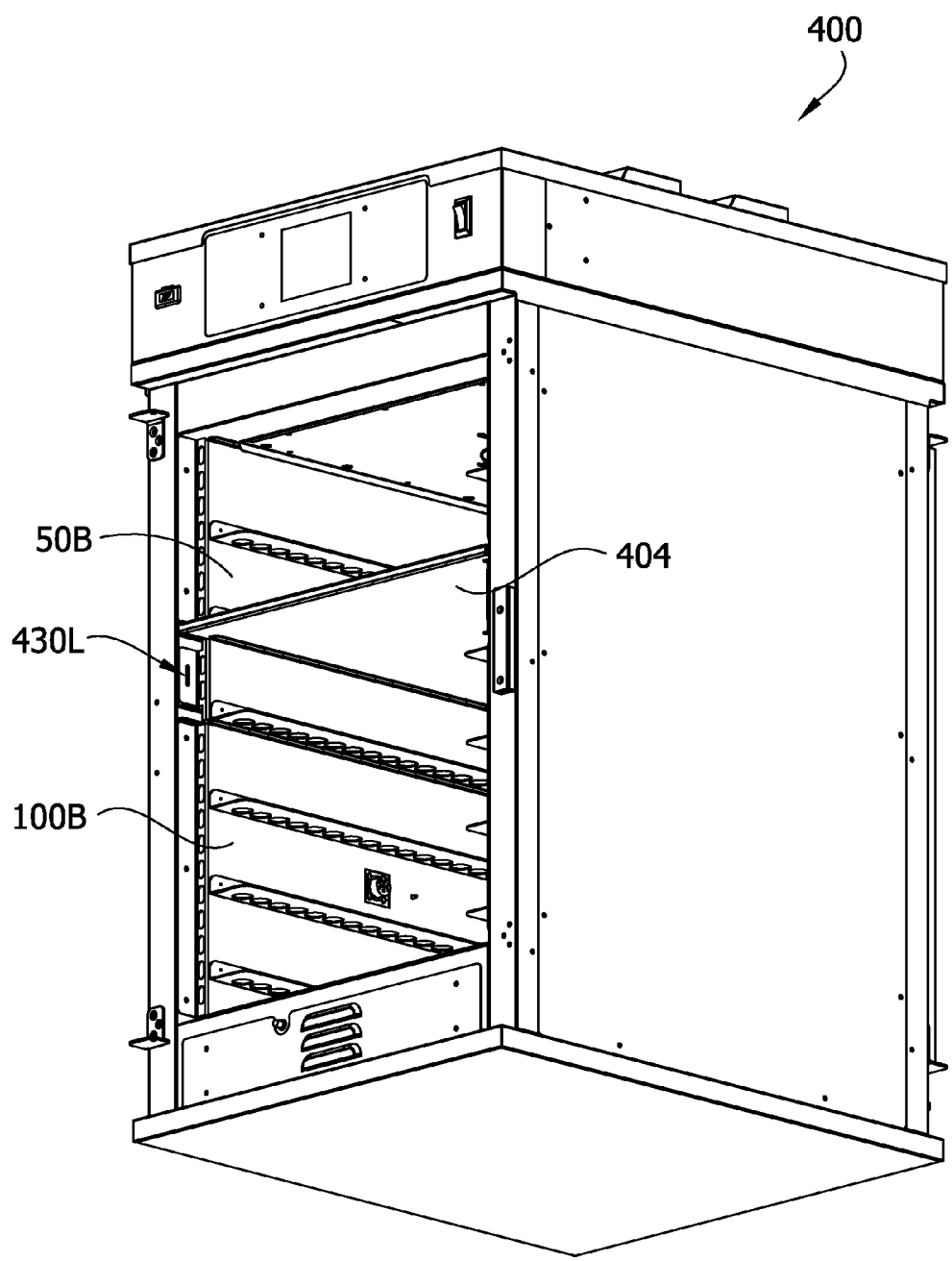
FIG. 48 is a bottom perspective of the oven showing the partition in the upper position.
Figure 49:
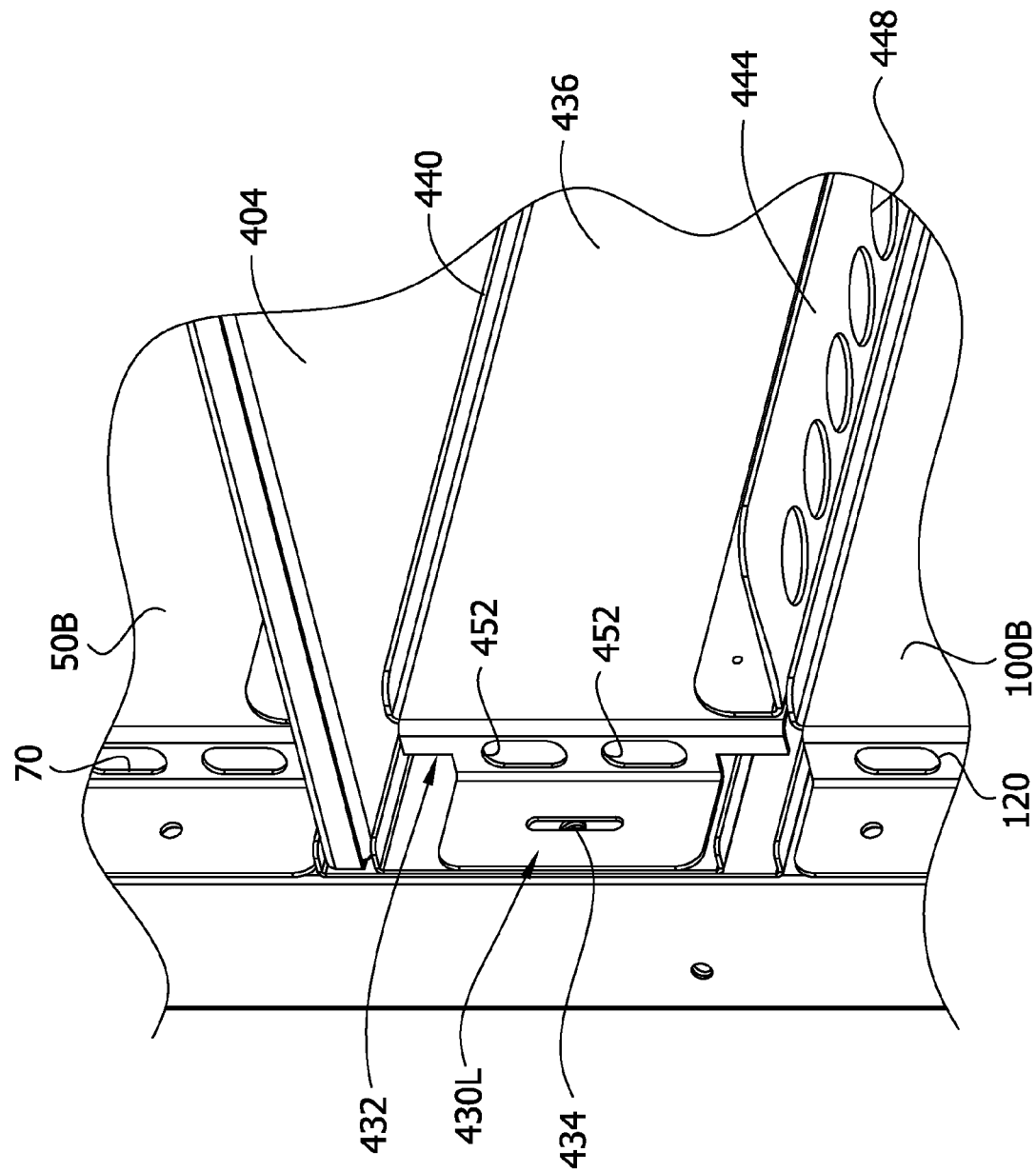
FIG. 49 is an enlarged segment of the perspective of FIG. 48.
Figure 50:
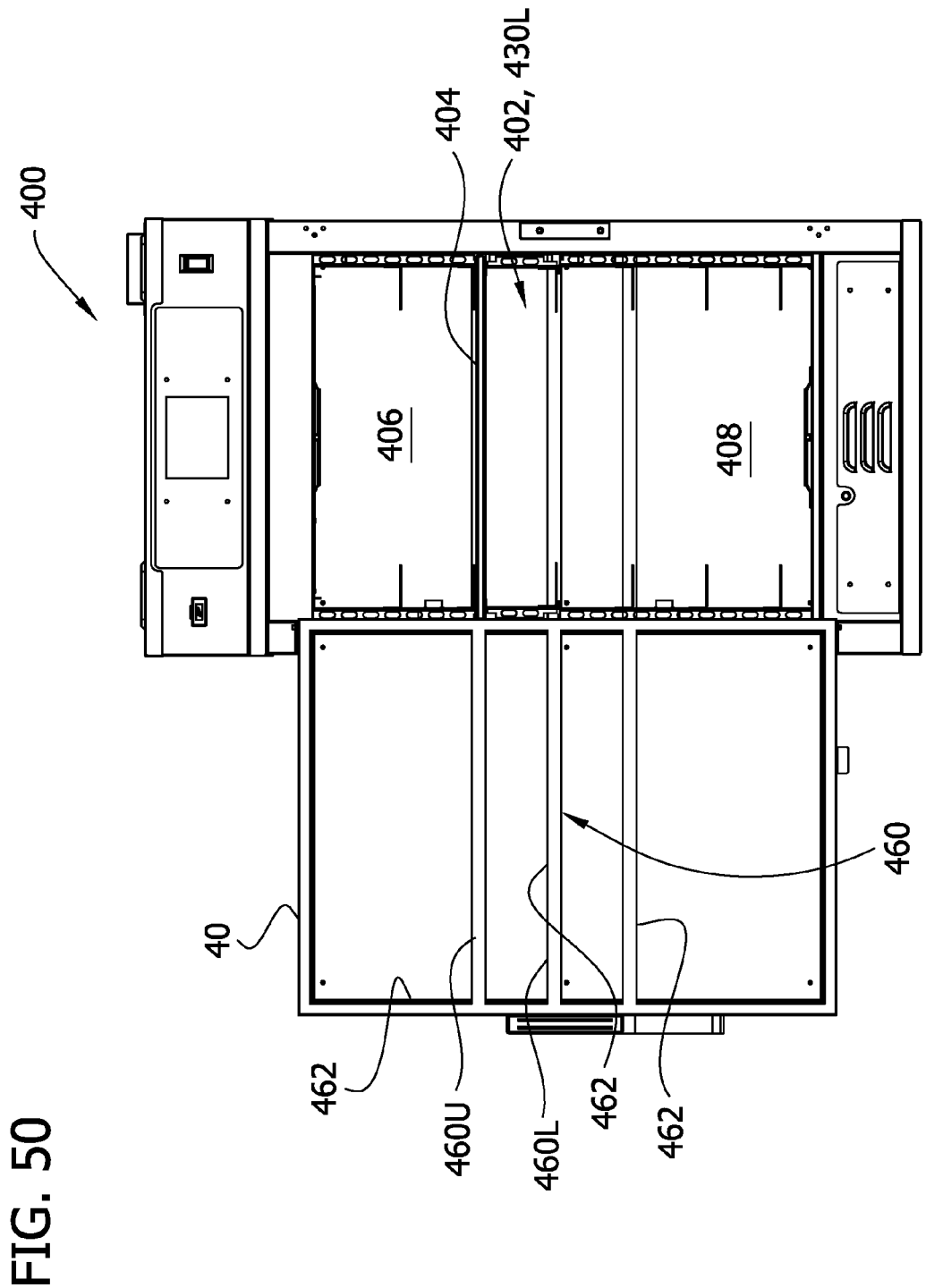
FIG. 50 is a front elevation of the oven, the front door of the oven being open and the partition being in the upper position.
Figure 51:
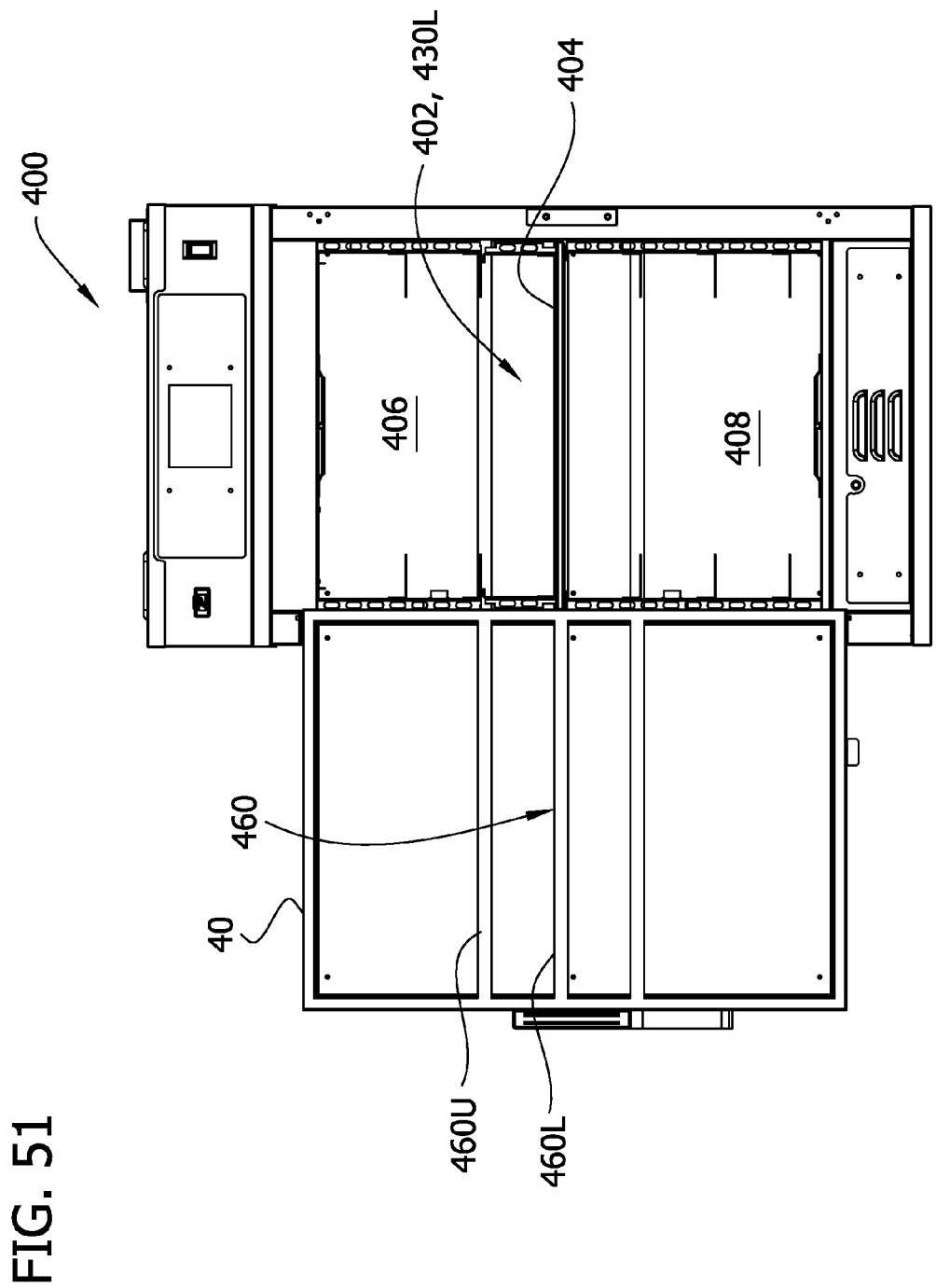
FIG. 51 is a view similar to FIG. 50 but showing the partition in the lower position.
Figure 54:
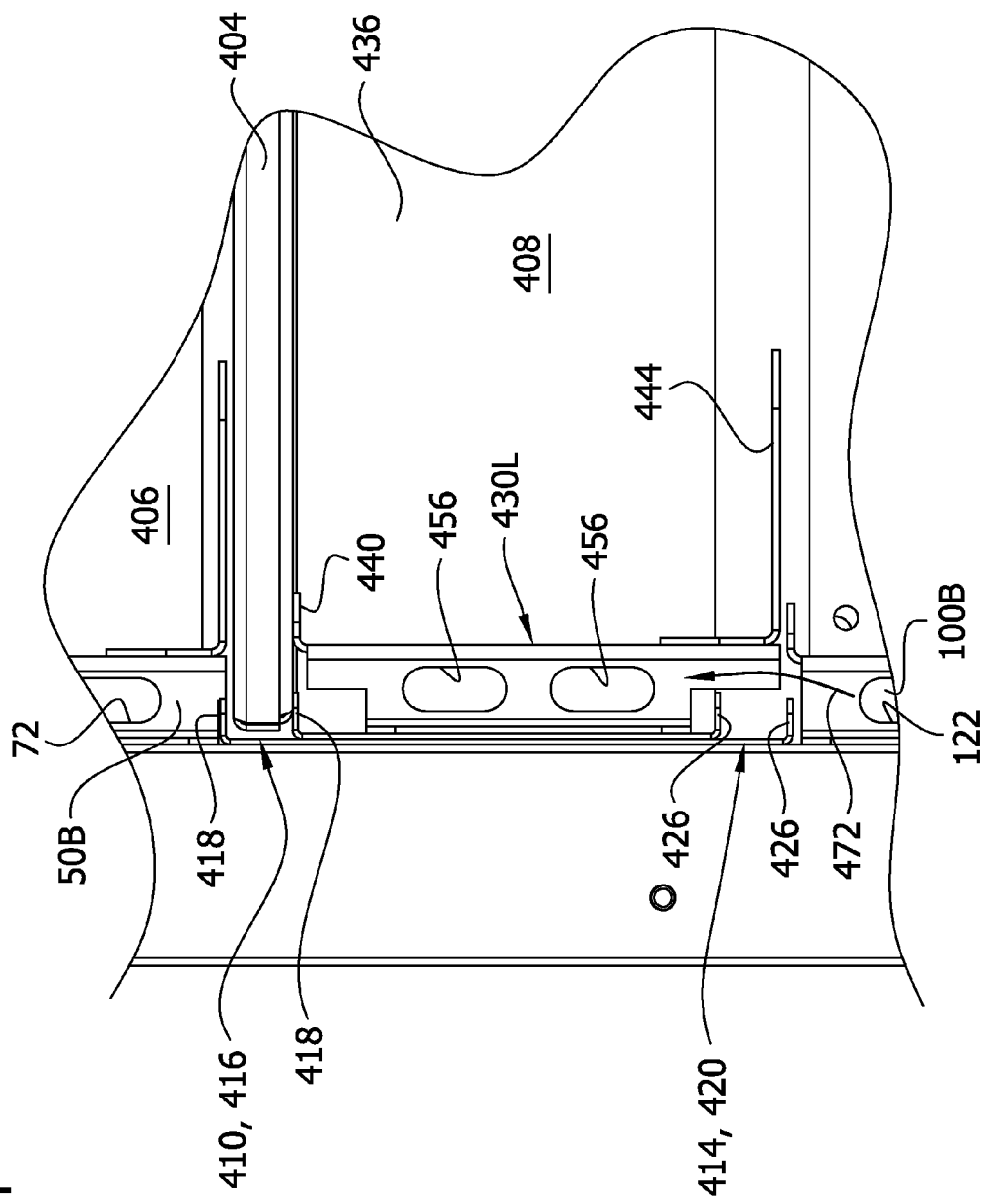
FIG. 54 is a segment of an elevation of the oven showing the partition in the upper position.
Figure 55:
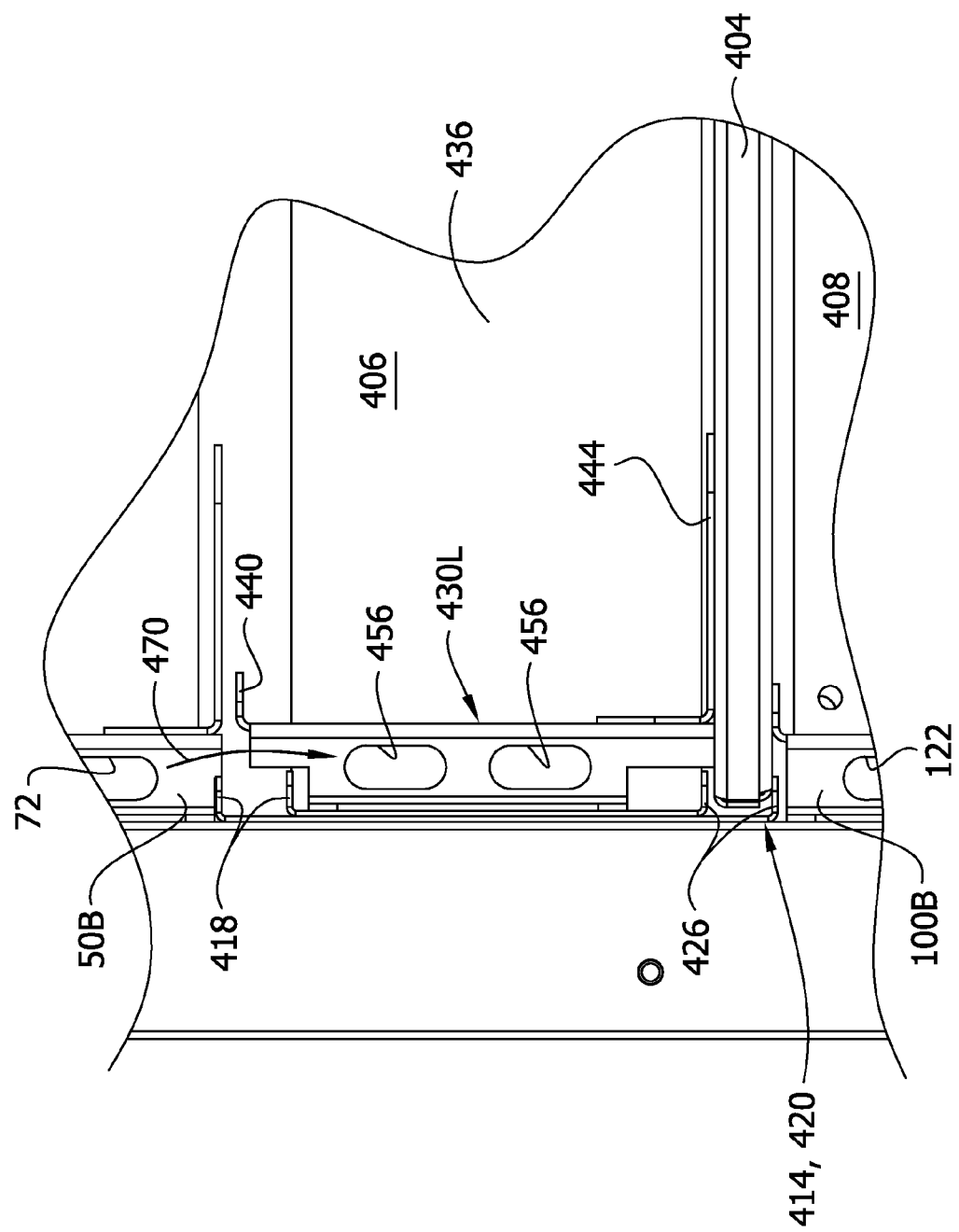
FIG. 55 is a view similar to FIG. 54 but showing the partition in the lower position.

The elongate member 432 of each sealing device 430L, 430R has a generally vertical web 436 substantially co-planar with the generally vertical surfaces of respective upper and lower side air ducts 50B, 50C, 100B, 100C, a generally horizontal upper sealing flange 440 extending laterally from the web 436 for underlying a bottom surface of the partition 404 when the partition is at its upper elevation (FIGS. 49, 54), and a generally horizontal lower sealing flange 444 extending laterally from the web for overlying a top surface of the partition 404 when the partition is at its lower elevation (FIGS. 47, 55). The lower sealing flanges 444 of the left and right sealing devices 430L, 430R have air flow openings 448 therein. The lower sealing flanges 444 are sized for supporting a tray of food in the upper oven cavity 406 when the sealing devices 430L, 430R are in their up-positions and in the lower oven cavity 408 when the sealing devices are in their down-positions.

Referring to FIGS. 46 and 47, the sealing devices 430L, 430R have front outlet openings 452 for exit of heated air into the upper oven cavity 406 when the sealing devices are in their up-positions and for exit of heated air into the lower oven cavity 408 when the sealing devices are in their down-positions. The front outlet openings 452 are generally co-planar with the front outlet openings 70, 120 in the side air ducts 50B, 50C, 100B, 100C, at opposite sides of the upper and lower oven cavities 406, 408. Similarly, the sealing devices 430L, 430R have rear outlet openings 456 (FIGS. 54, 55) for exit of heated air into the upper oven cavity 406 when the sealing devices are in their up-positions and for exit of heated air into the lower oven cavity 408 when the sealing devices are in their down-positions. The rear outlet openings are generally co-planar with the rear outlet openings 72 in the side air ducts 50B, 50C, 100B, 100C at opposite sides of the upper and lower oven cavities 406, 408.

Figure 52:
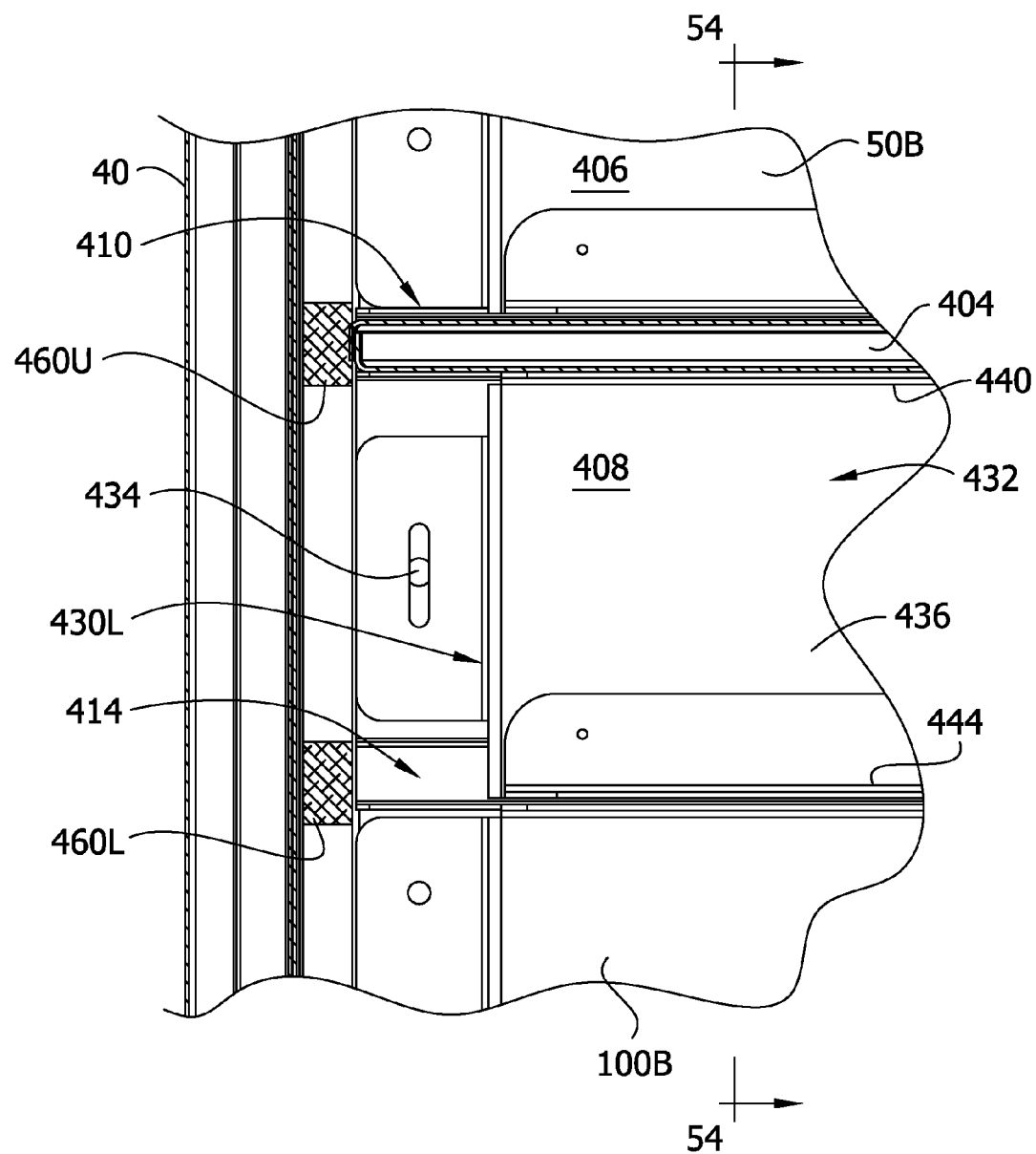
FIG. 52 is an enlarged segment of a section of the oven taken along the depth of the oven.
Figure 53:
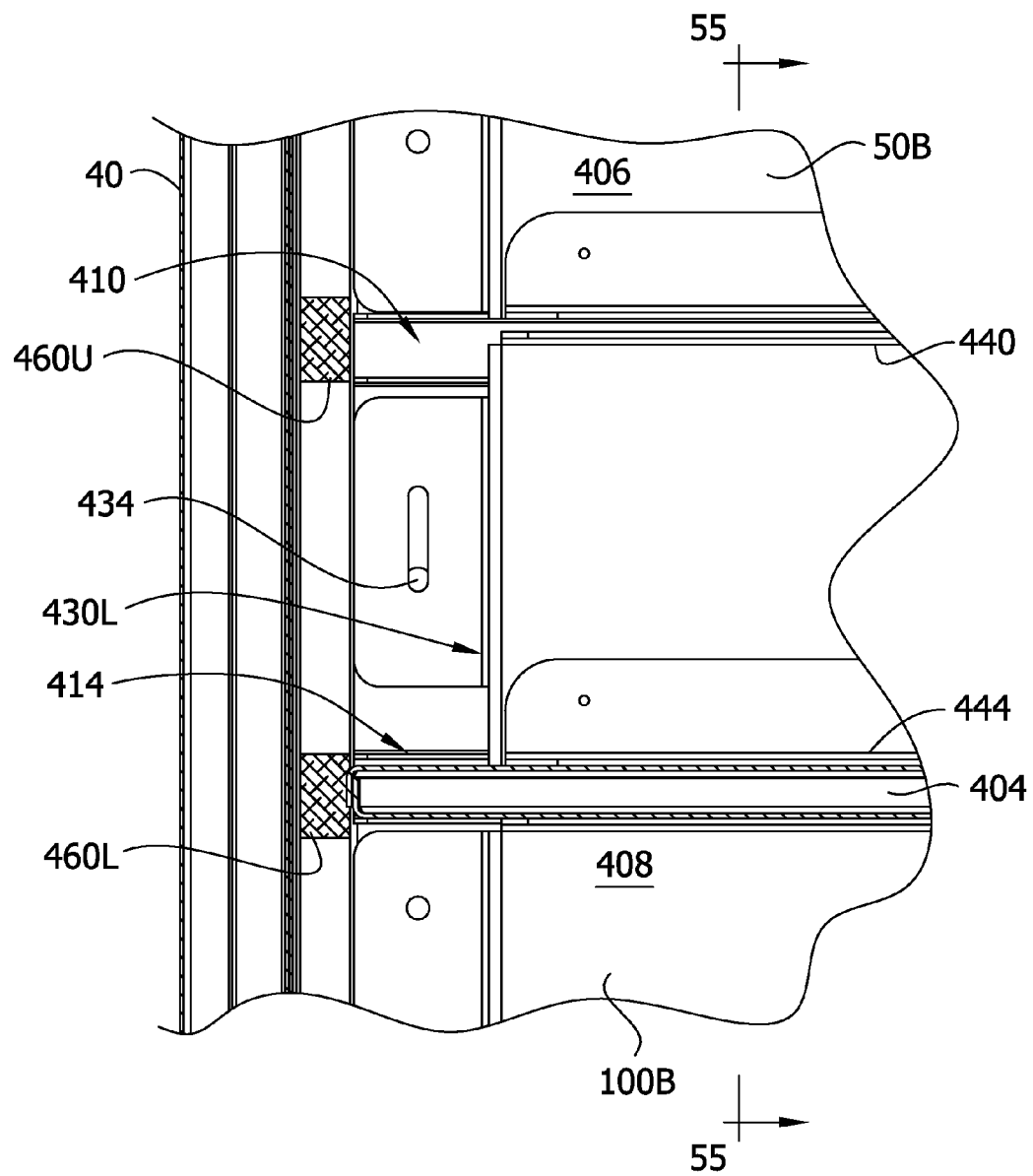
FIG. 53 is a view similar to FIG. 52 but showing the partition in the lower position.

The sealing system 402 also includes one or more gaskets 460 on the front door 40 (or doors) of the oven. In the illustrated embodiment (FIGS. 37, 50, 51), a single gasket 460 with multiple cutouts 462 is provided on the front door 40. Alternatively, multiple separate gaskets may be used. The gasket 460 is of a suitable compressible and elastic sealing material, such as a high-temperature closed-cell silicone foam. The gasket has an upper portion 460U positioned for sealing engagement by a front of the partition 404 when the front door 40 is closed and the partition it at its upper elevation (FIG. 52). The gasket has a lower portion 460L positioned for sealing engagement by the front of the partition 404 when the front door 40 closed and the partition is at its lower elevation (FIG. 53). A similar gasket configuration is provided on the rear door 42 (or doors) for sealing engagement by the back of partition 404. The gasket arrangement is such that the doors 40, 42 can be hinged on the left side of the oven or reversed and hinged on the right side of the oven.

To mount the partition 404 at its lower elevation, the sealing devices 430L, 430R are moved (e.g., lifted by hand) to their up-positions and the partition is moved into the lower two channels 420 (FIGS. 41, 47, 50, 53, 55). The sealing devices 430L, 430R are biased downward (by gravity and, optionally, springs) such that when the partition 404 is in place, the lower sealing flanges 444 of the sealing devices will closely overlie and desirably bear against the top surface of the partition 404 at respective side margins of the partition, thus providing a seal at these locations to inhibit air flow between the upper and lower cavities of the oven. The lower sealing flanges 444 are also positioned to support a tray of food at a location immediately above the partition 404. In their up-positions (e.g., FIG. 55), the sealing devices 430L, 430R have upper ends disposed closely adjacent the open lower ends of the side air ducts 50B, 50C, at opposite sides of the upper oven cavity 406 so that, in effect, the sealing devices form lower-end extensions of these side air ducts. The upper and lower flanges 418 of the upper channels 416 are relatively narrow so that they do not block the flow of air flow from the upper air side ducts 50B, 50C into respective lower-end extensions of the side air ducts 50B, 50C formed by the sealing devices 430L, 430R. (See FIG. 55 showing this air flow at 470 with respect to the left sealing device 430L. Although not shown in FIG. 55, the air flow arrangement is the same for the right sealing device 430R.) Air flows into the upper oven cavity 406 through the front outlet openings 70, 452 in the upper side air ducts 50B, 50C and sealing devices 430L, 430R and through the rear outlet openings 72, 456 in the upper side air ducts 50B, 50C and sealing devices 430L, 430R (FIGS. 47, 55).

Air flow between the upper and lower oven cavities 406, 408 is inhibited when the partition 404 is in its lower position. As illustrated in FIGS. 53 and 55, for example, air flow between the upper side ducts 50B, 50C and respective lower side ducts 100B, 100C (including the lower-end extensions of the upper side ducts formed by the left and right sealing devices 430L, 430R), and between the upper oven cavity 406 and the lower oven cavity 408, is blocked by the sealing engagement of the bottom surface of the partition 404 along its left and right side edge margins against respective lower flanges 426 of the lower partition channel supports 414, 420, and by the sealing engagement of the partition along its front edge with the lower gasket portion 460L. (Only the left side components of the oven are shown in FIG. 55, but the right side components are functionally identical.) Air flow between the upper oven cavity 406 and the lower oven cavity 408 is further inhibited by the sealing engagement of the lower sealing flanges 444 of the left and right sealing devices 430L, 430R with the top surface of the partition 404 along its respective left and right side edge margins.

To mount the partition 404 at its upper elevation, the sealing devices 430L, 430R are allowed to move to their down-positions (by the force of gravity and, optionally, added spring force) and the partition 404 is moved into the upper two channels 416 (FIGS. 38, 46, 50, 52, 54). With the partition 404 at this upper elevation, the upper sealing flanges 440 of the sealing devices 430L, 430R are substantially co-planar with the lower flanges of the upper channels 416 and thus closely underlie the bottom surface of the partition 404 at respective side margins of the partition, thus providing a seal at these locations to inhibit air flow between the upper and lower cavities 406, 408 of the oven. The lower sealing flanges 444 of the sealing devices 430L, 430R are positioned to support a tray of food at a location immediately above the partition 404. In their down-positions, the lower ends of the sealing devices 430L, 430R assume a position closely adjacent (e.g., in contact with) the open upper ends of the side air ducts 100A, 100B at opposite sides of the lower oven cavity 408 so that, in effect, the sealing devices form upper-end extensions of these side air ducts. The upper and lower flanges 426 of the lower channels 420 are relatively narrow so that they do not block the flow of air from the lower side air ducts 100B, 100C into the lower-end extensions of the side air ducts formed by the sealing devices 430L, 430R. (See FIG. 54 showing this air flow at 472 with respect to the left sealing device 430L. Although not shown in FIG. 54, the air flow arrangement is the same for the right sealing device 430R.) Air flows into the lower oven cavity 408 through the front outlet openings 120, 452 in the lower side ducts 100B, 100C and sealing devices 430L, 430R and through the rear outlet openings 122, 456 in the lower side ducts 100B, 100C and sealing devices 430L, 430R (FIGS. 46, 54).

Air flow between the upper and lower oven cavities 406, 408 is inhibited when the partition is in its upper position. As illustrated in FIGS. 52 and 54, for example, air flow between the upper side ducts 50B, 50C and the lower side ducts 100B, 100C (including the upper-end extensions of the lower side ducts formed by the left and right sealing devices 430L, 430R), and between the upper oven cavity 406 and the lower oven cavity 408, is blocked by the sealing engagement of the bottom surface of the partition 404 along its left and right side edge margins against respective lower flanges 418 of the upper partition channel supports 410, 416, and by the sealing engagement of the partition along its front edge with the upper gasket portion 460U. (Only the left side components of the oven are shown in FIG. 54, but the right side components are functionally identical.) Air flow between the upper oven cavity 406 and the lower oven cavity 408 is further inhibited by the sealing engagement of the upper sealing flanges 440 of the left and right sealing devices 430L, 430R with the bottom surface of the partition 404 along its respective left and right side edge margins.

It will be observed, therefore, that the sizes of the upper and lower cavities 406, 408 can be readily changed by moving the partition 404 between its upper and lower elevations. Further, regardless of the elevation of the partition 404, the left and right sealing devices 430L, 430R and the one or more gaskets 460 on the one or more front doors (and any one or more rear doors) effectively seal around peripheral portions of the partition 404 to inhibit flow of air between the upper and lower cavities 406, 408. The sealing devices 430L, 430R and partition supports 410, 414 are fabricated entirely from metal for longer life, and no tools are needed to adjust the sealing devices when the partition 404 is moved from one elevation to another.

FIGS. 56-61 illustrate another embodiment of a humidifying mechanism 558, which may be used in place of or in addition to other humidifying mechanisms (e.g., mechanisms 58, 108, 300). For convenience, corresponding parts are designated by corresponding reference numbers. It will be understood that the humidifying mechanism 558 can also be used in appliances other than the ovens disclosed herein. To maintain desired RH in an oven cavity, water may be delivered to the humidifying mechanism 558 at rates so low (e.g., 1-4 mL/second) that build-up of mineral deposits or scale on the humidifying mechanism may pose a significant problem in clogging water delivery paths and/or compromising surfaces of the humidifying mechanism important to accomplishing efficient vaporization. As will be described in further detail below, the humidifying mechanism 558 includes features which prevent build-up of mineral deposits on the humidifying mechanism and facilitate cleaning of the humidifying mechanism.

Figure 56:
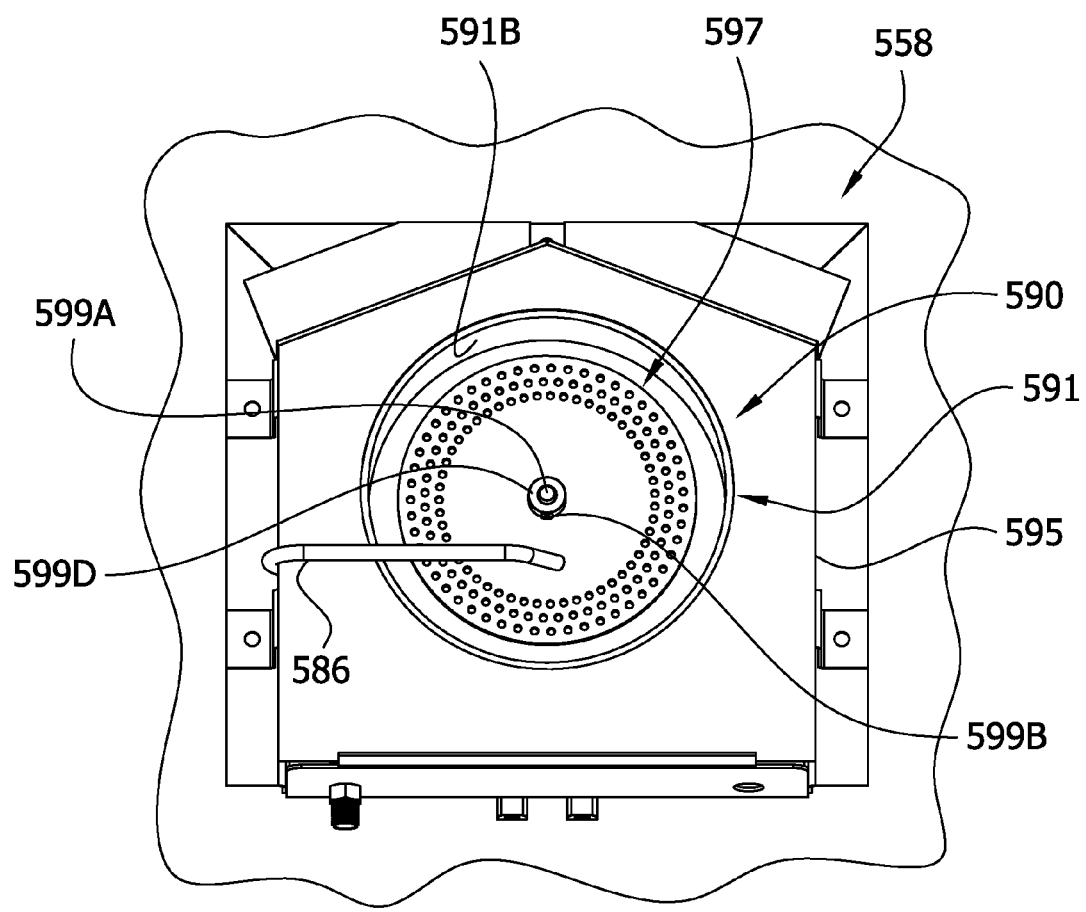
FIG. 56 is a perspective of another embodiment of a humidifying mechanism of the present invention.

FIG. 56 illustrates a front perspective of the humidifying mechanism 558. In general, the humidifying mechanism 558 comprises a water line 586 adapted for connection to a water source, a valve (not shown) in the line movable between open and closed positions, and a heating device 590 for receiving and vaporizing water from the water line. The illustrated water 586 line is a copper conduit, but other water lines may be used without departing from the scope of the present invention. The valve may be any suitable valve, such as a solenoid-operated valve. Water is delivered from the water line 586 to the heating device 590 where it is vaporized and then introduced into the circulating air for increasing the RH of the air in the oven cavity. The water line 586 and/or the valve may be referred to broadly as a water-delivery mechanism. In one embodiment, the water is delivered at a slow rate (e.g., dripped) instead of sprayed onto the heating device 590 from the free end of the water line 586.

In the embodiment of FIGS. 56-60, the heating device 590 comprises a receptacle 591 having a generally tub or cup shape. The receptacle 591 may be formed of aluminum or any other suitable material. The receptacle 591 includes a bottom wall 591A (FIG. 58) and a generally hollow cylindrical side wall 591B having a bottom connected to the bottom wall 591A and a height extending upward from the bottom wall to an open top of the receptacle. A heater 593 (FIG. 57) is provided on an outside of the cylindrical wall 591B for heating the cylindrical wall. In FIG. 56, the heater 593 and electrical leads connected to the heater are concealed from view by a cover 595. In the illustrated embodiment, the heater 593 is a band or barrel heater. In other embodiments, a suitable heater (e.g., resistance elements) may be cast into the receptacle 591. The heating device 590 also includes a rotor 597 in the form of a disc which is positioned in the receptacle 591. The disc 597 is rotated by a motor 599 (FIG. 60) positioned below the receptacle 591 having a drive shaft 599A. As the rotor 597 rotates, water is delivered onto an upper surface of the rotor. The water moves in the form of a thin layer or film radially outward on the upper surface of the rotor 597 toward the cylindrical wall 591B of the receptacle 591. In the illustrated embodiment, the disc 597 is sandwiched on the drive shaft 599A by two collars 599B, 599C (FIG. 58), and a nut 599D on the distal end of the drive shaft tightens the collar down against the disc. Optionally, the drive shaft 599A may have a D-shaped cross section, in which case the disc 597 would have a corresponding D-shaped opening received on the shaft to assist in preventing rotation of the disc with respect to the shaft. Other connections of the disc 597 and drive shaft 599A may be used without departing from the scope of the present invention. For example, a spring clip, cotter pin, or other type of quick-release fastener may be used which enables removal of the disc 597 from the drive shaft 599A without use of tools.

Before or upon contacting the cylindrical wall 591B, the water vaporizes due to the heat generated by the heater 593 and emanated from the cylindrical wall. In the illustrated embodiment, the cylindrical wall 591B has an inside diameter of about 6 inches and a height of about 3 inches. The illustrated disc 597 has a diameter of about 5 inches and is mounted on the drive shaft 599A at about mid-height of the cylindrical wall 591B. Other sizes, shapes, and relative positioning of the wall and disc may be used without departing from the scope of the present invention. The arrangement spreads the water out over a relatively large surface area of the disc 597 and the cylindrical wall 591B for rapid and more efficient vaporization. Desirably, the heater 593 maintains the temperature of the cylindrical wall 591B above the boiling temperature of water (212 degrees F.), preferably between 250-400 degrees F., and more preferably between 265-360 degrees F. In one embodiment, the heater maintains the temperature of the cylindrical wall 591B at about 275 degrees F.

Figure 57:
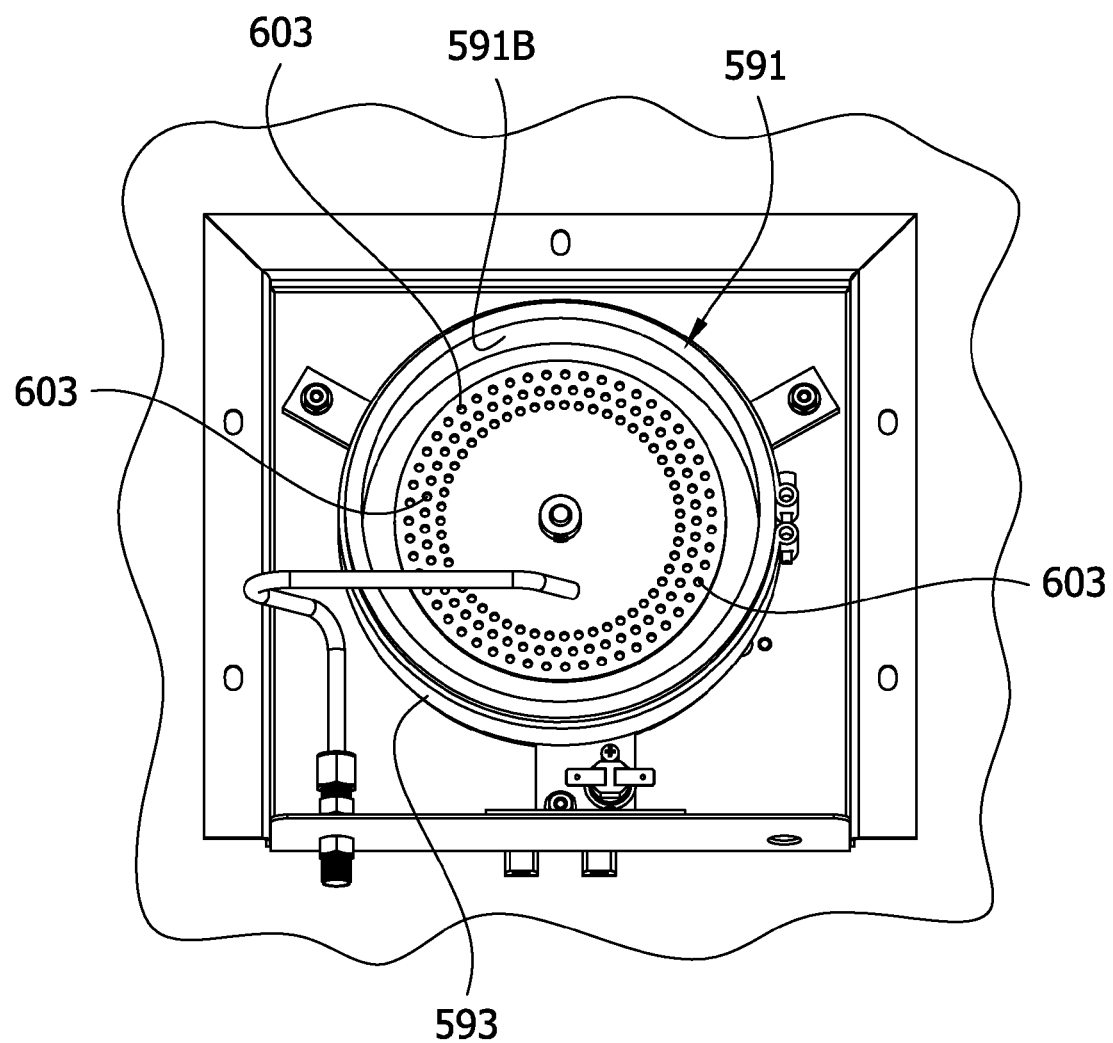
FIG. 57 is a perspective of the humidifying mechanism of FIG. 56 having a cover removed.
Figure 58:
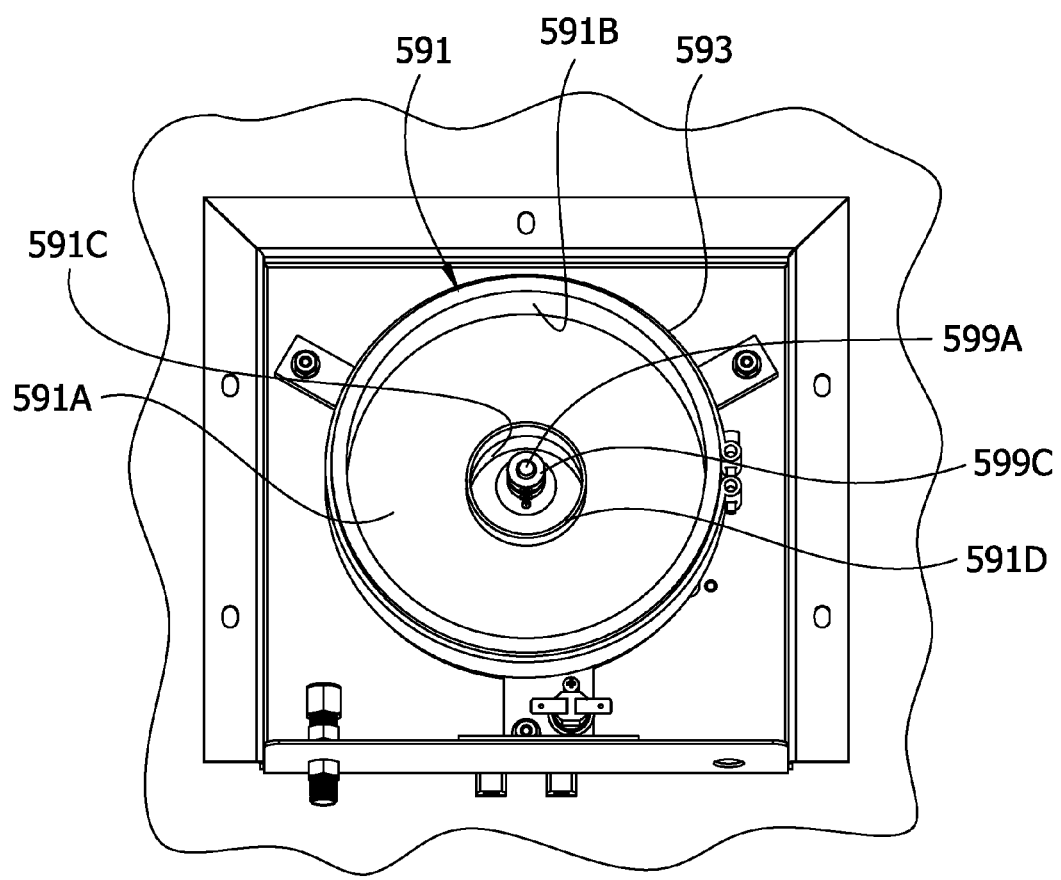
FIG. 58 is a perspective of the humidifying mechanism having a water line removed and a disc removed from a drive shaft.
Figure 59:
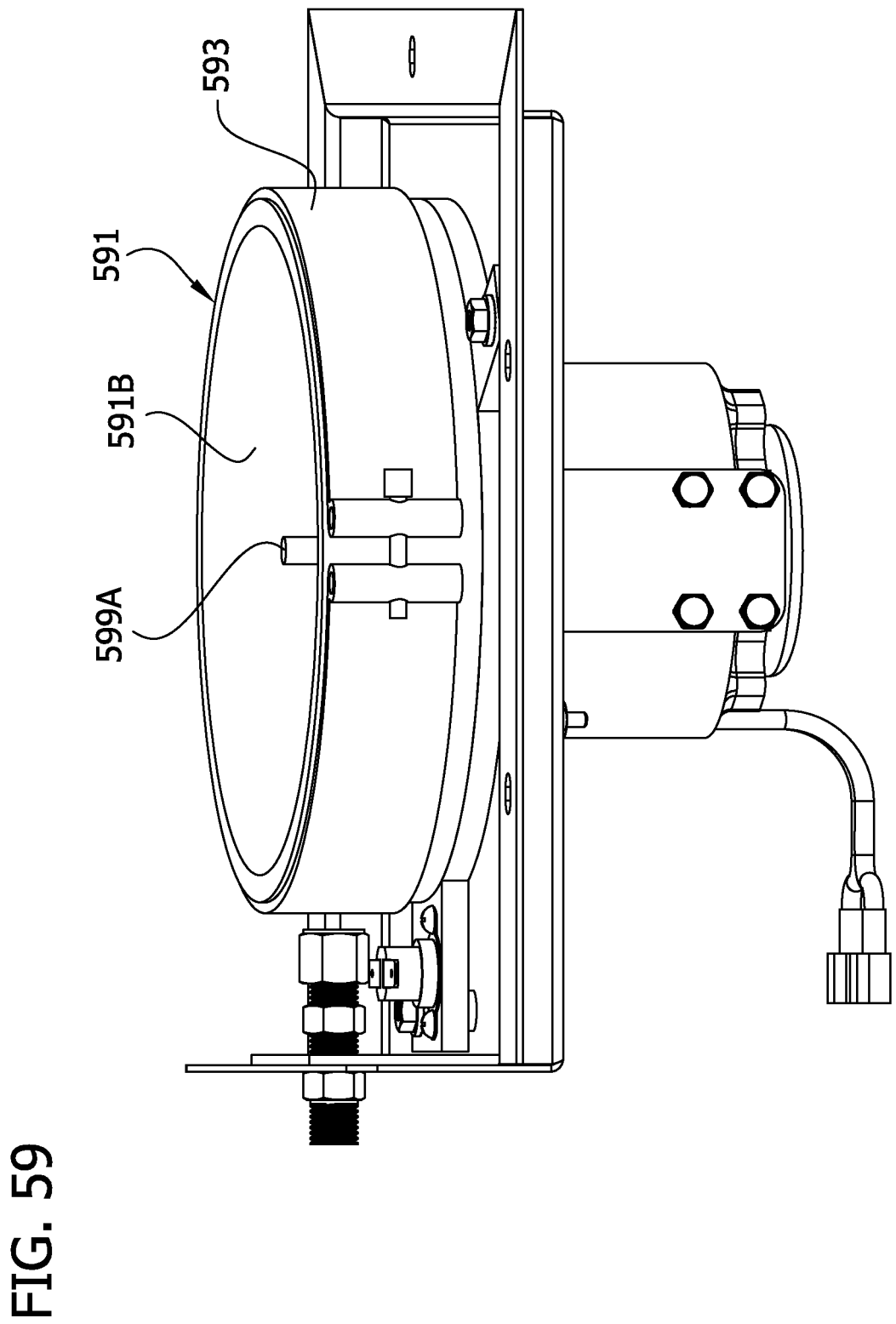
FIG. 59 is a side perspective of the humidifying mechanism.
Figure 60:
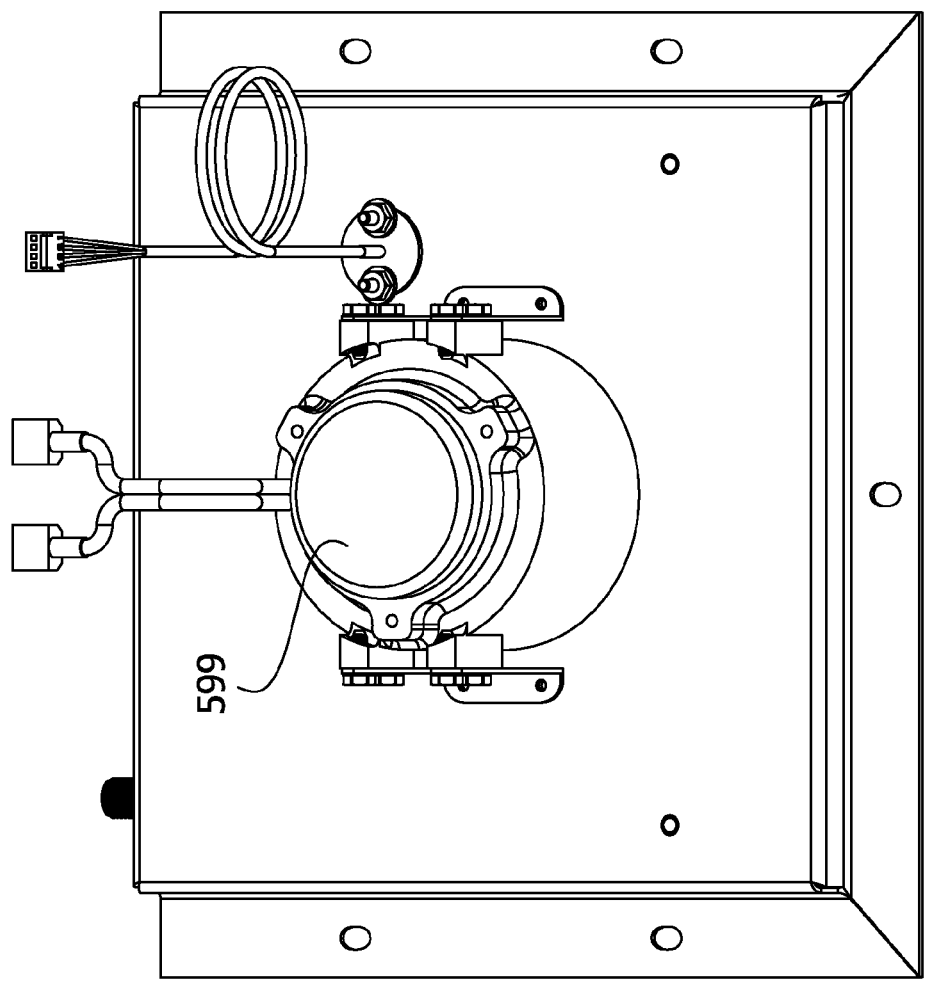
FIG. 60 is a bottom perspective of the humidifying mechanism showing a motor of the humidifying mechanism.

FIGS. 57-60 illustrate various features of the humidifying mechanism 558. FIG. 57 shows the humidifying mechanism 558 with the cover 595 removed. As shown in FIG. 57, the receptacle 591 is mounted on an upper surface of a pan-shaped support 601. FIG. 58 shows the humidifying mechanism 558 with the water line 586 removed and the disc 597 removed from the drive shaft 599A, which extends upward through a central opening 591C in the bottom wall 591A. A secondary cylindrical wall 591D is provided at the central opening 591C extending upward from the bottom wall 591A to prevent water which may collect on the bottom wall from leaking through the opening toward the motor 599. Desirably, the heater 593 indirectly heats the bottom wall 591A such that water which may collect on the bottom wall is vaporized. FIG. 59 is a side perspective of the humidifying mechanism 558 having the cover 595 and disc 597 removed and showing detail of the band heater 593. FIG. 60 illustrates a bottom perspective of the humidifying mechanism 558 showing a lower surface of the pan support 601 and the motor 599 mounted to the pan support. The motor 599 may be a single speed motor (e.g., for rotating the disc at about 3,000 rpm) or be a variable speed motor (e.g., for rotating the disc at 100-4,000 rpm). Any suitable motor may be used.

The disc 597 may include various features which enhance vaporization and/or cleaning of the humidifying mechanism 558. For example, the disc 597 may be formed of a flexible material (e.g., more flexible than metal such as aluminum) such as a silicone material. Because the disc 597 is flexible, while the disc is mounted on the drive shaft 599A, portions of the disc may be folded upward to provide access for cleaning the disc and the receptacle. More specifically, folding of portions of the disc 597 may provide access to the bottom wall 591A and cylindrical wall 591B of the receptacle 591 and lower surface of the disc.

Figure 61A:
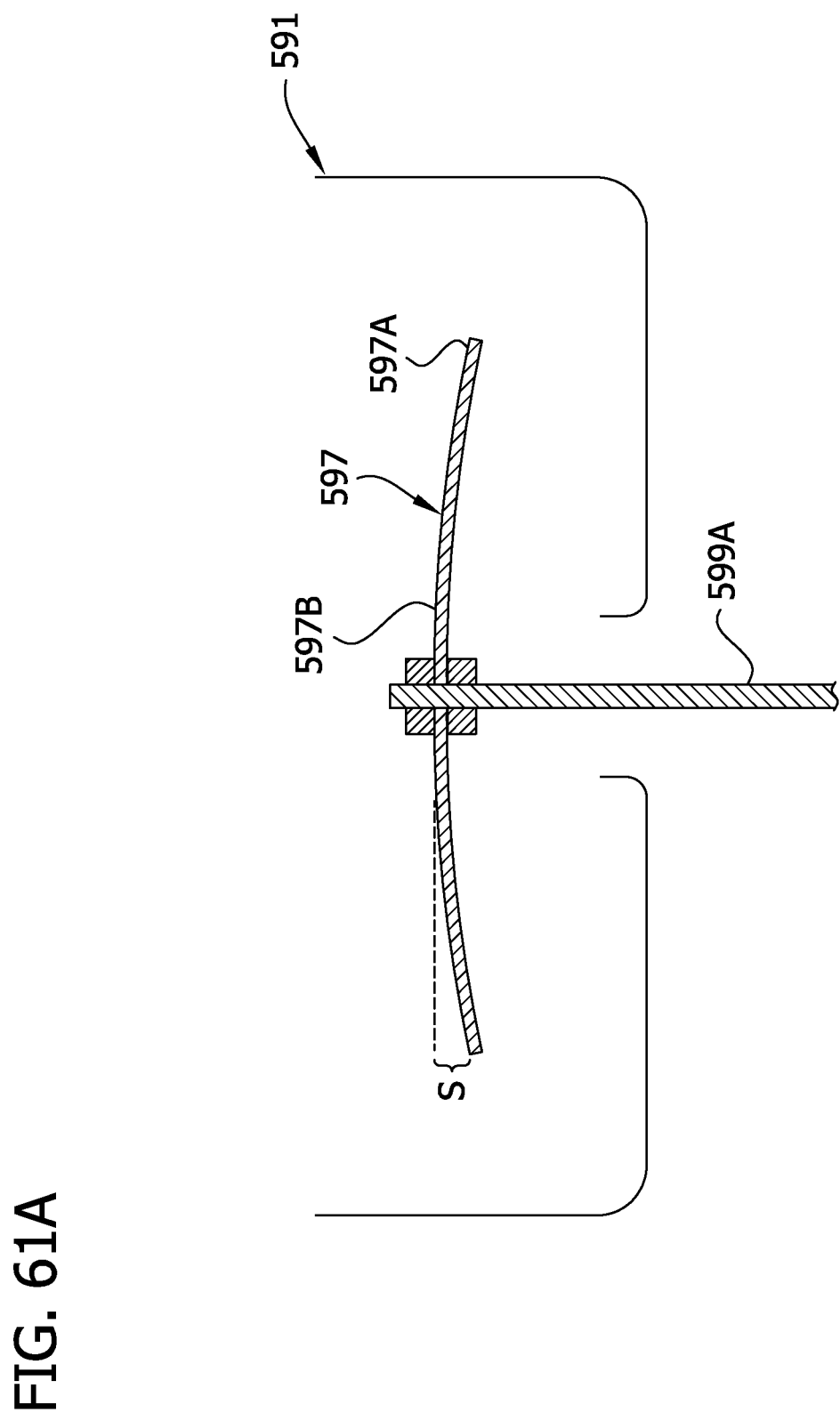
FIG. 61A is a schematic section of the humidifying mechanism showing the disc in a non-rotating position.
Figure 61B:
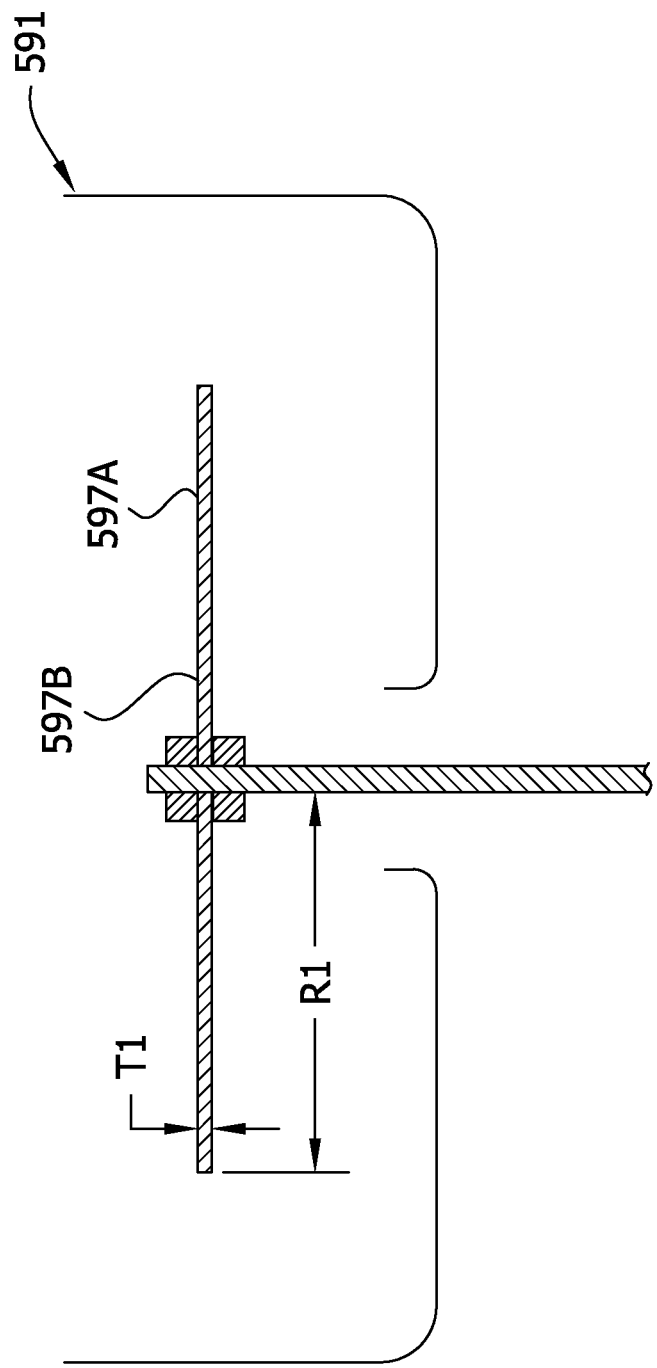
FIG. 61B is a view similar to FIG. 61A but showing the disc in a rotating position.
Figure 61C:
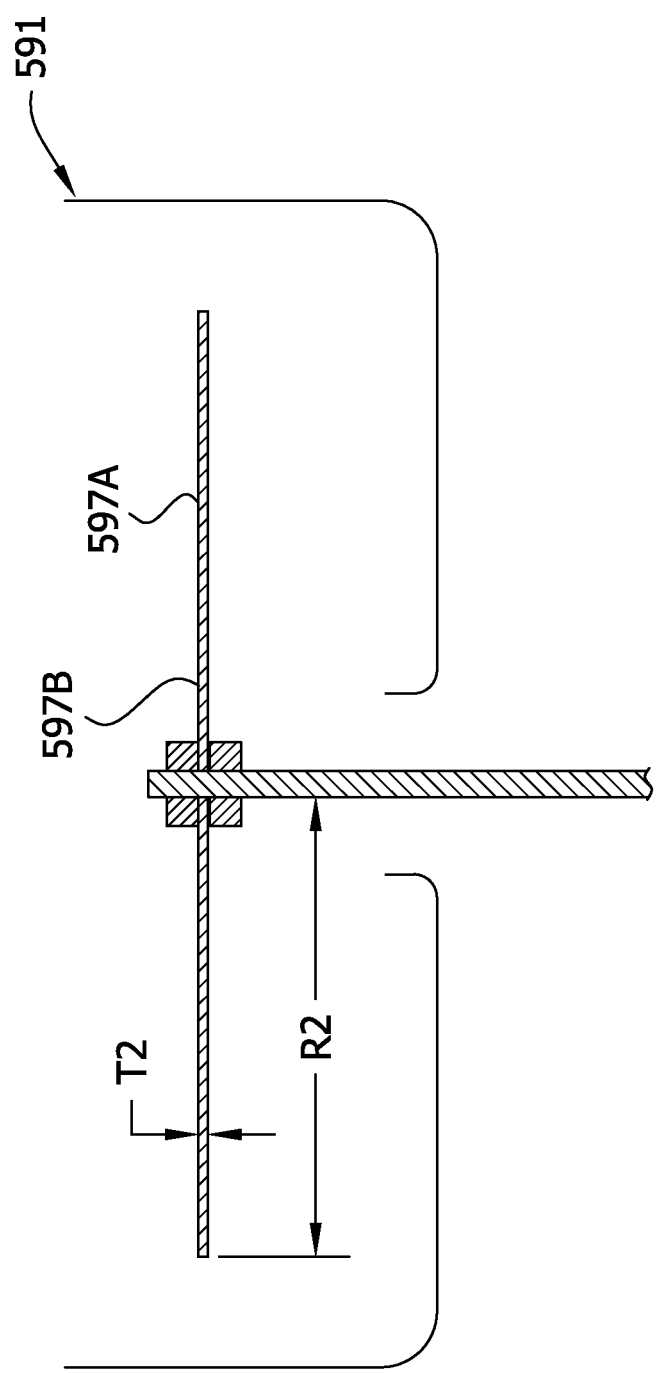
FIG. 61C is a view similar to FIG. 61B but showing the disc in a position when rotating at a higher speed than in FIG. 61A.

The flexibility of the disc 597 may also assist in preventing build-up of mineral deposits on the upper surface of the disc. The receptacle 591 and disc 597 are illustrated schematically in vertical cross section in FIGS. 61A-61C. As shown in FIG. 61A, due to the flexibility of the disc 597, a peripheral edge 597A of the disc may sag or be lower than a central portion 597B of the disc (indicated by S in FIG. 61A) when at a resting (non-rotating) position. The disc 597 is shown in a rotating position in FIG. 61B. As illustrated by comparison of FIGS. 61A and 61B, when the disc 597 begins rotating (e.g., about 300 rpm), the peripheral edge 597A rises to about the same height as the central portion 597B of the disc 597 (the distance S is minimized) due to centrifugal force. The difference in height of the peripheral edge 597A in FIGS. 61A and 61B is exaggerated for purposes of illustration. The flexible disc may sag minimally or not at all without departing from the scope of the present invention. FIG. 61C illustrates the disc 597 when rotating at a higher speed (e.g., about 3,000 rpm) than in FIG. 61B. For example, the disc 597 may be generally elastomeric and resilient. As can be seen by comparison of FIGS. 61B and 61C, the higher rotational speed may cause the disc 597 to temporarily elongate radially and decrease in thickness. The disc has a first radial length R1 and first thickness T1 in FIG. 61B and a longer radial length R2 and lesser thickness T2 in FIG. 61C. The difference in radial length and thickness of the disc 597 in FIGS. 61A and 61B is exaggerated for purposes of illustration. The disc may elongate minimally or not at all without departing from the scope of the present invention. When the rotational speed decreases, the disc 597 desirably assumes its original radial length and thickness. When rotation is ceased, the peripheral edge 597A assumes its sagging position relative to the central portion 61B (e.g., FIG. 61A). This action of the disc 597 flexing, elongating, and/or changing in thickness, may be referred to as "deforming" The deforming action, which occurs during normal use of the disc 597 (e.g., periodic rotation), automatically assists in breaking up mineral deposits which may form on the disc. The disc may be rotated at any suitable speed or variable speeds (e.g., 100-5,000 rpm) without departing from the scope of the present invention.

Referring again to FIG. 57, the disc 597 may include discontinuities 603 which disturb or interrupt the flow of the water along the upper surface of the disc 597 to enhance breaking-up of the water (e.g., into smaller droplets) on the disc as the water moves toward the cylindrical wall 597A and thus enhance vaporization of the water. For example, as shown in FIG. 56, the illustrated disc 597 includes discontinuities in the form of three circular rows of holes 603 spaced at different radial positions on the disc. The holes 603 are positioned (e.g., offset or staggered) with respect to each other such that at any given radial position on the disc, at least one hole 603 interrupts the path between the central portion 597B of the disc 597 and the peripheral edge 597A. In the illustrated embodiment, the holes 603 are about ⅛ inch in diameter. Other sizes and configurations of holes 603 may be used. Moreover, other forms or types of discontinuities 603 may be provided on the disc 597. For example, the upper surface of the disc 597 may be textured (e.g., a raised waffle pattern or random minor protuberances) and/or the upper surface may include depressions, indentations, protrusions, ribs, or other structure.

To enhance cleanability of the receptacle 591 and prevent build-up of mineral deposits on the receptacle, the bottom wall 591A and/or the cylindrical wall 591B may treated with or include a material which provides a smooth surface which is slick or has a low coefficient of friction. For example, the walls 591A, 591B may be coated with Teflon material or anodized. The cylindrical wall may have other configurations without departing from the scope of the present invention. For example, the inside surface of the wall may be relatively rough (e.g., textured) to increase surface area. In addition, the cylindrical wall may include discontinuities (not shown) such as ridges, indentations, or holes. Moreover, although the illustrated cylindrical wall is generally upright, the cylindrical wall may be angled inwardly or outwardly from bottom to top or otherwise have different inside diameters at different positions along the height of the cylindrical wall.

Components of the humidifying mechanism 558 may have configurations other than shown and described without departing from the scope of the present invention. For example, any of the rotors described herein may be generally rigid instead of generally flexible. The disc 597 may be formed of a rigid material such as a metal (e.g., stainless steel). Such a rigid disc may enhance filming of the water on the upper surface of the disc. The rigid upper surface may also be treated or coated (e.g., coated with PTFE) to minimize build-up of mineral deposits on the upper surface.

In use, the humidifying mechanism 558 may operate in a similar fashion as described above in regard to previous embodiments. For example, water may be delivered to the heating device in timed "on" intervals and not delivered to the heating device in timed "off" intervals. During the timed "on" intervals, the water may continuously flow or be dripped from the free end of the water line 586. The humidifying mechanism 558 may be used to control the RH in an oven cavity as described above with respect to other humidifying mechanisms.

Figure 62:
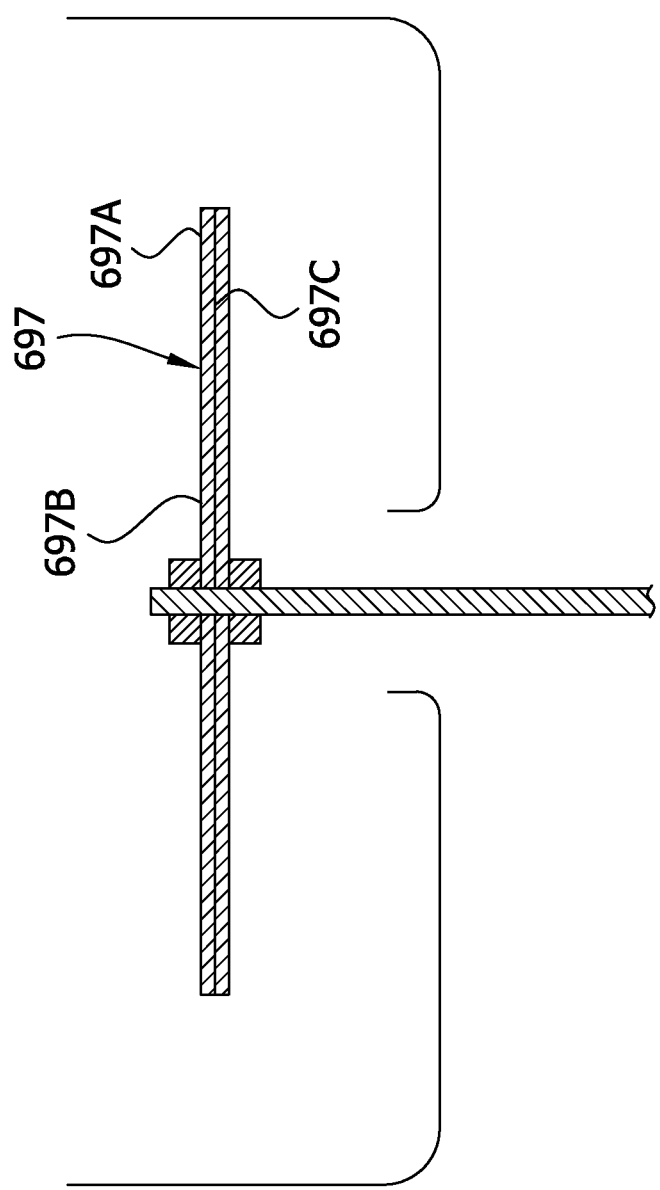
FIG. 62 is a schematic section of another embodiment of a disc which may be used as part of a humidifying mechanism according to the present invention.

FIG. 62 illustrates a schematic vertical cross section of another embodiment of a disc 697 which may be used as part of the humidifying mechanism. This disc 697 may be generally the same as and function like the disc described above. For example, the disc may be me made of a generally flexible, elastomeric, and/or resilient silicone material. Other materials may be used without departing from the scope of the present invention. In FIG. 62, the disc 697 is shown in a rotating state, where the peripheral edge 697A of the disc is positioned at about the same height as the central portion 697B of the disc. When in a resting (non-rotating) position, the peripheral edge 697A of the disc 697 may sag (or not sag) with respect to the central portion 697B as explained above with respect to the disc 597 (see FIG. 61A). In this embodiment, the disc 697 includes reinforcement to limit radial elongation of the disc due to centrifugal force when the disc is rotating. The reinforcement may also limit the amount the peripheral edge 697A sags. A disc made of material which is too elastic in the radial direction of the disc may cause the disc to become out of balance and "wobble" when rotating. The illustrated disc 697 includes a reinforcing member 697C to limit or control (e.g., make more uniform) the elasticity or potential elongation of the disc in the radial direction to enhance the balance of the disc. The reinforcing member 697C may be provided in the form of a fiberglass netting or scrim 697C which is laminated or coated with silicone material or otherwise provided in the silicone material of the disc. Other types of reinforcing members may be used without departing from the scope of the present invention. The reinforcing member 697C is illustrated as being circular and located at generally mid-height of the disc 697 and having a diameter about the same as the overall diameter of the disc. However, other configurations may be used without departing from the scope of the present invention.

Figure 63:
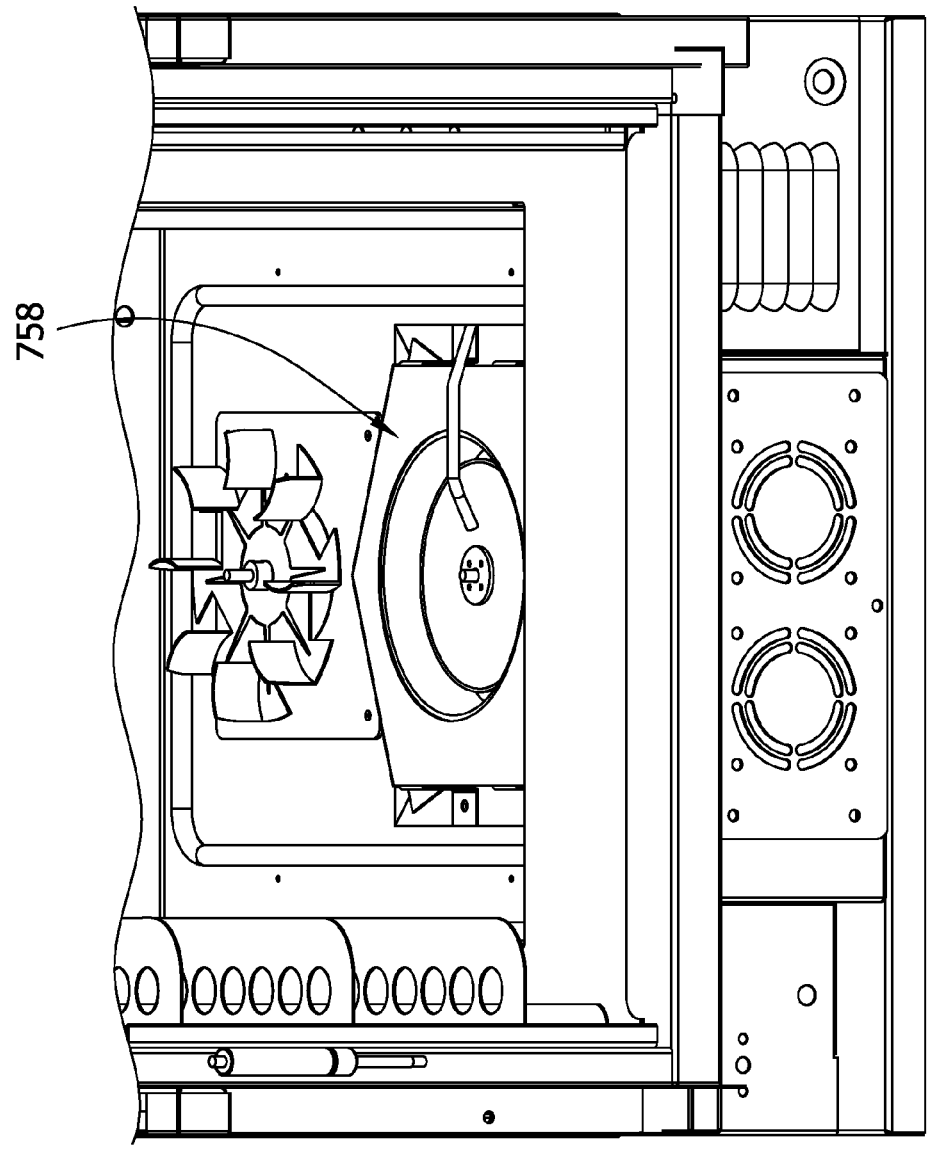
FIG. 63 is a perspective of another embodiment of a humidifying mechanism of the present invention.
Figure 64:
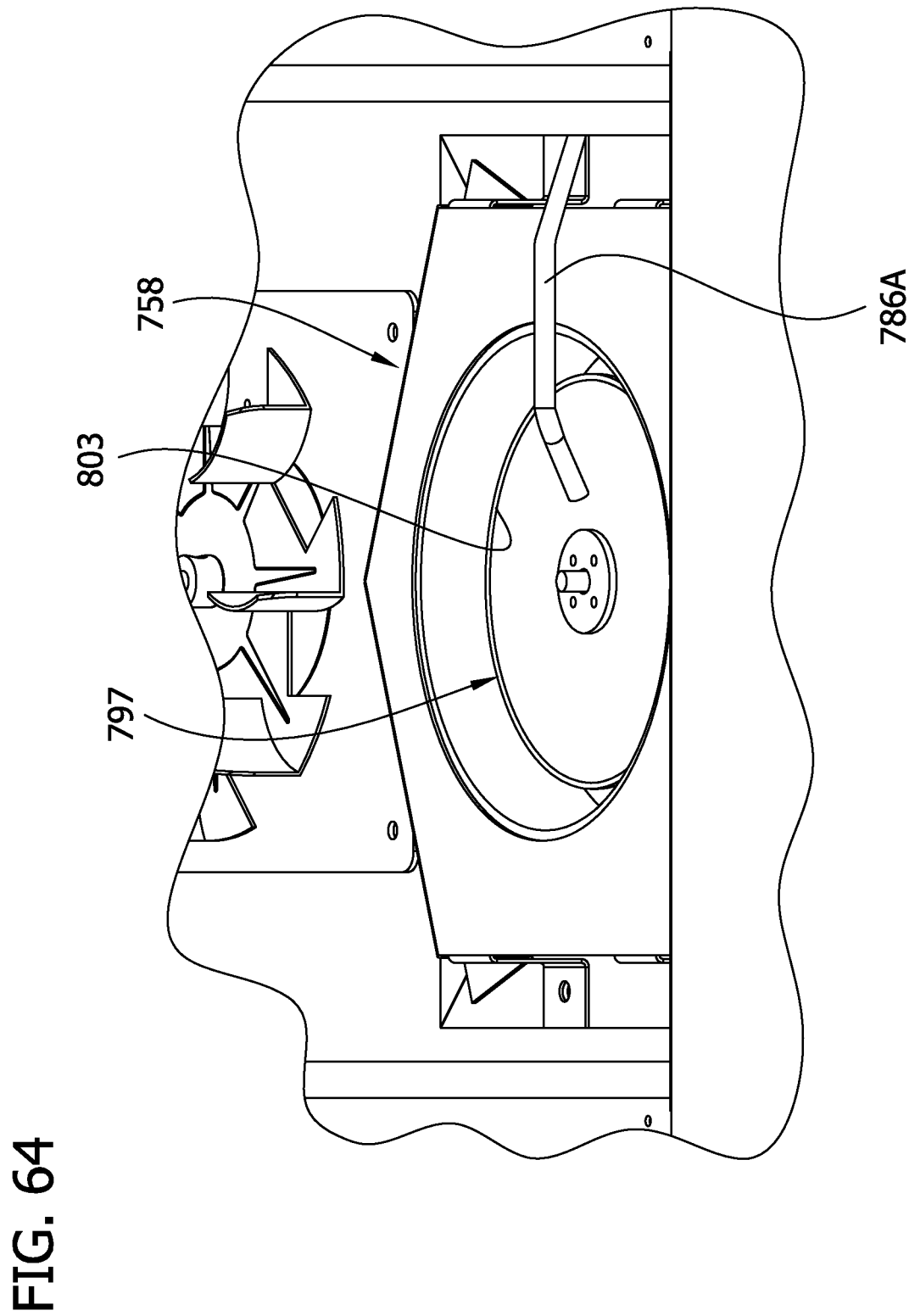
FIG. 64 is an enlarged portion of the perspective of FIG. 63.

FIGS. 63 and 64 illustrate another embodiment of a humidifying mechanism 758 of the present invention. The humidifying mechanism 758 is similar to the mechanism 558 described above, and corresponding reference numbers are used for convenience. In this embodiment, the disc 797 does not include holes 803 for interrupting the flow of water along the upper surface of the disc. Instead, the disc includes a discontinuity in the form of a raised ridge 803 extending around the periphery of the disc 797. The ridge 803 interrupts the flow of the water to divide the water into smaller droplets which vaporize more readily. In this embodiment, the water line 786 includes a length of flexible tubing 786A (e.g., a tube including silicone material). The flexible tubing 786A may have define a flow path which has a relatively large internal diameter (e.g., about ¼ inches) such that water flowing down the flow path to the heating device 790 may not fill the entire cross section of the flow path at a given position along the flow path. The flexible tubing 786A may be "worked" or repeatedly flexed by hand in different directions during routine or periodic cleaning to break up mineral deposits in the flow path which may be impeding or blocking the flow path. The water line 786 may include other features such as a duck bill valve (not shown) at the free end of the water line which automatically flexes in use to prevent clogging of the water line by breaking up mineral deposits at the free end or elsewhere along the flow path.

FIGS. 65-89 illustrate another embodiment of an oven of the present invention, which is generally designated 800. The oven may be similar in construction to the ovens described above and, for convenience, corresponding parts are designated by corresponding reference numbers. In general, in this embodiment, the oven 800 has a single cavity 824 (although additional cavities may be provided) and includes several features which facilitate cleaning of the oven. Any one feature or multiple features of this embodiment may be combined with features of other embodiments disclosed herein.

Figure 65:
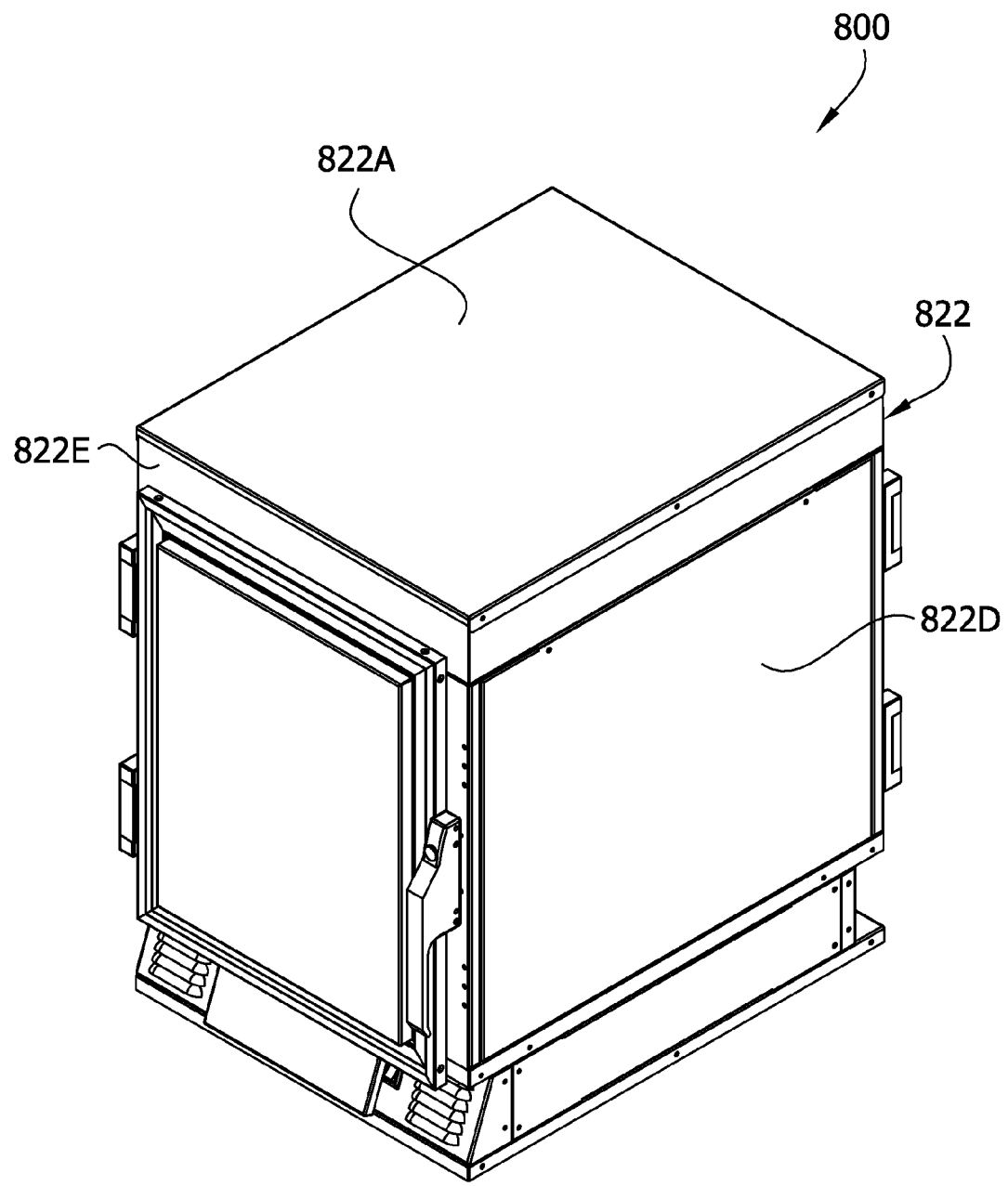
FIG. 65 is a perspective of another embodiment of an oven according to the present invention.

FIG. 65 illustrates the oven 800 in perspective. The oven comprises a housing or cabinet 822 having a holding cavity 824 for holding pre-cooked food at desired temperature and humidity conditions prior to serving the food, as described with respect to other embodiments above. The cavity 824 is configured to hold one or more containers (e.g., food pans or trays) of food on supports 829 (FIG. 66) spaced at different elevations in the cavity.

The cabinet 822 of the oven comprises a top wall 822A, a bottom wall 822B (FIG. 68), opposite side walls 822C, 822D, a front wall 822E, and a back wall 822F. The walls include suitable thermal insulation. The top wall 822A comprises a removable cover (also indicated by the reference number 822A). An upper internal horizontal panel 830 is spaced below the cover 822A to create an upper compartment 832 inside the cabinet 822. Similarly, a lower internal horizontal panel 834 (FIG. 68) is spaced above the bottom wall 822B of the cabinet to create a lower compartment 836 inside the cabinet for housing various components of the oven, as will be described.

Figure 66:
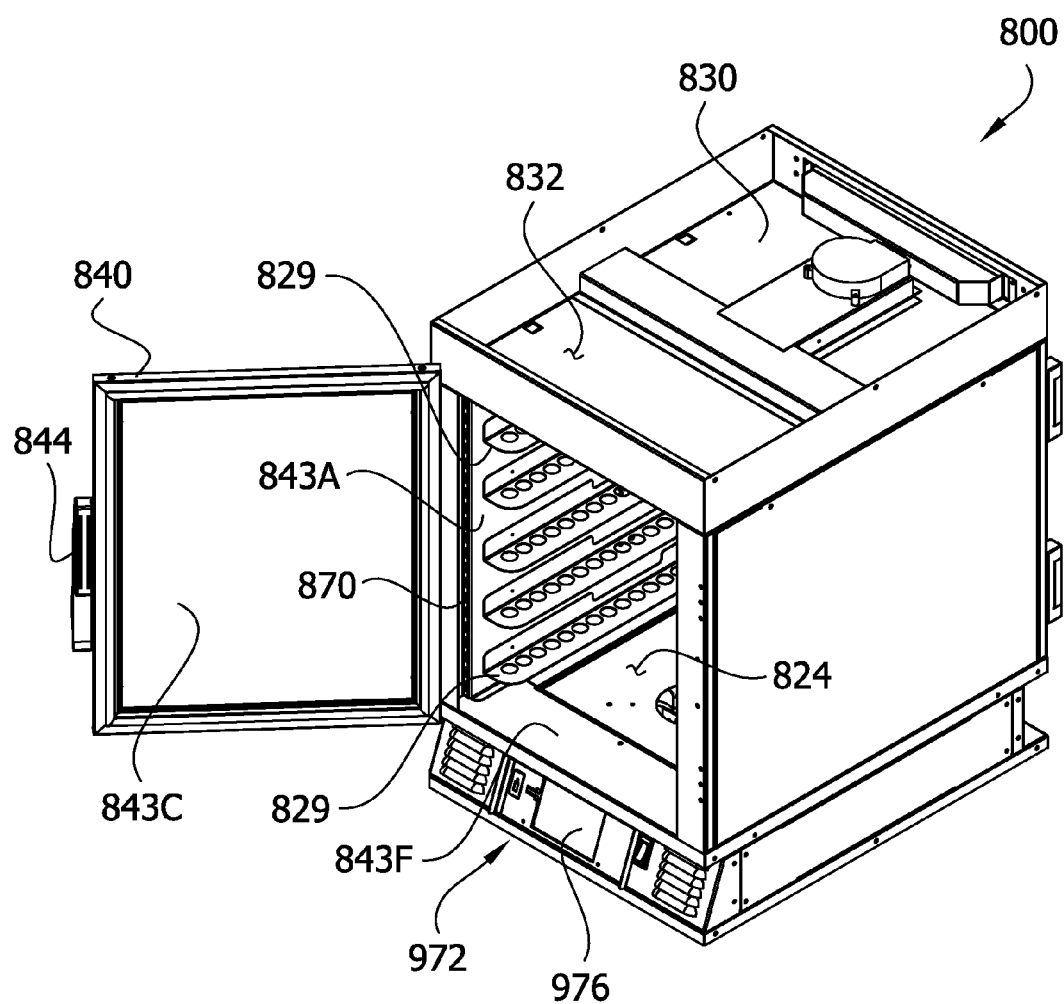
FIG. 66 is a view similar to the perspective of FIG. 65 but showing a front door open and a top panel removed.
Figure 67:
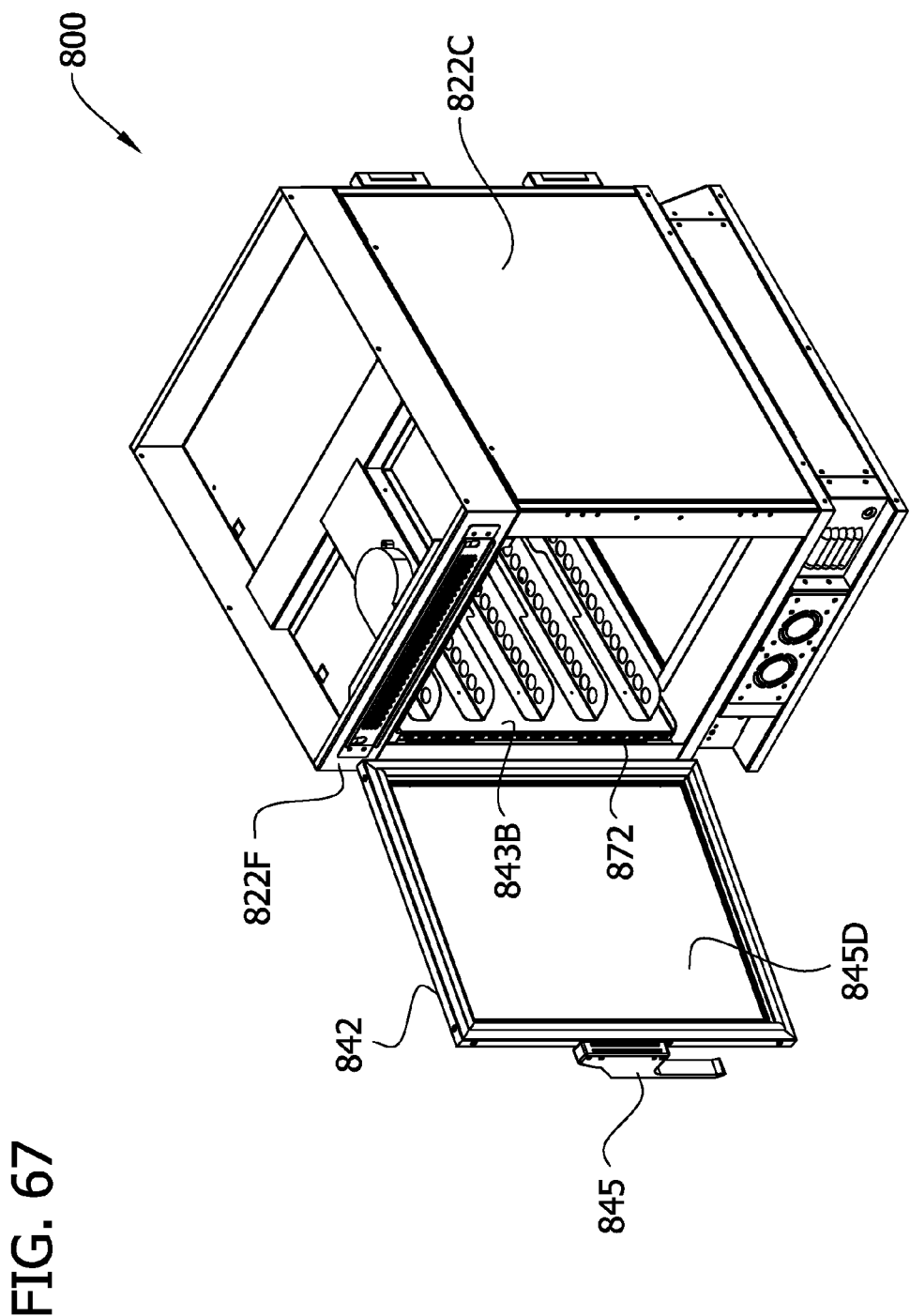
FIG. 67 is a rear perspective of the oven of FIG. 65 showing a rear door open and the top panel removed.

Referring to FIGS. 66 and 67, access to the cavity 824 is provided by front and rear doors 840, 842 at the front and rear of the cabinet 822. The cavity 824 is defined by interior walls mounted inside the cabinet including left and right side walls 843A, 843B, front and rear walls 843C, 843D formed by the doors 840, 842, and upper and lower walls 843E (FIG. 83), 843F. FIG. 66 is a front perspective of the cabinet 822 having the front door 840 open. FIG. 67 is a rear perspective of the cabinet 822 having the rear door 842 open. This "pass through" arrangement allows food to be loaded and/or unloaded from both the front and the rear of the cabinet 822. In other embodiments, only one door is provided for front-only loading/unloading. In any case, each door(s) may be hinged along its upper, lower, or side edge. Handles 844, 845 with suitable door-latching mechanisms are provided on the doors.

Figure 68:
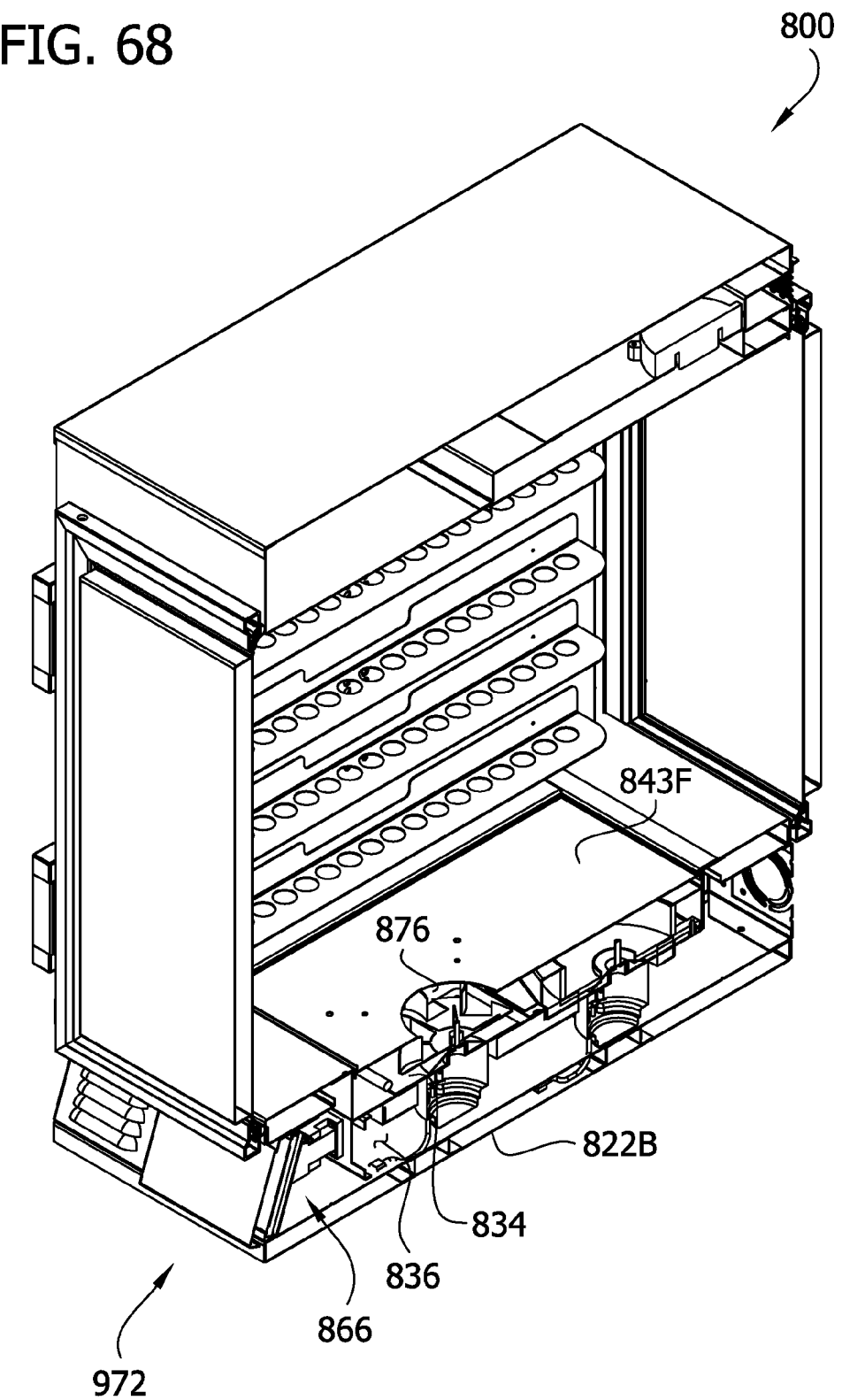
FIG. 68 is a perspective of a vertical section of the oven taken along the depth of the oven.
Figure 69:
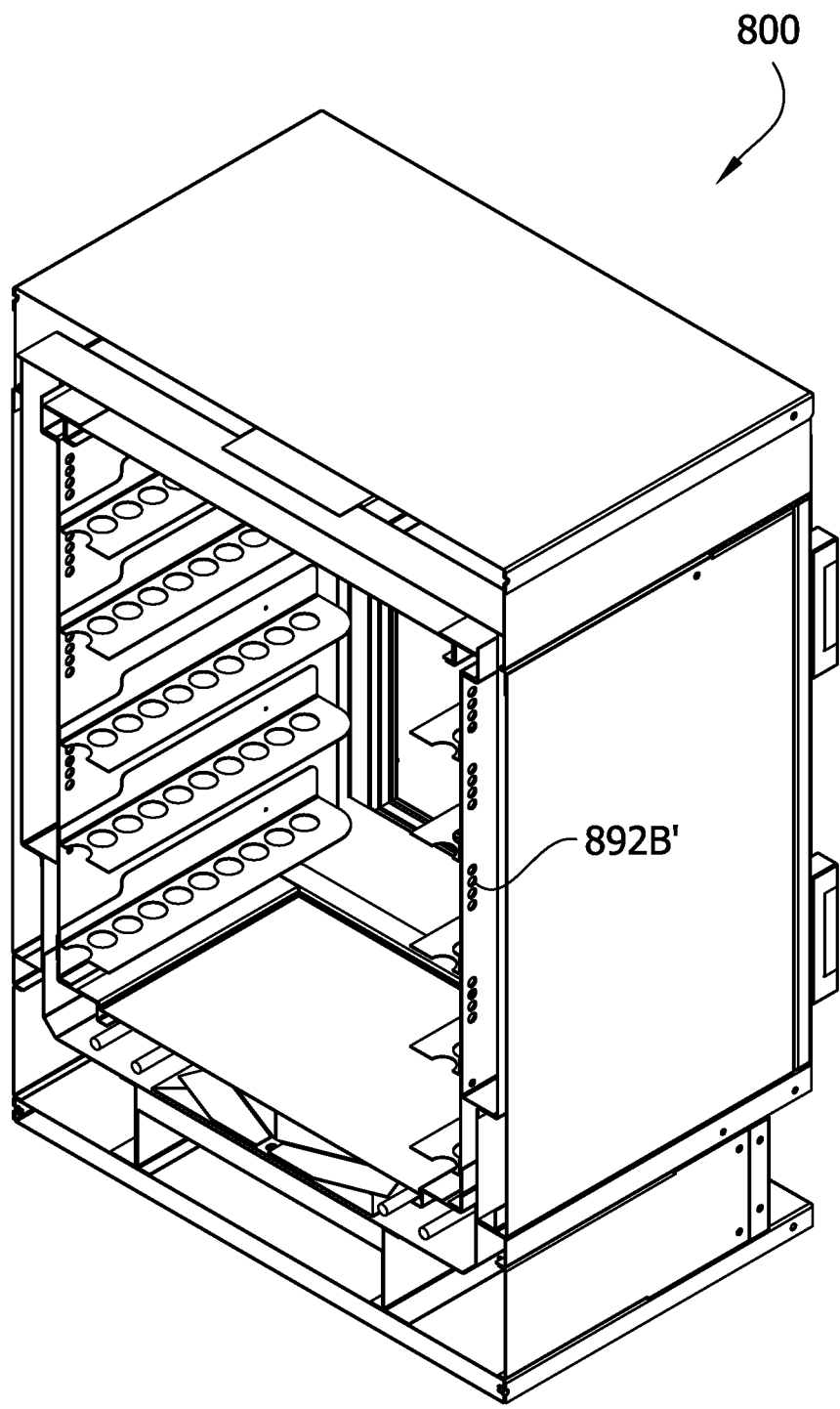
FIG. 69 is a perspective of a vertical section of the oven taken along the depth of the width of the oven.
Figure 70:
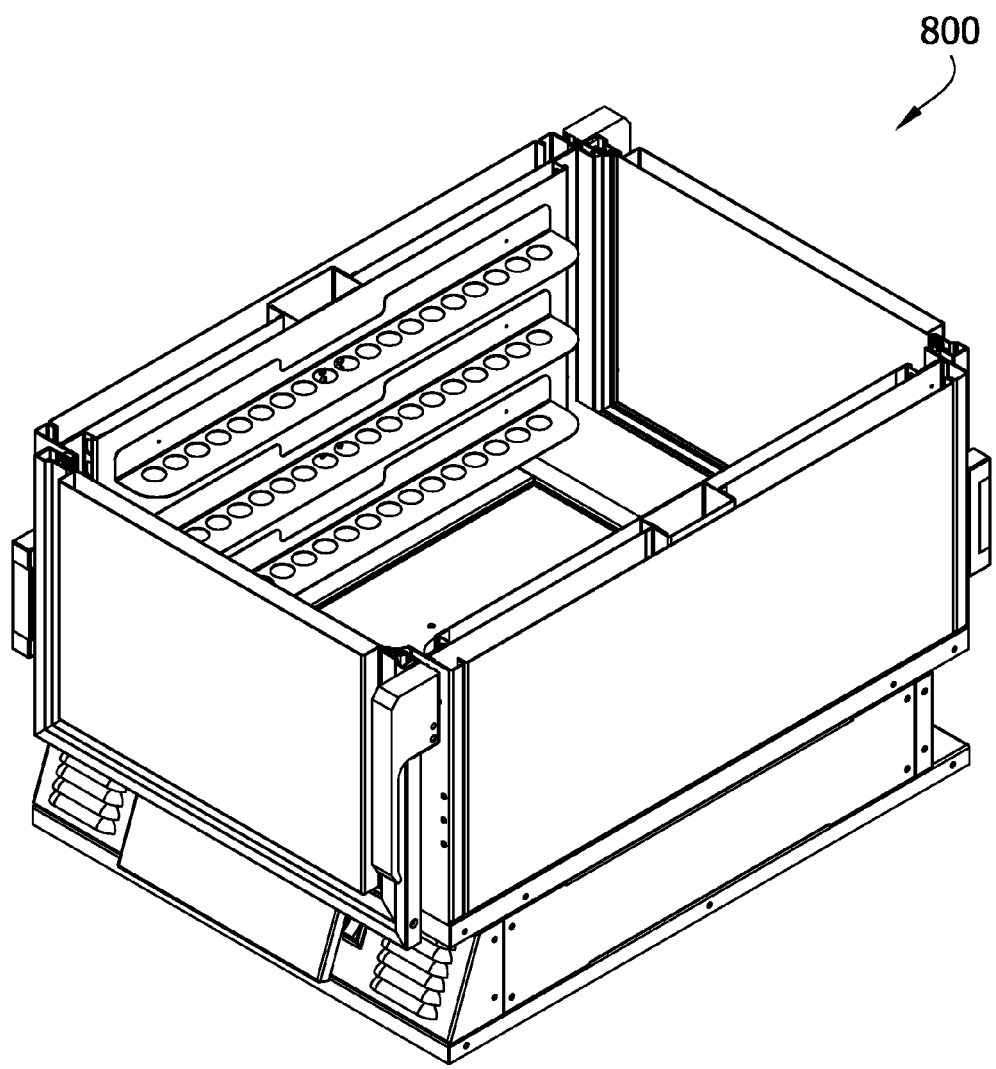
FIG. 70 is a perspective of a horizontal section of the oven.

FIGS. 68-70 illustrate various sections of the oven 820. In particular, FIGS. 68 and 69 illustrate vertical sections of the oven 820 taken along the depth and width of the oven, respectively. FIG. 70 illustrates a horizontal section of the oven 820.

Figure 71:
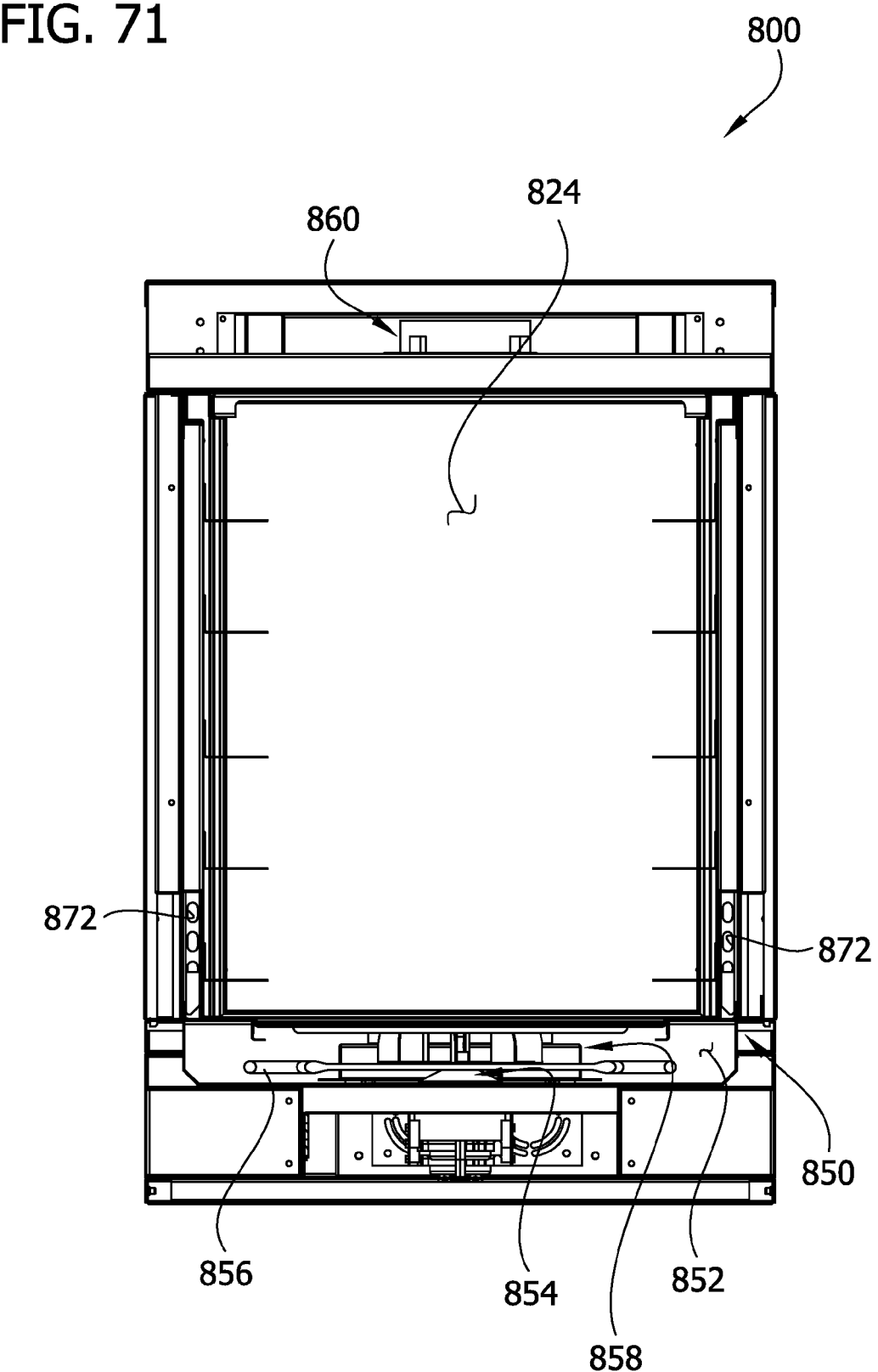
FIG. 71 is a vertical section of the oven taken along the width of the oven.

Referring to FIG. 71, the oven 820 has a cavity conditioning system for controlling the temperature, relative humidity (RH), and air flow conditions in the cavity 824. By way of example, conditions in the cavity 824 may be set for holding grilled chicken or for holding fried chicken.

In particular, the cavity system comprises a duct system (broadly, lower ductwork) 850 defining an air flow path 852, a blower 854 (air-circulation device) for circulating air through the duct system and cavity, a heater 856 for heating the circulating air of the cavity 824, a humidifying mechanism 858 for intermittently introducing water vapor into the circulating air of the cavity, and a de-humidifying mechanism 860 (FIG. 78) for removing water vapor from the circulating air of the cavity 824. A relative humidity (RH) sensor (not shown) is provided for sensing the relative humidity of the circulating air of the cavity 824, and a temperature sensor (not shown) is provided for measuring the temperature of the circulating air. The RH sensor and temperature sensors may be configured and located as described above with respect to RH sensor 62 and temperature sensor 64.

Figure 79:
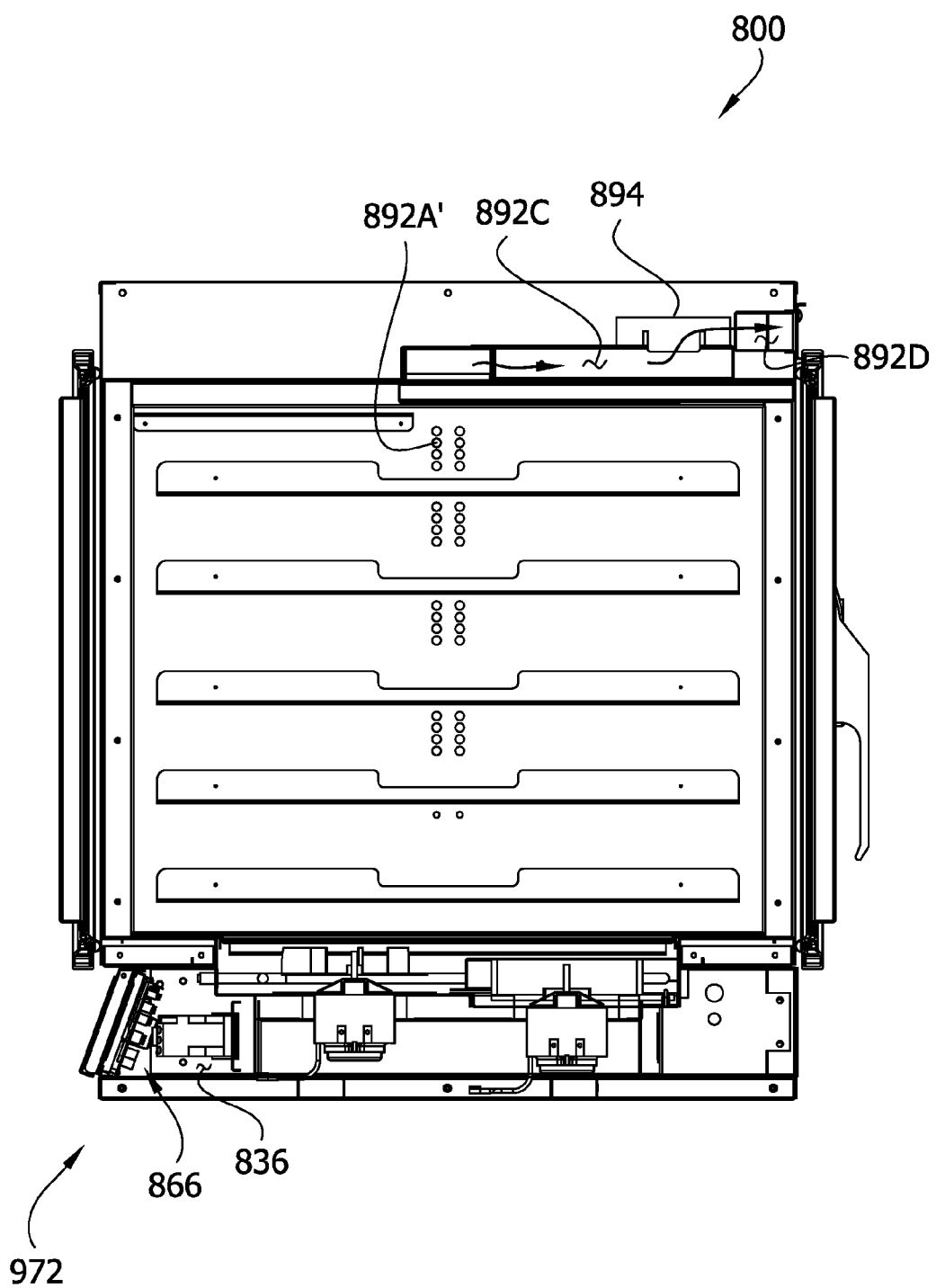
FIG. 79 is a vertical section of the oven taken along the depth of the oven.

As explained with respect to embodiments described above, the oven 800 has a controller 866 which may be programmed to maintain temperature and RH conditions in the cavity 824 at optimal values selected to maximize holding times for particular foods. Moreover, the oven 800 may be programmed to initiate rapid temperature and/or RH restoration. The controller 866 and associated components are housed in the lower compartment 836 (FIGS. 68 and 79).

Figure 72:
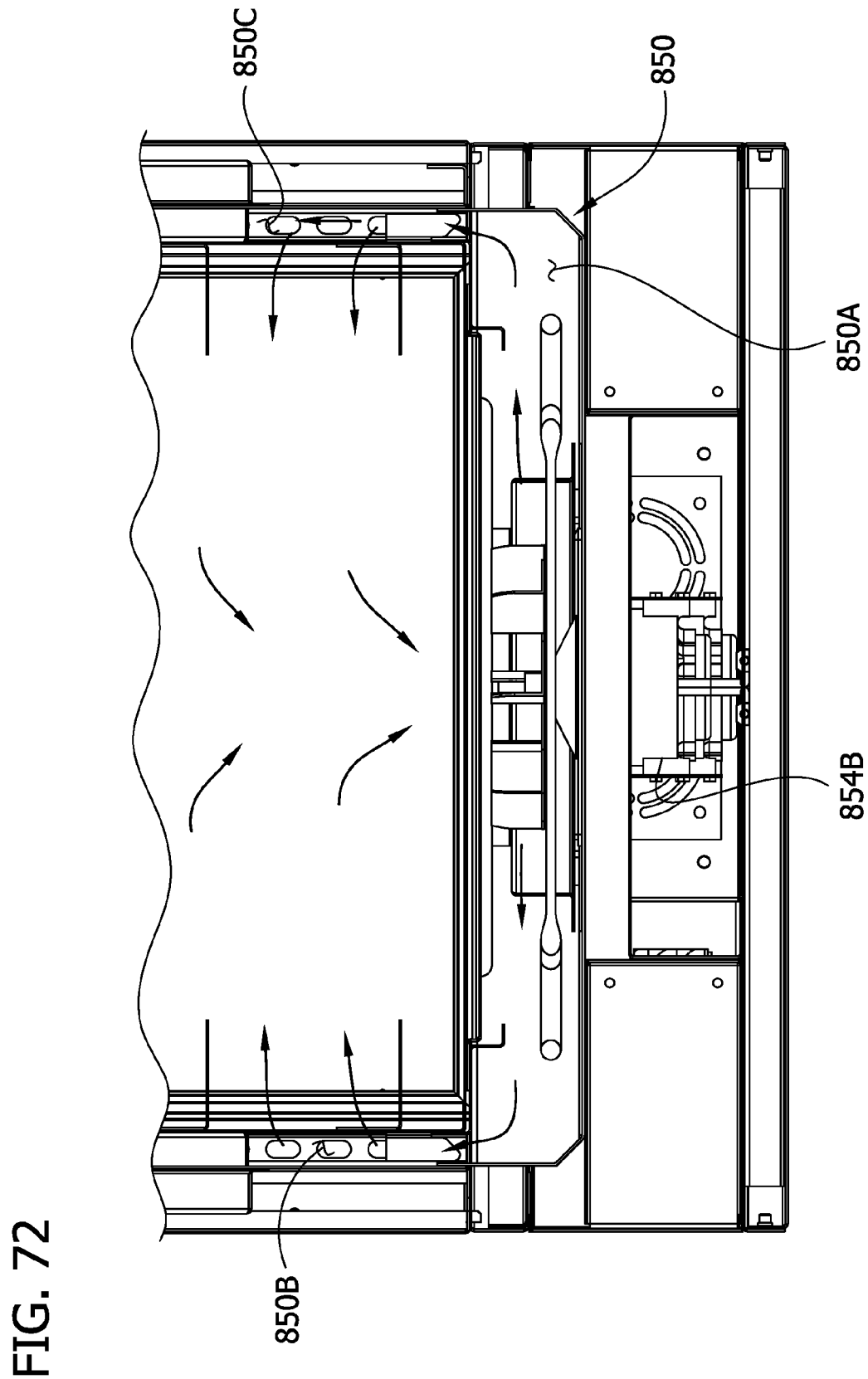
FIG. 72 is an enlarged lower portion of the section of FIG. 71.

Referring now to FIG. 72, the duct system 850 comprises a lower duct 850A extending horizontally below the cavity 824, and left and right side air ducts 850B, 850C to the left and right of the cavity 824. The lower duct 850A extends substantially the entire width of the cavity 824 (FIG. 72) and most of the depth (front-to-back dimension) of the cavity (FIG. 68). Each side duct 850B, 850C communicates at its lower end with the lower duct 850A along substantially the entire depth (front-to-back dimension) of the lower duct.

Figure 74:
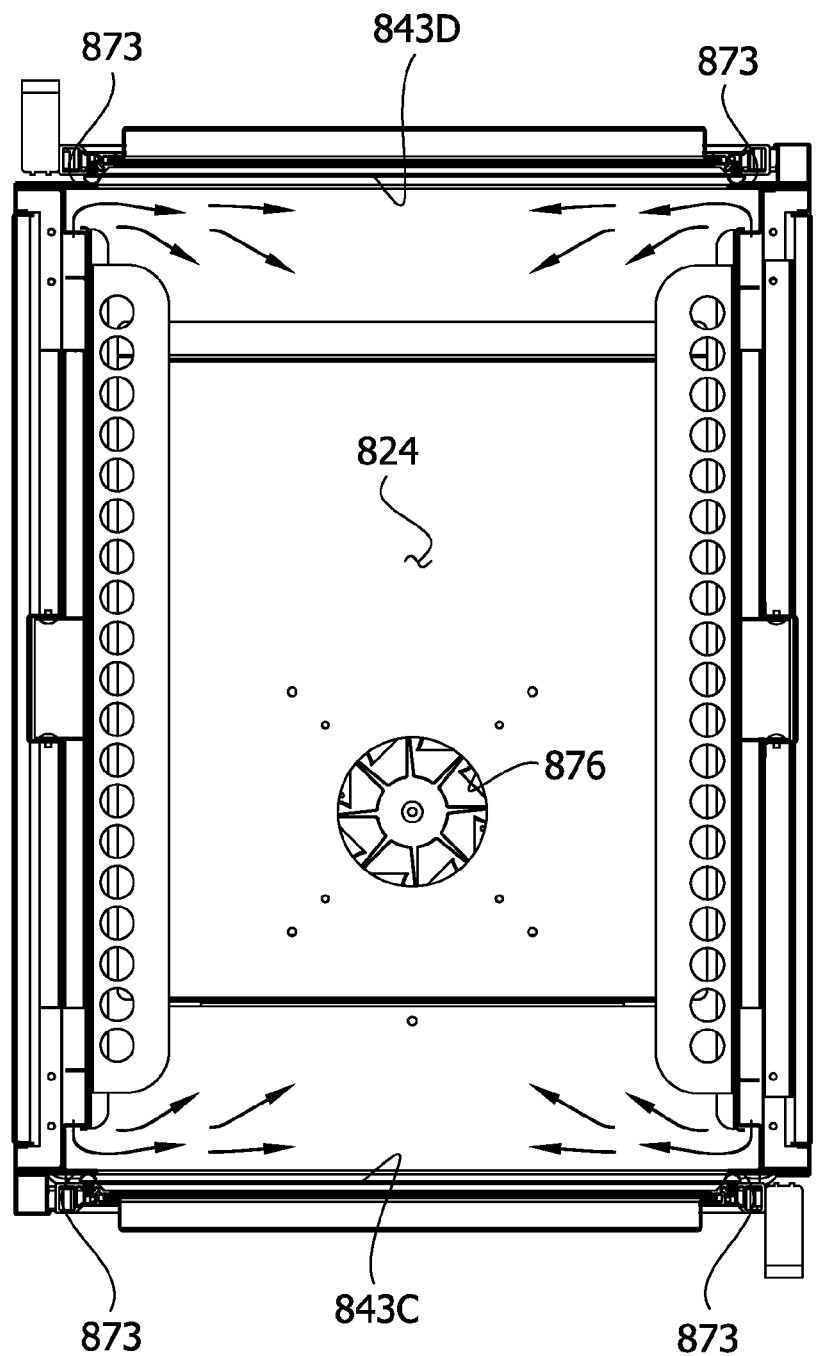
FIG. 74 is a top view of a horizontal section of the oven.
Figure 75:
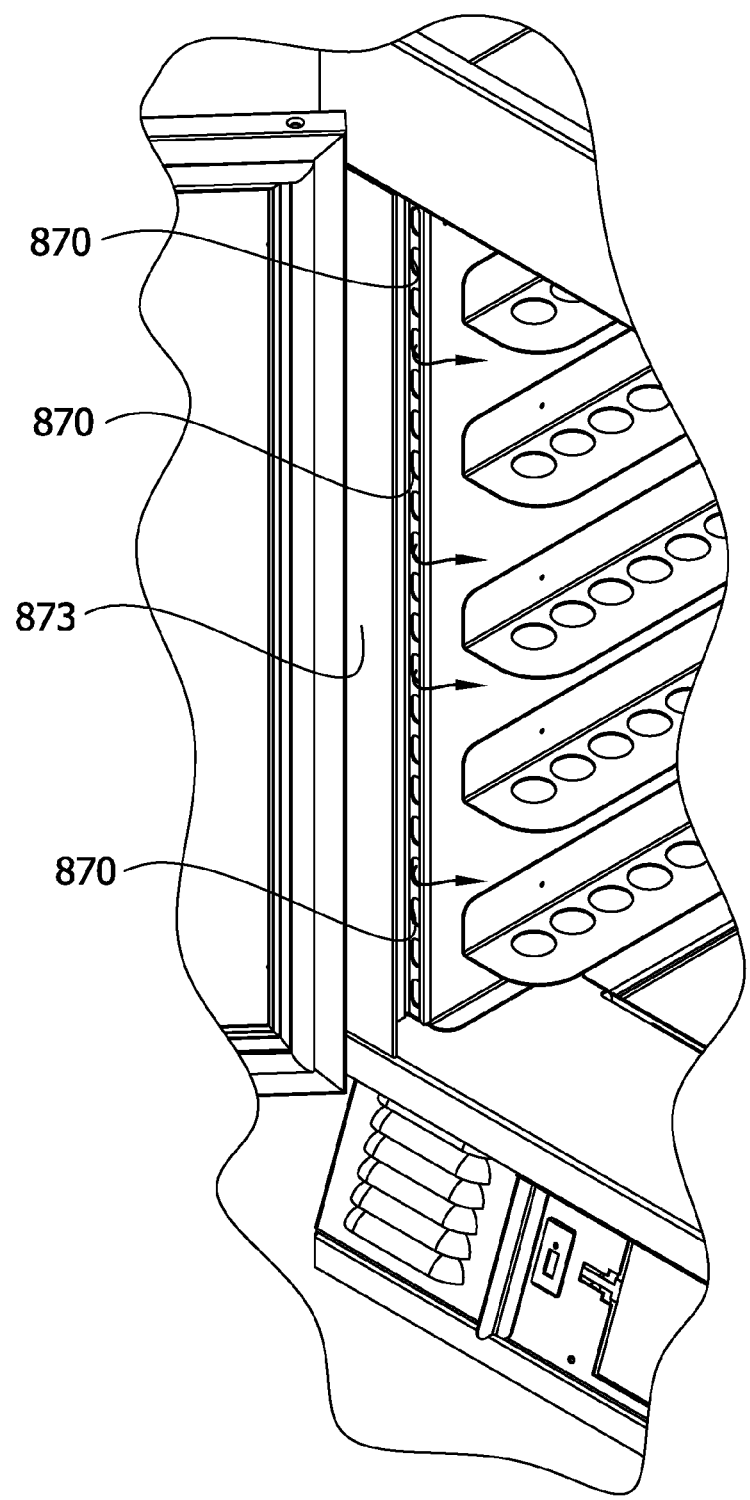
FIG. 75 is an enlarged partial perspective of the oven.

As shown in FIGS. 66, 67, 71, 75, 81, and 84, each side duct 850B, 850C has a series of front outlet openings 870 spaced from the rear (inner) surface of the front door when the door 840 is closed, and a series of rear outlet openings 872 spaced from the front (inner) surface of the rear door 842 when the door is closed. Each series of front and rear openings 870, 872 is arranged in a vertical array extending from adjacent the top of the cavity 824 to adjacent the bottom of the cavity. The openings 870, 872 are arranged and sized for directing flow of circulating air into the cavity 824 primarily along a perimeter of the cavity rather than toward a center of the cavity to reduce direct air flow over pre-cooked food product in a center area of the cavity. Desirably, the ductwork 850B, 850C directs circulating air into the cavity 824 primarily toward the four corners of the cavity 824, as shown in FIG. 74. A few small apertures (not shown) may be provided in the side ducts 850B, 850C to allow small amounts of ducted air to "bleed" out among the pan support locations for better temperature and humidity distribution and/or reduction of stratification in the cavity 824. However, the flow of air over the food product should be primarily "indirect," i.e., most of the air flowing over the product has been previously deflected by a surface at a perimeter of the oven cavity 824. Indirect air flow assists in preventing excessive surface drying of the food.

Referring to FIG. 74, air exiting the outlet openings 870, 872 impacts against inner surfaces of deflectors 873 positioned inside the cavity 824 and overlapping left and right side portions of the front and rear doors 840, 842. The deflectors 873 are shown in more detail in FIGS. 75, 77, and 84. In the illustrated embodiment, the deflectors 873 are include generally flat plates (also indicated by 873) which extend inward widthwise of the cavity 824 and extend substantially the entire height of the cavity 824 to overlap respective arrays of outlet openings 870, 872. The openings 870, 872 are oriented for directing air flow toward the left and right side portions of the doors when the doors are in their closed positions. However, the deflectors 873 overlap the side portions of the doors 840A, 842B such that most air from the openings 870, 872 does not directly flow against the side portions of the doors. Instead, the air flows directly against the inner surfaces (facing the cavity) of the deflectors 873A, where it is directed generally around the perimeter of the cavity 824. Some of the air may thereafter contact the inside surfaces of the doors 843C, 843D, but desirably only after initial contact with the deflectors. The deflectors 873 deflect the air for uniform distribution into the cavity 824 where it flows gently over the pre-cooked food product. An example air flow pattern is illustrated in FIG. 74.

Figure 76:
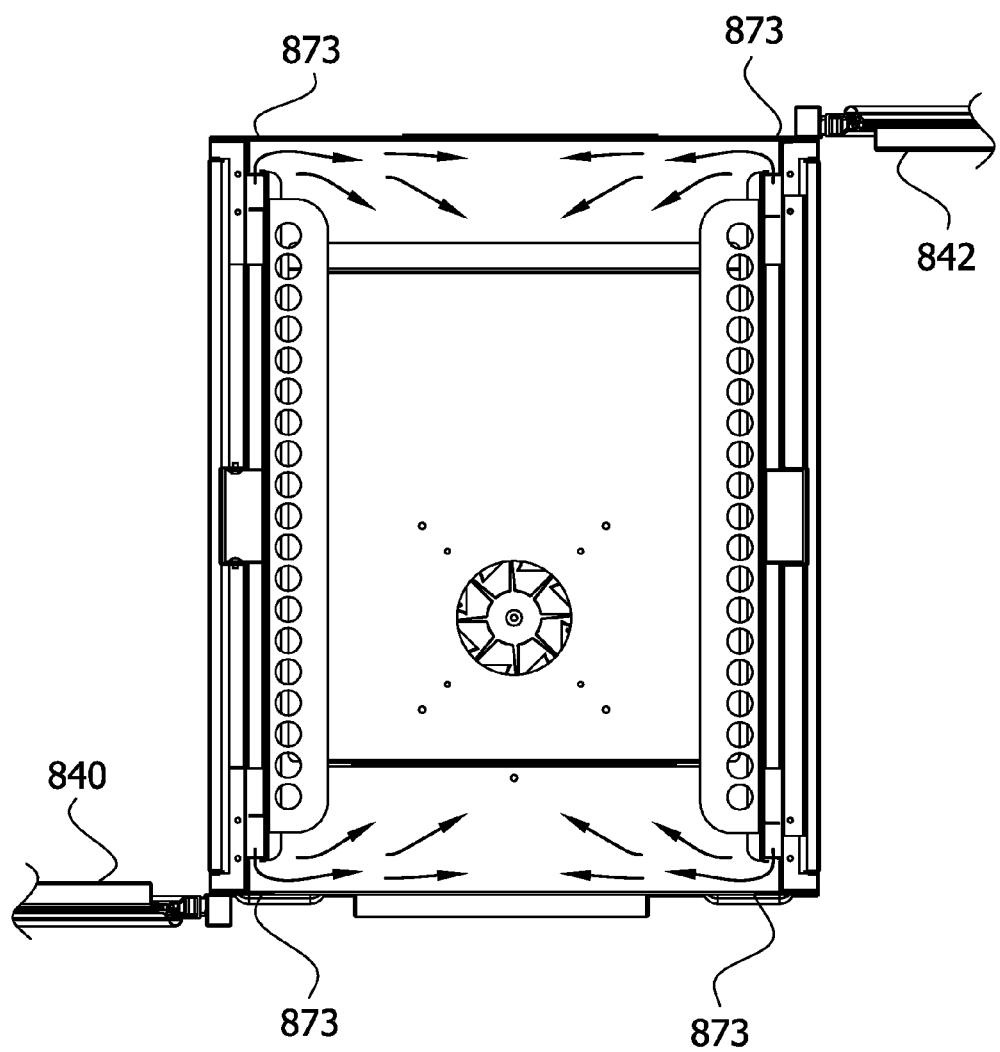
FIG. 76 is a top view of a horizontal section of the oven, the doors being open.
Figure 77:
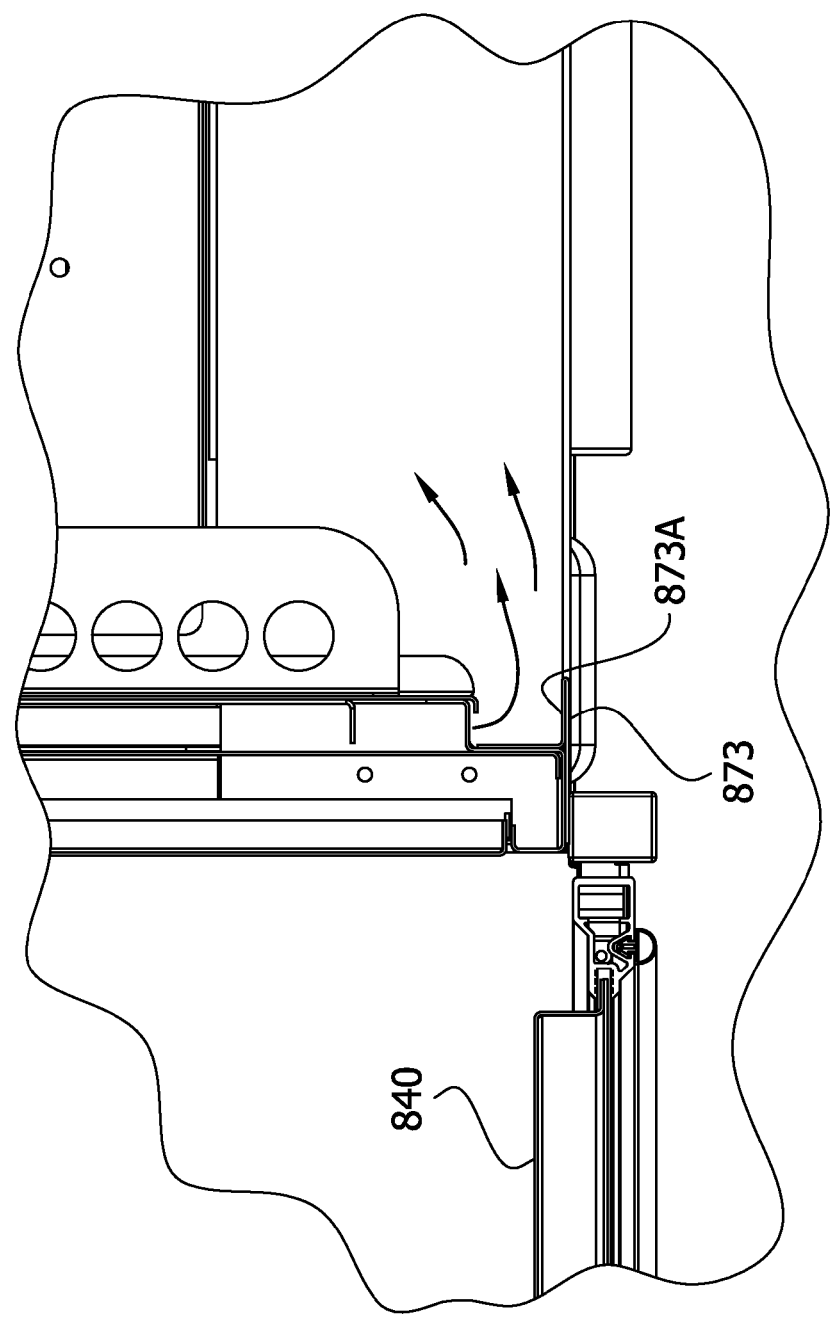
FIG. 77 is an enlarged portion of the section of FIG. 76.

The configuration of the deflectors 873 also prevents substantial loss of conditioned air directly from the openings 870, 872 when the doors are open. As shown in FIG. 76 (and the enlarged view in FIG. 77), the deflectors 873 desirably prevent air from the openings 870, 872 from flowing directly out of the cavity 824 to ambient. Other types of deflectors 873 may be used without departing from the scope of the present invention. For example, the deflectors 873 may include curved surfaces (e.g., for turning the air flow from the openings 870, 872 to a direction along the inside surface of a respective door). Moreover, the deflectors may be configured for deflecting air upward and/or downward in the cavity 824.

In one embodiment the air exiting the outlet openings 870, 872 has an average speed of about 310 feet per minute. Desirably, the speed of the air flowing over the food is relatively low, e.g., at an average maximum speed of no more than about 6, 8, 10, 12, 14, or 16 ft/min. The outlet openings 870, 872 are arranged and sized for uniform flow of air into the cavity 824 along substantially the entire vertical dimension of the cavity.

Air exits the cavity 824 through an air outlet 876 (FIG. 68) in the lower wall 843F into the lower duct 850A at a location generally under the center of the cavity 824.

Figure 73:
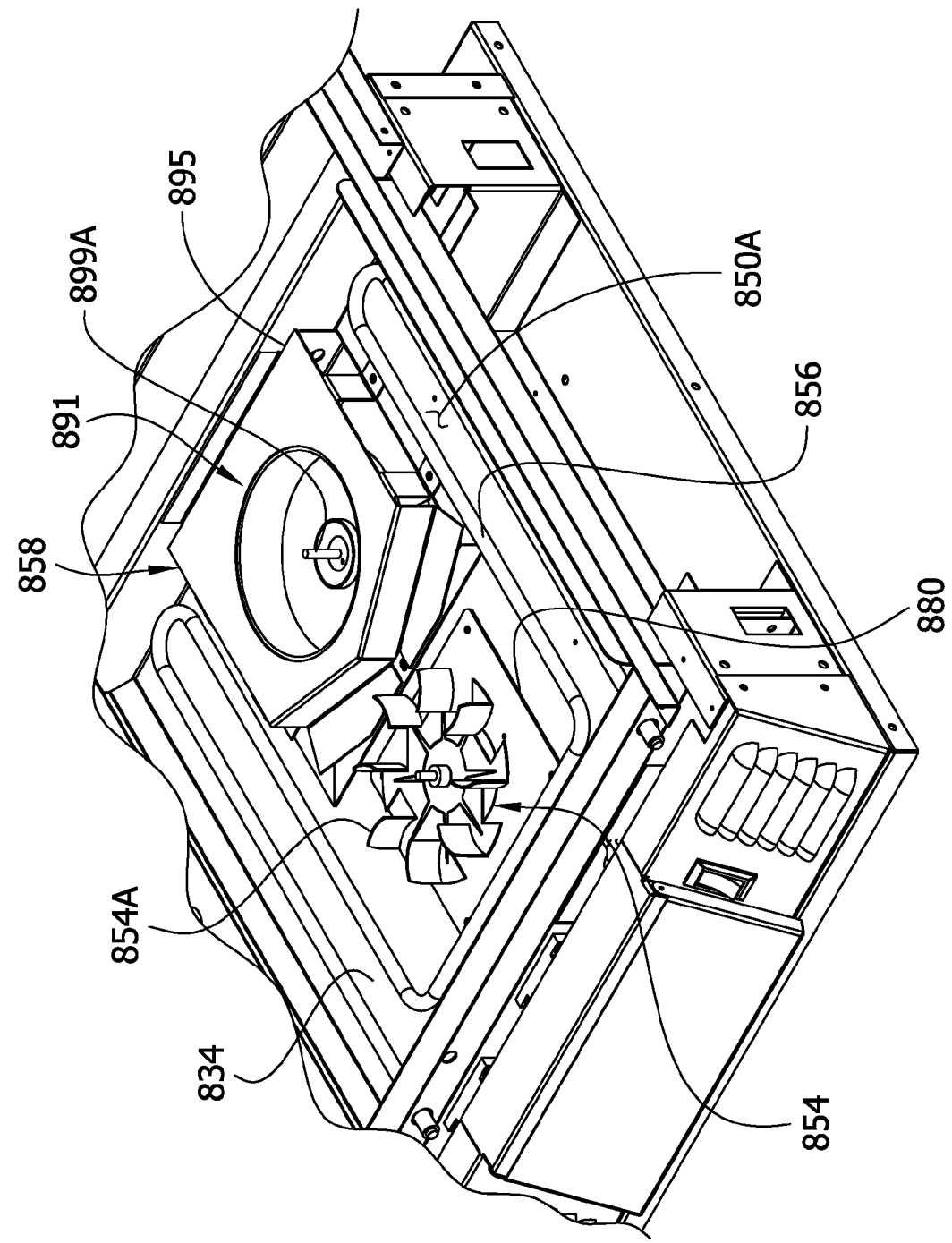
FIG. 73 is a partial perspective of a lower portion of the oven, portions of the oven being removed.

As shown in FIG. 73, the blower 854 for the cavity 824 is mounted on a pan-shaped support 880 secured to the lower internal panel 834 in the lower air duct 850A. The blower 854 includes a blower wheel 854A rotatable by a motor 854B (FIG. 72). The motor 854B may be a one-speed motor or a variable-speed motor having electrical lead wires for connection to a source of power. As illustrated in FIG. 68, the blower 854 is mounted such that the blower wheel 854A is positioned in the lower duct 850A desirably directly below the air outlet 876 of the cavity 824. The blower wheel 854A rotates about a generally vertical axis and has blades spaced around the axis of the wheel. The size and flow capabilities of the blower 854 will vary depending on the size of the cavity 824.

Referring again to FIG. 73, the heater 856 comprises electric resistance heating elements (also indicated by the reference number 856) in the lower duct 850A extending around the blower wheel 854A for heating air flowing through the duct system 850. The heating elements 856 have connections for receiving power from an electric power source.

Referring still to FIG. 73, a portion of the humidifying mechanism 858 is illustrated. More specifically, the cover 895, receptacle 891, and drive shaft 899A are shown. It is understood the humidifying mechanism 858 may have a construction generally the same as one of the mechanisms (e.g., mechanism 558) described above. Moreover, other mechanisms may be used for humidifying air circulating through the duct system 850 and cavity 824 without departing from the scope of the present invention.

Figure 78:
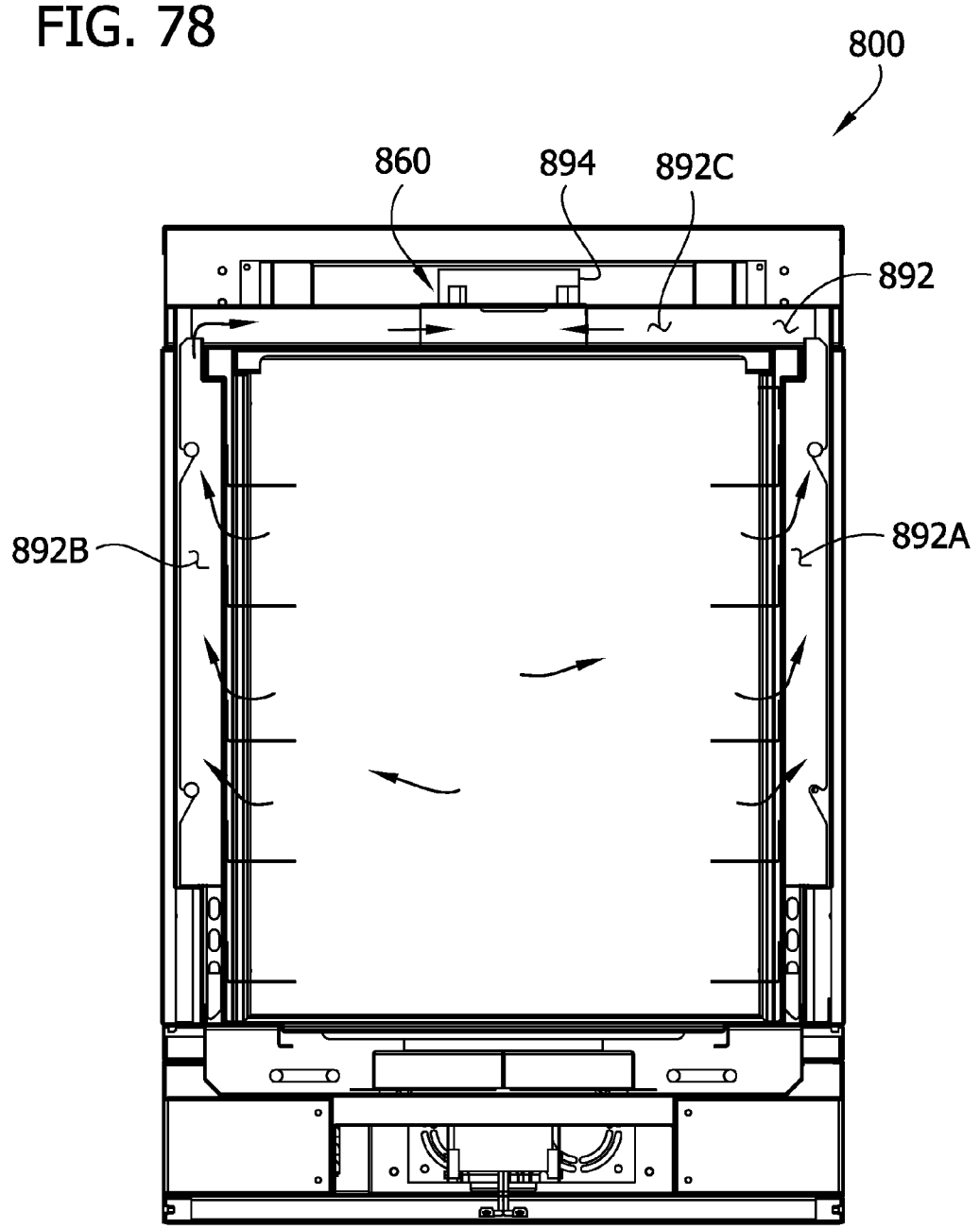
FIG. 78 is a vertical section of the oven taken along the width of the oven.
Figure 80:
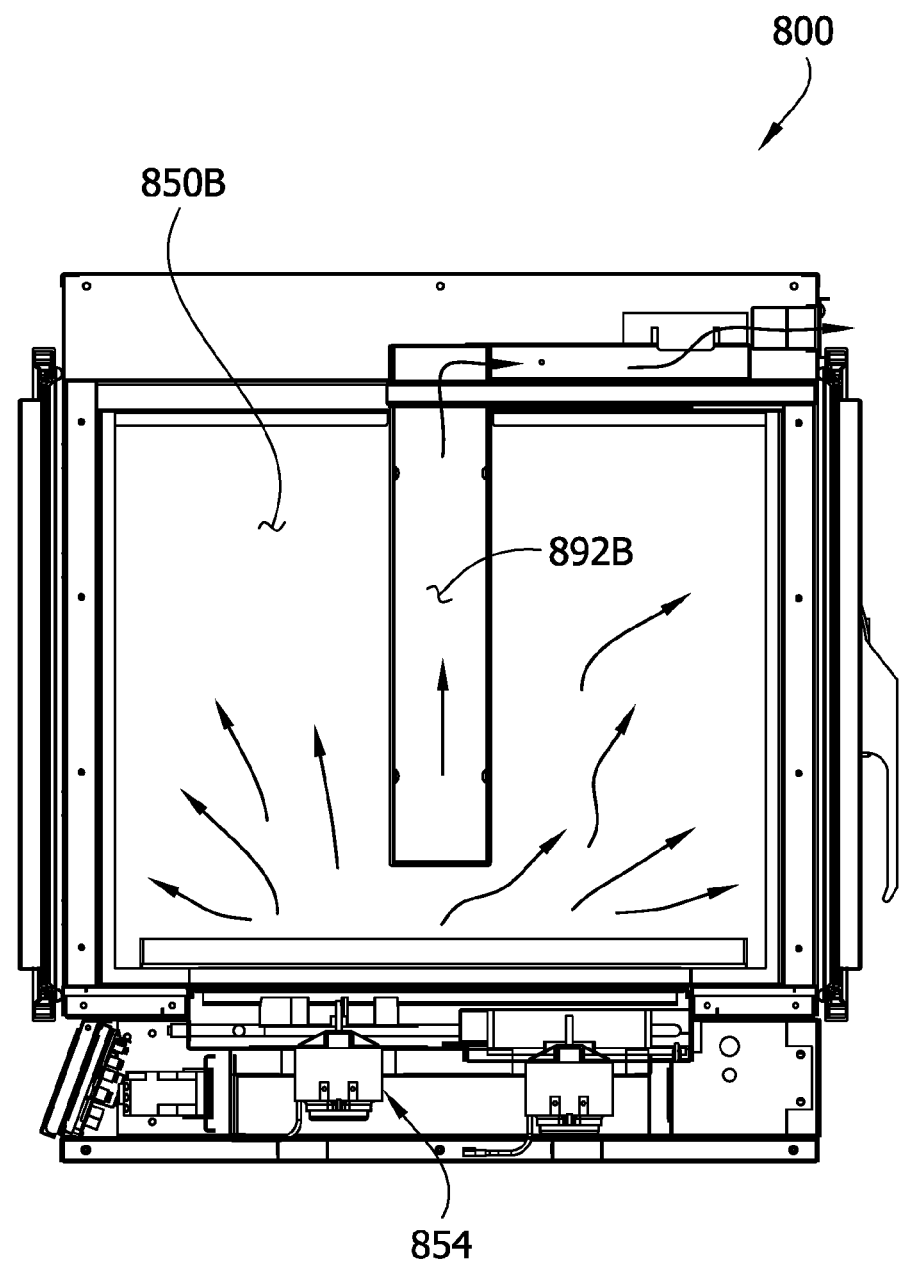
FIG. 80 is a vertical section of the oven taken along the depth of the oven, a removable side panel of the oven being removed.

Referring to FIGS. 78-80, the de-humidifying mechanism 860 comprises a vent 892 and a fan 894 for venting (exhausting) high-humidity air from the cavity 824 to atmosphere. The vent 892 comprises right and left side vent ducts 892A, 892B and an upper vent connecting duct 892C connecting the side vent ducts 892A, 892B in communication with the fan 894. The vent 892 also includes an outlet 892D downstream from the fan 894 where the air is vented to atmosphere through a perforated plate 892E (FIG. 81) at the rear of the oven 820. When energized, the vent fan 894 creates a flow of air to exhaust air from the cavity 824 through the left and right side vent ducts 892A, 892B the vent connecting duct 892C, and the outlet 892D. The right and left vent ducts 892A, 892B have inlets 892A', 892B' (FIG. 69) comprising arrays of perforations in the interior side walls 843A, 843B. Other types of inlets may be used without departing from the scope of the present invention.

The left and right side vent ducts 892A, 892B are positioned inside respective left and right side air ducts 850B, 850C about midway along the length of the cavity 824. FIG. 80 illustrates a right side vertical section with a removable panel being removed, as will be described in further detail below, to show positioning of the left side vent duct 892B with respect to the left side air duct 850B. The left side vent duct 892B has a bottom which is above and spaced from the bottom of the left side air duct 850B and extends upward to the top of the left side air duct. As shown in FIG. 80, the air flowing in the left side air duct 850B can flow from front to back (e.g., generally from the blower toward the rear of the left side air duct) within the left side air duct below the bottom of the left side vent duct 892B. However, the vent duct 892B blocks front-to-back flow of air in the left side air duct 850B above the bottom of the left side vent duct. The ductwork may be configured differently to permit different flow patterns without departing from the scope of the present invention. The air flow shown in the duct 892B in FIG. 80 represents air which has entered the duct from the cavity 824 to be exhausted. Desirably, air is substantially blocked from flowing directly from the left side air duct 850B into the left side vent duct 892B. It is understood the right side ductwork has substantially the same construction as described with respect to the left side ductwork.

Referring to FIGS. 66, 68, and 79, the oven 820 includes an electronic control system 972 in the lower compartment 836 toward the front of the cabinet 822. The control system may be substantially the same as control systems described above with respect to other embodiments. For example, the control system 972 includes the controller 866 comprising a microprocessor, memory, and associated components. The system 972 also includes an operator input 976 (e.g., touch screen) which is covered by a cover pivotally connected to the cabinet at its upper end.

As with the embodiments described above, the oven 800 may operate to create and maintain temperature, RH, and air flow conditions which are closely regulated and tailored to the food product being held in the cavity 824. For example, the controller 866 may be programmed in various ways to carry out rapid restoration and maintenance of temperature and RH conditions in the cavity 824, as described above.

Figure 81:
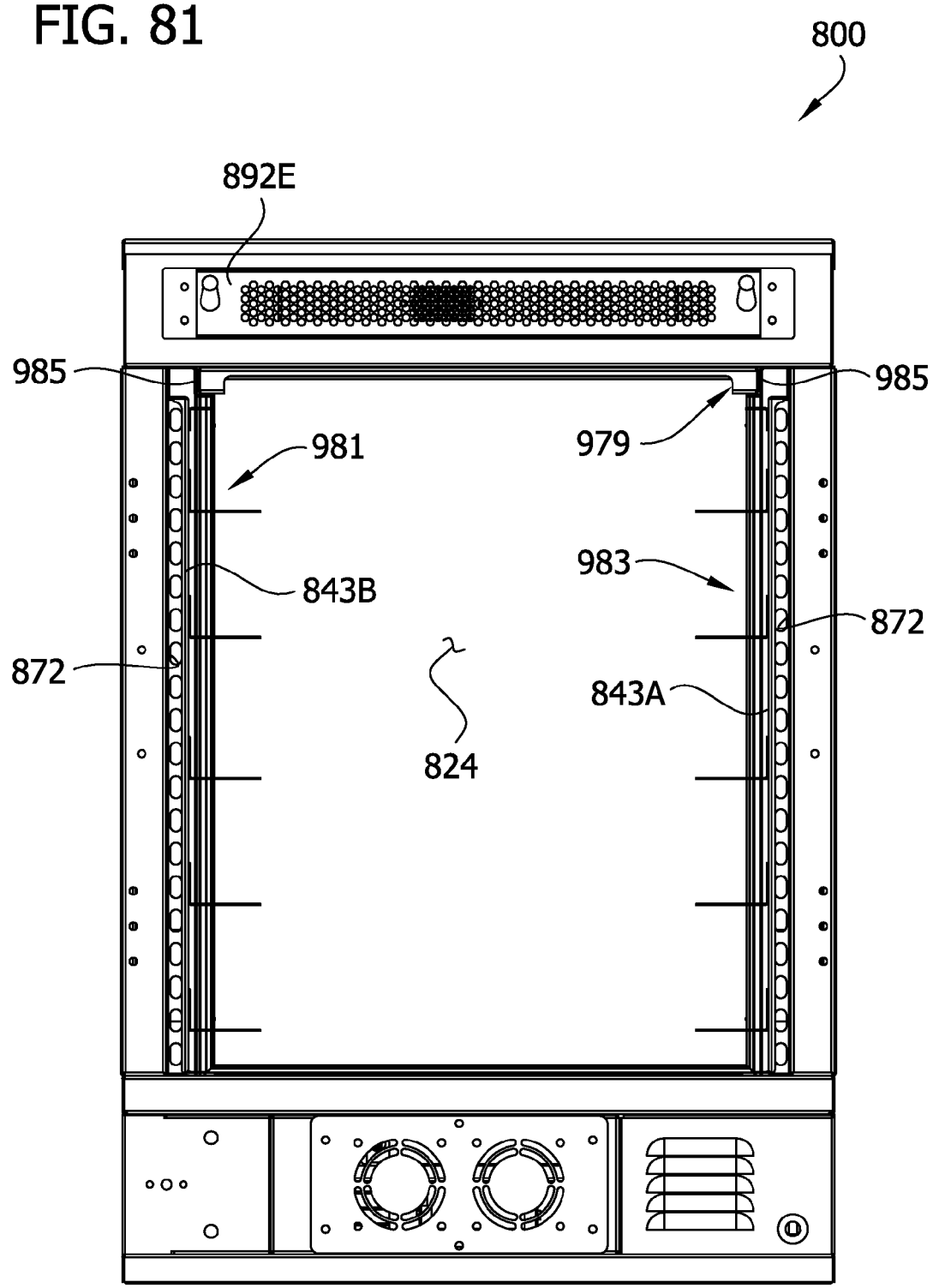
FIG. 81 is a rear elevation of the oven, the rear door and rear deflectors of the oven being removed.
Figure 82:
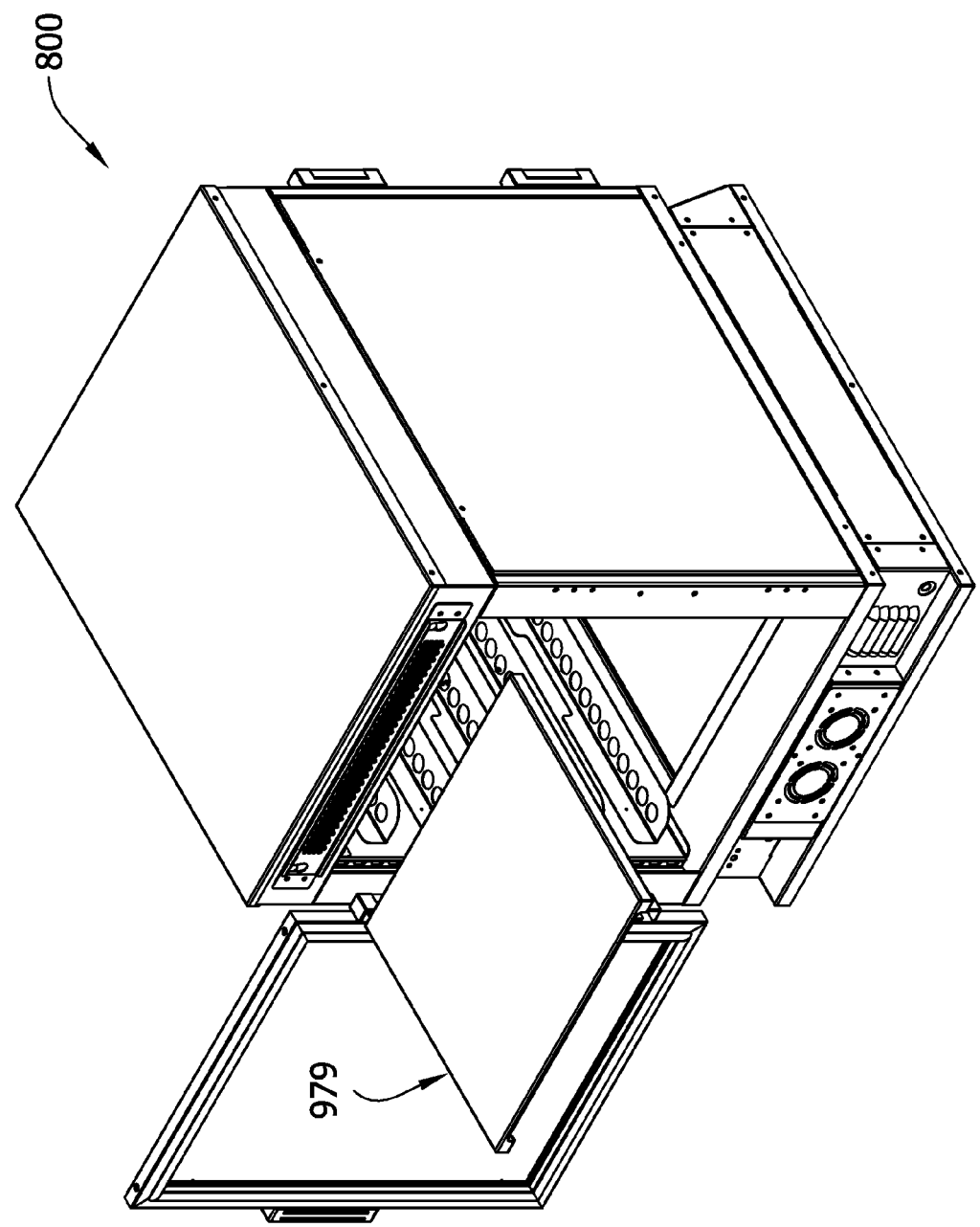
FIG. 82 is a perspective of the oven showing a removable upper panel removed from the oven.
Figure 83:
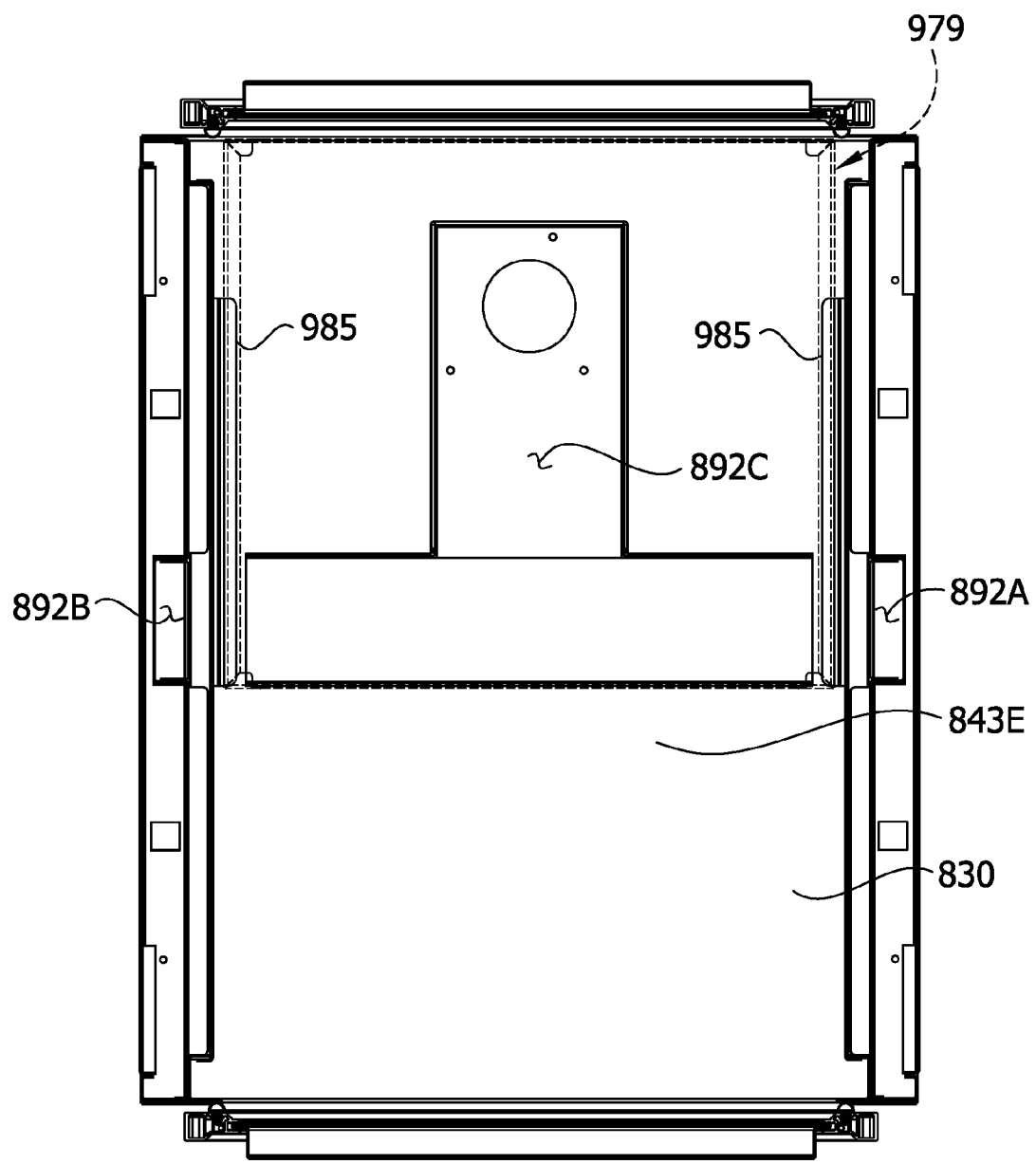
FIG. 83 is a bottom view of a horizontal section of the oven, the removable upper panel being shown in phantom.

FIG. 81 is an elevation of the rear side of the oven 800 having the rear door 842 and rear deflectors 873 removed to show details of a removable upper panel 979 and removable left and right side panels 981, 983. The panels 979, 981, 983 are removable to provide convenient access from the cavity 824 to clean internal surfaces of ductwork. The removable upper panel 979 has an inner surface which faces the cavity 824 and defines an upper boundary of the cavity and an opposite outer surface which faces away from the cavity and forms a boundary of the upper vent duct 892C. The removable upper panel 979 is mounted above the cavity 824 on slide rails 985 secured to upper internal horizontal panel 830. Together, the upper internal horizontal panel 830 and removable upper panel 979 form the upper wall 843E of the cavity 824. Alternatively, the removable upper panel 979 may form the entire upper wall 843E. The removable upper panel 979 is removable from the cabinet 822 by pulling it out of the open rear door opening, as illustrated in FIG. 82. FIG. 83 illustrates a horizontal section of the oven 800 looking upward and shows the removable upper panel 979 in phantom. The removable upper panel 979 has a width which extends substantially the entire width of the cavity 824 and a length which extends along the length of the cavity about corresponding to the length dimension of the upper vent duct 892C. Accordingly, the removable upper panel 979 may be removed from the cabinet 822 by hand, the exposed internal surfaces of the upper vent duct 892C can be cleaned, and the removable upper panel may then be replaced in the cabinet.

In the illustrated embodiment, the removable left and right side panels 981, 983 define the left and right interior walls 843A, 843B of the cavity. The removable left and right side panels 981, 983 each include inner surfaces which face the cavity and define a side boundary of the cavity and opposite outer surfaces which face away from the cavity and form a boundary of a respective left or right side air duct 850B, 850C. The removable left and right side panels 981, 983 extend substantially the entire length of the cavity 824 and extend substantially the entire height of the cavity.

Figure 84:
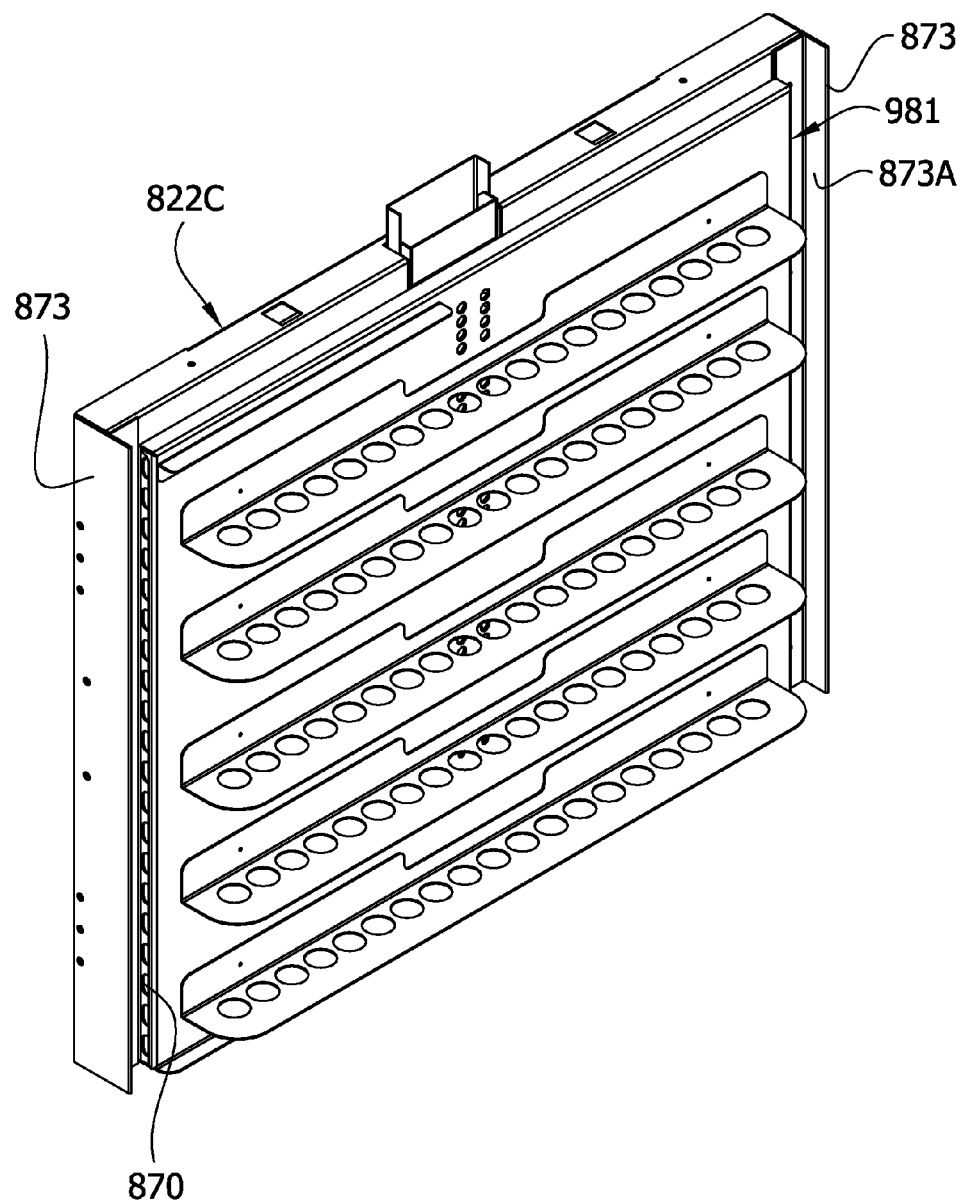
FIG. 84 is a perspective of a removable left side panel connected to a left side wall of a cabinet of the oven.
Figure 85:
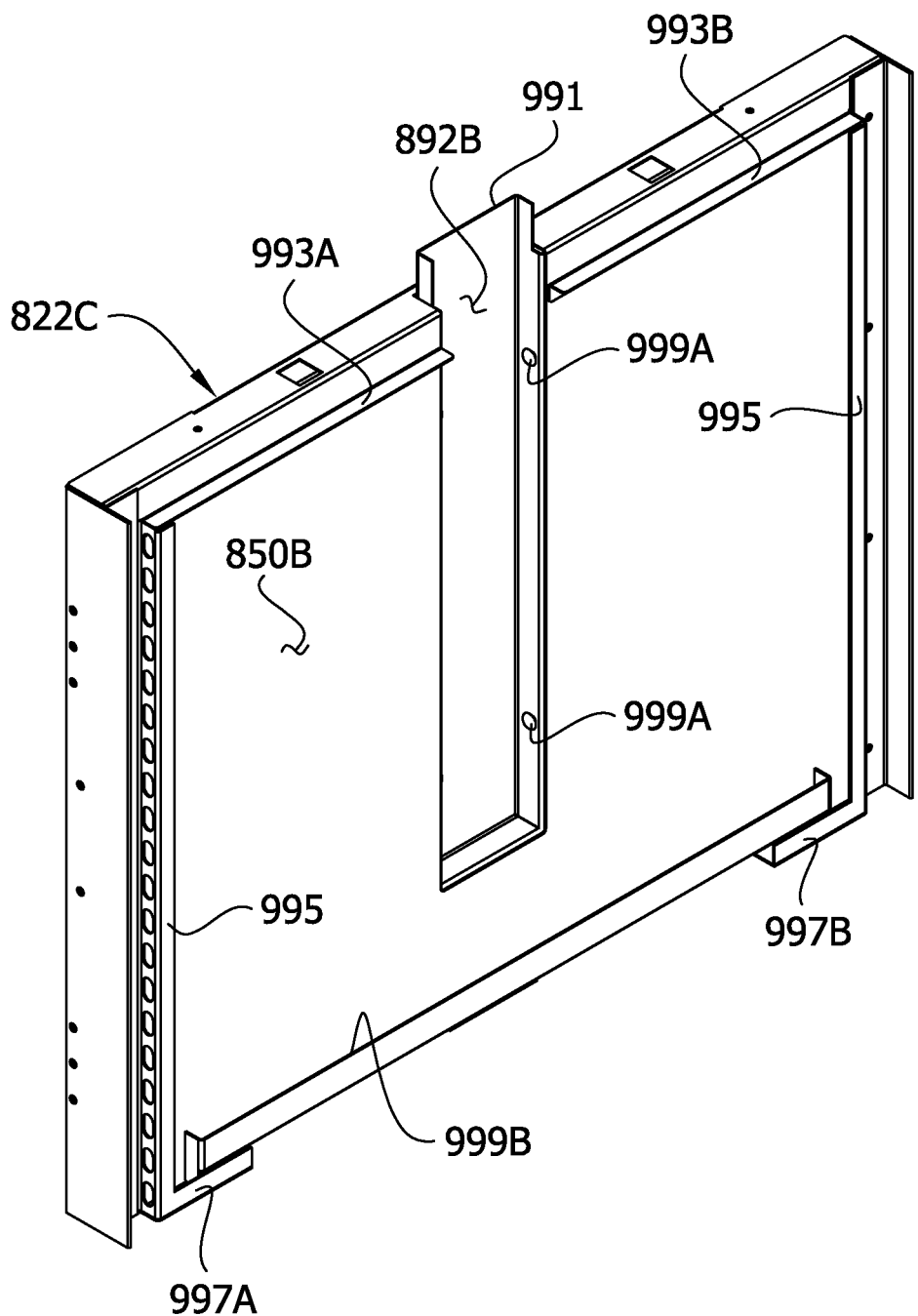
FIG. 85 is a view similar to FIG. 84 but showing the removable left side panel being removed.

FIG. 84-89 illustrates various views of the left side wall 822C of the cabinet 822 and the removable left side panel 981 to show details of the cooperation of the left side wall of the cabinet with the removable left side panel in forming the left side air duct 850B and the left side vent duct 892B. It is understood the right side of the oven 820 is constructed as essentially a mirror image and functions essentially the same as the left side. FIG. 84 is a perspective of the removable left side panel 981 connected to the left side wall 822C as it would be in the fully constructed oven 800. FIG. 85 illustrates a similar view but the removable left side panel 981 has been removed. As shown, the internal surfaces of the left side air duct 850B are exposed, and internal surfaces of the left side vent duct 892B are exposed. Accordingly, this ductwork 850B, 892B could be conveniently accessed from the cavity 824 for cleaning when the left side panel 981 is removed. As shown in FIG. 85, the left side wall 822C includes a generally U-shaped channel 991 which forms boundaries of the left side vent duct 892B. The left side wall 822C also includes structure which forms boundaries of the left side air duct 850B. More specifically, the left side wall 822C includes an inner surface facing the cavity forming a left boundary, forward and rear upper flanges 993A, 993B forming an upper boundary, front and rear channels 995 (which include the outlet openings 870, 872) forming front and rear boundaries, and lower channels 997A, 997B which cooperate with the lower wall 843F to form a lower boundary. The space between the channels 997A and 997B defines the inlet of the left side air duct 850B, i.e., where it communicates with the lower air duct 850A.

The left wall 822C also includes quick-release mechanism structure which, as will be explained later, cooperates with structure on the removable left side panel 981 to form a quick-release mechanism 999 for connecting the removable left side panel to the left side wall to form the ductwork. The quick-release mechanism structure of the removable left side panel includes upper and lower sets of pins 999A on front and rear walls of the U-shaped channel and a horizontal bar 999B extending along the length of the left side wall 822C adjacent the bottom of the left side wall. The bar 999B is spaced from the inside surface of the left side wall 822C to define an inlet of the left side air duct 850B through which the lower air duct 850A communicates with the left side air duct. As explained in further detail below, the removable left side panel 981 includes structure which cooperates with the bar 999B to form part of the quick-release mechanism 999.

Figure 86:
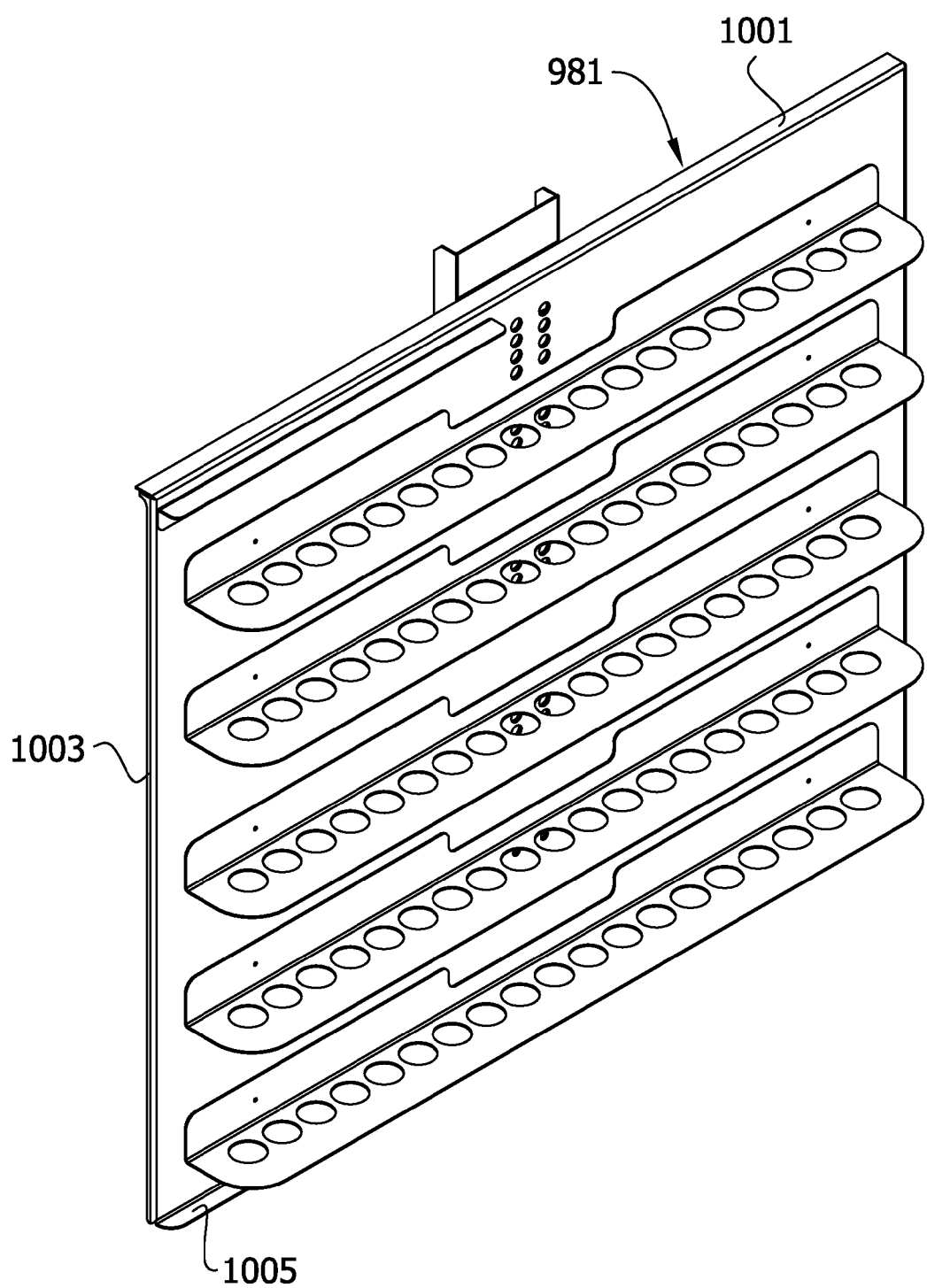
FIG. 86 is a perspective of the removable left side panel.
Figure 87:
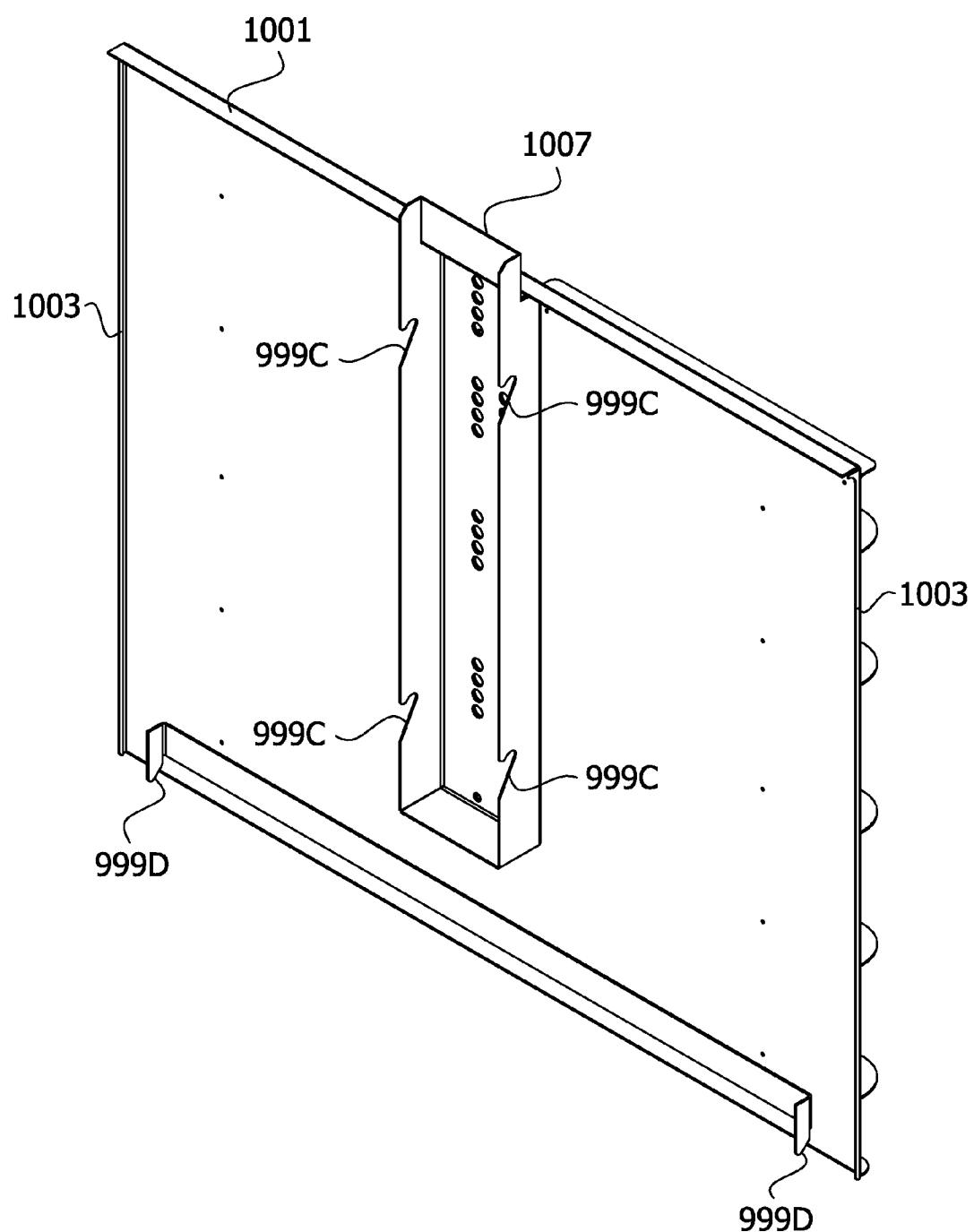
FIG. 87 is a rear perspective of the removable left side panel.

FIG. 86 is a front perspective and FIG. 87 is a rear perspective of the removable left side panel 981 alone. The removable left side panel 981 includes an upper flange 1001 extending along the length of the panel which cooperates with the upper flanges 993A, 993B of the left side wall 822C for forming the upper boundary of the left side air duct 850B. The removable left side panel 981 also includes front and rear flanges 1003 extending along the height of the panel which cooperate with the respective front and rear channels 995 on the left side wall 822C for forming the front and rear boundaries of the left side air duct 850B. The removable left side panel 981 includes a bottom flange 1005 extending along the length of the panel which cooperates with the lower wall 843F to form the lower boundary of the left side air duct 850B. The left side panel 981 also includes on its outer surface a generally U-shaped channel 1007 which cooperatively mates with the U-shaped channel 991 of the left side wall 822C for forming the left side vent duct 892B. More specifically, the U-shaped channel 1007 of the left side panel has front and rear walls which are spaced closer to one another than the front and rear walls of the U-shaped channel 991 on the left wall. Accordingly, the U-shaped channel 1007 of the removable left side panel 981 nests in the U-shaped channel 991 of the left side wall 822C.

Figure 88:
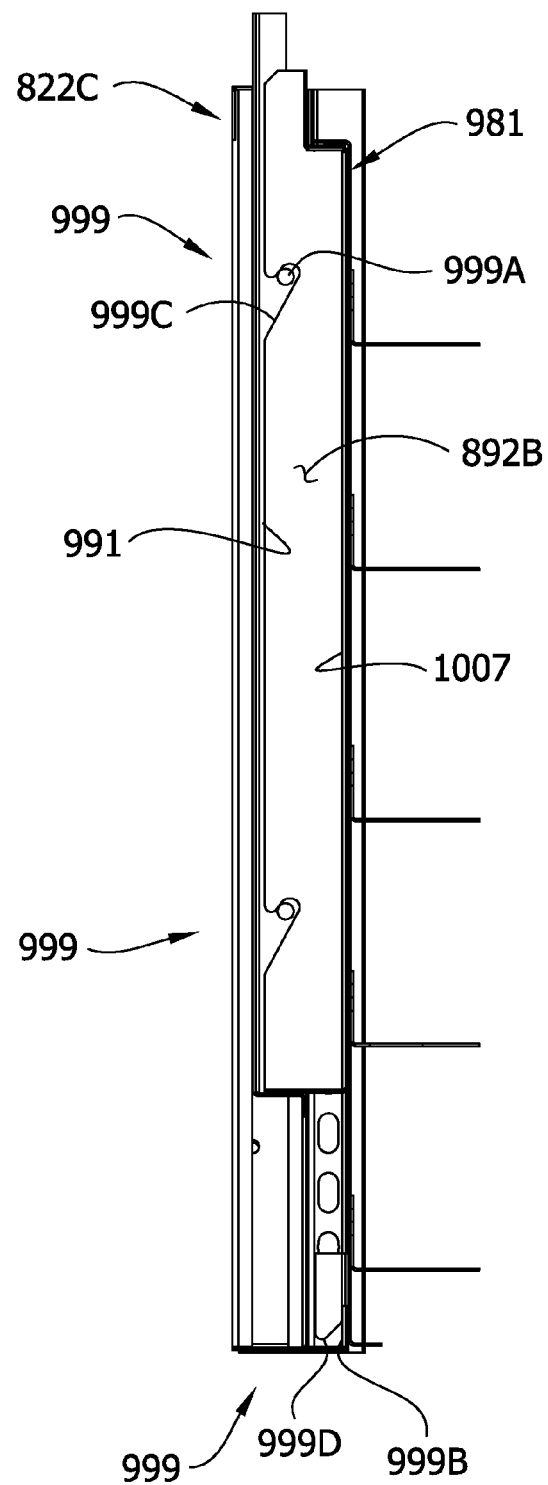
FIG. 88 is a vertical section of the removable left side panel connected to the side wall.
Figure 89:
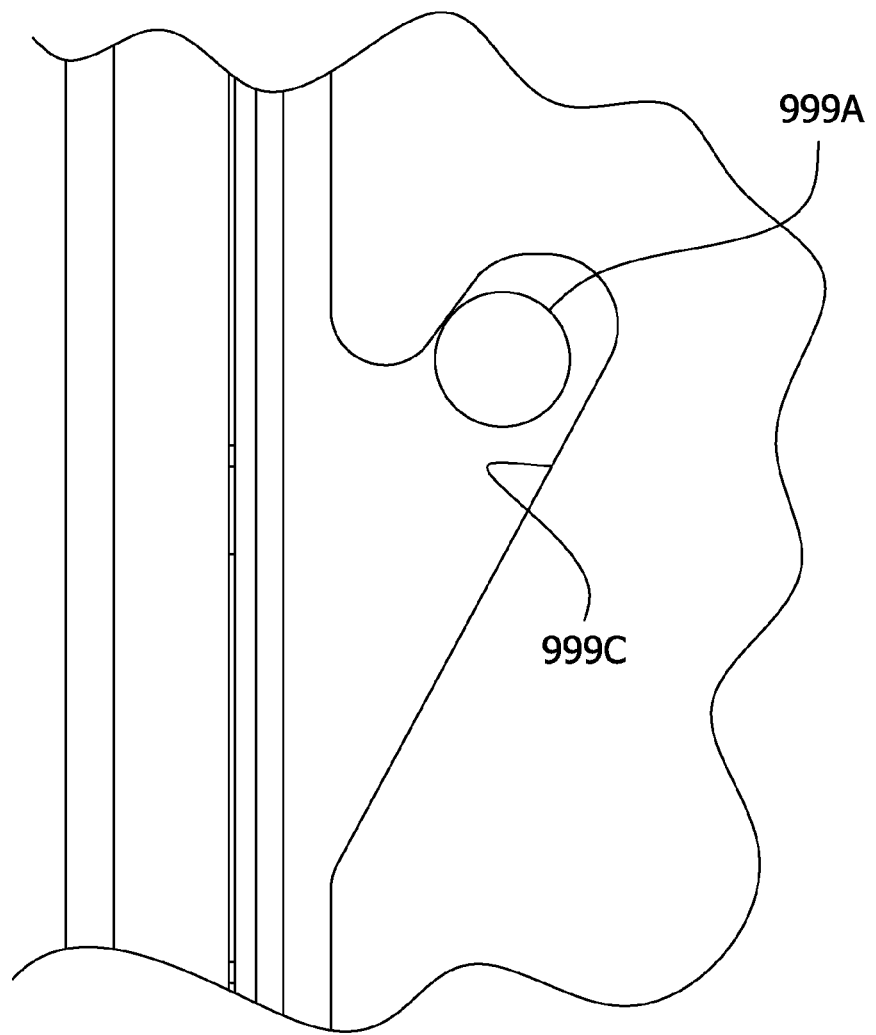
FIG. 89 is an enlarged portion of the section of FIG. 88.

The removable left side panel 981 also includes quick-release mechanism structure which cooperates with the quick-release mechanism structure on the left side wall 822C for forming the quick release mechanism 999 for connecting the removable left side panel to the left side wall. As will become apparent, the quick-release mechanism 999 permits removal of the left side panel 981 from the left side wall 822C by hand, without tools. The quick-release mechanism structure of the left side panel 981 includes pairs of angled slots 999C on the front and rear walls of the U-shaped channel which cooperate with the pins 999A of the left side wall 822C and camming feet 999D (FIGS. 87 and 88) adjacent the bottom of the left side wall which cooperate with the bar 999B adjacent the bottom of the left side wall. FIG. 88 illustrates a front vertical cross section of the left side panel 981 connected to the left side wall 822C. Heads of the pins 999A are removed to show location of shafts of the pins (having relatively smaller diameters than the heads) with respect to the slots 999C. As shown, the slots 999C are received over the shafts of the pins 999A. The slots 999C are configured such that the pins 999A do not "bottom out" in the slots. FIG. 89 is an enlarged view of the upper rear pin-and-slot connection of FIG. 88. As shown, the slot 999C is configured to wedge bearing surfaces of the left side panel 981 (e.g., flange 1001 and flanges 1003) against bearing surfaces of the left side wall 822C (e.g., flanges 993A and 993B and channels 995) to enhance seals of the left side panel with the left side wall. More particularly, the slot 999C is configured (e.g., is oriented at an acute angle with respect to vertical) such that a side of the slot forces the left side panel 981 toward the left side wall 822C as the slot advances onto the pin 999A. The force of gravity translates into a constant horizontal sealing force at the bearing surfaces of the removable left side panel 981 and left side wall 822C due to the camming action of the slots 999C on the pins 999A. Moreover, as shown in FIG. 88, the lower camming feet 999D on the left side panel 981 maintain the lower end of the left side panel in close proximity to the left side wall. In particular, while the removable left side panel 981 is being installed, a slanted camming surface of the feet engage the top edge of the bar 999B and guide the feet into the space between the bar and the inside surface of the left side wall 822C (i.e., into the space which defines the inlet of the left side air duct 850B). As the camming feet 999D move downward over the horizontal bar 999B, the camming surface of the feet guide the horizontal bar into a narrow space between a respective foot and the outer surface of the left side panel 981. The quick-release mechanism 999 may be released by lifting the left side panel 981 upward and then inward widthwise of the cavity 824, to disengage the slots 999C from the pins 999A and the camming feet 999D from the bar 999B. The left side panel 981 may then be removed from the cavity 824. These steps may be repeated in opposite order to re-mount the left side panel 981 inside the cabinet 822 by reestablishing the connection of the quick-release mechanism 999.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawing[s] shall be interpreted as illustrative and not in a limiting sense.

What is claimed is:

1. An oven comprising:
   a food receiving space for receiving food; and
   a humidifying mechanism for increasing humidity in the food receiving space, the humidifying mechanism including
      a rotor having a flexible surface, the rotor being configured for rotating about an axis of rotation, the flexible surface being deformable for breakup of mineral deposits on the flexible surface, and
      a water-delivery mechanism including a water line having a first end, a second end, and a length extending from the first end to the second end, the water-delivery mechanism being configured for delivering water to the flexible surface of the rotor,
   wherein the flexible surface has an at rest configuration when the rotor is not rotating and the rotor is configured such that the flexible surface deforms relative to the at rest configuration when the rotor rotates about the axis of rotation; and wherein the flexible surface includes first and second portions, the first portion being positioned a first distance from the axis of rotation and the second portion being positioned a second greater distance from the axis of rotation, and wherein the flexible surface is configured such that the second portion sags with respect to the first portion when the rotor is in the at rest configuration and sag of the second portion with respect to the first portion decreases when the rotor is rotated.

2. The oven as set forth in claim 1 wherein the rotor is configured such that the flexible surface flexes relative to the at rest configuration when the rotor is rotating.

3. The oven as set forth in claim 1 wherein the flexible surface is configured to elongate in a direction generally perpendicular to the axis of rotation when the rotor is rotated.

4. The oven as set forth in claim 1 wherein the rotor has a thickness in a direction generally parallel to the axis of rotation, and the rotor is configured to decrease in thickness when the rotor is rotated.

5. The oven as set forth in claim 1 wherein the rotor comprises a rotor body having the flexible surface, the rotor body comprising flexible material.

6. The oven as set forth in claim 1 wherein the rotor comprises a rotor body having the flexible surface, the rotor body comprising elastomeric material.

7. The oven as set forth in claim 1 wherein the oven includes a blower configured for forcing gas into the food receiving space, the rotor being separate from and not mounted on the blower.

8. The oven as set forth in claim 1 wherein the rotor is mounted in a receptacle, the receptacle including a side wall surrounding the rotor.

9. The oven as set forth in claim 8 further comprising a heating element configured for heating the receptacle for vaporizing the water delivered to the flexible surface of the rotor.

10. A method for increasing humidity in a food receiving space of an oven, the method comprising:
delivering water to a flexible surface of a rotor,
rotating the rotor about an axis of rotation,
heating the water to change the water to water vapor, and
deforming the flexible surface to breakup mineral deposits on the flexible surface,
wherein the flexible surface has an at rest configuration when the rotor is not rotating, and wherein rotating the rotor causes the flexible surface of the rotor to deform relative to the at rest configuration,
wherein a peripheral portion of the flexible surface saps with respect to a central portion of the flexible surface when the rotor is not rotating and the sag decreases when the rotor rotates.

11. The method as set forth in claim 10 wherein rotating the rotor about the axis of rotation moves the water away from the axis of rotation before the water changes to water vapor.

12. The method as set forth in claim 10 wherein rotating the rotor about the axis of rotation causes the water delivered to the flexible surface to move away from the axis of rotation toward a heated wall surrounding the flexible rotor for changing the water to water vapor, the heated wall being different from a blower wheel of the oven.

13. The method as set forth in claim 10 wherein the axis of rotation is a first axis of rotation and the method further comprises rotating a blower about a second axis of rotation different than the first axis of rotation for moving the water vapor into the food receiving space.

14. The oven as set forth in claim 5 wherein the rotor body has a generally disc shape.

15. The oven as set forth in claim 1 wherein the rotor comprises a rotor body having a face facing generally parallel with the axis of rotation, the face including said flexible surface.

16. An oven comprising:
a food receiving space for receiving food; and
a humidifying mechanism for increasing humidity in the food receiving space, the humidifying mechanism including
a rotor having a flexible surface, the rotor being configured for rotating about an axis of rotation, the flexible surface being deformable for breakup of mineral deposits on the flexible surface, and
a water-delivery mechanism including a water line having a first end, a second end, and a length extending from the first end to the second end, the water-delivery mechanism being configured for delivering water to the flexible surface of the rotor,
wherein the rotor comprises a rotor body having a face facing generally parallel with the axis of rotation, the face including said flexible surface,
wherein the rotor body is foldable without irreversibly deforming the rotor body.

17. The oven as set forth in claim 1 wherein the flexible surface is configured to deform automatically when the rotor is rotated about the axis of rotation.

18. The method as set forth in claim 10 wherein deforming the flexible surface comprises deforming the flexible surface in a direction in which the axis of rotation extends.

* * * * *